(12) United States Patent
Cefalo et al.

(10) Patent No.: US 9,683,102 B2
(45) Date of Patent: Jun. 20, 2017

(54) PHOTO-STABLE AND THERMALLY-STABLE DYE COMPOUNDS FOR SELECTIVE BLUE LIGHT FILTERED OPTIC

(71) Applicant: Frontier Scientific, Inc., Logan, UT (US)

(72) Inventors: Dustin Robert Cefalo, Hudrum, UT (US); Jerry Charles Bommer, Franklin, ID (US); Anita Trajkovska-Broach, Christiansburg, VA (US); Ronald David Blum, Roanoke, VA (US); Andrew Ishak, Havre de Grace, MD (US); Sean McGinnis, Roanoke, VA (US)

(73) Assignee: Frontier Scientific, Inc., Logan, UT (US)

( * ) Notice: Subject to any disclaimer, the term of this patent is extended or adjusted under 35 U.S.C. 154(b) by 0 days.

(21) Appl. No.: 14/702,551

(22) Filed: May 1, 2015

(65) Prior Publication Data
US 2015/0316688 A1    Nov. 5, 2015

Related U.S. Application Data

(60) Provisional application No. 61/988,360, filed on May 5, 2014.

(51) Int. Cl.
*G02B 5/23*   (2006.01)
*C09B 47/00*  (2006.01)
(Continued)

(52) U.S. Cl.
CPC .............. *C09B 47/00* (2013.01); *G02B 1/04* (2013.01); *G02B 1/041* (2013.01); *G02B 1/043* (2013.01); *G02B 5/208* (2013.01); *G02B 5/223* (2013.01)

(58) Field of Classification Search
USPC ............... 252/582, 586; 351/159.01, 159.24, 351/159.27, 159.29; 359/722; 623/6.17;
(Continued)

(56) References Cited

U.S. PATENT DOCUMENTS 3,269,267 A     8/1966  Collins
3,687,863 A  *  8/1972  Wacher ................. G02B 5/223
                                                          252/582

(Continued)

FOREIGN PATENT DOCUMENTS

CA    2054160 C    10/2002
CN    1659235 A    8/2005
(Continued)

OTHER PUBLICATIONS

Femke de Loos, Irene C. Reynhout, Jeroen J. L. M. Cornelissen, Alan E. Rowan and Roeland J. M. Nolte, Construction of functional porphyrin polystyrene nano-architectures by ATRP, Chem. Commun., 2005, 60-62, This journal is The Royal Society of Chemistry 2005.*

(Continued)

*Primary Examiner* — Bijan Ahvazi
(74) *Attorney, Agent, or Firm* — Sterne, Kessler, Goldstein & Fox P.L.L.C.

(57) ABSTRACT

A system is provided comprising an optical filter. The optical filter comprises a Cu-porphyrin dye compound. The transmission spectrum of the system has an average transmission across the wavelength range of 460 nm-700 nm of at least 80%. The transmission spectrum of the system has an average transmission across the wavelength range 400 nm-460 nm that is less than 75%.

29 Claims, 76 Drawing Sheets

(51) Int. Cl.
*G02B 1/04* (2006.01)
*G02B 5/20* (2006.01)
*G02B 5/22* (2006.01)
*C07B 47/00* (2006.01)
*C07D 487/22* (2006.01)
*C09D 1/00* (2006.01)
*C09D 11/00* (2014.01)
*C09D 4/00* (2006.01)
*C09D 5/00* (2006.01)
*C09K 3/00* (2006.01)

(58) Field of Classification Search
USPC .......................... 106/31.49, 31.78; 540/145
See application file for complete search history.

(56) References Cited

U.S. PATENT DOCUMENTS

| | | | |
|---|---|---|---|
| 4,017,292 A | 4/1977 | Mann | |
| 4,043,637 A | 8/1977 | Hovey | |
| 4,247,177 A | 1/1981 | Marks et al. | |
| 4,390,676 A | 6/1983 | Loshaek | |
| 4,581,288 A | 4/1986 | Barnhart et al. | |
| 4,656,186 A | 4/1987 | Bommer et al. | |
| 4,679,918 A | 7/1987 | Ace | |
| 4,698,374 A | 10/1987 | Gallas | |
| 4,793,669 A | 12/1988 | Perilloux | |
| 4,826,286 A | 5/1989 | Thornton | |
| 4,878,748 A | 11/1989 | Johansen et al. | |
| 4,952,046 A | 8/1990 | Stephens et al. | |
| 5,054,902 A | 10/1991 | King | |
| 5,172,256 A | 12/1992 | Sethofer et al. | |
| 5,177,509 A | 1/1993 | Johansen et al. | |
| 5,235,358 A | 8/1993 | Mutzhas et al. | |
| 5,373,515 A | 12/1994 | Wakabayashi et al. | |
| 5,374,663 A | 12/1994 | Daicho et al. | |
| 5,400,175 A | 3/1995 | Johansen et al. | |
| 5,470,932 A | 11/1995 | Jinkerson | |
| 5,521,765 A | 5/1996 | Wolfe | |
| 5,528,322 A | 6/1996 | Jinkerson | |
| 5,534,041 A | 7/1996 | Havens et al. | |
| 5,543,504 A | 8/1996 | Jinkerson | |
| 5,617,154 A | 4/1997 | Hoffman | |
| 5,650,137 A | 7/1997 | Nguyen et al. | |
| 5,662,707 A | 9/1997 | Jinkerson | |
| 5,694,240 A | 12/1997 | Sternbergh | |
| 5,702,819 A | 12/1997 | Gupta et al. | |
| 5,729,379 A | 3/1998 | Allemand et al. | |
| 5,891,229 A | 4/1999 | Nohr et al. | |
| 6,021,001 A | 2/2000 | Turner | |
| 6,102,539 A | 8/2000 | Tucker | |
| 6,145,984 A | 11/2000 | FarWig | |
| 6,158,862 A | 12/2000 | Patel et al. | |
| 6,220,703 B1 | 4/2001 | Evans et al. | |
| 6,231,183 B1 | 5/2001 | Dillon | |
| 6,277,940 B1 | 8/2001 | Niwa et al. | |
| 6,305,801 B1 | 10/2001 | Kerns et al. | |
| 6,306,316 B1 | 10/2001 | Mann et al. | |
| 6,310,215 B1 | 10/2001 | Iwamoto | |
| 6,326,448 B1 | 12/2001 | Ojio et al. | |
| 6,334,680 B1 | 1/2002 | Larson | |
| 6,373,615 B1 | 4/2002 | Mann et al. | |
| 6,411,450 B1 | 6/2002 | Gatewood et al. | |
| 6,444,146 B2 | 9/2002 | Yoshimura et al. | |
| 6,554,424 B1 | 4/2003 | Miller et al. | |
| 6,604,824 B2 | 8/2003 | Larson | |
| 6,641,261 B2 | 11/2003 | Wang et al. | |
| 6,793,339 B1 | 9/2004 | Yip et al. | |
| 6,851,074 B2 | 2/2005 | Milojicic et al. | |
| 6,863,848 B2 | 3/2005 | Engardio et al. | |
| 6,918,931 B2 | 7/2005 | Lai et al. | |
| 6,926,405 B2 | 8/2005 | Ambler et al. | |
| 6,955,430 B2 | 10/2005 | Pratt | |
| 6,960,231 B2 | 11/2005 | Tran | |
| 6,972,034 B2 | 12/2005 | Tran et al. | |
| 6,984,038 B2 | 1/2006 | Ishak | |
| 6,984,734 B2 | 1/2006 | Sessler et al. | |
| 6,986,579 B2 | 1/2006 | Blum et al. | |
| 7,029,118 B2 | 4/2006 | Ishak | |
| 7,029,758 B2 | 4/2006 | Gallas et al. | |
| 7,033,391 B2 | 4/2006 | Lai et al. | |
| 7,066,596 B2 | 6/2006 | Ishak | |
| 7,098,283 B2 | 8/2006 | Lai | |
| 7,166,357 B2 | 1/2007 | Kumar et al. | |
| 7,241,312 B2 | 7/2007 | Lai et al. | |
| 7,255,435 B2 | 8/2007 | Pratt | |
| 7,271,298 B2 | 9/2007 | Xu et al. | |
| 7,275,822 B2 | 10/2007 | Gupta et al. | |
| 7,276,544 B2 | 10/2007 | Lai et al. | |
| 7,278,737 B2 | 10/2007 | Mainster et al. | |
| 7,279,538 B2 | 10/2007 | Lai et al. | |
| 7,304,117 B2 | 12/2007 | Lai | |
| 7,364,291 B2 | 4/2008 | Haywood et al. | |
| 7,429,275 B2 | 9/2008 | Hercouet et al. | |
| 7,520,608 B2 | 4/2009 | Ishak et al. | |
| 7,524,060 B2 | 4/2009 | Sanchez Ramos | |
| 7,556,376 B2 * | 7/2009 | Ishak ..................... | G02C 7/104 351/159.01 |
| 7,713,452 B2 | 5/2010 | Kauffman et al. | |
| 7,832,903 B2 | 11/2010 | Ramos | |
| 7,914,177 B2 | 3/2011 | Ramos | |
| 8,113,651 B2 | 2/2012 | Blum | |
| 8,360,574 B2 | 1/2013 | Ishak et al. | |
| 9,226,917 B2 | 1/2016 | Strong et al. | |
| 2001/0032565 A1 * | 10/2001 | Nohr ..................... | C09B 47/00 106/31.49 |
| 2002/0042653 A1 | 4/2002 | Copeland et al. | |
| 2002/0118431 A1 | 8/2002 | Sommer et al. | |
| 2002/0126256 A1 | 9/2002 | Larson | |
| 2002/0159026 A1 | 10/2002 | Bernheim | |
| 2003/0076474 A1 | 4/2003 | Wang et al. | |
| 2003/0105130 A1 | 6/2003 | Hurley et al. | |
| 2003/0193643 A1 | 10/2003 | Pratt | |
| 2003/0229131 A1 | 12/2003 | Sessler et al. | |
| 2004/0014737 A1 | 1/2004 | Vicente et al. | |
| 2004/0041287 A1 | 3/2004 | Engardio et al. | |
| 2004/0070726 A1 | 4/2004 | Ishak | |
| 2004/0084790 A1 | 5/2004 | Blum et al. | |
| 2004/0185268 A1 | 9/2004 | Kumar et al. | |
| 2004/0246437 A1 | 12/2004 | Ambler et al. | |
| 2005/0018131 A1 | 1/2005 | Ishak | |
| 2005/0043793 A1 | 2/2005 | Pratt | |
| 2005/0054797 A1 | 3/2005 | Lai | |
| 2005/0055090 A1 | 3/2005 | Lai et al. | |
| 2005/0055091 A1 | 3/2005 | Lai | |
| 2005/0090428 A1 | 4/2005 | Compans et al. | |
| 2005/0143812 A1 | 6/2005 | Paul et al. | |
| 2005/0243272 A1 | 11/2005 | Mainster et al. | |
| 2005/0248752 A1 | 11/2005 | Hall | |
| 2005/0254003 A1 | 11/2005 | Jani et al. | |
| 2005/0273163 A1 | 12/2005 | Tran et al. | |
| 2005/0283234 A1 | 12/2005 | Zhou et al. | |
| 2006/0020337 A1 | 1/2006 | Lai et al. | |
| 2006/0020338 A1 | 1/2006 | Lai | |
| 2006/0092374 A1 | 5/2006 | Ishak | |
| 2006/0099148 A1 | 5/2006 | Fisher et al. | |
| 2006/0119954 A1 | 6/2006 | Casper et al. | |
| 2006/0126019 A1 | 6/2006 | Liang et al. | |
| 2006/0146280 A1 | 7/2006 | Gupta et al. | |
| 2006/0197067 A1 | 9/2006 | Xia et al. | |
| 2006/0228725 A1 | 10/2006 | Salafsky | |
| 2006/0235428 A1 | 10/2006 | Silvestrini | |
| 2006/0241263 A1 | 10/2006 | Lai | |
| 2006/0252844 A1 | 11/2006 | Mentak | |
| 2007/0034833 A1 | 2/2007 | Parce et al. | |
| 2007/0035240 A1 | 2/2007 | Yang et al. | |
| 2007/0092831 A1 | 4/2007 | Lai et al. | |
| 2007/0159594 A9 | 7/2007 | Jani et al. | |
| 2007/0188701 A1 | 8/2007 | Sanchez Ramos | |
| 2007/0195262 A1 | 8/2007 | Mosse et al. | |
| 2007/0216861 A1 | 9/2007 | Ishak et al. | |
| 2007/0293666 A1 | 12/2007 | Minami et al. | |
| 2008/0002147 A1 | 1/2008 | Haywood et al. | |
| 2008/0013035 A1 | 1/2008 | Yang et al. | |

(56) References Cited

U.S. PATENT DOCUMENTS

| | | |
|---|---|---|
| 2008/0013045 A1 | 1/2008 | Mainster et al. |
| 2008/0043200 A1 | 2/2008 | Ishak et al. |
| 2008/0094566 A1 | 4/2008 | Ishak et al. |
| 2008/0186448 A1 | 8/2008 | Ishak et al. |
| 2008/0221674 A1 | 9/2008 | Blum et al. |
| 2008/0241951 A1 | 10/2008 | Battulga et al. |
| 2008/0291394 A1 | 11/2008 | Ishak |
| 2008/0297931 A1 | 12/2008 | Ramos |
| 2009/0247483 A1 | 10/2009 | Mitchell et al. |
| 2009/0268157 A1 | 10/2009 | Krieg-Kowald et al. |
| 2010/0004330 A1 | 1/2010 | Huant et al. |
| 2010/0007847 A1 | 1/2010 | Cano et al. |
| 2010/0053550 A1 | 3/2010 | Giraudet |
| 2010/0060850 A1 | 3/2010 | Giraudet |
| 2010/0066974 A1 | 3/2010 | Croft et al. |
| 2010/0085534 A1 | 4/2010 | Mainster |
| 2010/0091240 A1 | 4/2010 | Drobe et al. |
| 2010/0125136 A1 | 5/2010 | Yeh et al. |
| 2011/0075096 A1 | 3/2011 | Ishak et al. |
| 2011/0157546 A1 | 6/2011 | Ishak et al. |
| 2012/0008217 A1* | 1/2012 | Ishak .................. A61F 2/1613 359/722 |
| 2012/0075577 A1 | 3/2012 | Ishak et al. |
| 2012/0120515 A1 | 5/2012 | Ishak et al. |
| 2016/0320636 A1 | 11/2016 | Baillet et al. |
| 2016/0320638 A1 | 11/2016 | Jallouli et al. |

FOREIGN PATENT DOCUMENTS

| | | |
|---|---|---|
| CN | 1961041 A | 5/2007 |
| DE | 3544627 | 12/1985 |
| EP | 0763754 A2 | 3/1997 |
| EP | 1837698 A1 | 9/2007 |
| JP | H07-113710 | 7/1988 |
| JP | H01-204668 | 8/1989 |
| JP | H02-103504 | 4/1990 |
| JP | H06-324293 | 11/1994 |
| JP | H07-306387 | 11/1995 |
| JP | H08-254603 | 1/1996 |
| JP | H09-136902 | 5/1997 |
| JP | H09-187500 | 7/1997 |
| JP | H10-186291 | 7/1998 |
| JP | H11-52101 | 2/1999 |
| JP | H11-101901 | 4/1999 |
| JP | 2000-147201 | 5/2000 |
| JP | 2001-506012 | 5/2001 |
| JP | 2001-517324 | 10/2001 |
| JP | 2002-031701 A | 1/2002 |
| JP | 2002-530686 | 9/2002 |
| JP | 2003-215302 A | 7/2003 |
| JP | 2004-524558 | 8/2004 |
| JP | 2004-247156 A | 9/2004 |
| JP | 2005-261606 | 9/2005 |
| JP | 2006-91532 A | 4/2006 |
| JP | 2006-184596 | 7/2006 |
| JP | 2006-265408 | 10/2006 |
| JP | 2006-265532 | 10/2006 |
| JP | 2006-273717 | 10/2006 |
| JP | 2006-527397 A | 11/2006 |
| JP | 2007-535708 A | 12/2007 |
| JP | 2009-531719 A | 9/2009 |
| JP | 2010-511205 | 4/2010 |
| TW | 201607991 A | 3/2016 |
| WO | WO 88/02871 | 4/1988 |
| WO | WO 98/44380 | 10/1998 |
| WO | WO 2005/001554 A1 | 1/2005 |
| WO | WO 2005/111702 | 11/2005 |
| WO | WO 2005/116138 A1 | 12/2005 |
| WO | WO 2007/109202 A2 | 9/2007 |
| WO | WO 2007/120427 A1 | 10/2007 |
| WO | WO 2007/146933 A2 | 12/2007 |
| WO | WO 2008/024414 A2 | 2/2008 |
| WO | WO 2008/059177 | 5/2008 |
| WO | WO 2008/067109 A1 | 6/2008 |
| WO | WO 2008/106449 | 9/2008 |
| WO | WO 2009/053502 | 4/2009 |
| WO | WO 2010/111499 A1 | 9/2010 |
| WO | WO 2013/084178 | 6/2013 |

OTHER PUBLICATIONS

Louis D. Rollmann, Porous, Polymer-Bonded Metalloporphyrins, Journal of the American Chemical Society / 97:8 / Apr. 16, 1975, pp. 2131-2136.*

Baumeister, P. & Pincus, G, "Optical Interference Coatings," Scientific American, 1970.

CRC Handbook of Chemistry and Physics, 85th Ed., 2004-2005, pp. 10-217.

Ernest, "Light-transmission-spectrum comparison of foldable intraocular lenses," J. Cataract Refract Surg., vol. 30, 2004, p. 1755-1758.

Espindle et al., "Quality-of-life improvements in cataract patients with bilateral blue light-filtering intraocular lenses: Clinical trial" J. Cataract Refract Surg., vol. 31, Oct. 2005, p. 1952-1959.

Infeld, K."Sunlight Poses Universal Cataract Risk" Johns Hopkins Study (1998) available at http://www.eurekalert.org/releases/jhu-sunposcat.htrnl, last visited Feb. 1, 2008.

International Search Report and Written Opinion dated Aug. 26, 2008, dated in International Patent Application No. PCT/US07/06748, filed Mar. 19, 2007.

International Search Report and Written Opinion dated Dec. 16, 2008, dated in International Patent Application No. PCT/US07/70995, filed Jun. 12, 2007.

International Search Report and Written Opinion dated Jul. 16, 2008, dated in International Patent Application No. PCT/US07/18593, filed Aug. 23, 2007.

International Search Report and Written Opinion dated May 28, 2009, dated in International Patent Application No. PCT/US07/83236, filed Oct. 31, 2007.

International Search Report and Written Opinion dated Sep. 25, 2011, dated in International Patent Application No. PCT/US10/28680, filed Mar. 25, 2010.

International Search Report and Written Opinion, dated Jul. 25, 2008, for International Patent Application No. PCT/US08/55017, filed Feb. 26, 2008.

International Search Report and Written Opinion, dated Nov. 15, 2011, for International Patent Application No. PCT/US2011/42922, filed Jul. 5, 2011.

Johnson, J.E., "A Study of Qunizarin (Orange Dye 2) in Hexane as a Model Fuel Dye", accessed at http://ww.labmate-online.com/article_read/1005/, accessed on Jun. 10, 2014, published May 12, 2011.

Johnson, W. & Crane, R. "Color Neutral Rugate Filter", SPIE, vol. 2046, pp. 132-140 (Nov. 1993).

Johnson, W. & Crane, R. "Introduction to Rugate Filter Technology" SPIE 2046: 88-108 (Nov. 1993).

Kalloniatis, M. & Luu, C. "Psychophysics of Vision" available at http://webvision.med.utah.edu/Phychl.html, last visited Jan. 29, 2008.

Leibovitch et al., "Visual outcomes with the yellow intraocular lens," ACTA Opthalmologica Scandinavica 2006, vol. 84, p. 95-99.

Li, Q. et al., "The effect of blue light on visual function," International Review of Ophthalmology, vol. 30, No. 5, Oct. 2006, p. 336-340.

Mainster, M.A. & Sparrow, J.R. "How Much Blue Light Should an IOL Transmit?" British Journal of Ophthalmology, 2003, vol. 87, pp. 1523-1529.

Mainster, M.A., "Intraocular Lenses Should Block UV Radiation and Violet but not Blue Light" Arch. Ophthal., 2005, vol. 123, pp. 550.

Mainster, M.A., "Violet and Blue Light Blocking Intraocular Lenses: Photoprotection vs. Photoreception," Br J Ophthalmol, 2006, vol. 90, pp. 784-792.

McLeod, A., Thin Film Optical Filters, pp. 86-347, McGraw-Hill, New York (1989).

(56) References Cited

OTHER PUBLICATIONS

Moon and Spencer, "A Metric for Colorspace", J. Opt. Soc. Am., vol. 33, No. 5, pp. 260-269 (1944).
NACL website, as archived from Oct. 8, 2000: http://web.archive.org/web/20001008003354//www .nacl.com/custom.htm obtained for WayBack Machine at www.archive.org.
Nolan, J.M. et al., "Augmentation of Macular Pigment following Implantation of Blue Light-Filtering Intraocular Lenses at the Time of Cataract Surgery" Invest Ophthalmol Vis Sci, 2009, vol. 50(10), pp. 4777-4785.
Notice of Reexamination dated May 23, 2014 in Chinese Application No. 200780017579.0.
Notice of Reexamination dated Sep. 23, 2014 in Chinese Application No. 200780017579.0.
Office Action dated Apr. 14, 2014, issued in Canadian Application No. 2,661,465.
Office Action dated Apr. 15, 2013, issued in Chinese Patent Application No. 201080022639.X, filed Mar. 25, 2010.
Office Action dated Apr. 28, 2014, issued in Korean Application No. 9-5-2014-028970883.
Office Action dated Aug. 20, 2013, issued in Japanese Application No. 2013-140659, filed Jul. 4, 2013.
Office Action dated Aug. 21, 2014, issued in European Patent Application No. 07844774.5.
Office Action dated Dec. 23, 2011, issued in Chinese Application No. 200780017579.0.
English translation of Office Action dated Dec. 21, 2012, issued in Japanese Patent Application No. 2009-539390.
Office Action dated Dec. 27, 2013, issued in Chinese Patent Application No. 201080022639.X, filed Mar. 25, 2010.
Office Action dated Dec. 3, 2012, in Chinese Patent Application No. 200780050536.2, High Performance Optics, Inc., filed Oct. 31, 2007.
Office Action dated Feb. 1, 2013, issued in Japanese Patent Application No. 2009-515603.
Office Action dated Feb. 10, 2015, issued in U.S. Appl. No. 12/731,215.
English translation of Office Action dated Feb. 17, 2012, for Chinese application No. 200780050536.2.
Office Action dated Feb. 18, 2015, issued in U.S. Appl. No. 13/014,483.
Office Action dated Feb. 27, 2015 dated in Australian Application No. 2010229849.
English translation of Office Action dated Feb. 5, 2013, for Japanese Application No. 2009-501478, filed Mar. 19, 2007.
English translation of Office Action dated Feb. 7, 2013, issued in Israeli Application No. 194226.
Office Action dated Jan. 20, 2014, issued in Canadian Application No. 2,655,130.
Office Action dated Jan. 20, 2015, issued in Canadian Application No. 2,670,789.
Office Action dated Jan. 22, 2015, issued in Korean Application No. 10-2008-7030594.
Office Action dated Jan. 22, 2015, issued in Korean Application No. 10-2014-7030168.
Office Action dated Jan. 23, 2014, issued in Singaporean Application No. 201106973-9.
Office Action dated Jan. 28, 2014, issued in Japanese Patent Application No. 2012-502251, filed Mar. 25, 2010.
Office Action dated Jan. 3, 2014, issued in Chinese Patent Application No. 200780050536.2, filed Oct. 31, 2007.
Office Action dated Jan. 5, 2012, issued in Australian Application No. 2007227389.
Office Action dated Jan. 6, 2014, issued in Canadian Application No. 2,645,742.
Office Action dated Jul. 1, 2014, issued in Chinese Patent Application No. 200780050536.2, filed Oct. 31, 2007.
Office Action dated Jul. 12, 2010, issued in Chinese Patent Application No. 200780050536.2, filed Oct. 31, 2007.

English translation of Office Action dated Jul. 18, 2012, issued in Japanese Patent Application No. 2009-515603.
Office Action dated Jul. 25, 2013, issued in Japanese Application No. 2009-539390, filed Oct. 31, 2007.
Office Action dated Jul. 26, 2012, issued in Australian Patent Application No. 2007325483.
Office Action dated Jul. 29, 2013, issued in Korean Application No. 9-5-2013-051987493.
Office Action dated Jul. 31, 2014, issued in Canadian Application No. 2,645,742.
Office Action dated Jun. 20, 2014, issued in Japanese Application No. 2009-501478, filed Mar. 19, 2007.
Office Action dated Mar. 17, 2014, issued in Japanese Patent Application No. 2013-140659.
Office Action dated Mar. 23, 2015, issued in Japanese Patent Application No. 2013-123522.
Office Action dated Mar. 30, 2015, issued in Japanese Patent Application No. 2014-147092.
Office Action dated May 12, 2014, issued in Israeli Patent Application No. 197167.
Office Action dated May 13, 2014, issued in Japanese Patent Application No. 2013-139471.
Office Action dated May 8, 2014, issued in Canadian Application No. 2,670,789, filed Oct. 31, 2007.
Office Action dated May 9, 2013, issued in Korean National Phase Application No. 10-2008-7023304.
Office Action dated May 9, 2014, issued in Japanese Patent Application No. 2013-123522.
Office Action dated Nov. 18, 2013, issued in Korean Application No. 10-2009-70063705.
Office Action dated Oct. 31, 2014, issued in Japanese Application No. 2013-140659.
Office Action dated Sep. 16, 2014, issued in Japanese Application No. 2012-502251.
Office Action dated Sep. 18, 2013, issued in Japanese Application No. 2009-501478, filed Mar. 19, 2007.
Office Action dated Sep. 25, 2012, issued in Australian Patent Application No. 2007257752.
Office Action dated Apr. 21, 2015, issued in Japanese Application No. 2013-139471.
Office Action dated Nov. 17, 2015, issued in Japanese Application No. 2015-006193, filed Mar. 25, 2010.
Patent Examination Search Report No. 1 for Australian Patent Application No. 2010229849, dated on Mar. 18, 2014.
Reexamination Decision dated Sep. 25, 2014, dated in Chinese Application No. 200780017579.0.
Rodriguez-Galietero et al., "Comparison of contrast sensitivity and color discrimination after clear and yellow intraocular lens implantation" J. Cataract Refract Surg., vol. 31, Sep. 2005, p. 1736-1740.
Sparrow, J.R. et al., "Blue light-absorbing intraocular lens and retinal pigment epithelium protection in vitro," J. Cataract Refract. Surg. 2004, vol. 30, pp. 873-878.
Supplementary search report for EP Application No. 07844774.5, dated Mar. 2, 2010.
Supplementary search report for EP Application No. 10756850.3, dated Jun. 17, 2014.
Ueda, T. et al., "Eye damage control by reduced blue illumination," Exp Eye Res., 2009, vol. 89(6), pp. 863-868.
Willard et al., Instrumental Methods of Analysis, 6th Ed., pp. 67-68 (1981).
Wyszecki & Stiles. Color Science: Concepts and Methods, Quantitative Data and Formulae, pp. 100-107, Wiley, New York (1982).
International Search Report and Written Opinion mailed Jul. 22, 2015, for International Application No. PCT/US 15/29073, High Performance Optics, Inc., filed May 4, 2015.
Samaroo et al. Efficient microwave-assisted synthesis of amine substituted pentafluorophenylporphyrin in Org Lett. Oct. 26, 2006; vol. 8(22): pp. 4985-4988. Abstract.
Office Action mailed Jul. 24, 2015, in Canadian Patent Application No. 2,670,789, High Performance Optics, Inc., filed Oct. 31, 2007.
Office Action mailed Jul. 24, 2015, in Indian Patent Application No. 5247/CHENP/2008, High Performance Optics, Inc., filed Sep. 30, 2008.

(56) References Cited

OTHER PUBLICATIONS

Office Action mailed Aug. 27, 2015, in Chinese Patent Application No. 201410641454.7, High Performance Optics, Inc., filed Mar. 25, 2010.
Search Report mailed Aug. 27, 2015, for Chinese Patent Application No. 201410641454.7, High Performance Optics, Inc., filed Mar. 25, 2010.
Office Action mailed Sep. 14, 2015, in Japanese Patent Application No. 2013-140659, High Performance Optics, Inc., filed Apr. 7, 2013.
Office Action mailed Oct. 5, 2015, in Japanese Patent Application No. 2009-501478, High Performance Optics, Inc., filed Mar. 19, 2007.
Zhou, Jilin and Sparrow, Janet R., "Light Filtering in a Retinal Pigment Epithelial Cell Culture Model," *Optometry and Vision Science*, 88(6), Jun. 6, 2011, pp. 1-7.
Liebmann, J., et al. "Blue-Light Irradiation Regulates Proliferation and Differentiation in Human Skin Cells," *J. Invest. Dermatol.*, 130:256-269, Heinrich-Heine-University Duesseldorf, Duesseldorf, Germany (2010).
Oplander, C., et al. "Effects of blue light irradiation on human dermal fibroblasts," *J. Photochem. Photobiol.*, 103:118-125, RWTH Aachan University, Aachen, Germany (2011).

\* cited by examiner

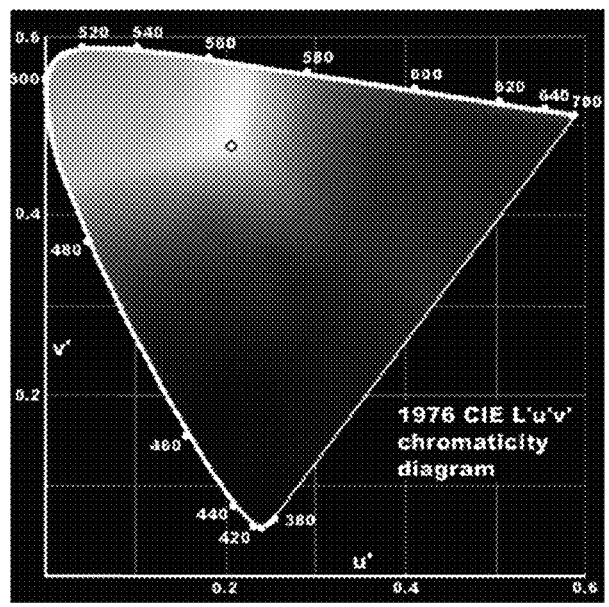
FIG. 8
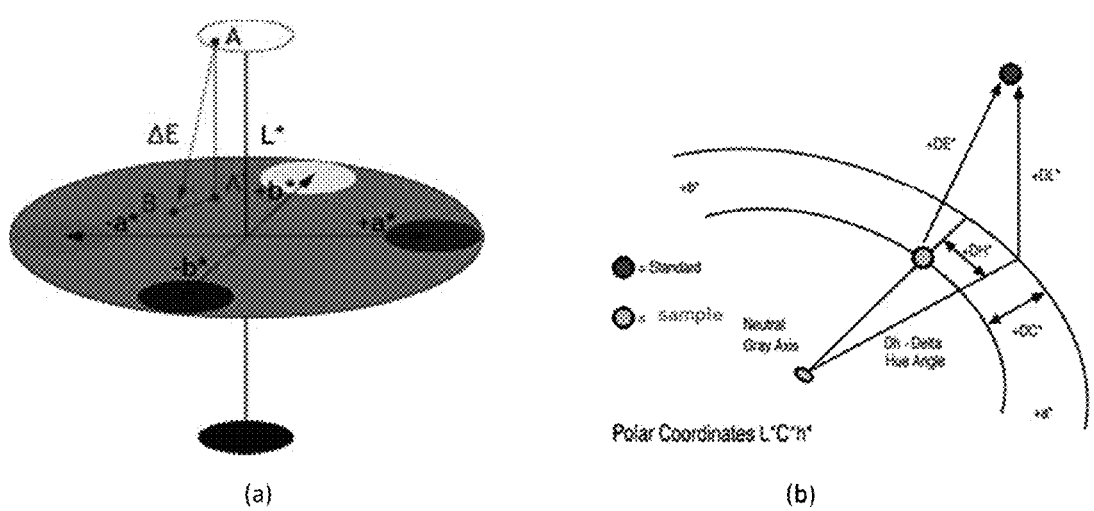
FIG. 9A  FIG. 9B

FIG. 21D
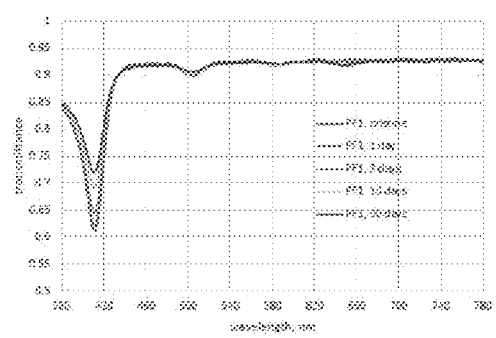
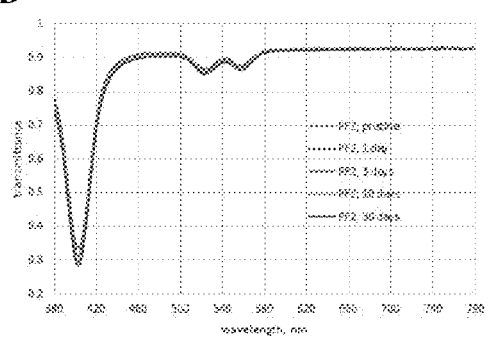
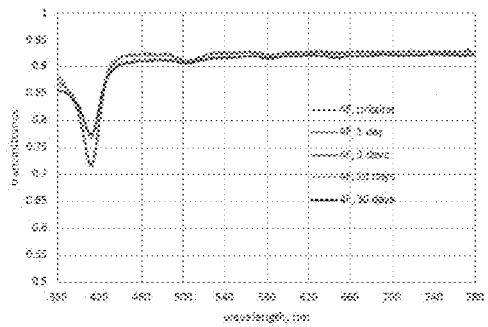
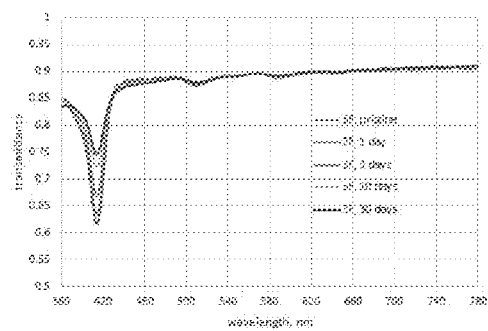

FIG. 22F
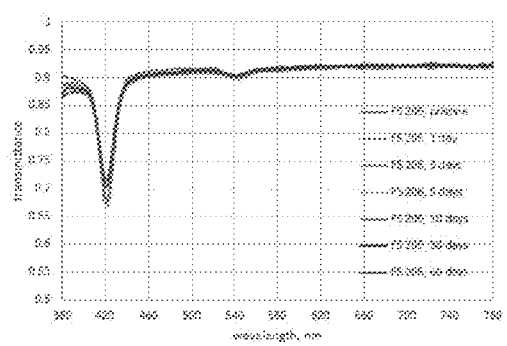 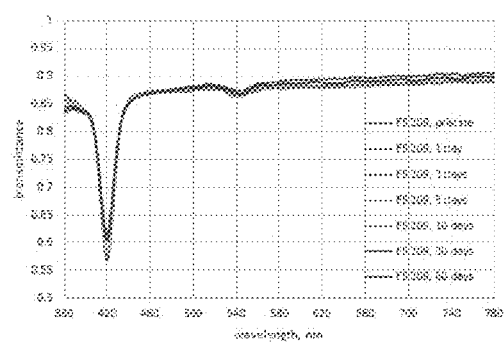

FIG. 22G
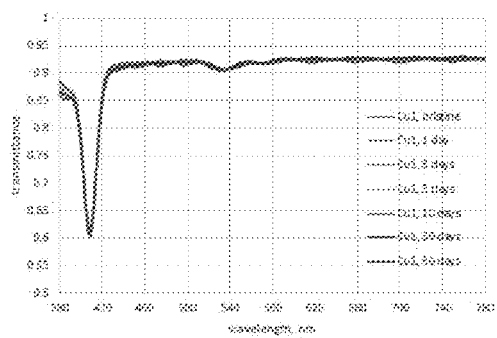
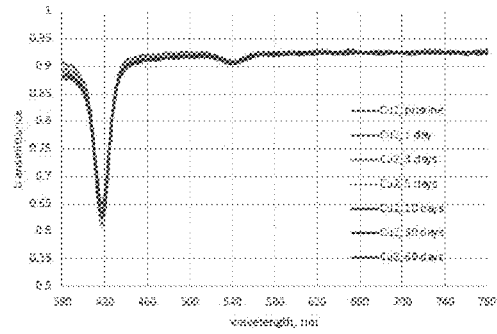
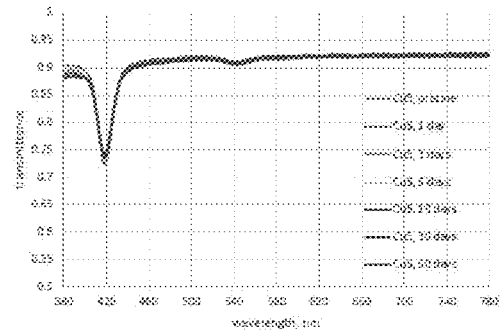

Legend:
- ● Dye molecule
- ) UV blocker
- ⌇ Covalent linkage
- / UV stabilizer

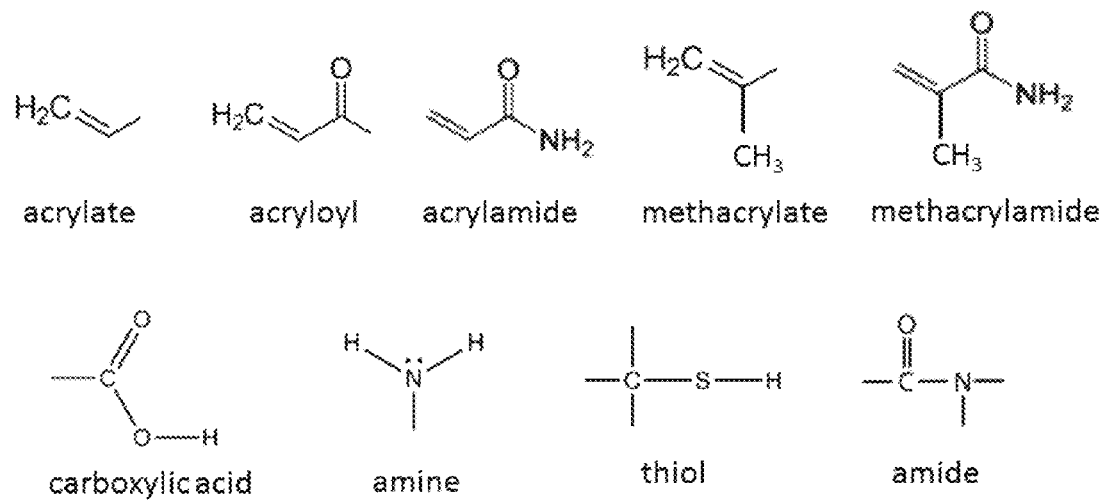
FIG. 28A
FIG. 28B
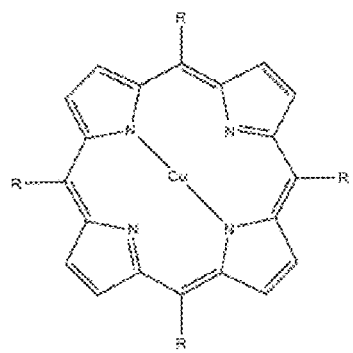
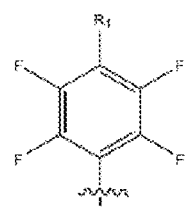
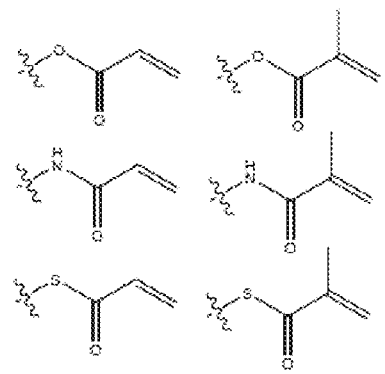

FIG. 28C
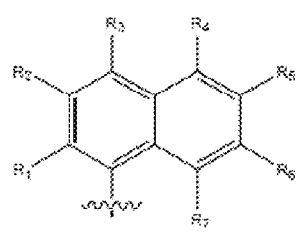
Where R is -
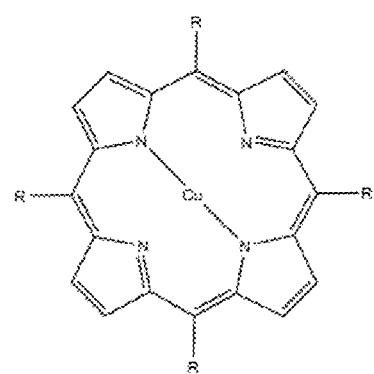
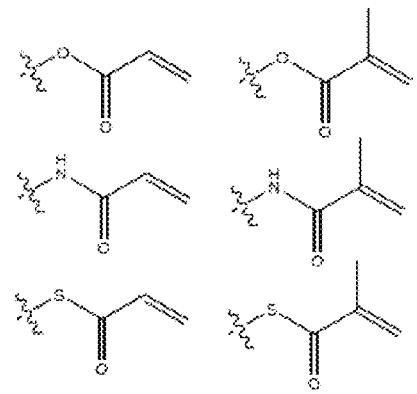
$R_{1-7} = H$

FIG. 28D
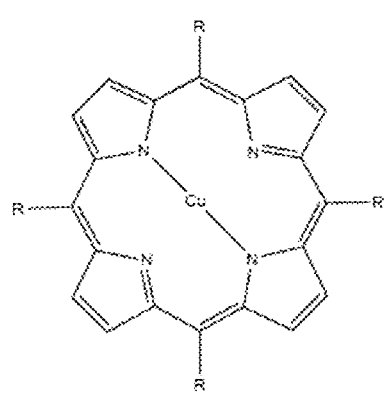
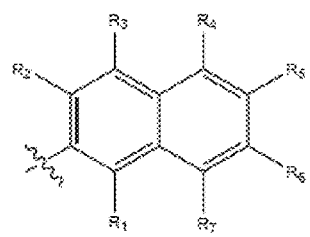
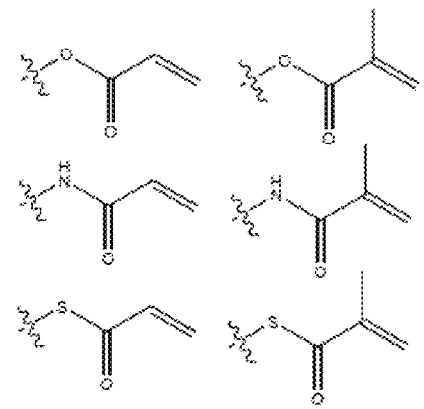

(a)
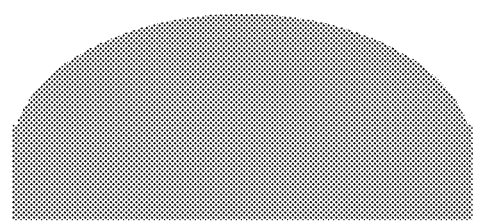
(b)
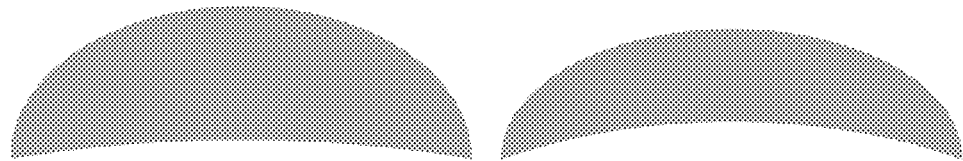
(c)
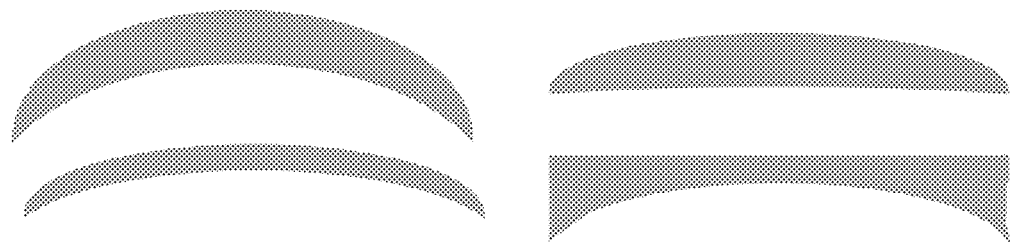
FIG. 39

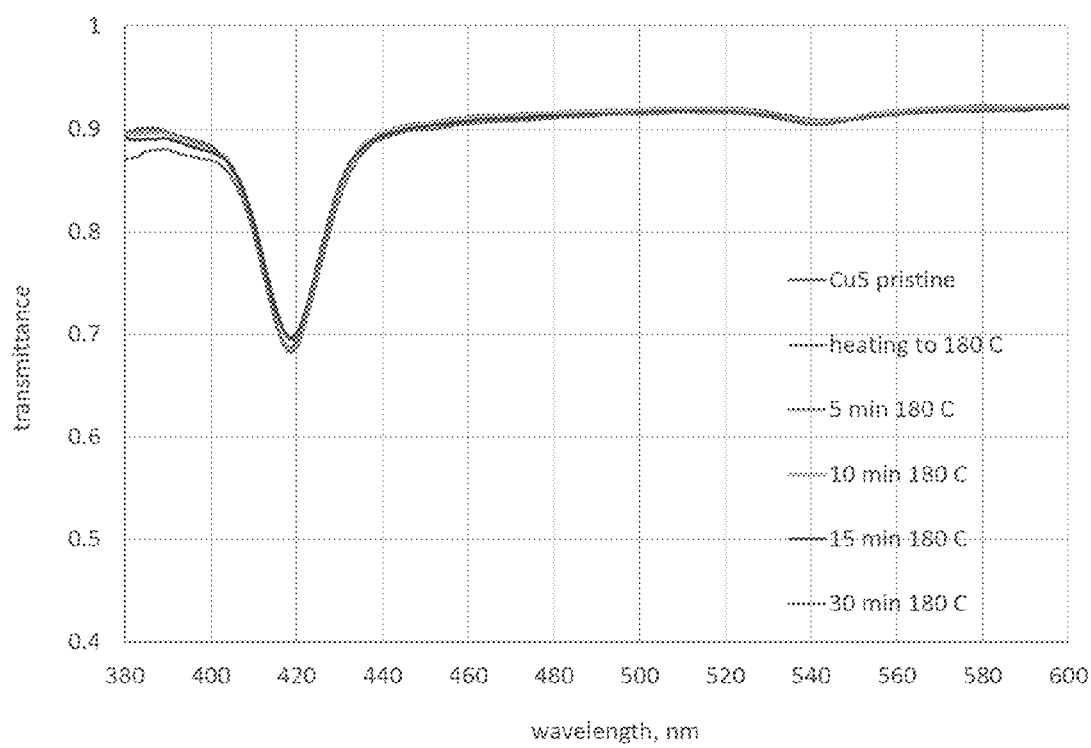

PHOTO-STABLE AND THERMALLY-STABLE DYE COMPOUNDS FOR SELECTIVE BLUE LIGHT FILTERED OPTIC

RELATED APPLICATIONS

This application claims the benefit of U.S. provisional application No. 61/988,360, the entirety of which is incorporated herein by reference thereto.

TECHNICAL FIELD

This disclosure relates generally to coatings comprising a dye or dye mixture that provide selective high energy visible light (HEVL) filtering, particularly filtering of one or more wavelengths in the 400-500 nm spectral range.

BACKGROUND

Electromagnetic radiation from the sun continuously bombards the Earth's atmosphere. Light is made up of electromagnetic radiation that travels in waves. The electromagnetic spectrum includes radio waves, millimeter waves, microwaves, infrared, visible light, ultra-violet (UVA and UVB), X-rays, and gamma rays. The visible light spectrum includes the longest visible light wavelength of approximately 700 nm and the shortest of approximately 400 nm (nanometers or 10.sup.-9 meters). Blue light wavelengths fall in the approximate range of 400 nm to 500 nm. For the ultra-violet bands, UVB wavelengths are from 290 nm to 320 nm, and UVA wavelengths are from 320 nm to 400 nm. Gamma and x-rays make up the higher frequencies of this spectrum and are absorbed by the atmosphere. The wavelength spectrum of ultraviolet radiation (UVR) is 100-400 nm. Most UVR wavelengths are absorbed by the atmosphere, except where there are areas of stratospheric ozone depletion. Over the last 20 years, there has been documented depletion of the ozone layer primarily due to industrial pollution. Increased exposure to UVR has broad public health implications as an increased burden of UVR ocular and skin disease is to be expected.

The ozone layer absorbs wavelengths up to 286 nm, thus shielding living beings from exposure to radiation with the highest energy. However, we are exposed to wavelengths above 286 nm, most of which falls within the human visual spectrum (400-700 nm). The human retina responds only to the visible light portion of the electromagnetic spectrum. The shorter wavelengths pose the greatest hazard because they inversely contain more energy. Blue light has been shown to be the portion of the visible spectrum that produces the most photochemical damage to animal retinal pigment epithelium (RPE) cells. Exposure to these wavelengths has been called the blue light hazard because these wavelengths are perceived as blue by the human eye.

SUMMARY

In one embodiment, a first system comprises an optical filter comprising a Cu-porphyrin compound. In one embodiment, the Cu-porphyrin compound has a structure according to Formula I:

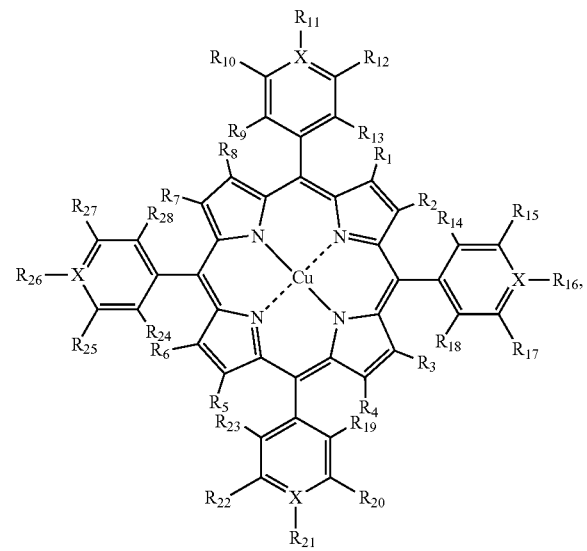

(Formula I)

or a salt, or a tautomeric form thereof, wherein X is carbon or nitrogen and each of $R_1$ through $R_8$ is independently H, Cl, Br, F, I, Me, a straight alkyl chain having 2-20 carbon atoms, a branched alkyl having 2-20 carbons, or a moiety represented by -L-P; each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, amide, or a moiety represented by -L-P; or two of adjacent $R_9$ to $R_{28}$ form aromatic or non-aromatic ring structure; wherein $R_{100}$ is a bond, $—(CH_2)_n—$, or a branched alkyl having 2-20 carbon atoms, wherein n is 1-20; $R_{110}$, $R_{111}$, $R_{112}$ and $R_{200}$ are each independently H, Me, a straight alkyl chain having 2-20 carbon atoms, a branched alkyl having 2-20 carbon atoms, or a moiety represented by -L-P; wherein P is a polymer moiety or a polymerizable group and L is null or a linker; provided that when X is nitrogen, then $R_{11}$, $R_{16}$, $R_{21}$, and $R_{26}$ are each independently a lone pair or as defined above.

In one embodiment, the Cu-porphyrin compound of the first system is selected from the group consisting of compounds having structures according to Formula I-1 to Formula I-16, described in the detailed description.

In one embodiment, each of R1 through R28, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ in Formula I and Formulae I-1 to I-16 is H, provided that in Formula I, when X is nitrogen, then $R_{11}$, $R_{16}$, $R_{21}$, and $R_{26}$ are each a lone pair.

In one embodiment, in Formula I and Formulae I-1 to I-16, each of $R_1$ through $R_8$ is independently H, Cl, Br, F, I, $CH_3$, a straight alkyl chain having 2-20 carbon atoms, or a branched alkyl having 2-20 carbons; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, or amide; wherein $R_{100}$ is a bond, —$(CH_2)_n$—, or a branched alkyl having 2-20 carbon atoms, wherein n is 1-20; and $R_{110}$, $R_{111}$, $R_{112}$ and $R_{200}$ are each independently H, Me, a straight alkyl chain having 2-20 carbon atoms, or a branched alkyl having 2-20 carbon atoms. In some embodiments, two of adjacent $R_9$ to $R_{28}$ in Formula I and Formulae I-1 to I-16 form aromatic or non-aromatic ring structure, e.g., as described herein.

In one embodiment, at least one of $R_1$ to $R_{28}$, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ in Formula I and Formulae I-1 to I-16 is -L-P, wherein when there are more than one -L-P, each -L-P is the same or different.

In one embodiment, 1-8 of $R_1$ to $R_{28}$, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ in Formula I and Formulae I-1 to I-16 are -L-P, wherein each -L-P is the same or different.

In one embodiment, P is a polymerizable group. In one embodiment, the polymerizable group is selected from the group consisting of acrylates, acryloyls, acrylamides, methacrylates, methacrylamides, carboxylic acids, thiols, amides, terminal or internal alkynyl groups, terminal or internal alkenyl groups, iodides, bromides, chlorides, azides, carboxylic esters, amines, alcohols, epoxides, isocyanates, aldehydes, acid chlorides, siloxanes, boronic acids, stannanes, and benzylic halides.

In one embodiment, P is a polymer moiety. In one embodiment, the Cu-porphyrin compound is a homopolymer or a copolymer characterized by having a monomeric structure of Formula I(m)

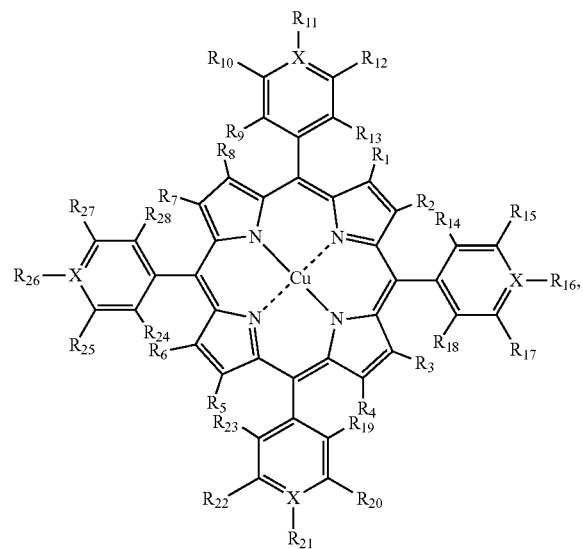

(Formula I(m))

or a salt, or a tautomeric form thereof, wherein: X is carbon or nitrogen, each of $R_1$ through $R_8$ is independently H, Cl, Br, F, I, $CH_3$, a straight alkyl chain having 2-20 carbon atoms, a branched alkyl having 2-20 carbons, or a moiety represented by -Lm-Pm; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, or amide, or a moiety represented by -Lm-Pm; or two of adjacent $R_9$ to $R_{28}$ form aromatic or non-aromatic ring structure; wherein $R_{100}$ is a bond, —$(CH_2)_n$—, or a branched alkyl having 2-20 carbon atoms, wherein n is 1-20; $R_{110}$, $R_{111}$, $R_{112}$ and $R_{200}$ are each independently H, Me, a straight alkyl chain having 2-20 carbon atoms, a branched alkyl having 2-20 carbon atoms, or a moiety represented by -Lm-Pm; wherein Pm is a polymerizable group and Lm is null or a linker; provided that when X is nitrogen, then $R_{11}$, $R_{16}$, $R_{21}$, and $R_{26}$ are each independently a lone pair or as defined above; and provided that there is 1-8-Lm-Pm in Formula I(m), wherein each -Lm-Pm is the same or different.

In one embodiment, the polymer moiety is selected from the group consisting of biopolymers, polyvinyl alcohol, polyacrylates, polyamides, polyamines, polyepoxides, polyolefins, polyanhydrides, polyesters, and polyethyleneglycols.

In one embodiment, L is a linker. In one embodiment, the linker is —C(O)—, —O—, —O—C(O)O—, —C(O)CH$_2$CH$_2$C(O)—, —S—S—, —NR$^{130}$, —NR$^{130}$C(O)O—, —OC(O)NR$^{130}$, —NR$^{130}$C(O)—, —C(O)NR$^{130}$, —NR$^{130}$C(O)NR$^{130}$—, -alkylene-NR$^{130}$C(O)O, -alkylene-NR$^{130}$C(O)NR$^{130}$—, -alkylene-OC(O)NR$^{130}$—, -alkylene-NR$^{130}$—, -alkylene-O—, -alkylene-NR$^{130}$C(O)—, -alkylene-C(O)NR$^{130}$—, —NR$^{130}$C(O)O-alkylene-, —NR$^{130}$C(O)NR$^{130}$-alkylene-, —OC(O)NR$^{130}$-alkylene, —NR$^{130}$-alkylene-, —O-alkylene-, —NR$^{130}$C(O)-alkylene-, —C(O)NR$^{130}$-alkylene-, -alkylene-NR$^{130}$C(O)O-alkylene-, -alkylene-NR$^{130}$C(O)NR$^{130}$-alkylene-, -alkylene-OC(O)NR$^{130}$-alkylene-, -alkylene-NR$^{130}$-alkylene-, -alkylene-O-alkylene-, -alkylene-NR$^{130}$C(O)-alkylene-, —C(O)NR$^{130}$-alkylene-, where R$^{130}$ is hydrogen, or optionally substituted alkyl.

In one embodiment, the Cu-porphyrin compound of the first system is a homopolymer or a copolymer characterized by having a monomeric structure of Formula I(m)

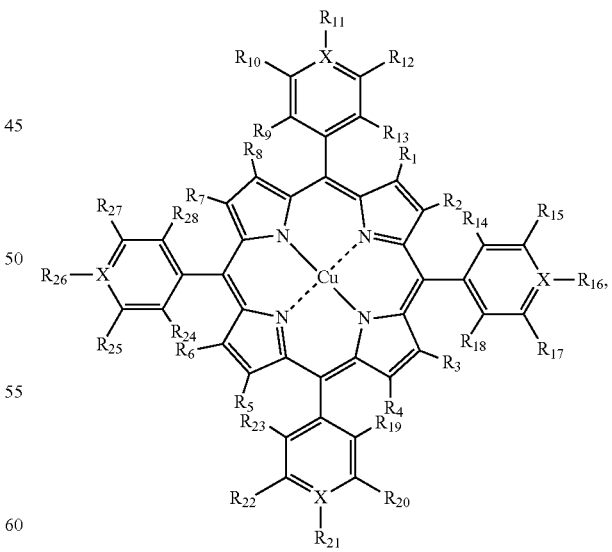

(Formula I(m))

or a salt, or a tautomeric form thereof, wherein: X is carbon or nitrogen, each of $R_1$ through $R_8$ is independently H, Cl, Br, F, I, $CH_3$, a straight alkyl chain having 2-20 carbon atoms, or a branched alkyl having 2-20 carbons; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $-R_{100}-$OH, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, or amide; wherein $R_{100}$ is a bond, $-(CH_2)_n-$, or a branched alkyl having 2-20 carbon atoms, wherein n is 1-20; $R_{110}$, $R_{111}$, $R_{112}$ and $R_{200}$ are each independently H, Me, a straight alkyl chain having 2-20 carbon atoms, or a branched alkyl having 2-20 carbon atoms; provided that when X is nitrogen, then $R_{11}$, $R_{16}$, $R_{21}$, and $R_{26}$ are each independently a lone pair or as defined above. In some embodiments, two of adjacent $R_9$ to $R_{28}$ form aromatic or non-aromatic ring structure, e.g., as described herein.

In one embodiment, the Cu-porphyrin compound of the first system is a homopolymer or a copolymer characterized by having a monomeric structure of Formula I(m)

(Formula I(m))

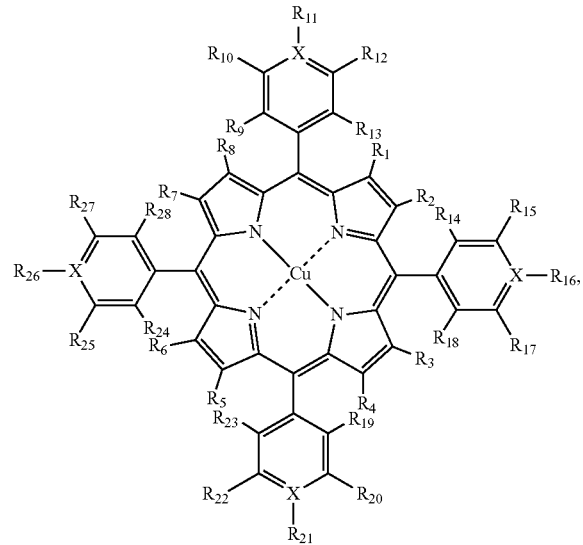

or a salt, or a tautomeric form thereof, wherein: X is carbon or nitrogen, each of $R_1$ through $R_8$ is independently H, Cl, Br, F, I, $CH_3$, a straight alkyl chain having 2-20 carbon atoms, a branched alkyl having 2-20 carbons, or a moiety represented by -Lm-Pm; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $-R_{100}-$OH, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -Lm-Pm; wherein $R_{100}$ is a bond, $-(CH_2)_n-$, or a branched alkyl having 2-20 carbon atoms, wherein n is 1-20; $R_{110}$, $R_{111}$, $R_{112}$ and $R_{200}$ are each independently H, Me, a straight alkyl chain having 2-20 carbon atoms, a branched alkyl having 2-20 carbon atoms, or a moiety represented by -Lm-Pm; provided that when X is nitrogen, then $R_{11}$, $R_{16}$, $R_{21}$, and $R_{26}$ are each independently a lone pair or as defined above; wherein there are 1-4-Lm-Pm in Formula I(m), wherein Lm is null, and each Pm is the same or different polymerizable group, wherein the polymerizable group is selected from the group consisting of acrylates, acryloyls, acrylamides, methacrylates, methacrylamides, carboxylic acids, thiols, amides, terminal or internal alkynyl groups having 2 to 20 carbons, terminal or internal alkenyl groups having 2 to 20 carbons, iodides, bromides, chlorides, azides, carboxylic esters, amines, alcohols, epoxides, isocyanates, aldehydes, acid chlorides, siloxanes, boronic acids, stannanes, and benzylic halides. In some embodiments, two of adjacent $R_9$ to $R_{28}$ form aromatic or non-aromatic ring structure, e.g., as described herein.

In one embodiment, the first system further comprises a surface, wherein the optical filter is a coating disposed on the surface, and the coating includes the Cu porphyrin compound.

In one embodiment, the first system further comprises a substrate, wherein the optical filter is the Cu porphyrin compound, and wherein the Cu porphyrin compound is dispersed through the substrate.

In one embodiment, the first system is an ophthalmic system. In one embodiment, the ophthalmic system is selected from a group consisting of: an eyeglass lens, a contact lens, an intra-ocular lens, a corneal inlay, and a corneal onlay.

In one embodiment, the first system is a non-ophthalmic ocular system. In one embodiment, the non-ophthalmic ocular system is selected from the group consisting of: a window, an automotive windshield, an automotive side window, an automotive rear window, a sunroof window, commercial glass, residential glass, skylights, a camera flash bulb and lens, an artificial lighting fixture, a fluorescent light or diffuser, a medical instrument, a surgical instrument, a rifle scope, a binocular, a computer monitor, a television screen, a lighted sign, an electronic device screen, and a patio fixture.

In one embodiment, the first system further comprises: a first surface, wherein the filter is disposed on the first surface.

In one embodiment, the first system is a dermatologic lotion.

In one embodiment, the first system further comprises: a second surface, wherein the filter is disposed between the first surface and the second surface. In one embodiment, wherein the first and second surfaces are glass.

In one embodiment, the optical filter is incorporated in a layer of polyvinyl butyral (PVB), polyvinyl alcohol (PVA), ethylene vinyl acetate (EVA), or polyurethane (PU).

In one embodiment, $TS_{RG}$ is the average transmission of the first system across the wavelength range of 460 nm-700 nm. $TS_{Blue}$ is the average transmission of the first system across the wavelength range of 400-460 nm. $TS_{RG}>=80\%$ and $TS_{Blue}<TS_{RG}-5\%$.

In one embodiment, the first system transmits at least 80% of light at every wavelength across the range of 460 nm-700 nm.

In one embodiment, the filter of the first system has a transmission spectrum that is different from the transmission spectrum of the first system.

In one embodiment, $TF_{RG}$ is the average transmission of the filter across the wavelength range of 460 nm-700 nm. $TF_{Blue}$ is the average transmission of the filter across the wavelength range of 400-460 nm. $TF_{RG}>=80\%$ and $TF_{Blue}<TF_{RG}-5\%$. The filter has a first local minimum in transmission at a first wavelength within the wavelength range of 400-460 nm.

In one embodiment, the filter transmits less than $TF_{Blue}-5\%$ of light at the first wavelength.

In one embodiment, the first wavelength is within 2 nm of 420 nm. In one embodiment, the first wavelength is within 2 nm of 409 nm. In one embodiment, the first wavelength is within 10 nm of 425 nm. In one embodiment, the first wavelength is within 5 nm of 425 nm. In one embodiment, the first wavelength is within 30 nm of 430 nm.

In one embodiment, the filter transmits no more than 60% of light at the first wavelength.

In one embodiment, T5 is the average transmission of the filter in a wavelength range from 5 nm below the first wavelength to 5 nm above the first wavelength. T6 is the average transmission of the filter in a wavelength range from 400 nm to 460 nm, excluding the wavelength range from 5 nm below the first wavelength to 5 nm above the first wavelength. T5 is at least 5% less than T6.

In one embodiment, T7 is the average transmission of the filter in a wavelength range from 10 nm below the first wavelength to 10 nm above the first wavelength. T8 is the average transmission of the transmission spectrum in a wavelength range from 400 nm to 460 nm, excluding the wavelength range from 10 nm below the first wavelength to 10 nm above the first wavelength. T7 is at least 5% less than T8.

In one embodiment, the filter has a second local minimum in transmission at a second wavelength within the wavelength range of 460 nm-700 nm.

In one embodiment, CIE Standard Illuminant D65 light having CIE LAB coordinates $(a^*_1, b^*_1, L^*_1)$, when transmitted through the first system, results in transmitted light having CIE LAB coordinates $(a^*_2, b^*_2, L^*_2)$. A total color difference $\Delta E$ between $(a^*_1, b^*_1, L^*_1)$ and $(a^*_2, b^*_2, L^*_2)$ is less than 5.0.

In one embodiment, CIE Standard Illuminant D65 light having CIE LAB coordinates $(a^*_1, b^*_1, L^*_1)$, when transmitted through the first system, results in transmitted light having CIE LAB coordinates $(a^*_2, b^*_2, L^*_2)$. CIE Standard Illuminant D65 light having CIE LAB coordinates $(a^*_1, b^*_1, L^*_1)$, when transmitted through a second system, results in transmitted light having CIE LAB coordinates $(a^*_3, b^*_3, L^*_3)$. The second system does not include the optical filter, but is otherwise identical to the first system, and a total color difference $\Delta E$ between $(a^*_2, b^*_2, L^*_2)$ and $(a^*_3, b^*_3, L^*_3)$ is less than 5.0.

In one embodiment, CIE Standard Illuminant D65 light having CIE LAB coordinates $(a^*_1, b^*_1, L^*_1)$, when transmitted through the first system, results in transmitted light having CIE LAB coordinates $(a^*_2, b^*_2, L^*_2)$. A total chroma difference between $(a^*_1, b^*_1, L^*_1)$ and $(a^*_2, b^*_2, L^*_2)$ is less than 5.0.

In one embodiment, CIE Standard Illuminant D65 light having CIE LAB coordinates $(a^*_1, b^*_1, L^*_1)$, when transmitted through the first system, results in transmitted light having CIE LAB coordinates $(a^*_2, b^*_2, L^*_2)$. CIE Standard Illuminant D65 light having CIE LAB coordinates $(a^*_1, b^*_1, L^*_1)$, when transmitted through a second system, results in transmitted light having CIE LAB coordinates $(a^*_3, b^*_3, L^*_3)$. The second system does not include the optical filter, but is otherwise identical to the first system, and a total chroma difference between $(a^*_2, b^*_2, L^*_2)$ and $(a^*_3, b^*_3, L^*_3)$ is less than 5.0.

In one embodiment, CIE Standard Illuminant D65 light having CIE LAB coordinates $(a^*_1, b^*_1, L^*_1)$, when reflected off the first system, results in reflected light having CIE LAB coordinates $(a^*_2, b^*_2, L^*_2)$, and a total color difference $\Delta E$ between $(a^*_1, b^*_1, L^*_1)$ and $(a^*_2, b^*_2, L^*_2)$ is less than 5.0.

In one embodiment, CIE Standard Illuminant D65 light having CIE LAB coordinates $(a^*_1, b^*_1, L^*_1)$, when reflected off the first system, results in reflected light having CIE LAB coordinates $(a^*_2, b^*_2, L^*_2)$. CIE Standard Illuminant D65 light having CIE LAB coordinates $(a^*_1, b^*_1, L^*_1)$, when reflected off a second system, results in reflected light having CIE LAB coordinates $(a^*_3, b^*_3, L^*_3)$. The second system does not include the optical filter, but is otherwise identical to the first system. A total color difference $\Delta E$ between $(a^*_2, b^*_2, L^*_2)$ and $(a^*_3, b^*_3, L^*_3)$ is less than 5.0.

In one embodiment, CIE Standard Illuminant D65 light having CIE LAB coordinates $(a^*_1, b^*_1, L^*_1)$, when reflected off the first system, results in reflected light having CIE LAB coordinates $(a^*_2, b^*_2, L^*_2)$, and a total chroma difference between $(a^*_1, b^*_1, L^*_1)$ and $(a^*_2, b^*_2, L^*_2)$ is less than 5.0.

In one embodiment, CIE Standard Illuminant D65 light having CIE LAB coordinates $(a^*_1, b^*_1, L^*_1)$, when reflected off the first system, results in reflected light having CIE LAB coordinates $(a^*_2, b^*_2, L^*_2)$. CIE Standard Illuminant D65 light having CIE LAB coordinates $(a^*_1, b^*_1, L^*_1)$, when reflected off a second system, results in reflected light having CIE LAB coordinates $(a^*_3, b^*_3, L^*_3)$. The second system does not include the optical filter, but is otherwise identical to the first system. A total chroma difference between $(a^*_2, b^*_2, L^*_2)$ and $(a^*_3, b^*_3, L^*_3)$ is less than 5.0.

In one embodiment, a total color difference $\Delta E$ between $(a^*_2, b^*_2, L^*_2)$ and $(a^*_3, b^*_3, L^*_3)$ is less than 6.0. In one embodiment, a total color difference $\Delta E$ between $(a^*_2, b^*_2, L^*_2)$ and $(a^*_3, b^*_3, L^*_3)$ is less than 5.0.

In one embodiment, the first system has a YI of no more than 35. In one embodiment, the first system has a YI of no more than 30. In one embodiment, the first system has a YI of no more than 27.5. In one embodiment, the first system has a YI of no more than 25. In one embodiment, the first system has a YI of no more than 22.5. In one embodiment, the first system has a YI of no more than 20. In one embodiment, the first system has a YI of no more than 17.5. In one embodiment, the first system has a YI of no more than 15. In one embodiment, the first system has a YI of no more than 12.5. In one embodiment, the first system has a YI of no more than 10. In one embodiment, the first system has a YI of no more than 9. In one embodiment, the first system has a YI of no more than 8. In one embodiment, the first system has a YI of no more than 7. In one embodiment, the first system has a YI of no more than 6. In one embodiment, the first system has a YI of no more than 5. In one embodiment, the first system has a YI of no more than 4. In one embodiment, the first system has a YI of no more than 3. In one embodiment, the first system has a YI of no more than 2. In one embodiment, the first system has a YI of no more than 1.

In one embodiment, the filter has a YI of no more than 35. In one embodiment, the filter has a YI of no more than 30. In one embodiment, the filter has a YI of no more than 27.5. In one embodiment, the filter has a YI of no more than 25. In one embodiment, the filter has a YI of no more than 22.5. In one embodiment, the filter has a YI of no more than 20. In one embodiment, the filter has a YI of no more than 17.5. In one embodiment, the filter has a YI of no more than 15. In one embodiment, the filter has a YI of no more than 12.5. In one embodiment, the filter has a YI of no more than 10. In one embodiment, the filter has a YI of no more than 9. In one embodiment, the filter has a YI of no more than 8. In one embodiment, the filter has a YI of no more than 7. In one embodiment, the filter has a YI of no more than 6. In one embodiment, the filter has a YI of no more than 5. In one embodiment, the filter has a YI of no more than 4. In one embodiment, the filter has a YI of no more than 3. In one embodiment, the filter has a YI of no more than 2. In one embodiment, the filter has a YI of no more than 1.

In one embodiment, the first system has a YI of no more than 15 if the first system is an ophthalmic system. In one embodiment, the filter has a YI of no more than 15 if the first system is an ophthalmic system.

In one embodiment, the first system has a YI of no more than 35 if the first system is a non-ophthalmic system. In one embodiment, the filter has a YI of no more than 35 if the first system is a non-ophthalmic system.

In one embodiment, the slope of the transmission spectrum of the first system for at least one wavelength within 10 nm of the first wavelength on the negative side has an absolute value that is less than the absolute value of the slope of the transmission spectrum at a third wavelength. The third wavelength is more than 10 nm from the first wavelength on the negative side.

In one embodiment, the first system further comprises a UV blocking element. In one embodiment, the UV blocking element is disposed on the filter.

In one embodiment, the optical filter is a Cu-porphyrin compound, the Cu-porphyrin compound is incorporated into a coating, and the UV blocking element is incorporated into the coating.

In one embodiment, the first system further comprises an IR blocking element.

In one embodiment, a method comprises dissolving a Cu-porphyrin compound in a solvent to make a solution, diluting the solution with a primer, filtering the solution, and applying the solution to form an optical filter.

In one embodiment, where applying to the solution comprises coating a surface with the solution, wherein the coating is through dip-coating, spray coating, or spin coating.

In one embodiment, an ophthalmic system comprising a filter: whereby said ophthalmic system selectively filters 5.0-50% of a wavelength of light within the 400-460 nm range and transmits at least 80% of light across the visible spectrum; wherein the yellowness index is no more than 15.0, and wherein said filter incorporates Cu(II)meso-Tetra(2-naphthyl) porphine.

In another embodiment, a non-ophthalmic system comprising a selective light wavelength filter that blocks 5-50% of light in the 400-460 nm range and transmits at least 80% of light across the visible spectrum, wherein the yellowness index is no more than 35.0, and wherein said filter incorporates Cu(II)meso-Tetra(2-napthyl) porphine.

In one embodiment, the optical filter may comprise a mixture of Cu-porphyrin dye compounds.

In one embodiment, the dye or dye mixture has an absorption spectrum with at least one absorption peak in the range 400 nm to 500 nm.

In one embodiment, the at least one absorption peak is in the range 400 nm to 500 nm.

In one embodiment, the at least one absorption peak has a full-width at half-max (FWHM) of less than 60 nm in the range 400 nm to 500 nm.

In one embodiment, the dye or dye mixture, when incorporated in the device's optical path, absorbs at least 5% of the at least one wavelength of light in the range 400 nm to 500 nm.

In one embodiment, the dye or dye mixture aggregates have an average size less than 5 micrometers.

In one embodiment, the dye or dye mixture aggregates have an average size less than 1 micrometer.

In one embodiment, providing the solution comprises ultrasonicating the solution to reduce the average size of aggregates of the dye or dye mixture contained in the solution.

In one embodiment, the ultrasonicating is performed in a controlled temperature environment.

In one embodiment, the aggregates have an average size greater than 10 micrometers prior to ultrasonicating the solution.

In one embodiment, the controlled temperature environment is set to a temperature equal or less than 50 degrees C.

In one embodiment, the incorporating comprises loading the solution in a resin to form a coating formulation.

In one embodiment, the coating formulation is subjected to further ultrasonication in a controlled temperature environment for a certain time period.

In one embodiment, the incorporating further comprises applying the coating formulation on one or both surfaces of the device.

In one embodiment, the method comprises applying a coating formulation comprising the dye or the dye mixture on the first surface to form a coating, the coating selectively inhibiting visible light in a selected range of visible wavelengths. Furthermore, the incorporating step comprises air drying or short thermal baking the coating or short UV exposure of the coating.

In one embodiment, applying the coating formulation comprises determining an amount of the dye or the dye mixture, the amount corresponding to a predetermined percentage of blockage of light in the selected range.

In one embodiment the dye is one of the group consisting of Cu(II) meso-Tetraphenylporphine or FS-201; Cu(II) meso-Tetra(4-chlorophenyl) porphine or FS-202; Cu(II) meso-Tetra(4-methoxyphenyl) porphine or FS-203; Cu(II) meso-Tetra(4-tert-butylphenyl) porphine or FS-204; Cu(II) meso-Tetra(3,5-di-tert-butylphenyl) porphine or FS-205; Cu(II) meso-Tetra(2-naphthyl) porphine or FS-206; Cu(II) meso-Tetra(N-methyl-4-pyridyl) porphine tetrachloride or FS-207; Cu(II) meso-Tetra(N-Methyl-6-quinolinyl) porphine tetrachloride or FS-208; Cu(II) meso-Tetra(1-naphthyl)porphine or FS-209; Cu(II) meso-Tetra(4-bromophenyl) porphine or FS-210; Cu(II) meso-Tetra(pentafluorophenyl) porphine or Cu1; Cu(II) meso-Tetra(4-sulfonatophenyl) porphine or Cu2; Cu(II) meso-Tetra(N-methyl-4-pyridyl) porphine tetra acetate or Cu3; Cu(II) meso-Tetra(4-pyridyl) porphine or Cu4; Cu(II) meso-Tetra(4-carboxyphenyl)porphine or Cu5.

In one embodiment, the dye is Cu(II) meso-Tetra(2-naphthyl) porphine (FS-206).

In one embodiment, the dye is Cu(II) meso-Tetra(1-naphthyl)porphine (FS-209).

In one embodiment, the dye is Cu(II) meso-Tetra(pentafluorophenyl) porphine (Cu1).

In one embodiment, the dye is Cu(II) meso-Tetra(4-sulfonatophenyl) porphine (Cu2).

In one embodiment, the dye is Cu(II) meso-Tetra(4-carboxyphenyl)porphine (Cu5).

In one embodiment, the solution includes a chlorinated solvent.

In one embodiment, the solution includes solvent having a polarity index of 3.0 or greater.

In one embodiment, the solution comprises a solvent selected from the group consisting of cyclopentanone, cyclohexanone, methyl ethyl ketone, DMSO, DMF, THF, chloroform, methylene chloride, acetonitrile, carbon tetrachloride, dichloroethane, dichloroethylene, dichloropropane, trichloroethane, trichloroethylene, tetrachloroethane, tetrachloroethylene, chlorobenzene, dichlorobenzene, and combinations thereof.

In one embodiment, the solvent of the solution is chloroform.

In one embodiment, the solvent of the solution consists essentially of chloroform.

In one embodiment, the solvent is a chlorinated solvent.

In one embodiment, the at least one wavelength of light is within the range 430 nm+/−20 nm.

In one embodiment, the at least one wavelength of light is within the range 430 nm+/−30 nm.

In one embodiment, the at least one wavelength of light is within the range 420 nm+/−20 nm.

In one embodiment, the coating is a primer coating.

In one embodiment, the device selectively filters the at least one wavelength in the range of 400 nm to 500 nm using at least one of a reflective coating and a multi-layer interference coating.

In one embodiment, the dye or dye mixture, when incorporated in the device's optical path, absorbs 5-50% of light in the range 400 nm to 500 nm.

In one embodiment, the dye or dye mixture, when incorporated in the device's optical path, absorbs 20-40% of light in the range 400 nm to 500 nm.

In one embodiment, the device blocks 5-50% of light in the range 400 nm to 500 nm.

In one embodiment, the device blocks 20-40% of light in the range 400 nm to 500 nm.

In one embodiment, the controlled temperature environment is set at a temperature equal to or less than 50 degrees C. and the time period is between 1 hour and 5 hours.

In one embodiment, the dye or dye mixture has a Soret peak within the range 400 nm to 500 nm.

In one embodiment, the at least one absorption peak has a full-width at half-max (FWHM) of less than 40 nm in the range 400 nm to 500 nm.

In one embodiment, the at least one wavelength is 430 nm.

In one embodiment the peak wavelength filtering is 420+/−5 nm.

In one embodiment the peak wavelength filtering is 420+/−10 nm.

In one embodiment, the dye or dye mixture, when incorporated in the device's optical path, absorbs 5-50% of light in the range 410 nm to 450 nm.

In one embodiment, the dye or dye mixture, when incorporated in the device's optical path, absorbs 20-40% of light in the range 410 nm to 450 nm.

In one embodiment, the device blocks 5-50% of light in the range 410 nm to 450 nm.

In one embodiment, the device blocks 20-40% of light in the range 410 nm to 450 nm.

In one embodiment, the dye or dye mixture, when incorporated in the device's optical path, absorbs 5-50% of light in the range 400 nm to 460 nm.

In one embodiment, the dye or dye mixture, when incorporated in the device's optical path, absorbs 20-40% of light in the range 400 nm to 460 nm.

In one embodiment, the device blocks 5-50% of light in the range 400 nm to 460 nm.

In one embodiment, the device blocks 20-40% of light in the range 400 nm to 460 nm.

In one embodiment, the dye or dye mixture, when incorporated in the device's optical path, absorbs 5-50% of light in the range 400 nm to 440 nm.

In one embodiment, the dye or dye mixture, when incorporated in the device's optical path, absorbs 20-40% of light in the range 400 nm to 440 nm.

In one embodiment, the device blocks 5-50% of light in the range 400 nm to 440 nm.

In one embodiment, the device blocks 20-40% of light in the range 400 nm to 440 nm.

In one embodiment, the haze level of the device having incorporated therein the dye or dye mixture therein is less than 0.6%.

In one embodiment the filtering is accomplished through absorption, reflection, interference, or any combination thereof.

In one embodiment, there is provided an ophthalmic system which comprises an ophthalmic lens selected from the group consisting of a spectacle lens (prescription or non-prescription), sunglasses (prescription or non-prescription), a photochromic lens, a contact lens (prescription or non-prescription), cosmetic tinted contact lens, the visibility tint of a contact lens, intra-ocular lens, corneal inlay, corneal onlay, corneal graft, and corneal tissue, electronic lens, over the counter reading glasses or magnifiers, safety glasses, safety goggles, safety shields, vision rehabilitation devices, and a selective light wavelength filter that blocks 5-50% of light having a wavelength in the range between 400-500 nm and transmits at least 80% of light across the visible spectrum. Further, the selective wavelength filter comprises a dye or a dye mixture having average aggregate size of less than 1 micrometer. In one embodiment, the range is 400-460 nm.

In order to provide this optimal ophthalmic system it is desirable to include standardized Yellowness Index ranges, whereby the upper end of said range closely borders a cosmetically unacceptable yellow color. The coating may be applied to any ophthalmic system, by way of example only: an eyeglass lens, a sunglass lens, a contact lens, intra-ocular lens, corneal inlay, corneal onlay, corneal graft, electro-active ophthalmic system or any other type of lens or non-ophthalmic system. It is preferable that the Yellowness Index (YI) is 15.0 or less for ophthalmic systems, or YI is 35.0 or less for non-ophthalmic systems.

A coating as described above is also provided whereby the coating is applied to a spectacle lens, sunglass lens, contact lens, intra-ocular lens, corneal inlay, corneal onlay, corneal graft, corneal tissue, electro-active ophthalmic system or a non-ophthalmic system and selectively inhibits visible light between 430+/−20 nm, whereby the coating blocks a maximum of 30% of light within the 430+/−20 nm range with a yellowness index of 15.0 or less. In one embodiment, the lens made with the process discussed above, can have yellowness index (YI) of 15.0 or less. In other embodiments, a YI of 12.5 or less, or 10.0 or less, or 9.0 or less, or 8.0 or less, or 7.0 or less, or 6.0 or less, or 5.0 or less, or 4.0 or less, or 3.0 or less is preferred to reduce blue light dose to the retina and allow best possible cosmetics of the intended application. The YI varies based on the specific filter application In one embodiment, the system has a haze level of less than 0.6%.

In one embodiment, there is provided a method comprising providing a solution containing a dye or a dye mixture, ultrasonicating the solution to reduce the average size of aggregates of the dye or dye mixture contained in the solution, and incorporating the dye or the dye mixture in the optical path of a device that transmits light.

In one embodiment, there is provided an ophthalmic system prepared by a process comprising providing a solution containing a dye or dye mixture, the dye or the dye mixture forming aggregates of average size less than 10 micrometers, incorporating the dye or the dye mixture in the optical path of the ophthalmic lens, and the dye or dye mixture selectively filters at least one wavelength of light within the range of 400 nm to 500 nm. Further, the system having the dye or dye mixture incorporated therein has an average transmission of at least 80% across the visible spectrum.

In one embodiment, the ophthalmic system comprises an ophthalmic lens, the ophthalmic lens selected from the group consisting of a spectacle lens (prescription or non-prescription), sunglasses (prescription or non-prescription), a photochromic lens, a contact lens (prescription or non-prescription), cosmetic tinted contact lens, the visibility tint of a contact lens, intra-ocular lens, corneal inlay, corneal onlay, corneal graft, and corneal tissue, electronic lens, over the counter reading glasses or magnifiers, safety glasses, safety goggles, safety shields, and vision rehabilitation devices. Further, the ophthalmic system comprises selective light wavelength filter that blocks 5-50% of light having a wavelength in the range of 400-500 nm and transmits at least 80% of light across the visible spectrum, the selective wavelength filter comprising the dye or dye mixture.

In one embodiment, the system exhibits a yellowness index of no more than 15.

In one embodiment, the haze level of the ophthalmic system is less than 0.6%.

In one embodiment, the system is non-ophthalmic system.

Embodiments could include non-ophthalmic systems by way of example only: any type of windows, or sheet of glass, laminate, or any transparent material, automotive windshields or automotive windows, aircraft windows, agricultural equipment such as the windows and windshield in the cab of a farm tractor, bus and truck windshields or windows, sunroofs, skylights, camera flash bulbs and lenses, any type of artificial lighting fixture (either the fixture or the filament or both), any type of light bulb, fluorescent lighting, LED lighting or any type of diffuser, medical instruments, surgical instruments, rifle scopes, binoculars, computer monitors, televisions screens, any electronic device that emits light either handheld or not hand held, lighted signs or any other item or system whereby light is emitted or is transmitted or passes through filtered or unfiltered.

Embodiments disclosed herein may include non-ophthalmic systems. Any non-ophthalmic system whereby, light transmits through or from the non-ophthalmic system are also envisioned. By way of example only, a non-ophthalmic system could include: automobile windows and windshields, aircraft windows and windshields, any type of window, computer monitors, televisions, medical instruments, diagnostic instruments, lighting products, fluorescent lighting, or any type of lighting product or light diffuser. Furthermore, military and space applications apply as acute or chronic exposure to high energy visible light wavelengths can have a deleterious effect on soldiers and astronauts. Any type of product other than described as ophthalmic is considered a non-ophthalmic product. Thus, any type of product or device whereby visible light is emitted or travels through said product or device whereby light from that product or device enters the human eye are envisioned.

A coating as described above is also provided whereby the coating is applied to a non-ophthalmic system, and selectively inhibits visible light between 430+/−20 nm, or in other embodiments 430+/−30 nm, whereby the coating blocks 5% to 70% of light within the 430+/−20 nm range or 430+/−30 nm with a yellowness index of 35.0 or less. In other embodiments, a YI of 30 or less, or 25.0 or less, or 20.0 or less, or 17.5 or less, or 15.0 or less, or 12.5 or less, or 10.0 or less, or 9.0 or less, or 8.0 or less, 7.0 or less, 6.0 or less, 5.0 or less, 4.0 or less, 3.0 or less, is preferred to reduce blue light dose to the retina and allow best possible cosmetics of the intended application. The YI varies based on the specific filter application.

In one embodiment the coating is applied by any one of: spin coating, dip coating, spray coating, evaporation, sputtering, chemical vapor deposition or any combination thereof or by other methods known in the art of applying coatings.

A coating as described above is also provided whereby the coating is applied to a non-ophthalmic system, and selectively inhibits visible light between 430+/−20 nm, or in other embodiments 430+/−30 nm, whereby the coating blocks 5% to 60% of light within the 430+/−20 nm or 430+/−30 nm range with a yellowness index of 35.0 or less. In other embodiments, a YI of 30 or less, or 25.0 or less, or 20.0 or less, or 17.5 or less, or 15.0 or less, or 12.5 or less, or 10.0 or less, or 9.0 or less, or 8.0 or less, 7.0 or less, 6.0 or less, 5.0 or less, 4.0 or less, 3.0 or less, is preferred to reduce blue light dose to the retina and allow best possible cosmetics of the intended application. The YI varies based on the specific filter application.

A coating as described above is also provided whereby the coating is applied to a non-ophthalmic system, and selectively inhibits visible light between 430+/−20 nm, or in other embodiments 430+/−30 nm, whereby the coating blocks 5% to 50% of light within the 430+/−20 nm or 430+/−30 nm range with a yellowness index of 35.0 or less. In other embodiments, a YI of 30 or less, or 25.0 or less, or 20.0 or less, or 17.5 or less, or 15.0 or less, or 12.5 or less, or 10.0 or less, or 9.0 or less, or 8.0 or less, 7.0 or less, 6.0 or less, 5.0 or less, 4.0 or less, 3.0 or less, is preferred to reduce blue light dose to the retina and allow best possible cosmetics of the intended application. The YI varies based on the specific filter application.

A coating as described above is also provided whereby the coating is applied to a non-ophthalmic system, and selectively inhibits visible light between 430+/−20 nm, or in other embodiments 430+/−30 nm, whereby the coating blocks 5% to 40% of light within the 430+/−20 nm or 430+/−30 nm range with a yellowness index of 35.0 or less. In other embodiments, a YI of 30 or less, or 25.0 or less, or 20.0 or less, or 17.5 or less, or 15.0 or less, or 12.5 or less, or 10.0 or less, or 9.0 or less, or 8.0 or less, 7.0 or less, 6.0 or less, 5.0 or less, 4.0 or less, 3.0 or less, is preferred to reduce blue light dose to the retina and allow best possible cosmetics of the intended application. The YI varies based on the specific filter application.

In some embodiments, the selective blue-light filtering coatings comprising porphyrin dyes exhibit tunable filtering with:

less color or Chroma C lower Delta E* (total color) and lower YI values when compared to broad-band blue blockers or other coatings. Particularly, in one embodiment, the coatings disclosed herein, which can provide up-to 40% blue light blockage, have:

Chroma C<5.0,

|a*| and |b*|<2 and 4, respectively,

YI<8.0, delta E*<5.0 and

JND<2 units, at high transmittance level.

Furthermore, in one embodiment, the coatings disclosed herein, which block 20% blue light, have:
Chroma C=2-3,
YI=3-4,
delta E*<2.0 and
JND<1 unit,
at transmittance level >90%.

BRIEF DESCRIPTION OF THE DRAWINGS/FIGURES

Embodiments of the invention will now be described, by way of example only, with reference to the accompanying schematic drawings. The accompanying drawings, which are incorporated herein and form part of the specification, illustrate the present disclosure and further serve to explain the principles disclosed.

FIG. 8 shows CIE 1976 color space.

FIG. 9A shows total color difference, delta E* in CIE LAB color space.

FIG. 9B shows total color difference, delta E* in CIE LCH color space.

Figure 12:
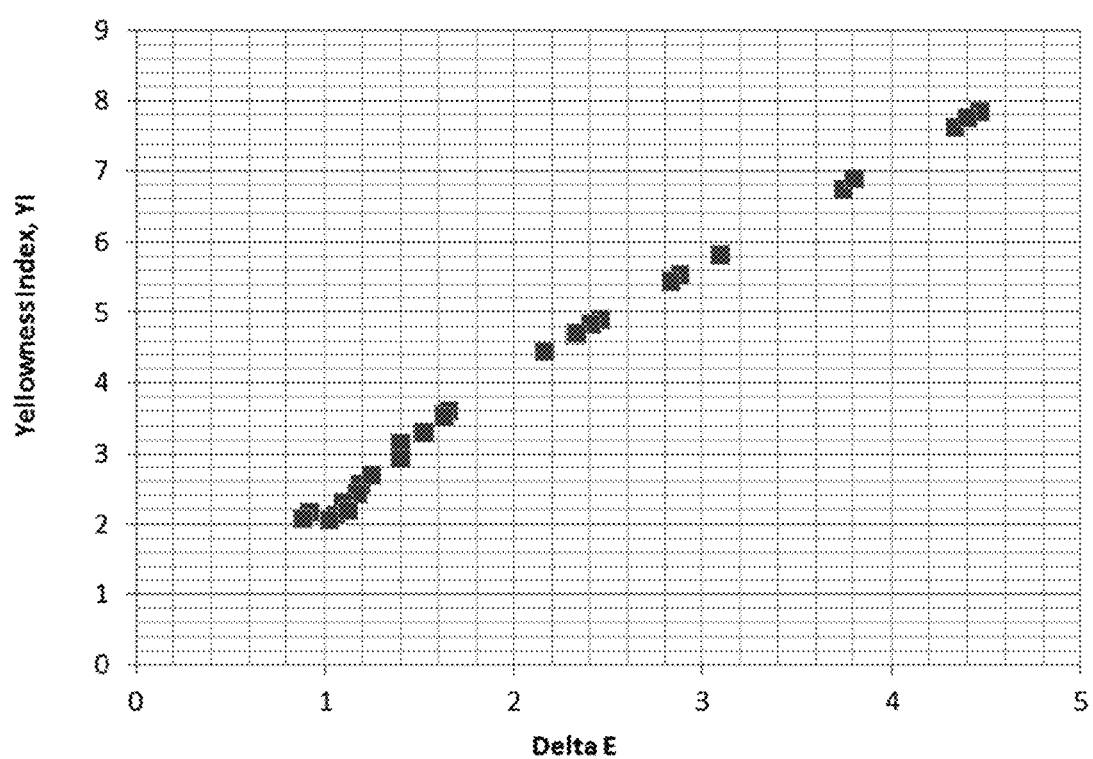

FIG. 12 shows an exemplary YI vs. Delta E for selective blue-blocking coatings comprising FS-206 dye. Each symbol designates the measured coating; all presented coatings provide blue light blocking in the range 10-40% and showed YI between 2 and 8. The color difference in this FIG. (Delta E) was calculated as: La*b* (SAMPLE)–La*b* (STANDARD) with a polycarbonate surfaced lens used as the STANDARD.

Figure 13:
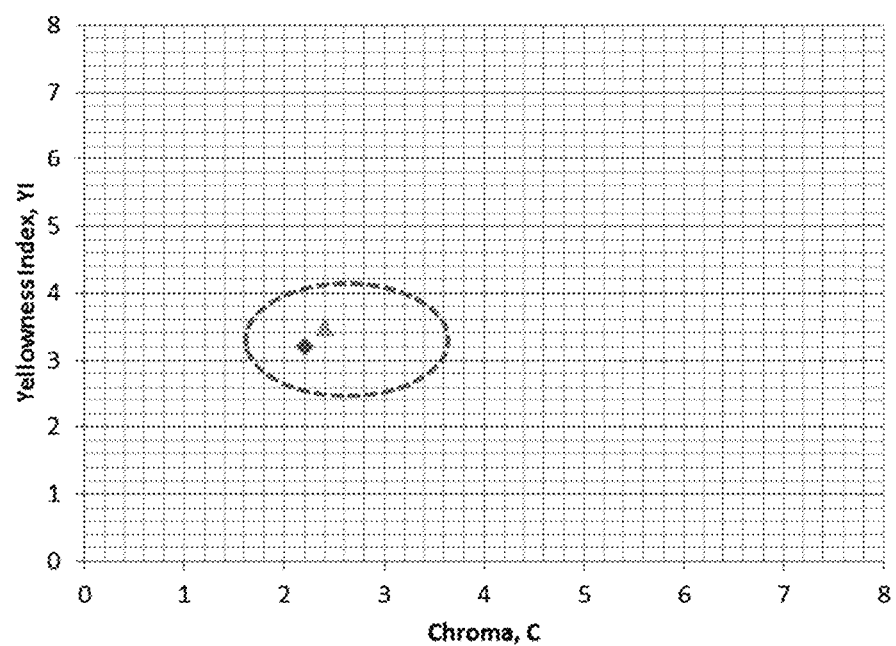

FIG. 13 shows Yellowness index vs. Chroma for blue-blocking coatings. The symbols designate coatings with about 20% blue light blockage, while the broken ellipsoid gives the range for coatings with 10-40% blue light blockage.

Figure 14:
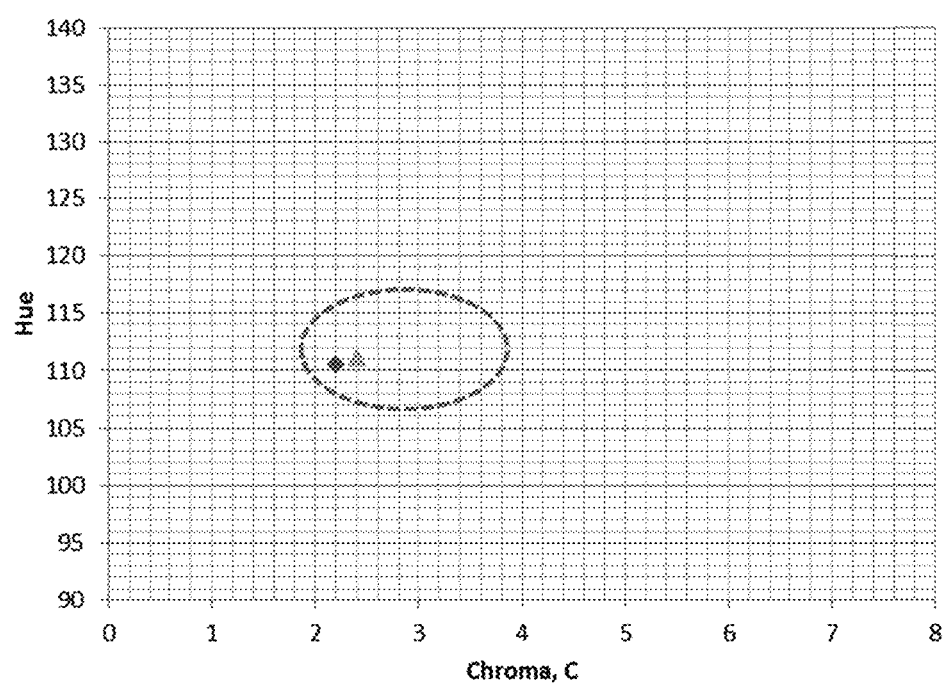

FIG. 14 shows Hue vs. Chroma for blue-blocking coatings. The symbols designate coatings with about 20% blue light blockage, while the broken ellipsoid gives the range for coatings with 10-40% blue light blockage.

Figure 15:
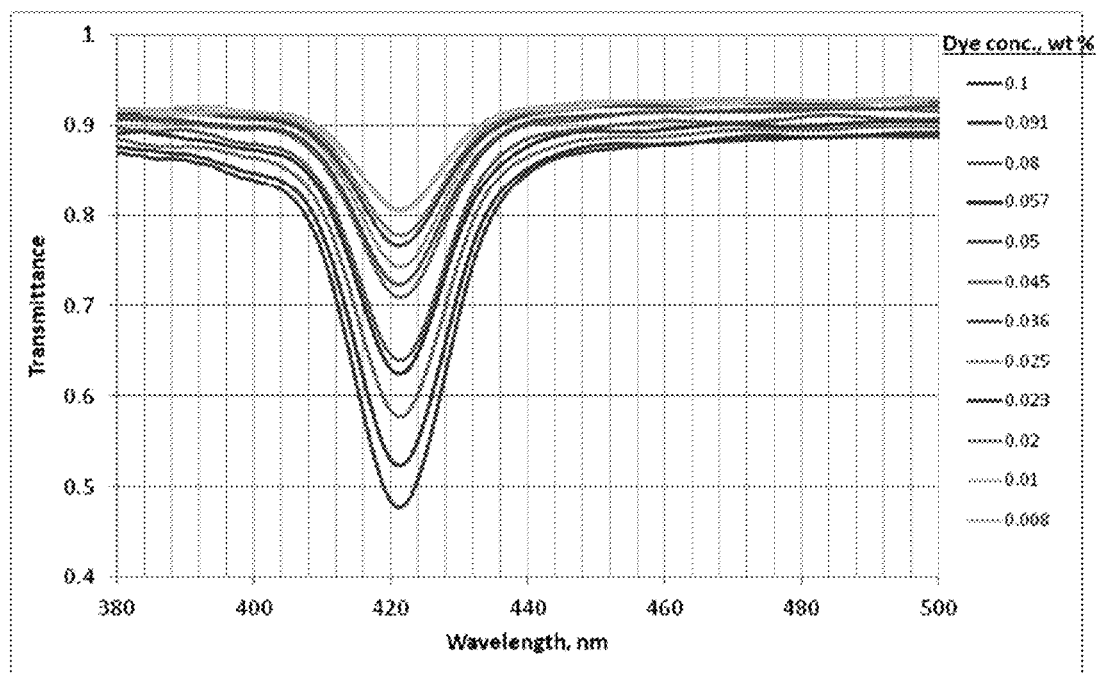

FIG. 15 shows transmission spectra of selective filtering coatings on glass substrates comprising Cu(II) meso-Tetra (2-naphthyl) porphine dye (FS-206) at different concentrations. Precise tunability of % blue light blockage and YI can be achieved by adjusting the dye concentration in the coating Table 7 provides examples of the relationship between the dye concentration, YI, and % blue light blockage for coatings containing FS-206 dye.

Figure 16:
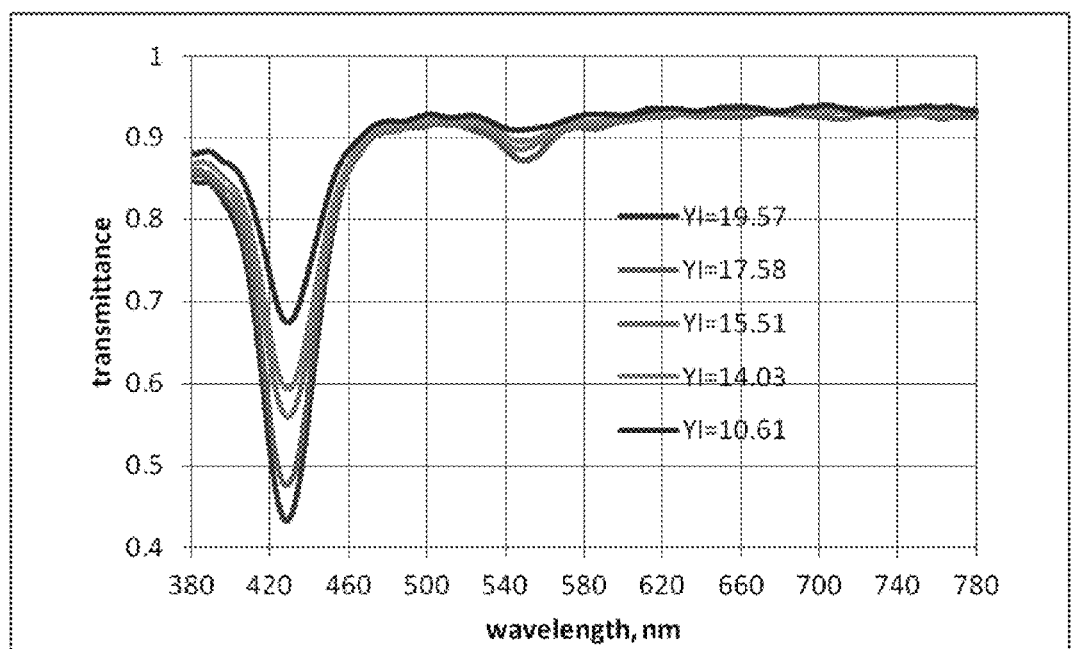

FIG. 16 shows transmission spectra of selective filtering coating on glass substrates comprising FS-207 dye at different concentrations. Table 8 provides examples of the relationship between dye concentration, YI, and % blue blockage. Note: the glass substrate does not contribute to the YI shown in the Figure. (in other words, YI of glass substrate is 0).

Figure 17A:
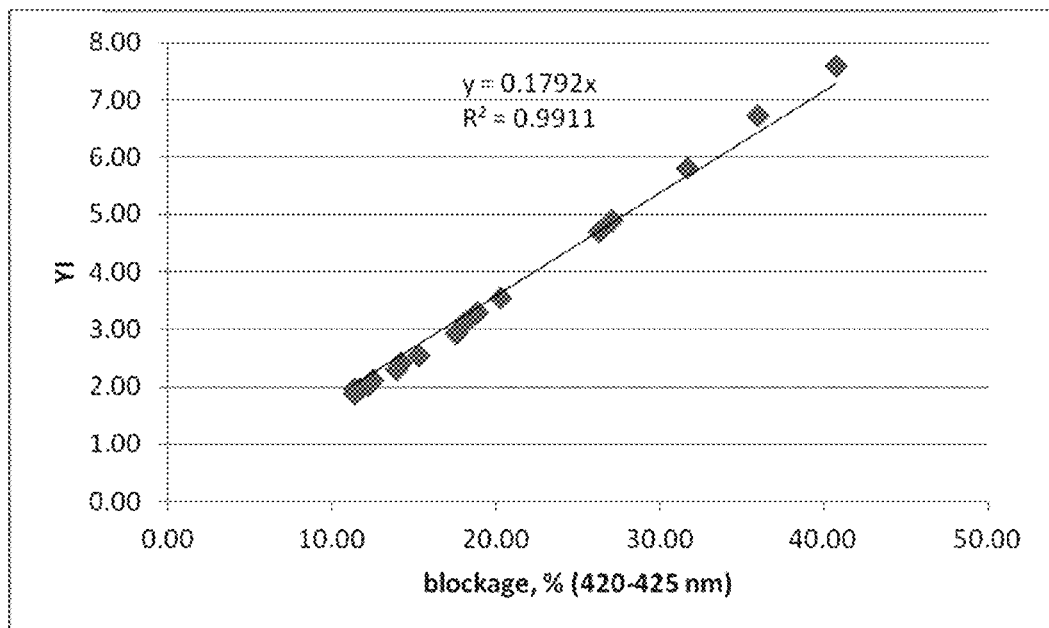

FIG. 17A shows Yellowness Index (YI) vs. % blue light blockage, calculated for different as a spectral range for coatings on glass substrates comprising FS-206 dye at different concentrations. Note: the glass substrate does not contribute to the YI shown in the Figure. (in other words, YI of glass substrate is 0).

Figure 17B:
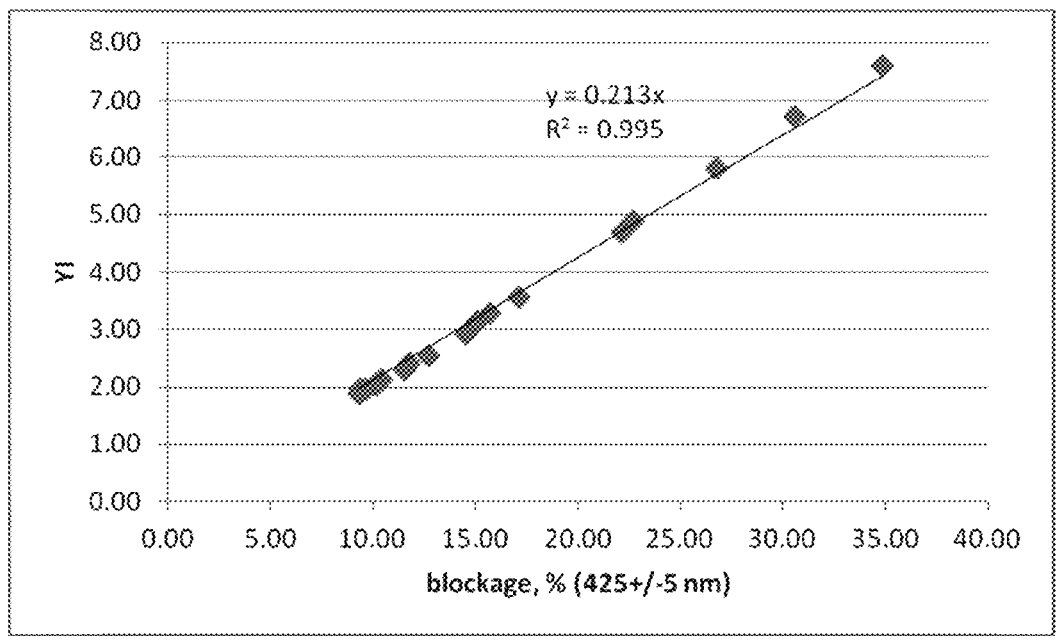

FIG. 17B shows Yellowness Index (YI) vs. % blue light blockage, calculated for a different spectral range for coatings on glass substrates comprising FS-206 dye at different concentrations.

Figure 17C:
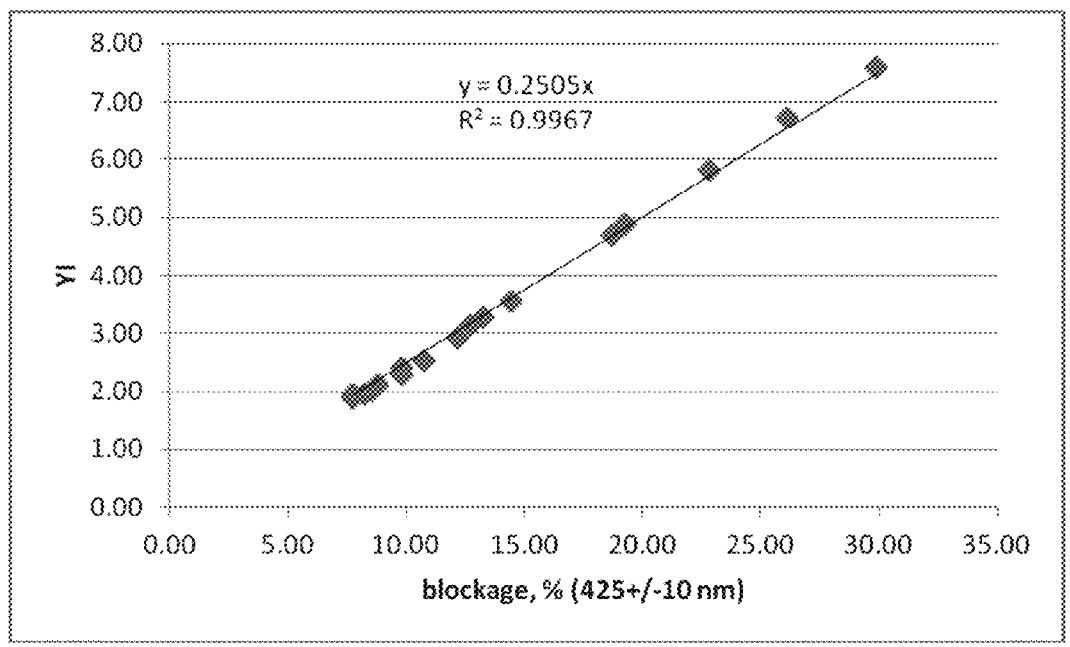

FIG. 17C shows Yellowness Index (YI) vs. % blue light blockage, calculated for a different spectral range than FIG. 17B for coatings on glass substrates comprising FS-206 dye at different concentrations.

Figure 17D:
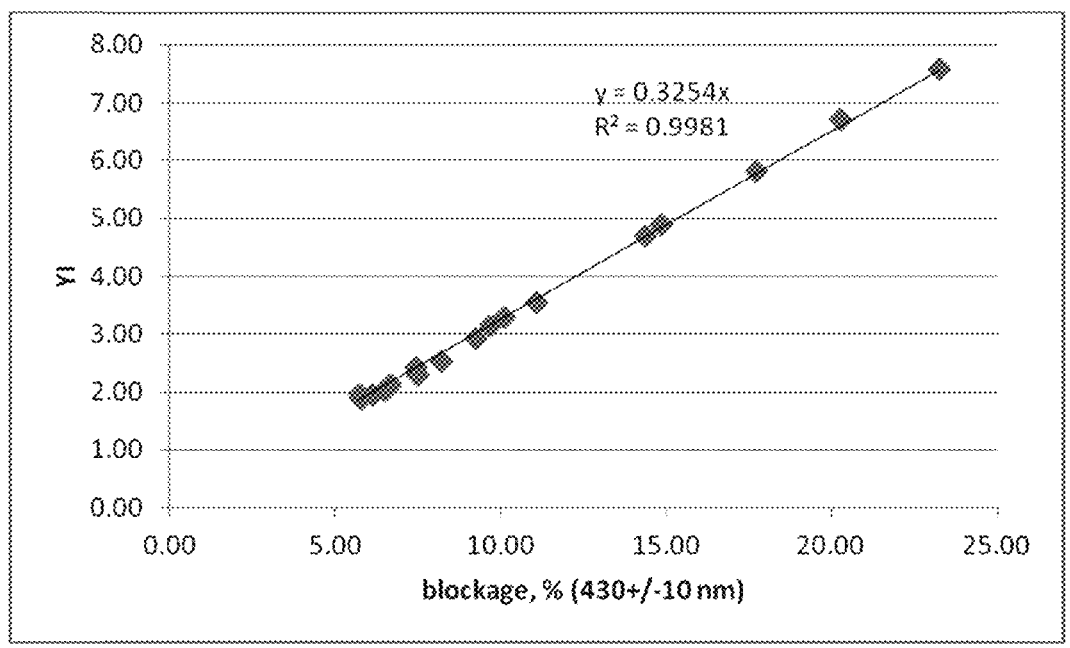

FIG. 17D shows Yellowness Index (YI) vs. % blue light blockage, calculated for a different spectral range for coatings on glass substrates comprising FS-206 dye at different concentrations.

Figure 17E:
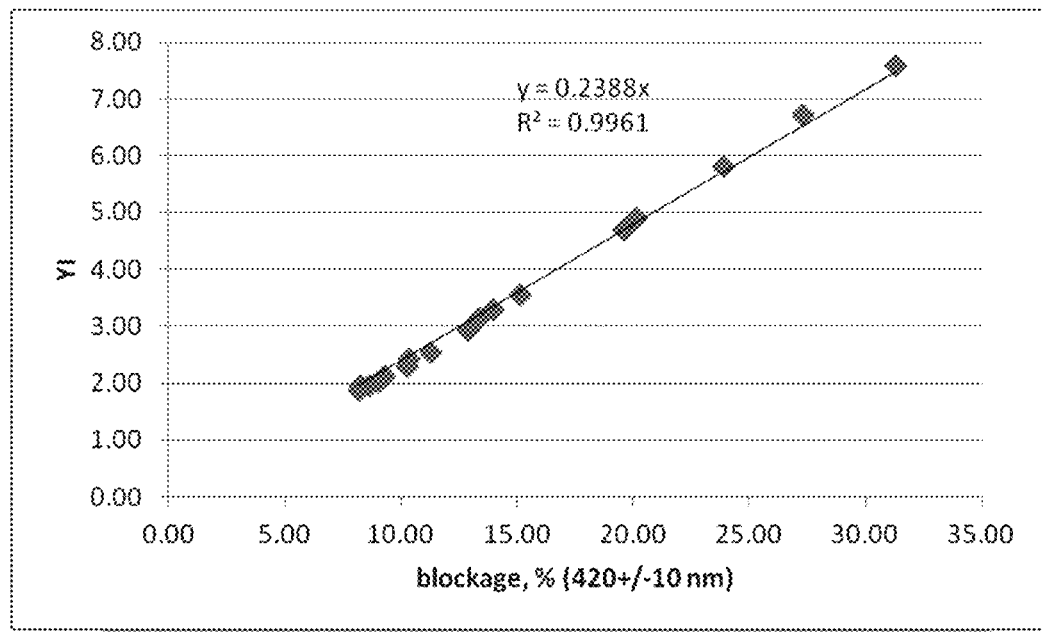

FIG. 17E shows Yellowness Index (YI) vs. % blue light blockage, calculated for a different spectral range for coatings on glass substrates comprising FS-206 dye at different concentrations.

Figure 17F:
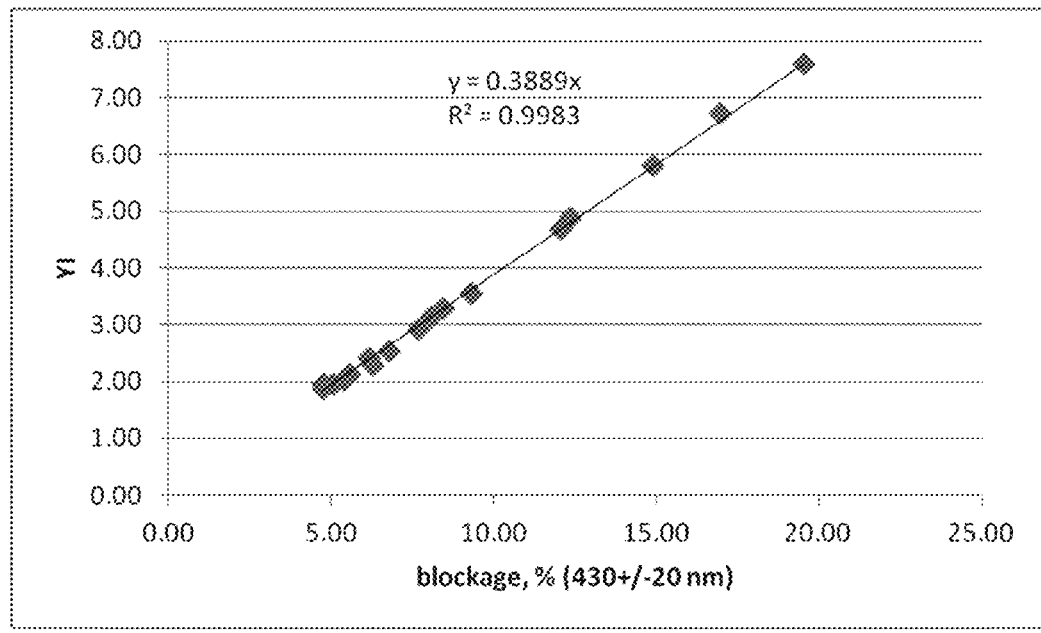

FIG. 17F shows Yellowness Index (YI) vs. % blue light blockage, calculated for a different spectral range for coatings on glass substrates comprising FS-206 dye at different concentrations.

Figure 18A:
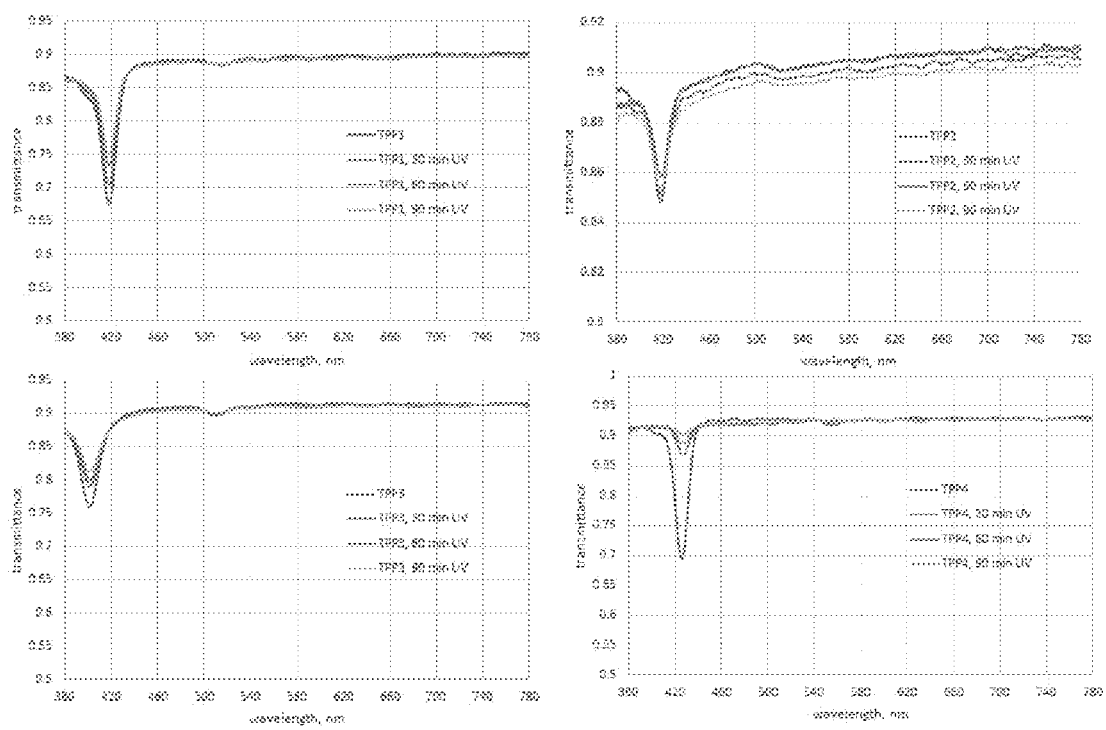

FIG. 18A shows transmission spectra of TPP-dye series dye before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. This set of dyes was selected in order to determine the most stable core metal inside porphyrin ring, while the pendants in all cases were phenyl.

Figure 18B:
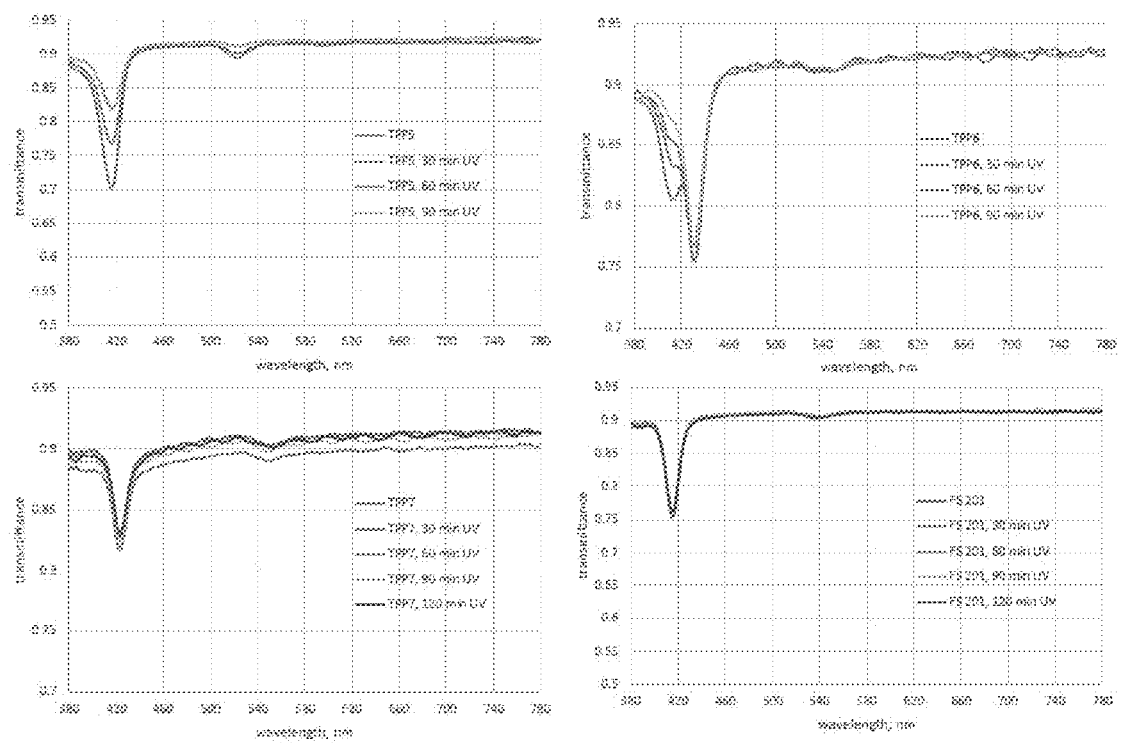

FIG. 18B shows transmission spectra of more TPP-dye series and FS-201 dye before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. This set of dyes was selected in order to determine the most stable core metal inside porphyrin ring, while the pendants in all cases were phenyl.

Figure 19A:
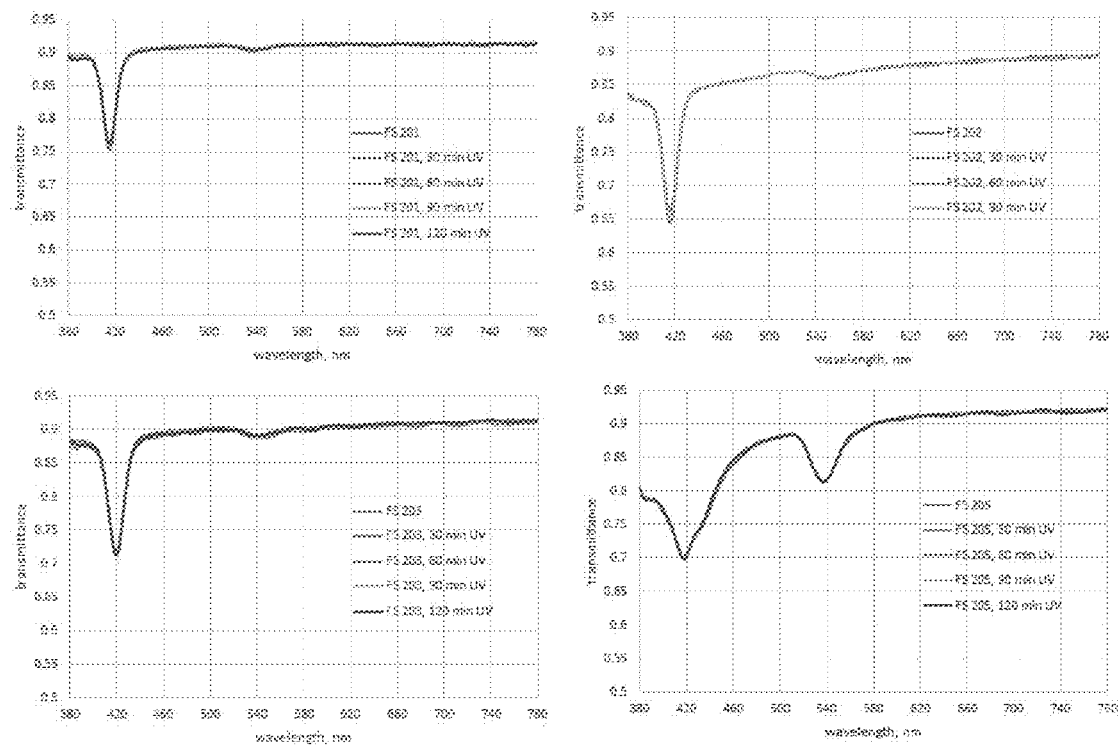

FIG. 19A shows transmission spectra of FS-dye series before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. These sets of dyes were selected for testing in this category in order to determine the most stable pendent attached to a porphyrin with copper (Cu) as a core metal.

Figure 19B:
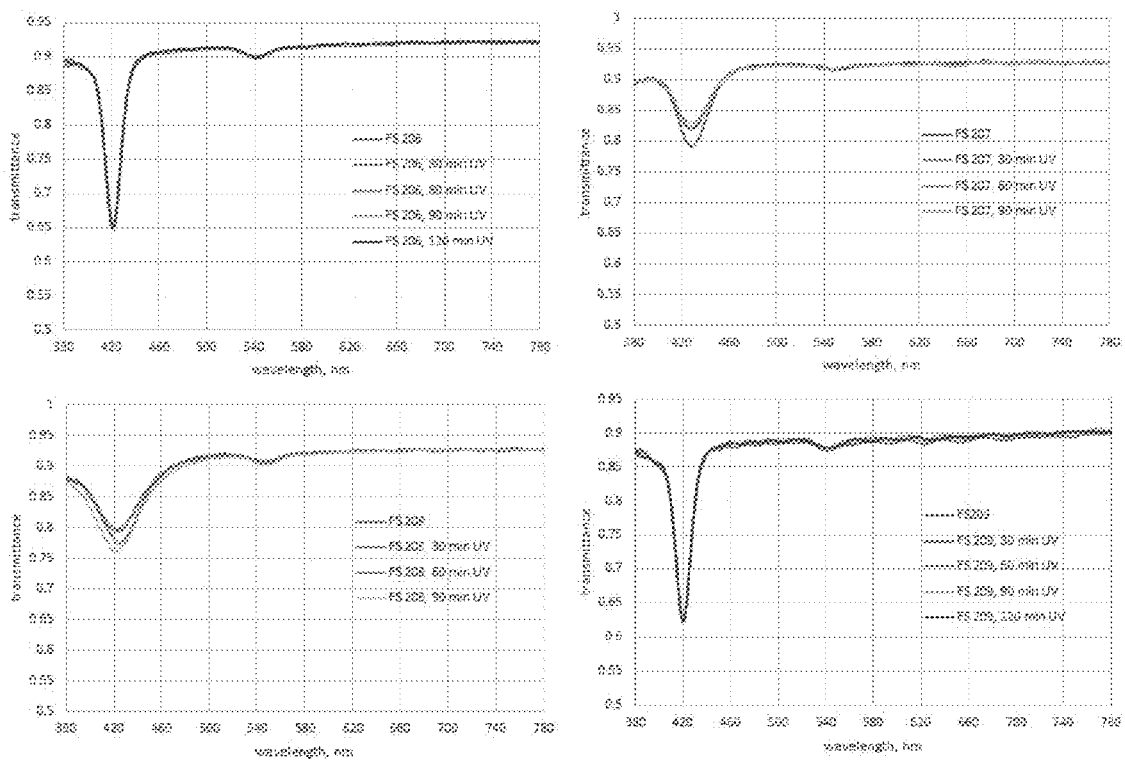

FIG. 19B shows transmission spectra of more FS-dye series before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. These sets of dyes were selected for testing in this category in order to determine the most stable pendent attached to a porphyrin with copper (Cu) as a core metal.

Figure 19C:
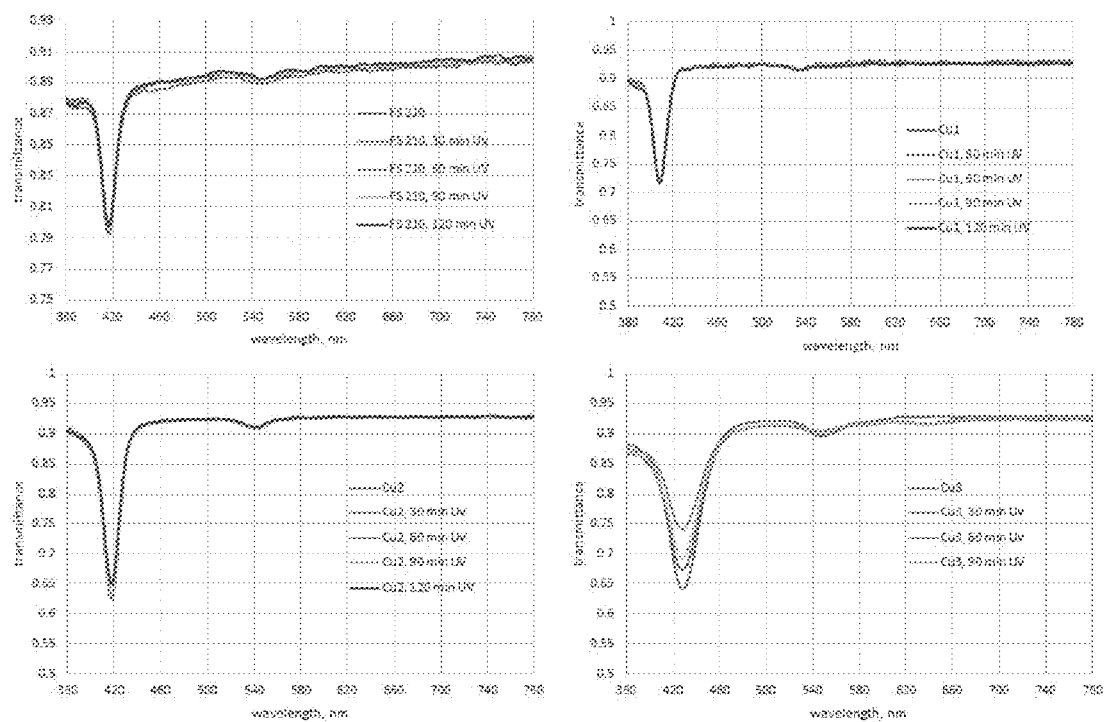

FIG. 19C shows transmission spectra of more FS-dye series and CU-dye series before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. These sets of dyes were selected for testing in this category in order to determine the most stable pendent attached to a porphyrin with copper (Cu) as a core metal.

Figure 19D:
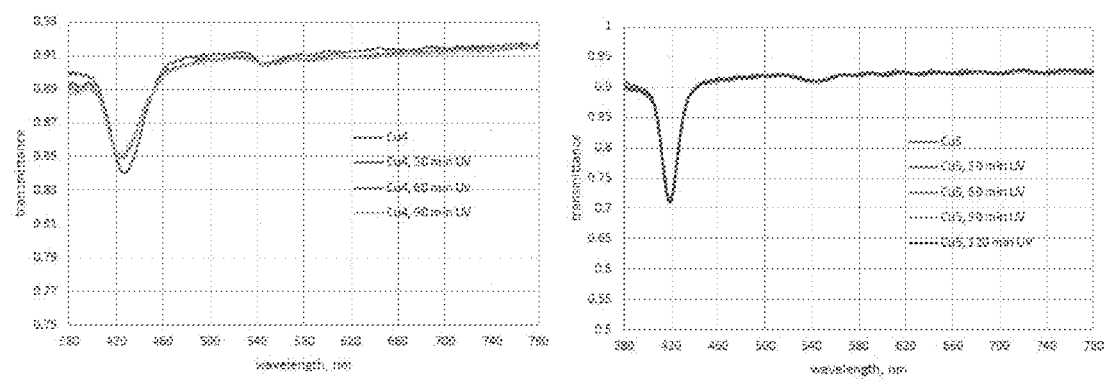

FIG. 19D shows transmission spectra of CU-dye series before, during and after laboratory UV-visible light exposure test in ambient conditions. Samples of blue-blocking coatings comprising the dyes individually were exposed to Dymax BlueWave 200 light for 30, 60 and 90 min, with the most stable dyes (determined after 90 min UV-visible light exposure) exposed to 120 min. These sets of dyes were selected for testing in this category in order to determine the most stable pendent attached to a porphyrin with copper (Cu) as a core metal.

Figure 20A:
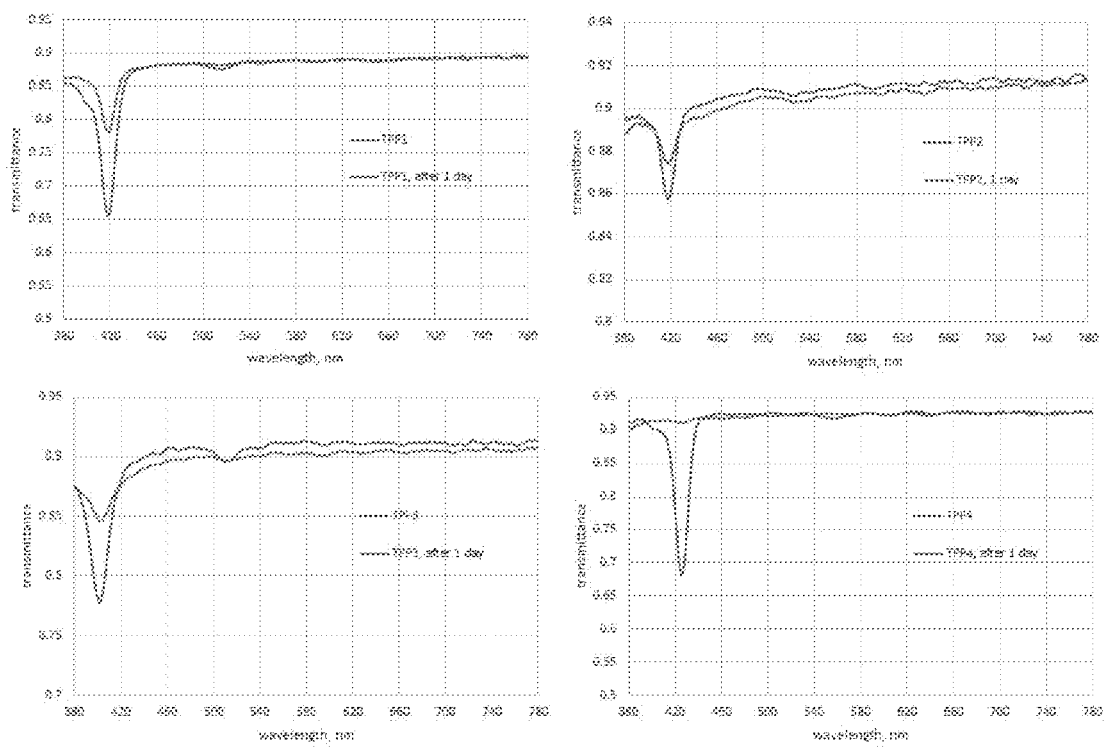

FIG. 20A shows transmission spectra of TPP-dye series before and during outdoor weathering test. Samples of blue-blocking coatings comprising the dyes individually were exposed outdoors for 24 hrs/day for 1, 3 and 5 days. The outdoor test continued for the most stable dyes. This set of dyes was selected in order to determine the most stable core metal inside porphyrin ring, while the pendants in all cases were phenyl.

Figure 20B:
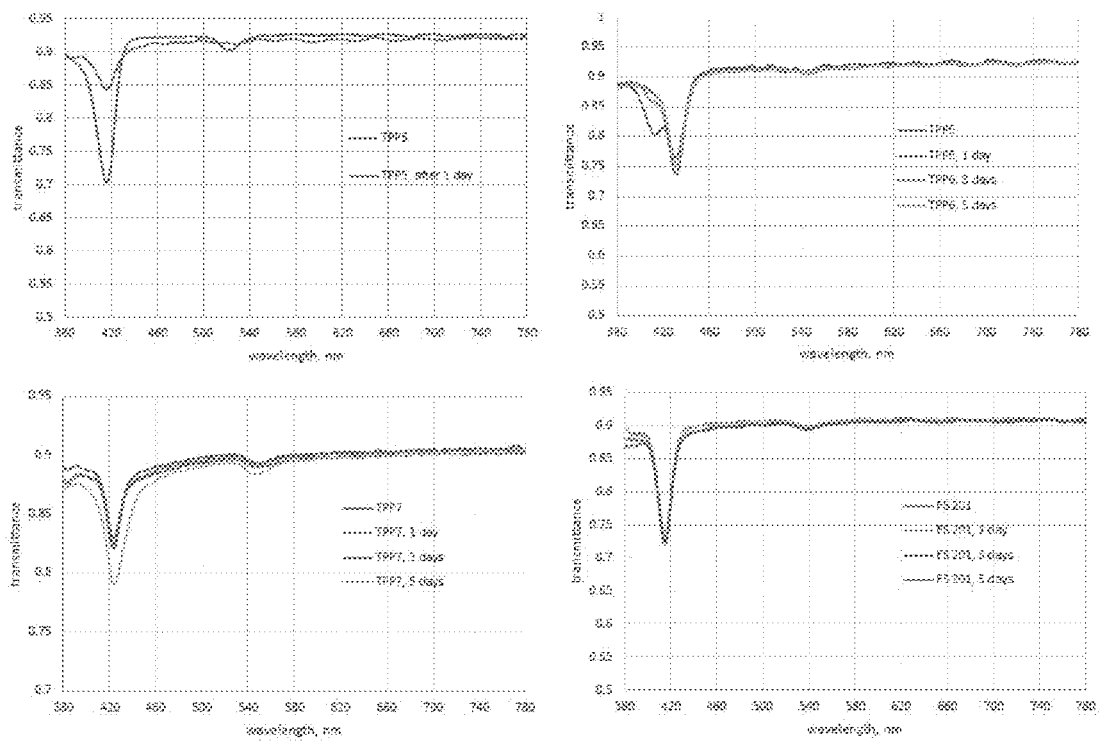

FIG. 20B shows transmission spectra of more TPP-dye series and FS-201 dye before and during outdoor weathering test. Samples of blue-blocking coatings comprising the dyes individually were exposed outdoors for 24 hrs/day for 1, 3 and 5 days. The outdoor test continued for the most stable dyes. This set of dyes was selected in order to determine the most stable core metal inside porphyrin ring, while the pendants in all cases were phenyl.

Figure 21A:
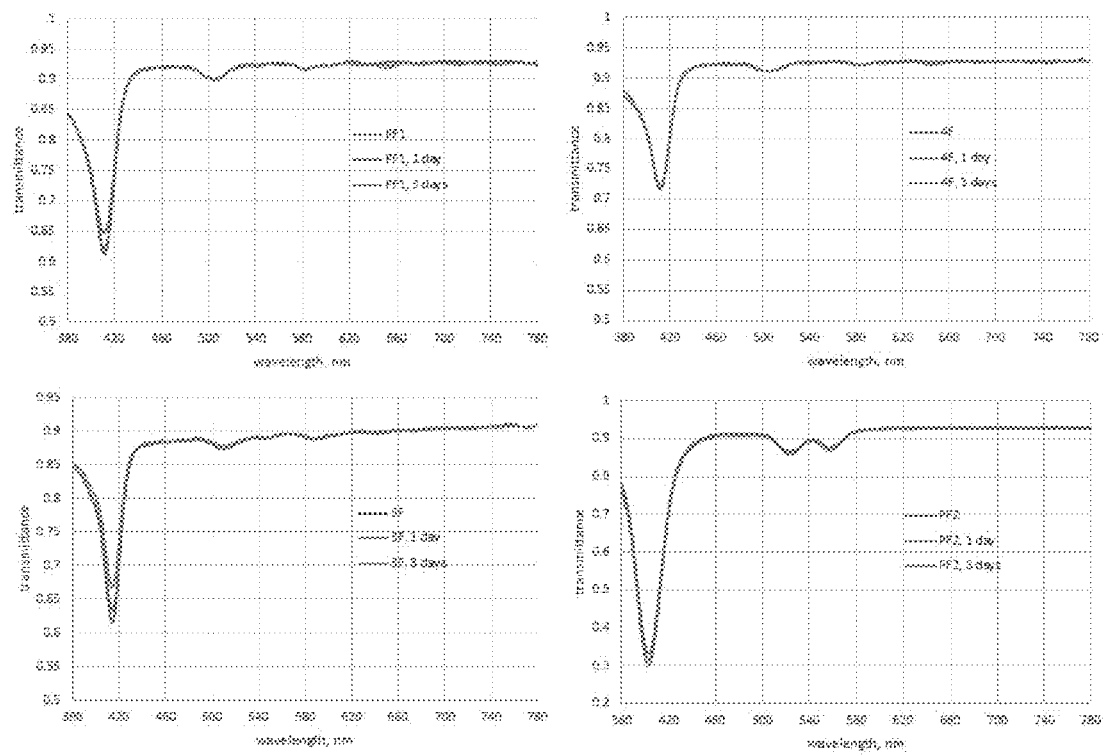

FIG. 21A shows transmission spectra of F-series and PF-dye series before and during outdoor weathering test. Samples of blue-blocking coatings comprising the dyes individually were exposed outdoors for 24 hrs/day for 1 and 3 days. The outdoor test continued for the most stable dyes. This set of dyes was selected in order to determine the most stable core metal inside porphyrin ring, while the pendants in all cases were penta-fluoro-phenyl.

Figure 21B:
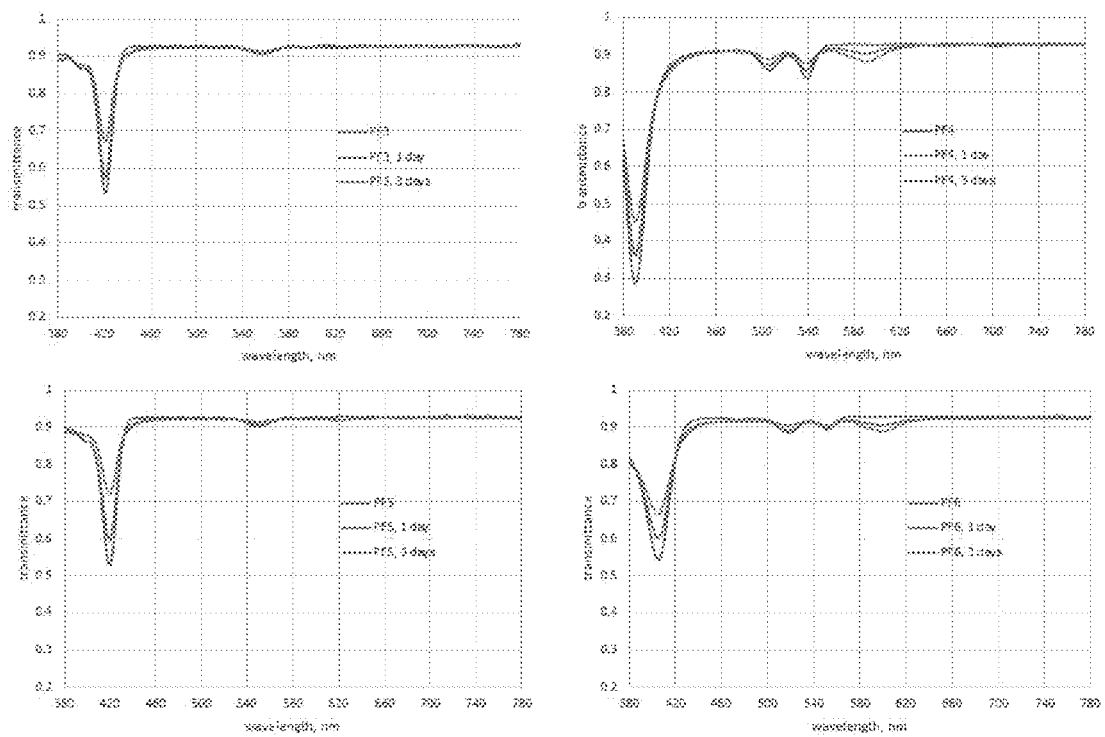

FIG. 21B shows transmission spectra of more PF-dye series before and during outdoor weathering test. Samples of blue-blocking coatings comprising the dyes individually were exposed outdoors for 24 hrs/day for 1 and 3 days. The outdoor test continued for the most stable dyes was selected in order to determine the most stable core metal inside porphyrin ring, while the pendants in all cases were penta-fluoro-phenyl.

Figure 21C:
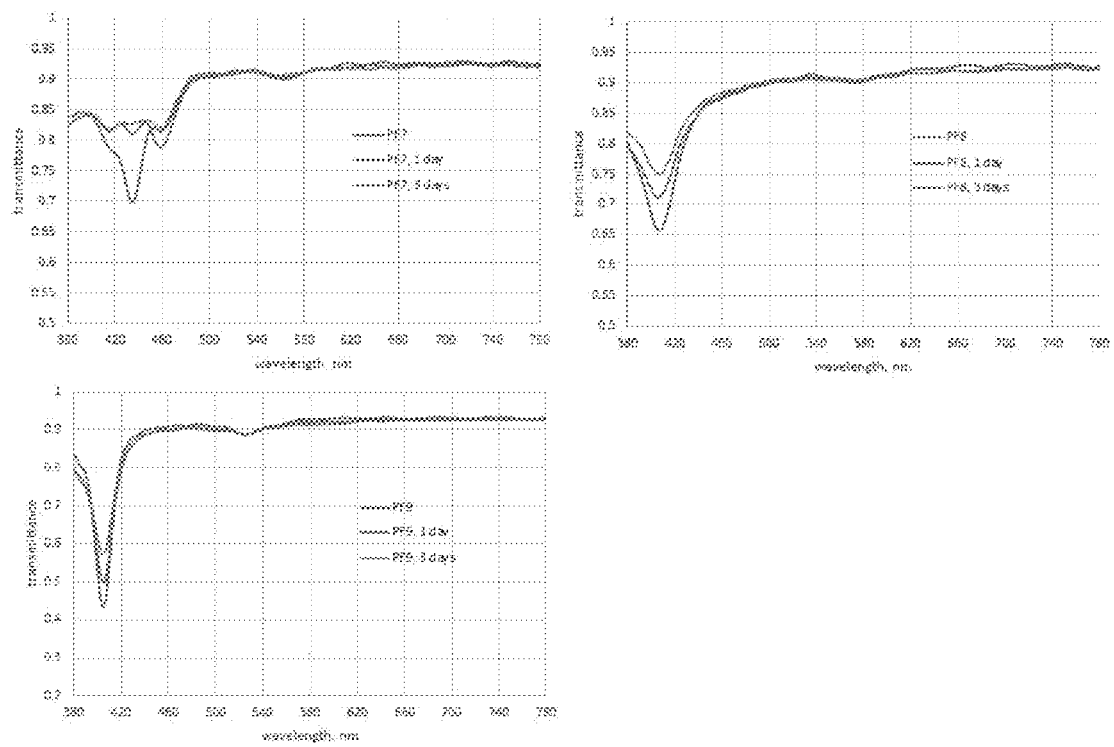

FIG. 21C shows transmission spectra of more PF-dye series before and during outdoor weathering test. Samples of blue-blocking coatings comprising the dyes individually were exposed outdoors for 24 hrs/day for 1 and 3 days. The outdoor test continued for the most stable dyes. This set of dyes was selected in order to determine the most stable core metal inside porphyrin ring, while the pendants in all cases were penta-fluoro-phenyl.

FIG. 21D shows transmission spectra of more F-series and PF-dye series before and during outdoor weathering test. Samples of blue-blocking coatings comprising the dyes individually were exposed outdoors for 24 hrs/day for 1 and 3 days. The outdoor test continued for the most stable dyes. This set of dyes was selected in order to determine the most stable core metal inside porphyrin ring, while the pendants in all cases were penta-fluoro-phenyl.

Figure 22A:
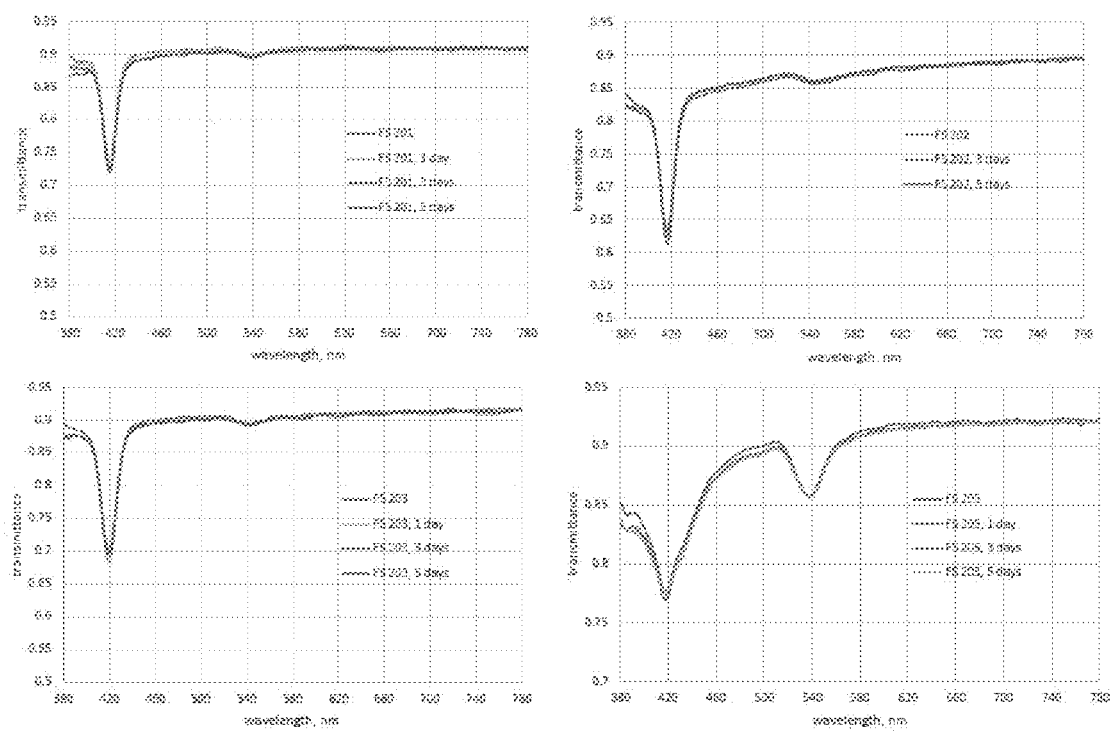

FIG. 22A shows transmission spectra of FS-dye series before and during outdoor weathering test. Samples of blue-blocking coatings comprising the dyes individually were exposed outdoors for 24 hrs/day for 1, 3 and 5 days. The outdoor test continued for the most stable dyes. These sets of dyes were selected for testing in this category in order to determine the most stable pendent attached to a porphyrin with copper (Cu) as a core metal.

Figure 22B:
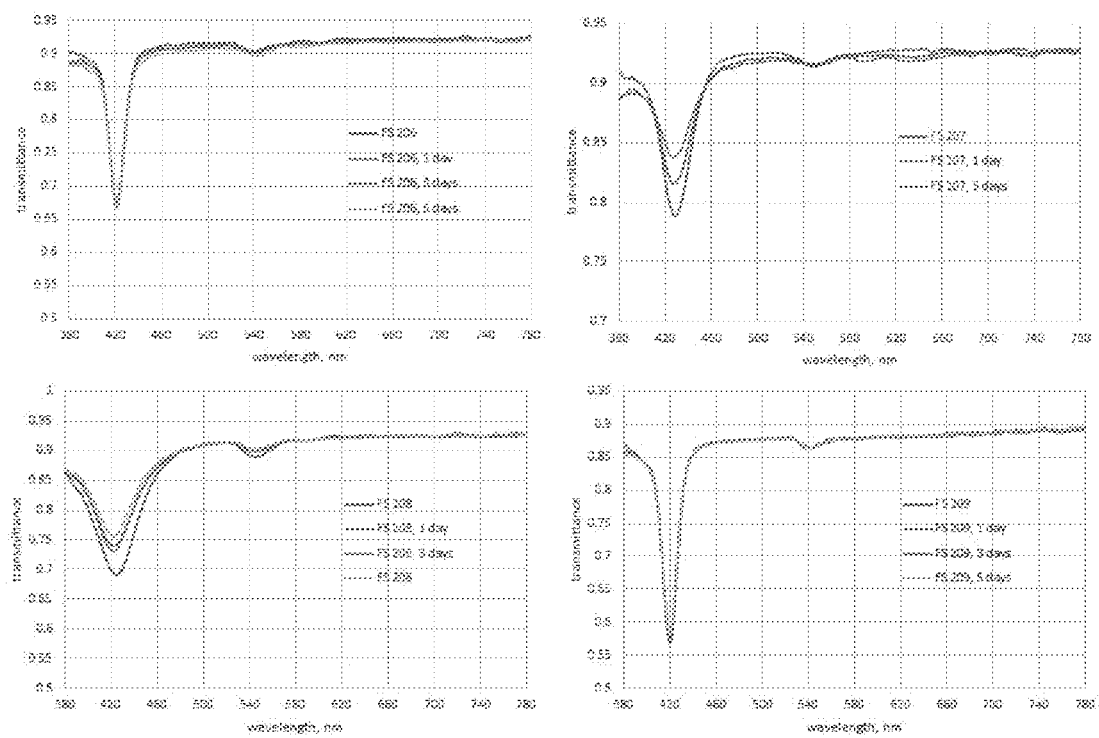

FIG. 22B shows transmission spectra of more FS-dye series before and during outdoor weathering test. Samples of blue-blocking coatings comprising the dyes individually were exposed outdoors for 24 hrs/day for 1, 3 and 5 days. The outdoor test continued for the most stable dyes. These sets of dyes were selected for testing in this category in order to determine the most stable pendent attached to a porphyrin with copper (Cu) as a core metal.

Figure 22C:
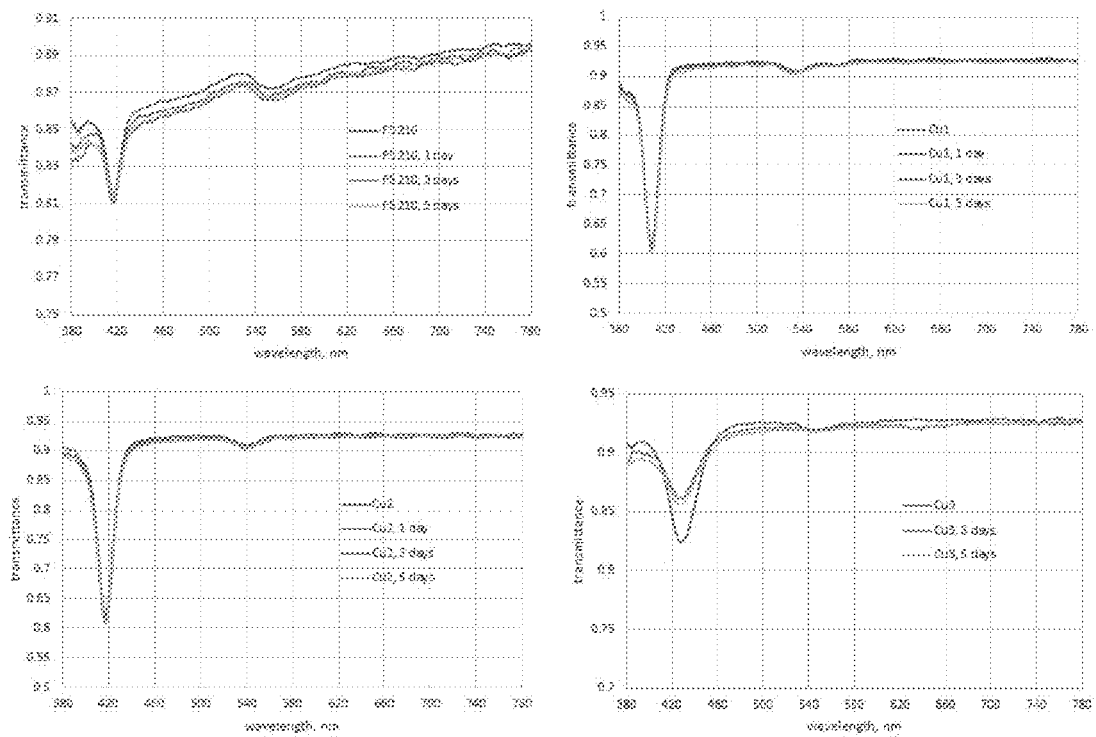

FIG. 22C shows transmission spectra of more FS-dye series and Cu-dye series before and during outdoor weathering test. Samples of blue-blocking coatings comprising the dyes individually were exposed outdoors for 24 hrs/day for 1, 3 and 5 days. The outdoor test continued for the most stable dyes. These sets of dyes were selected for testing in this category in order to determine the most stable pendent attached to a porphyrin with copper (Cu) as a core metal.

Figure 22D:
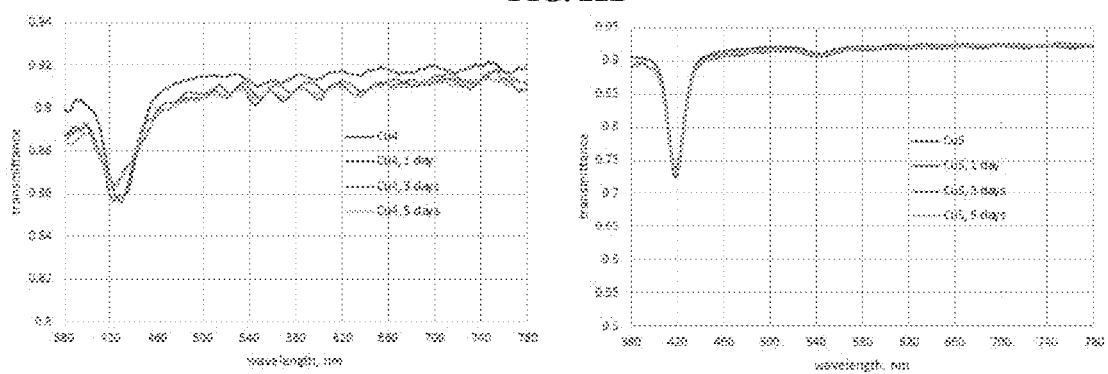

FIG. 22D shows transmission spectra of more Cu-dye series before and during outdoor weathering test. Samples of blue-blocking coatings comprising the dyes individually were exposed outdoors for 24 hrs/day for 1, 3 and 5 days. The outdoor test continued for the most stable dyes. These sets of dyes were selected for testing in this category in order to determine the most stable pendent attached to a porphyrin with copper (Cu) as a core metal.

Figure 22E:
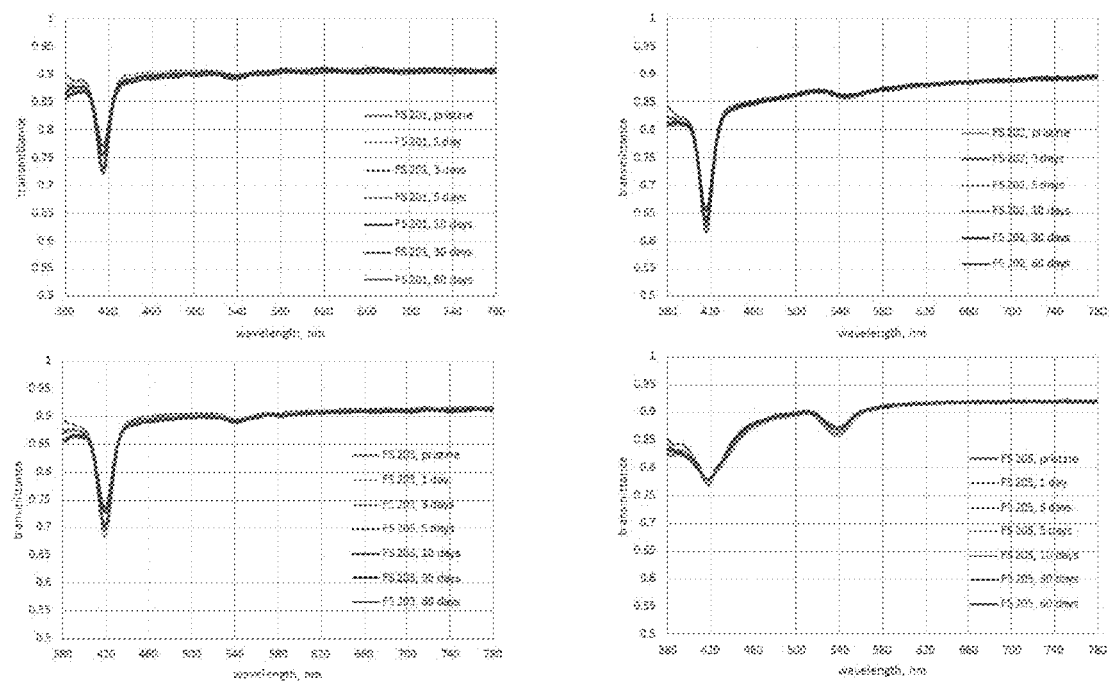

FIG. 22E shows transmission spectra of the most stable FS-dye series before and during outdoor weathering test performed for 60 days. These sets of dyes were selected for testing in this category in order to determine the most stable pendant attached to a porphyrin with copper (Cu) as a core metal.

FIG. 22F shows more transmission spectra of the most stable FS-dye series before and during outdoor weathering test performed for 60 days. These sets of dyes were selected for testing in this category in order to determine the most stable pendant attached to a porphyrin with copper (Cu) as a core metal.

FIG. 22G shows transmission spectra of the most stable Cu-dye series before and during outdoor weathering test performed for 60 days. These sets of dyes were selected for testing in this category in order to determine the most stable pendant attached to a porphyrin with copper (Cu) as a core metal.

Figure 23:
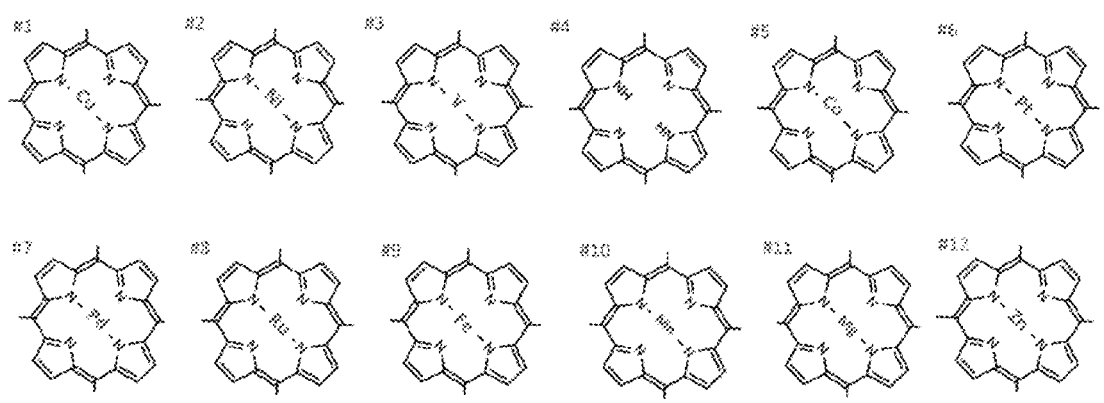

FIG. 23 shows the order of core metals of porphyrins with phenyl pendants according to their photo-stability. The photo-stability decreases going from dye #1 towards a higher #. The dye photo-stability ordering was done according to the results from Laboratory UV-visible light exposure test and the outdoor weathering test for the TPP-dye series. A similar trend was observed when PF-dye series was tested.

Figure 24:
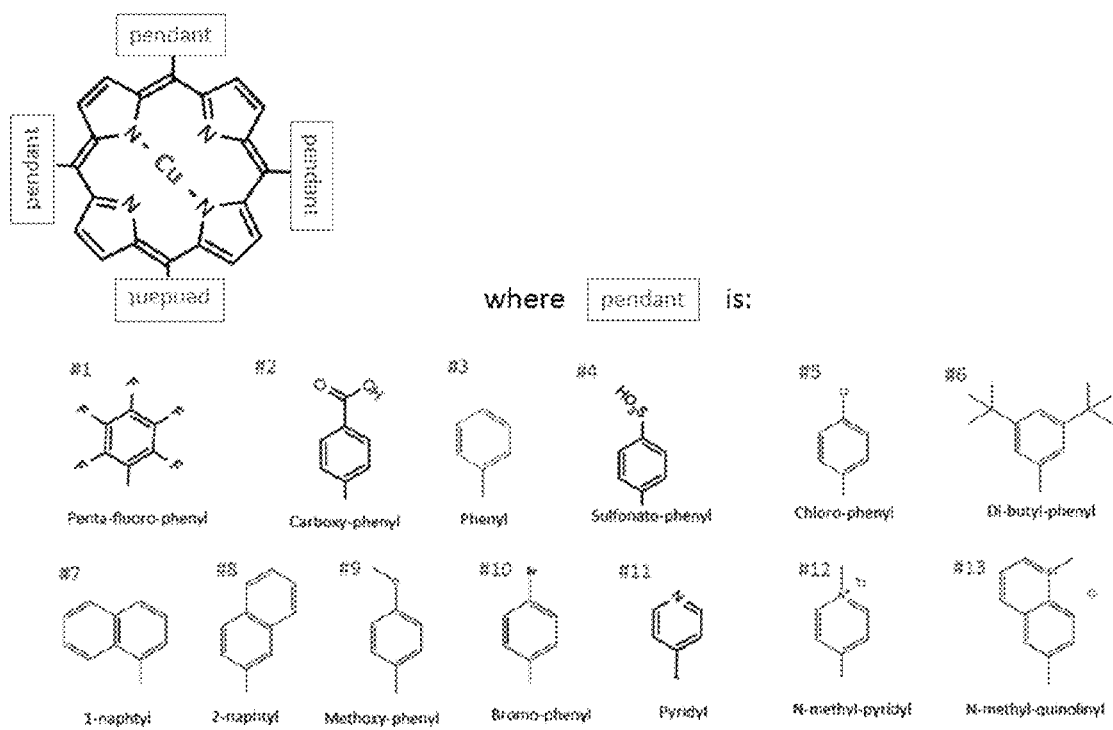

FIG. 24 shows the order of pendants according to their photo-stability as assessed in porphyrin dyes with copper (Cu) as a core metal. The photo-stability decreases going from pendant #1 towards a higher pendant #. The pendant photo-stability ordering was done according to the results from Laboratory UV-visible light exposure test and the outdoor weathering test for FS-dye and Cu-dye series.

Figure 25:
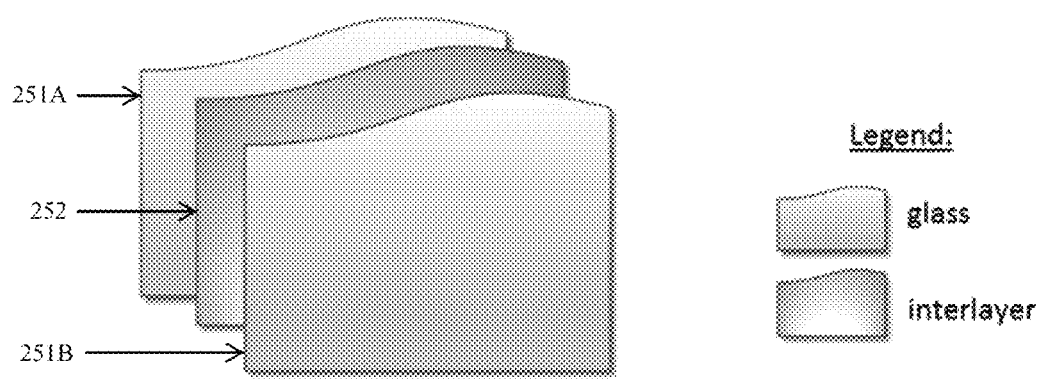

FIG. 25 shows a schematic of laminated glass consisting of two glass substrates and a polymer interlayer.

Figure 26:
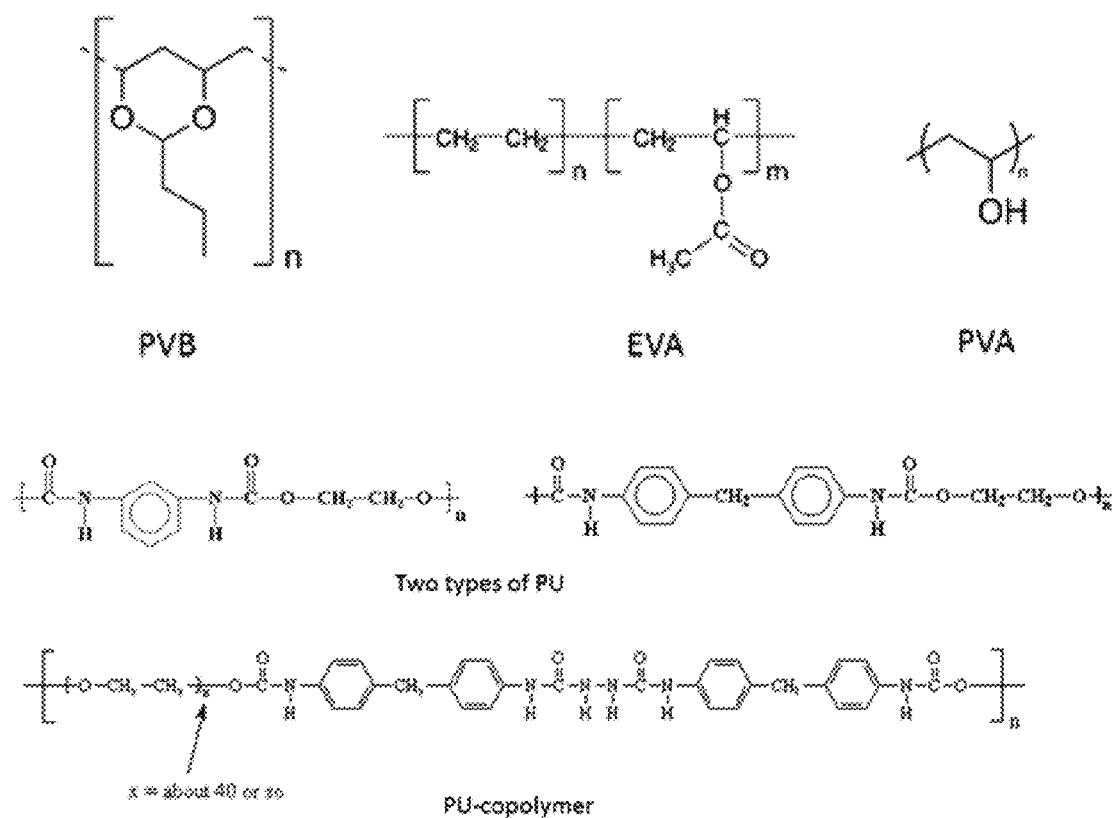

FIG. 26 shows structures of polymer interlayers that can be used in laminated glass applications.

Figure 27A:
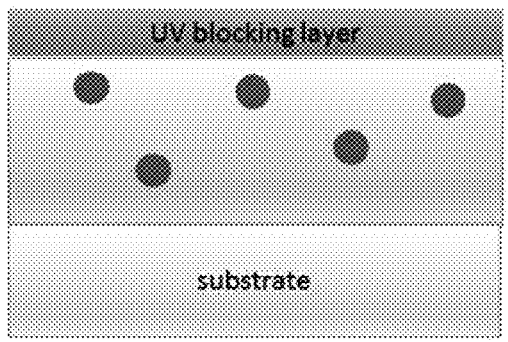

FIG. 27A shows a schematic presentation of selective blue-blocking coatings additionally protected with UV blockers/stabilizers where the UV blocking layer is added on top of blue-blocking coating.

Figure 27B:
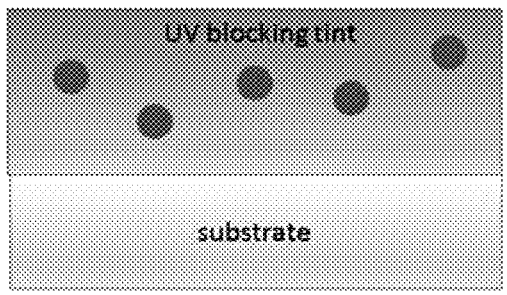

FIG. 27B shows another schematic presentation of selective blue-blocking coatings additionally protected with UV blockers/stabilizers where the a blue-blocking coating is exposed to tinting in UV blocking bath and the UV blocker diffuses into the coating.

Figure 27C:
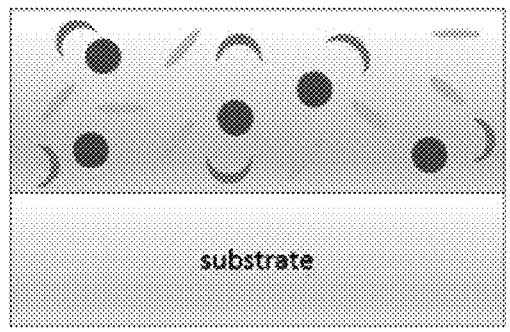

FIG. 27C shows another schematic presentation of selective blue-blocking coatings additionally protected with UV blockers/stabilizers where the UV blocker and/or UV stabilizer is added in the blue-blocking coating.

Figure 27D:
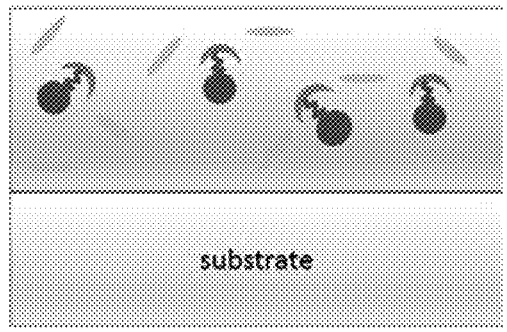

FIG. 27D shows schematic presentation of selective blue-blocking coatings additionally protected with UV blockers/stabilizers where the UV blocker is chemically attached to the dye molecule in the blue-blocking coating.

FIG. 28A shows examples of reactive groups that can be attached on existing porphyrin pendants or directly on porphyrin ring.

FIG. 28B shows an example of possible different reactive groups that may be attached on a specific Cu-porphyrin compound, either on the porphyrin pendant or on the porphyrin ring.

FIG. 28C shows another example of possible different reactive groups that may be attached on a specific Cu-porphyrin compound, either on the porphyrin pendant or on the porphyrin ring.

FIG. 28D shows another example of possible different reactive groups that may be attached on a specific Cu-porphyrin compound, either on the porphyrin pendant or on the porphyrin ring.

Figure 29A:
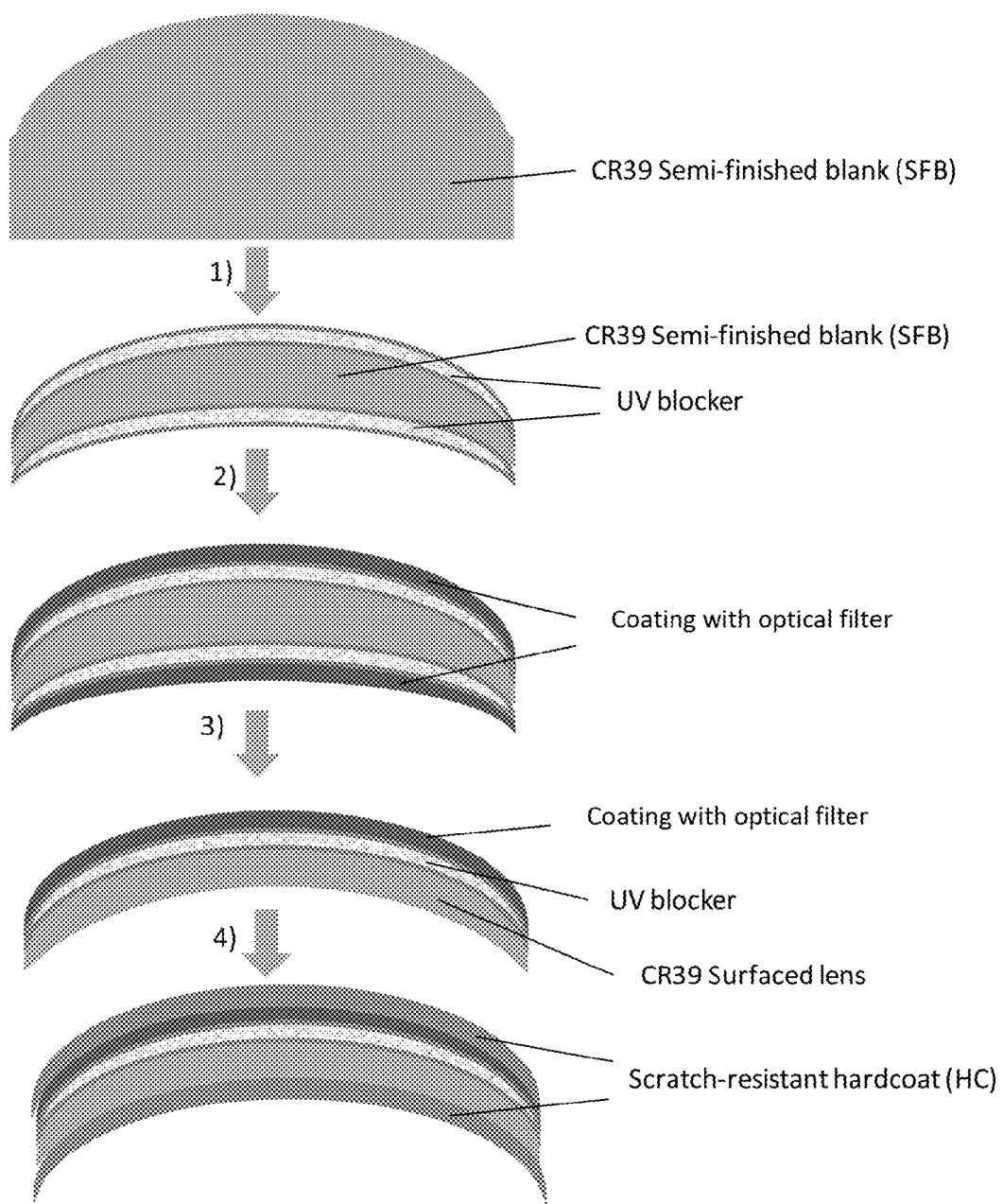

FIG. 29A shows one embodiment of fabrication steps for CR39 lenses.

Figure 29B:
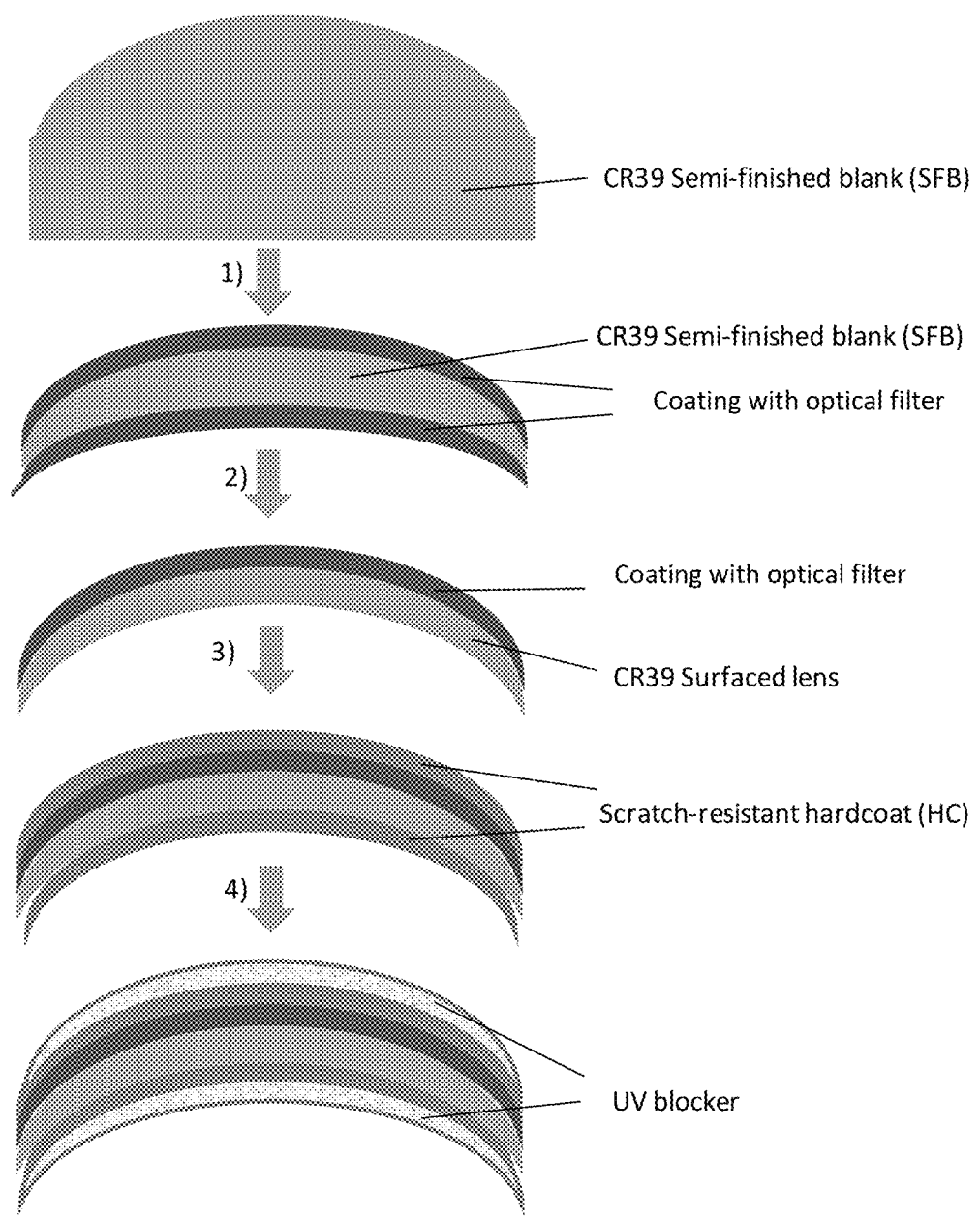

FIG. 29B shows another embodiment of fabricating CR39 lenses.

Figure 29C:
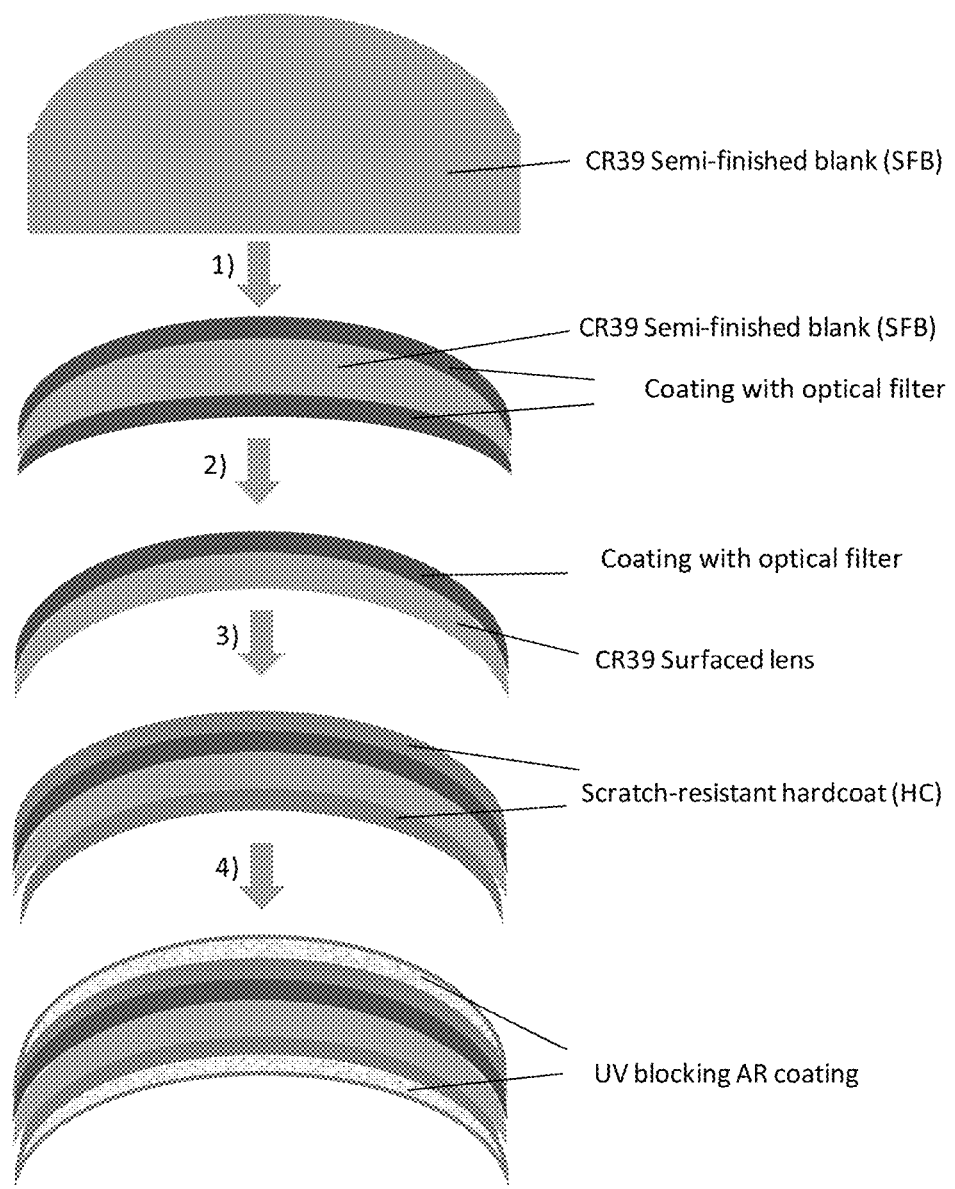

FIG. 29C shows yet another embodiment of fabricating CR39 lenses.

Figure 30:
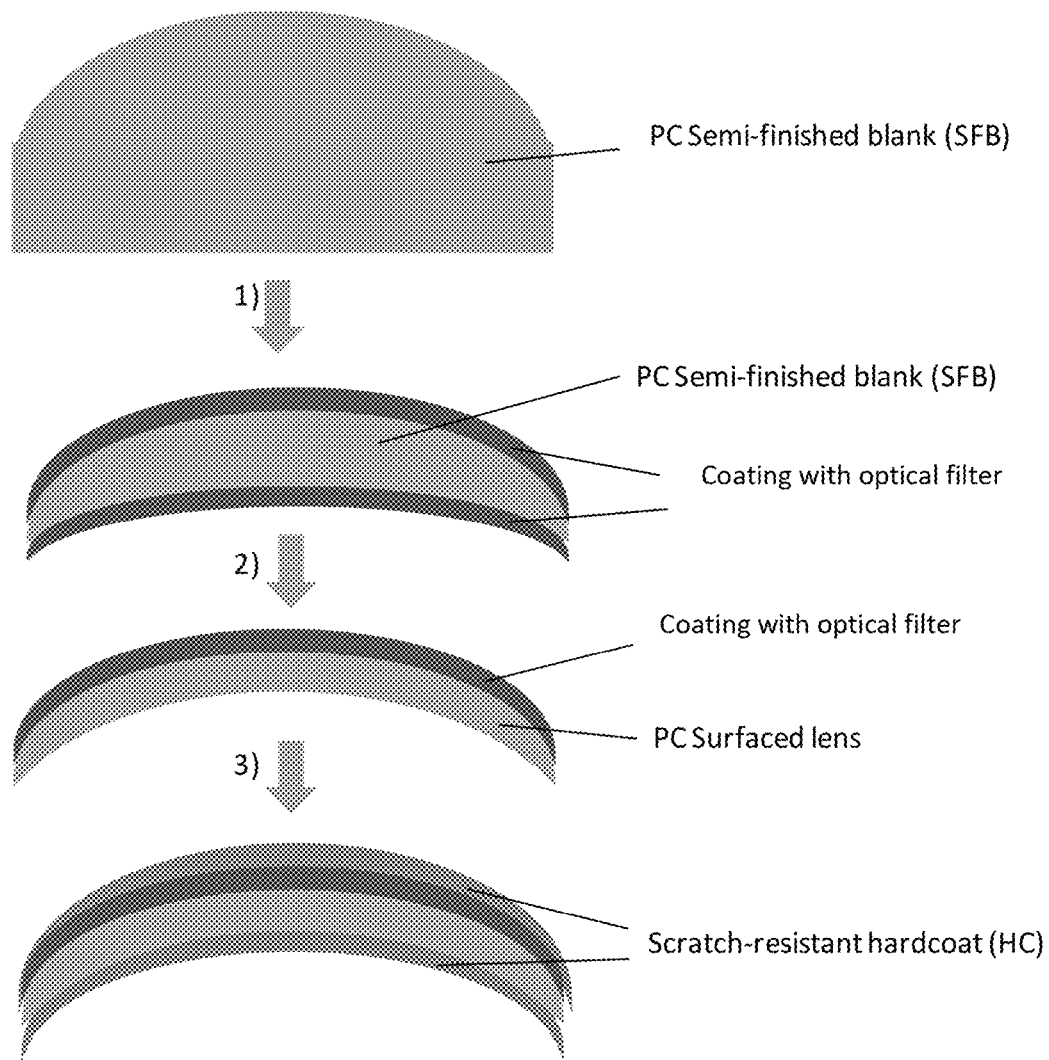

FIG. 30 shows one embodiment of fabrication steps for PC lenses.

Figure 31:
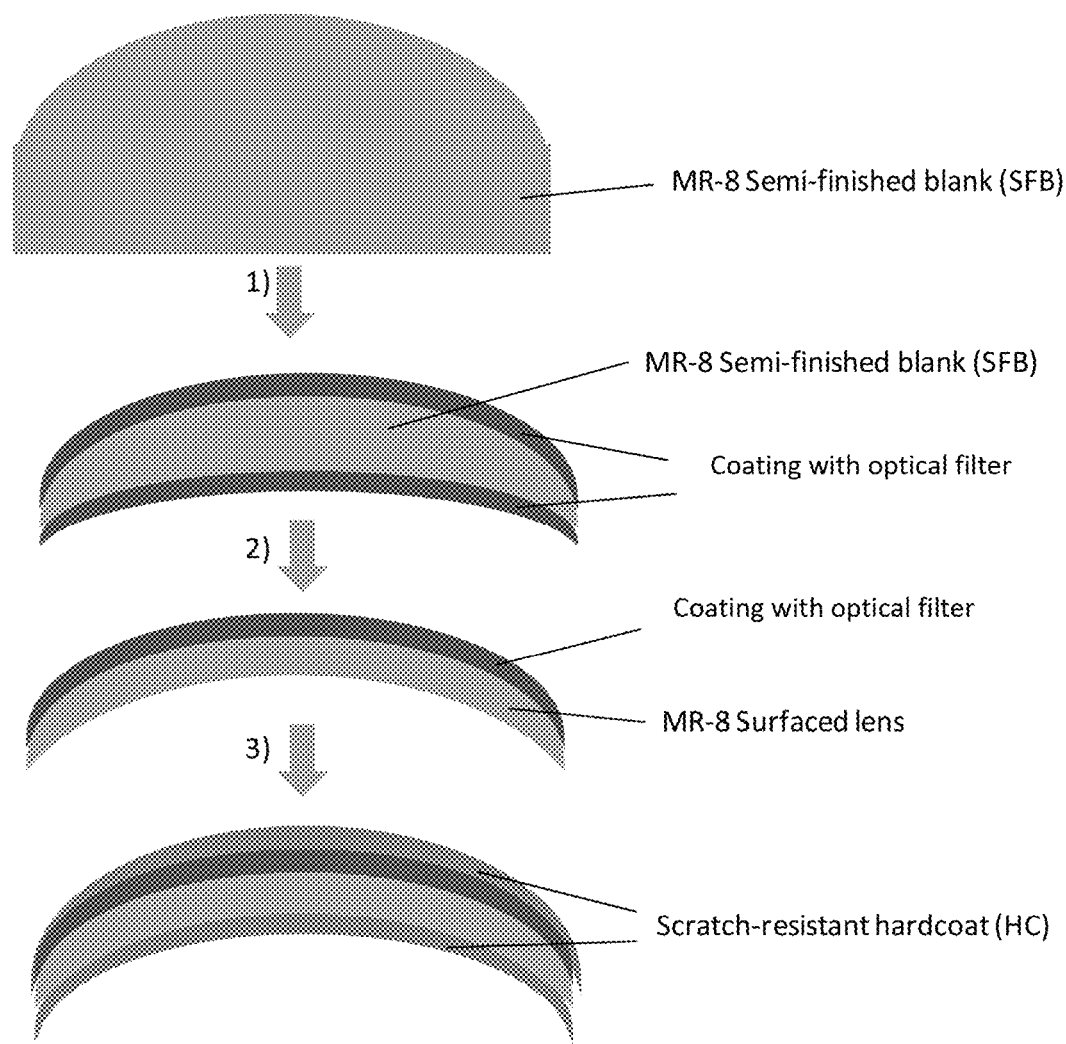

FIG. 31 shows one embodiment of fabrication steps for MR-8 lenses.

Figure 32A:
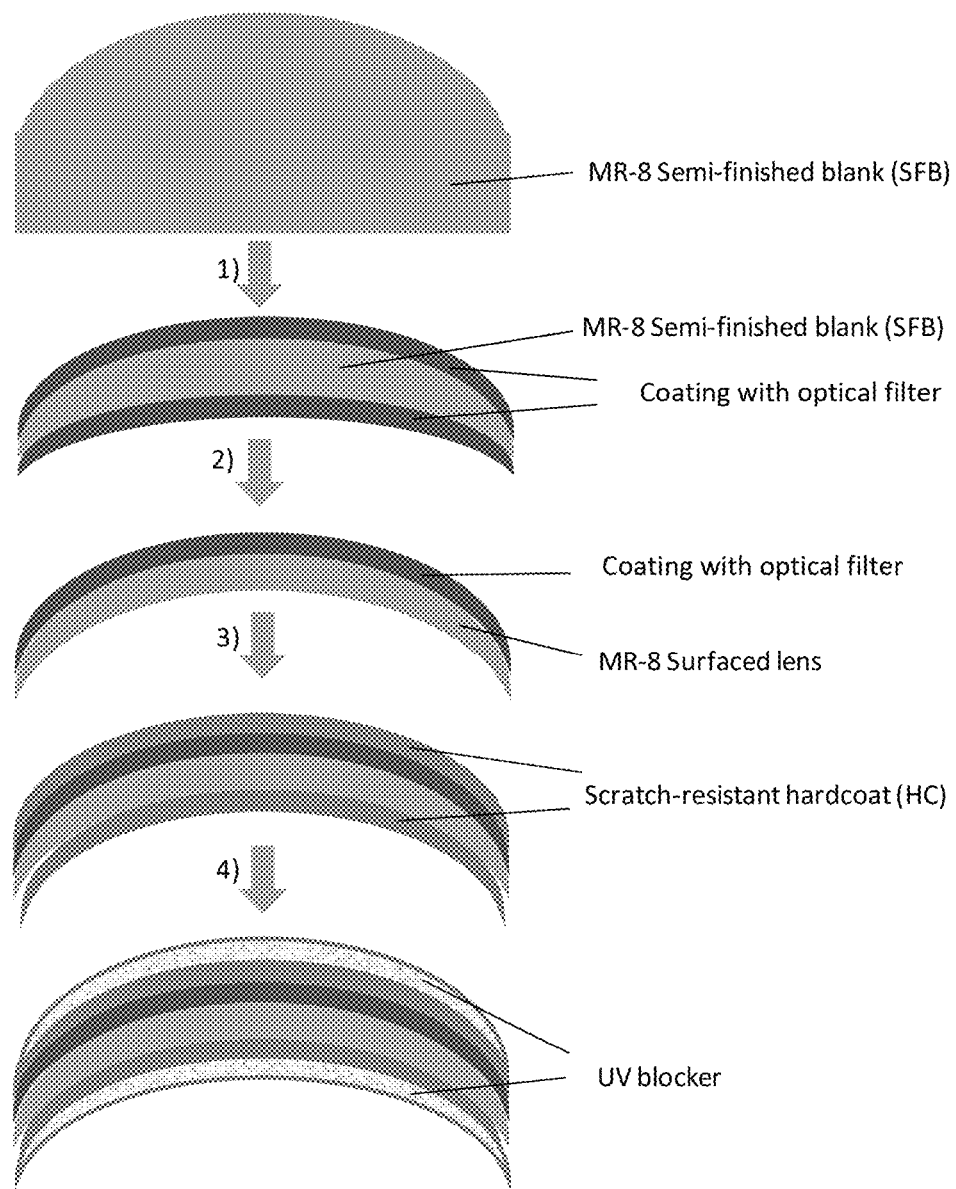

FIG. 32A shows one embodiment of fabricating MR-8 lenses.

Figure 32B:
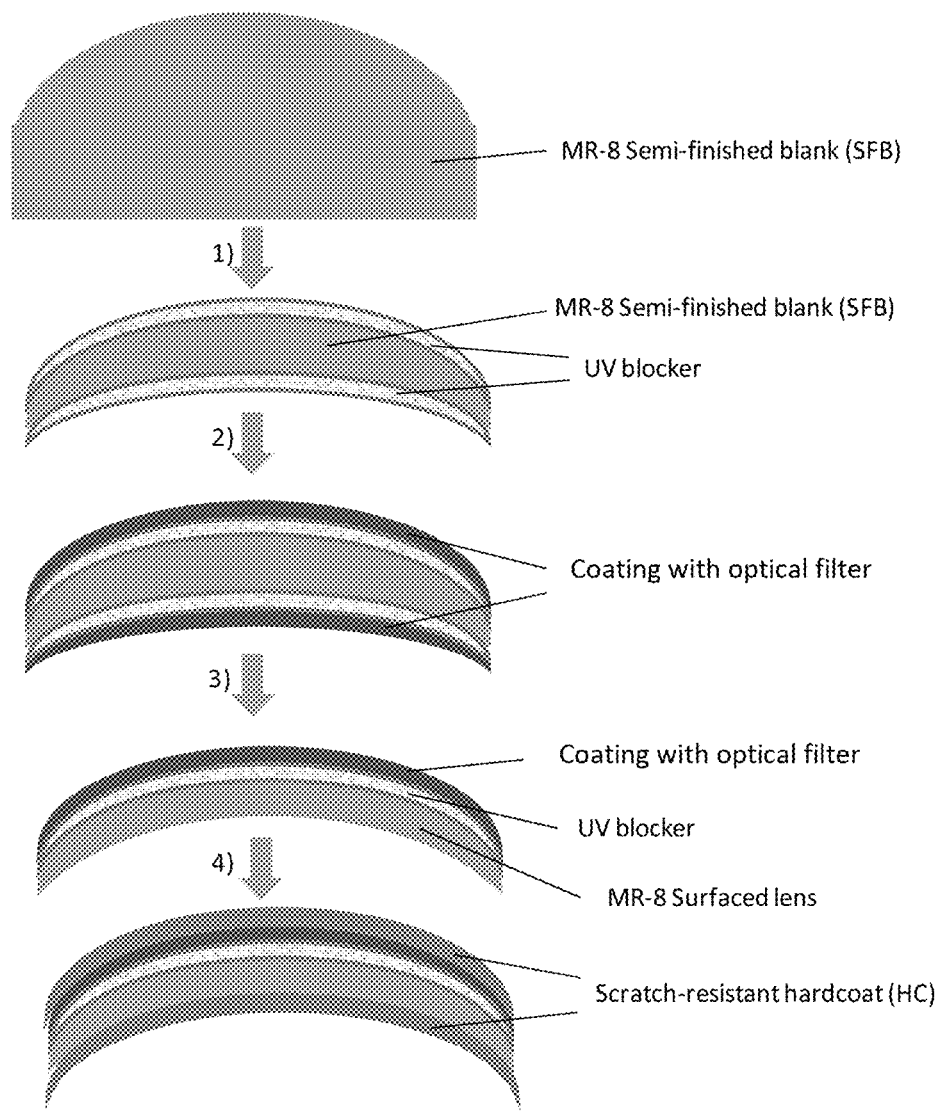

FIG. 32B shows another embodiment of fabricating MR-8 lenses.

Figure 32C:
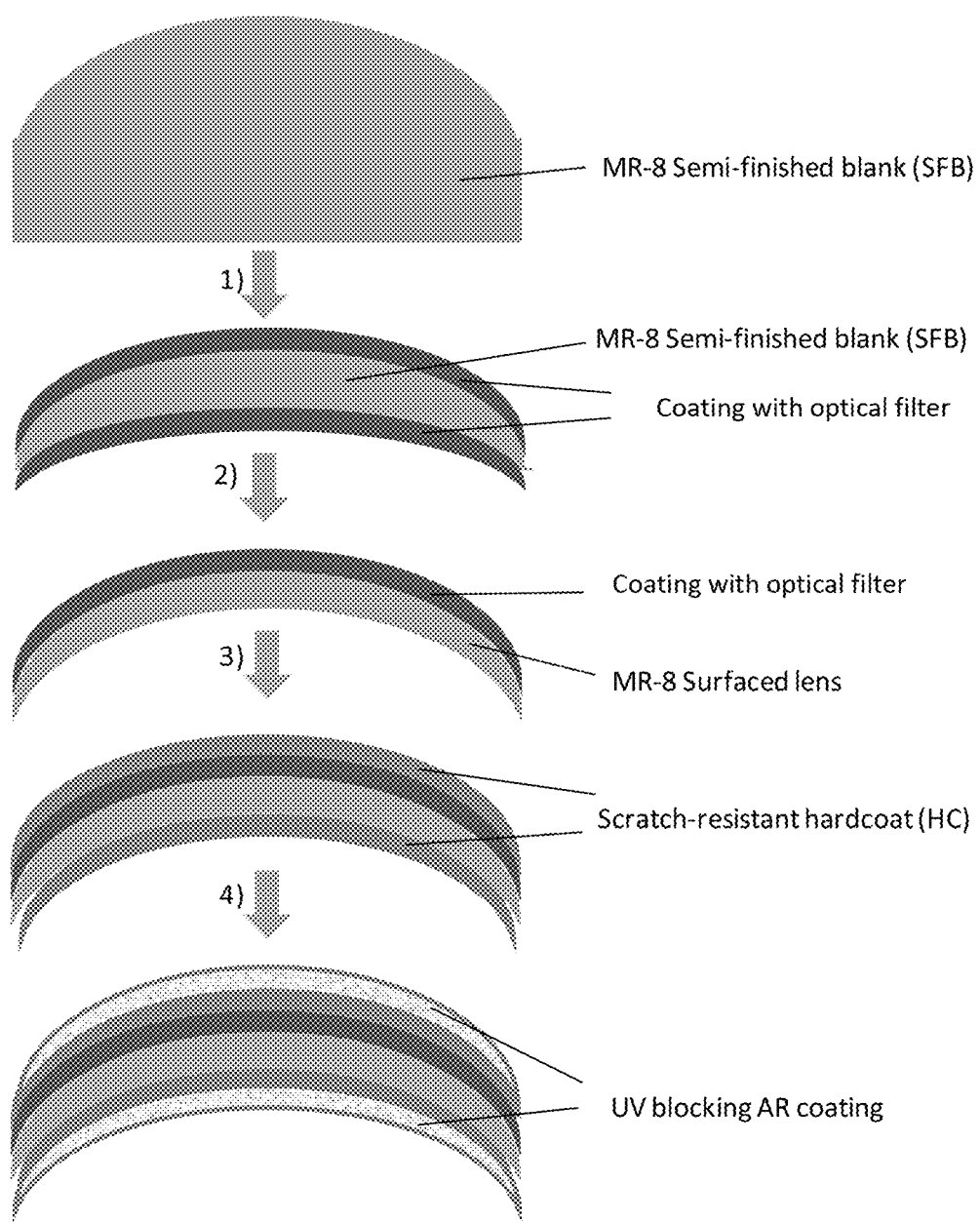

FIG. 32C shows yet another embodiment of fabricating MR-8 lenses.

Figure 33:
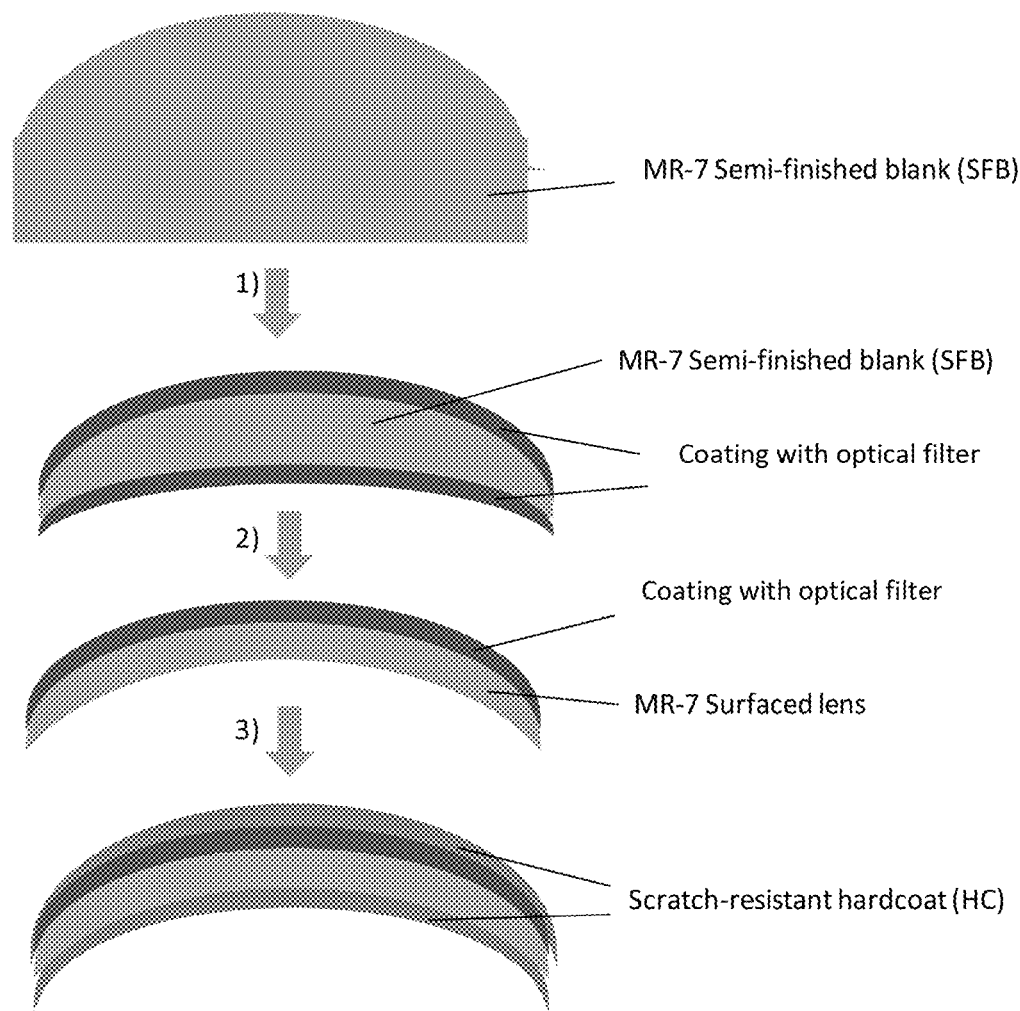

FIG. 33 shows fabrication steps for MR-7 lenses

Figure 34:
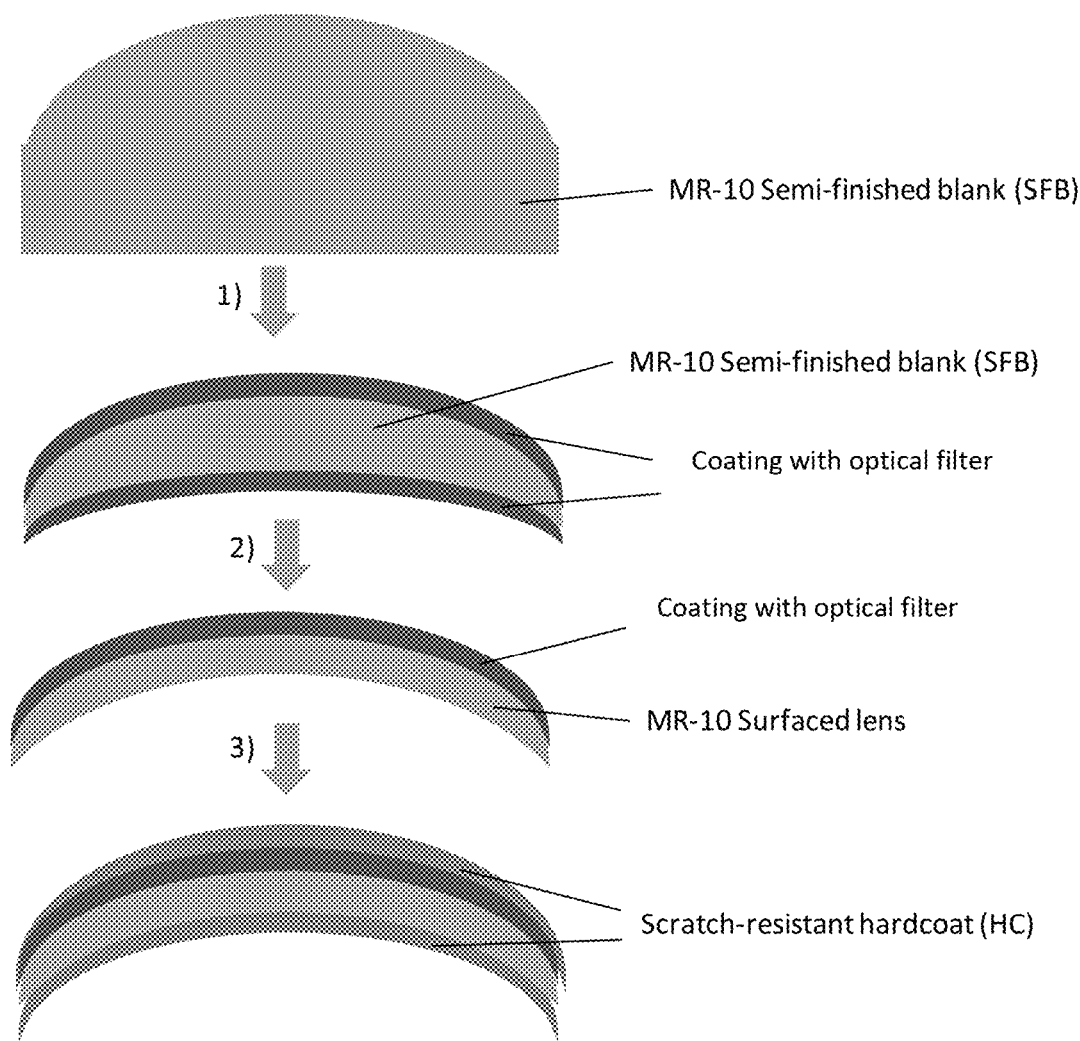

FIG. 34 shows fabrication steps for MR-10 lenses

Figure 35:
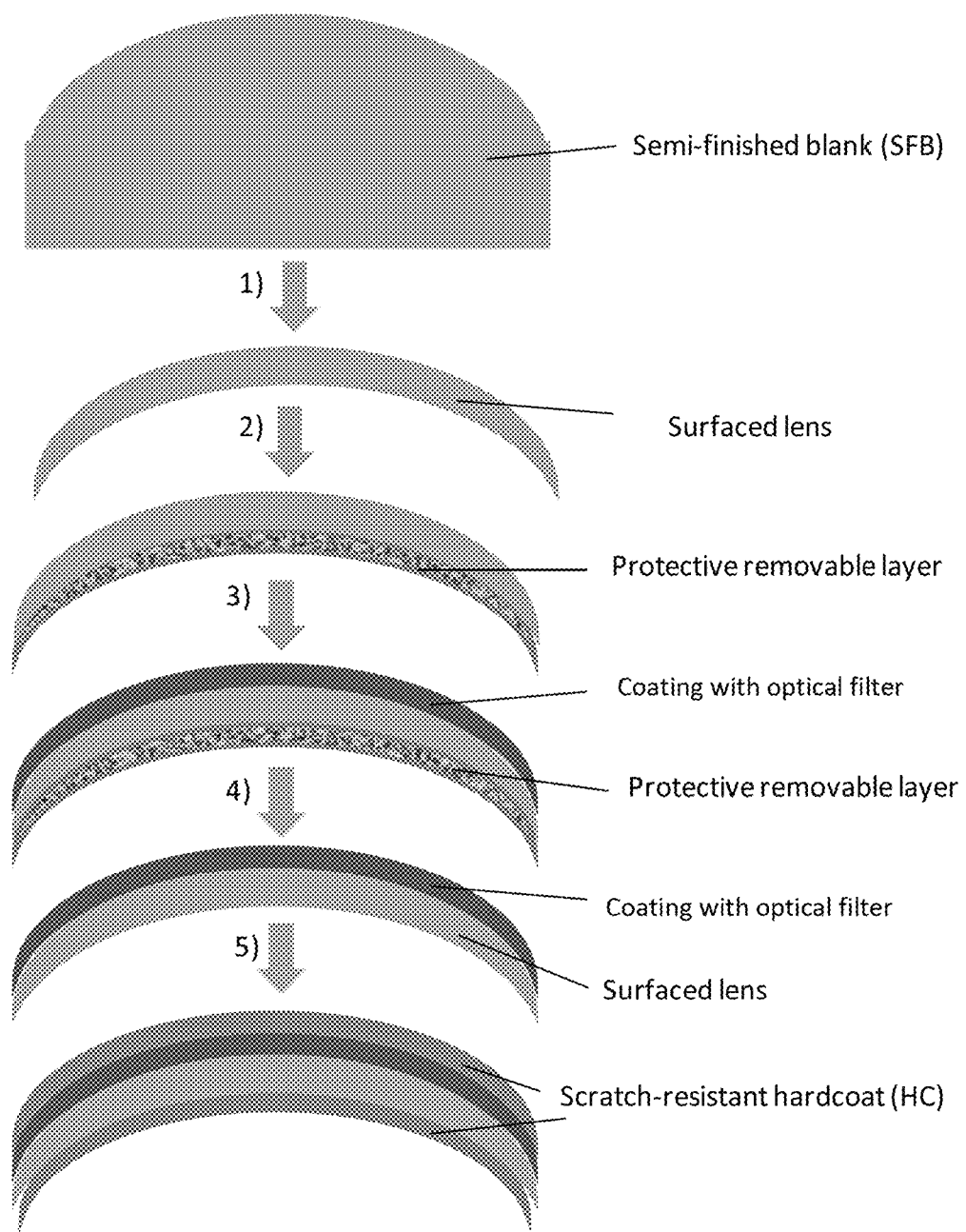

FIG. 35 shows an embodiment where a protective removable layer is used during fabrication of a lens.

Figure 36:
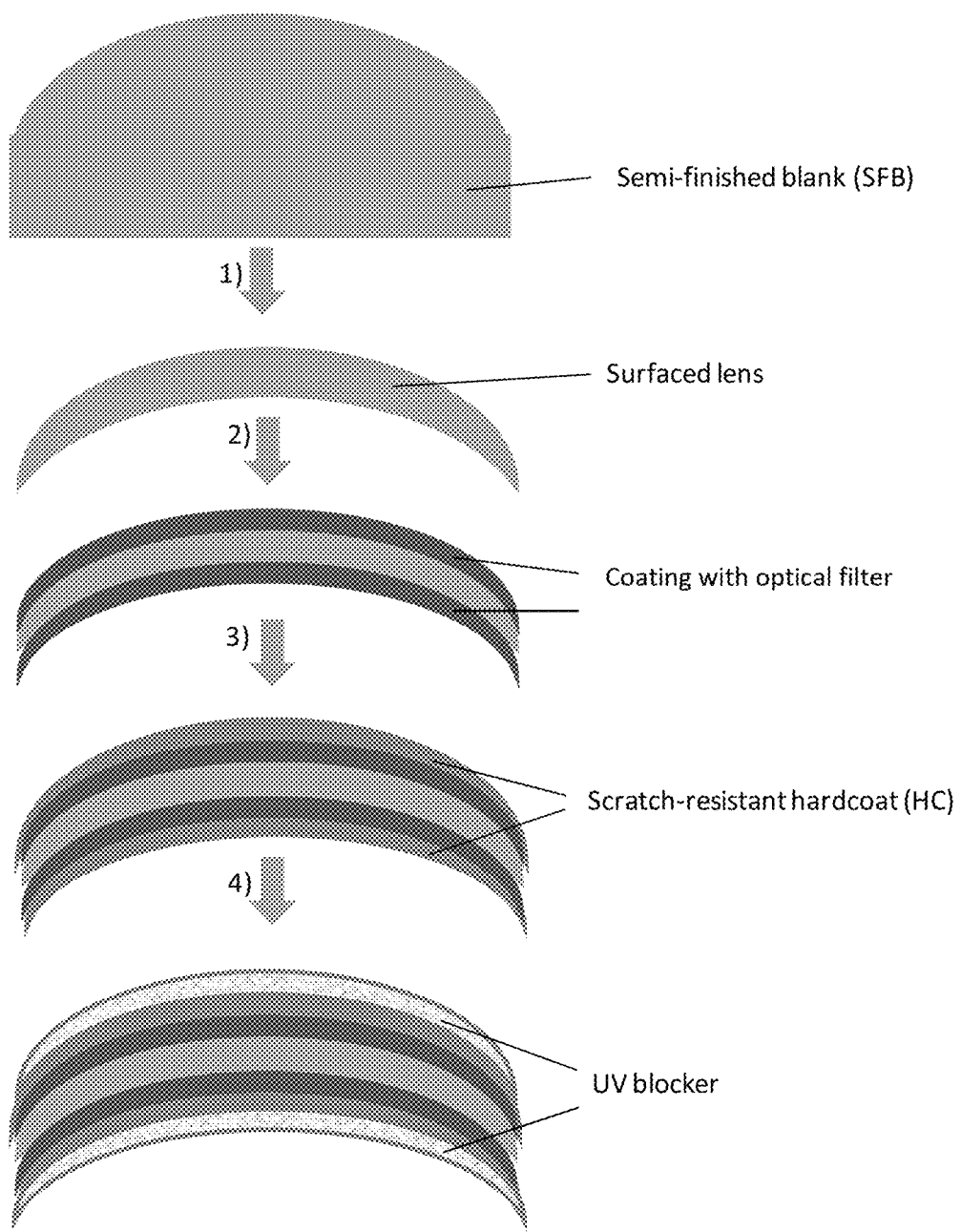

FIG. 36 shows an example of both surfaces coated with HPO primer on inherently non-UV-blocking lens substrates.

Figure 37:
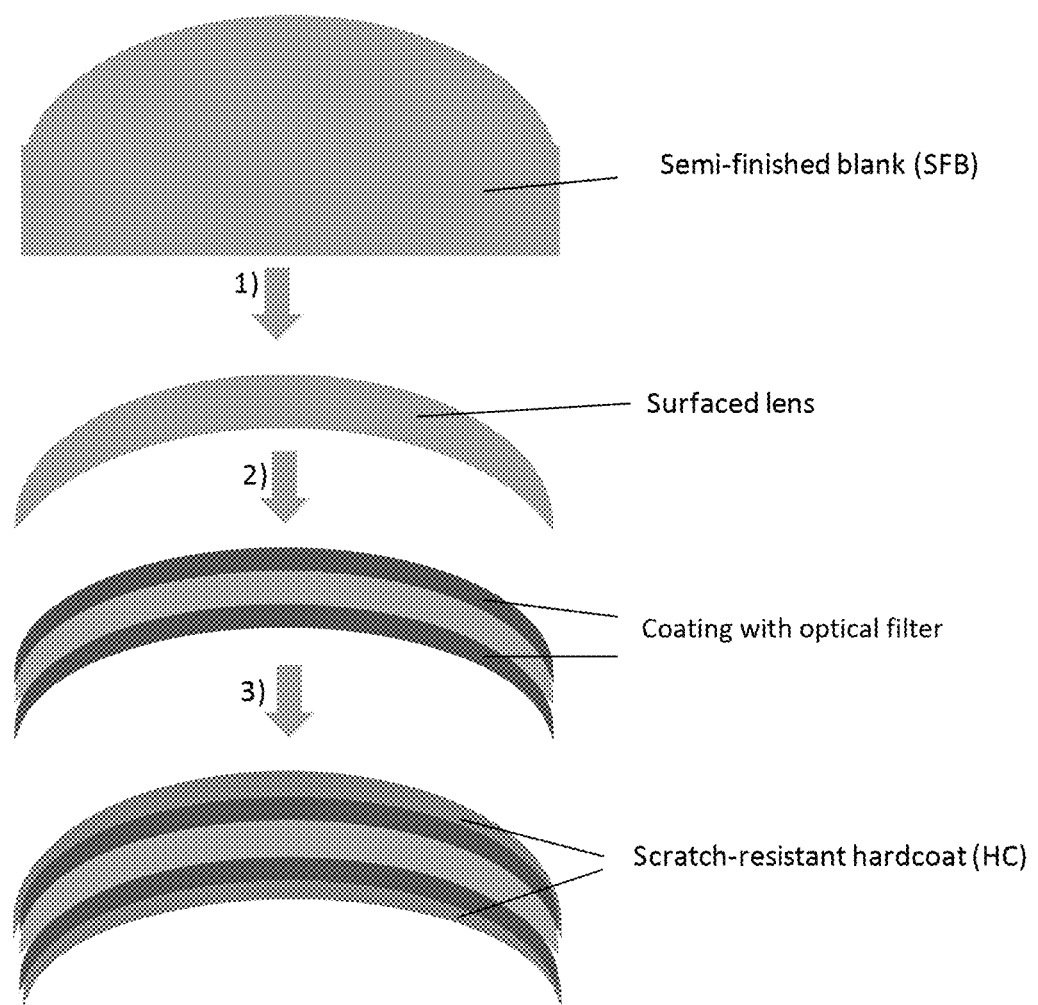
Figure 38:
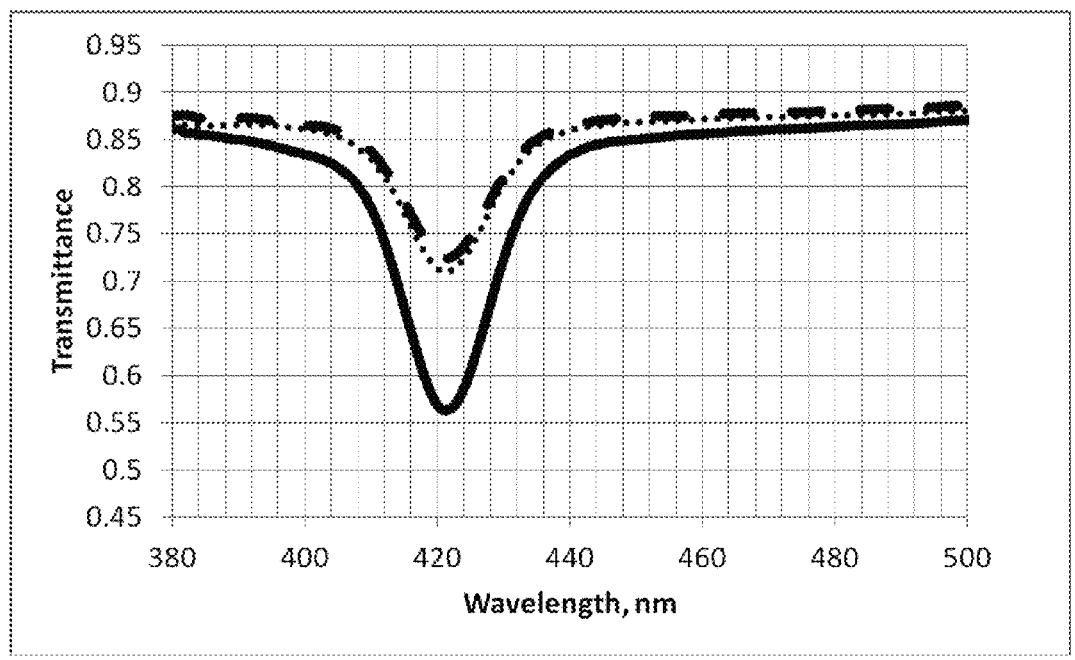

FIG. 37 shows an example of both surfaces coated with HPO primer on inherently UV-blocking lens substrates FIG. 38 shows transmission spectra of (a) glass substrate coated on both surfaces with HPO primer comprising FS-206-porphyrin dye (solid line), (b) glass substrate coated on both surfaces with the same primer as in (a) but the coating was stripped of from one surface (dotted line), and (c) glass substrate which one surface has been taped with protective tape before dip-coating with the same HPO primer as in (a) (broken line).

FIG. 39 shows a schematic of cross-sections of (a) Semi-finished blank (SFB), (b) thick finished lens blanks, and (c) surfaced finished lens blanks. Semi-finished blanks (a) and thick surfaced lens blanks (b) are capable of being surfaced into finished lens blanks (c).

Figure 40:
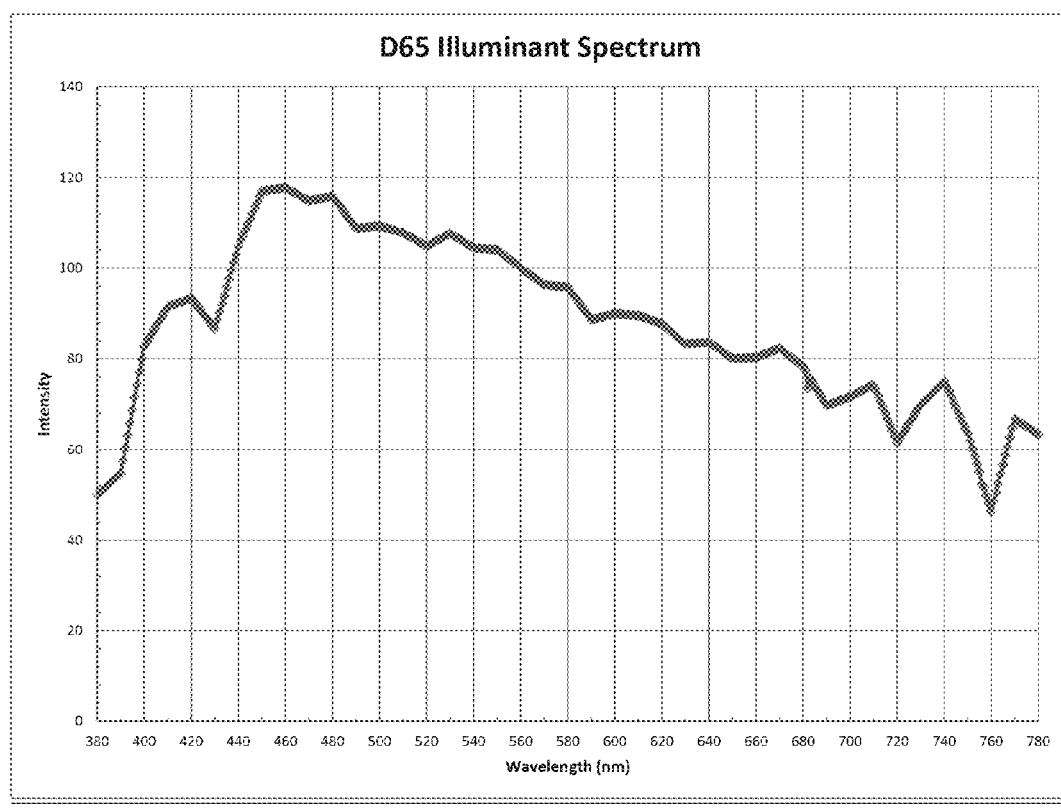

FIG. 40 shows the transmission spectrum of CIE Standard D65 Illuminant.

Figure 41:
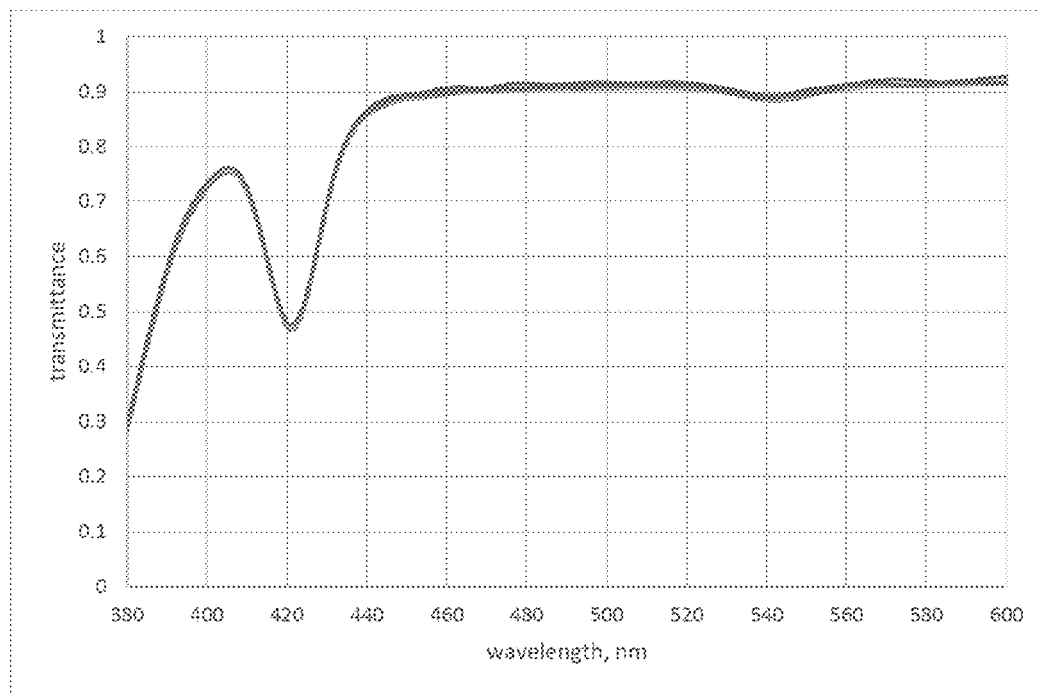

FIG. 41 Shows an exemplary transmission spectra of systems comprising an optical filter.

Figure 42:
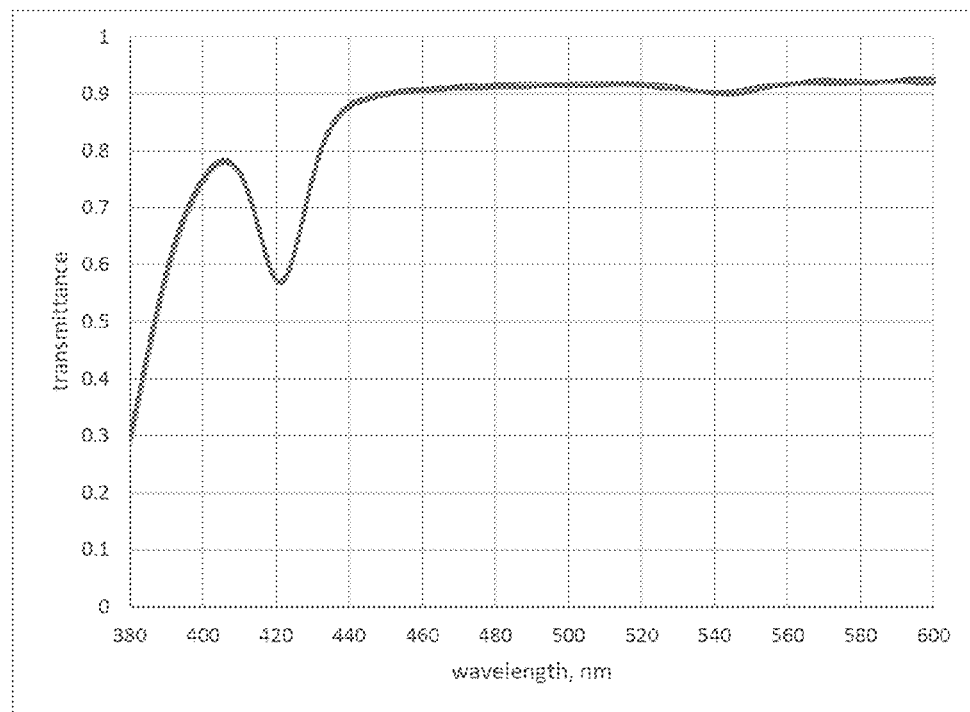

FIG. 42 shows additional exemplary transmission spectra of systems comprising an optical filter.

Figure 43:
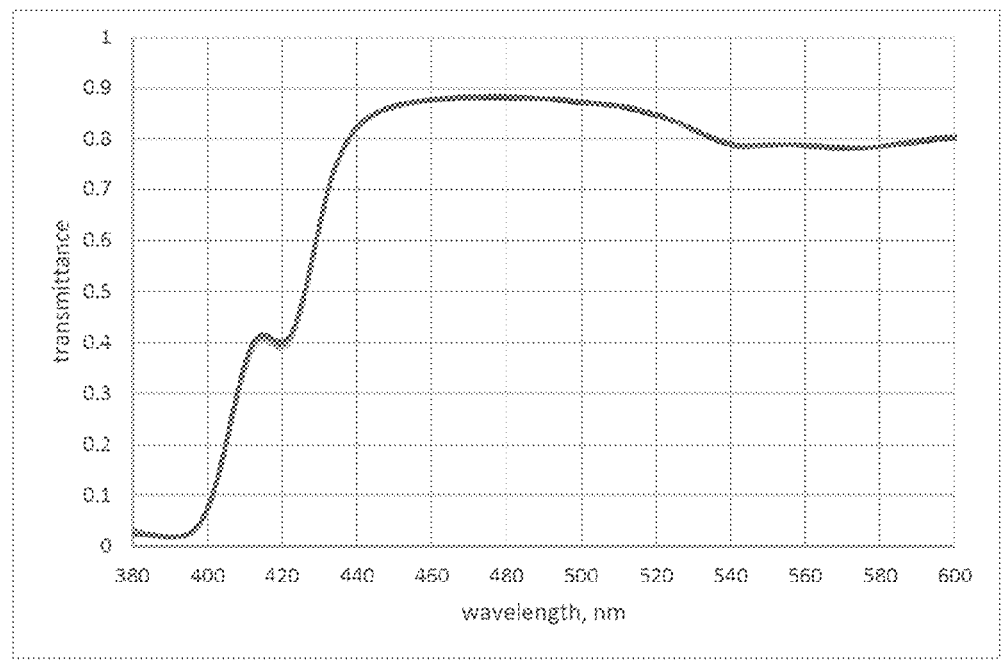

FIG. 43 shows additional exemplary transmission spectra of systems comprising an optical filter.

Figure 44:
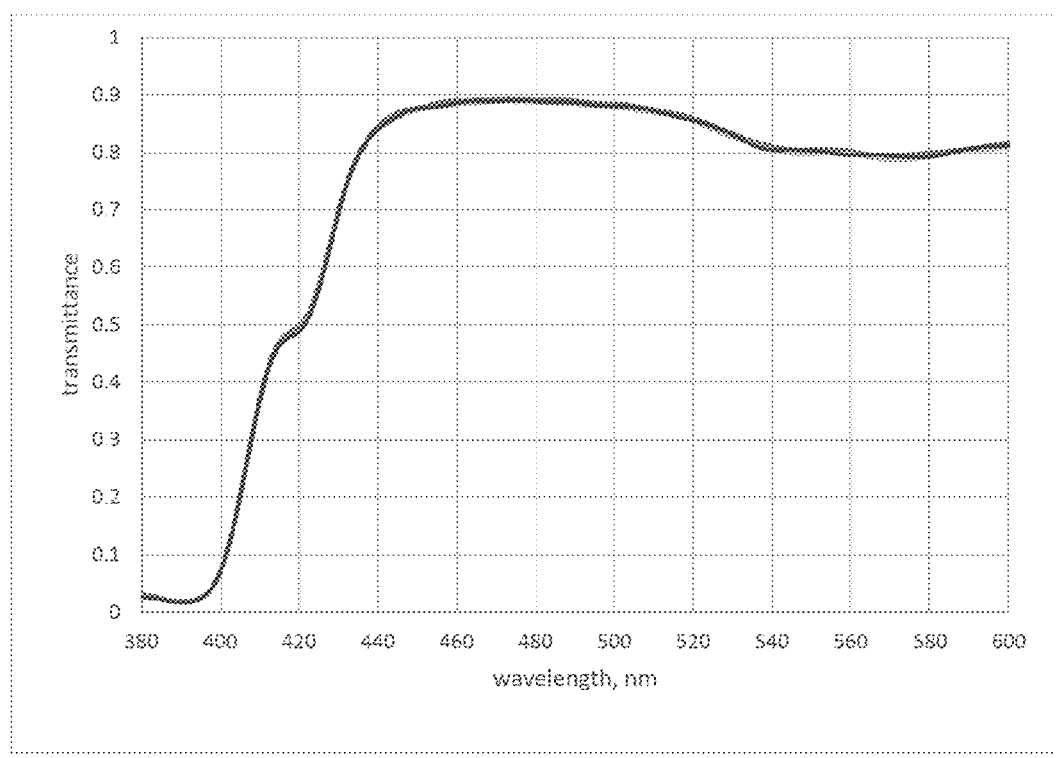
Figure 45:
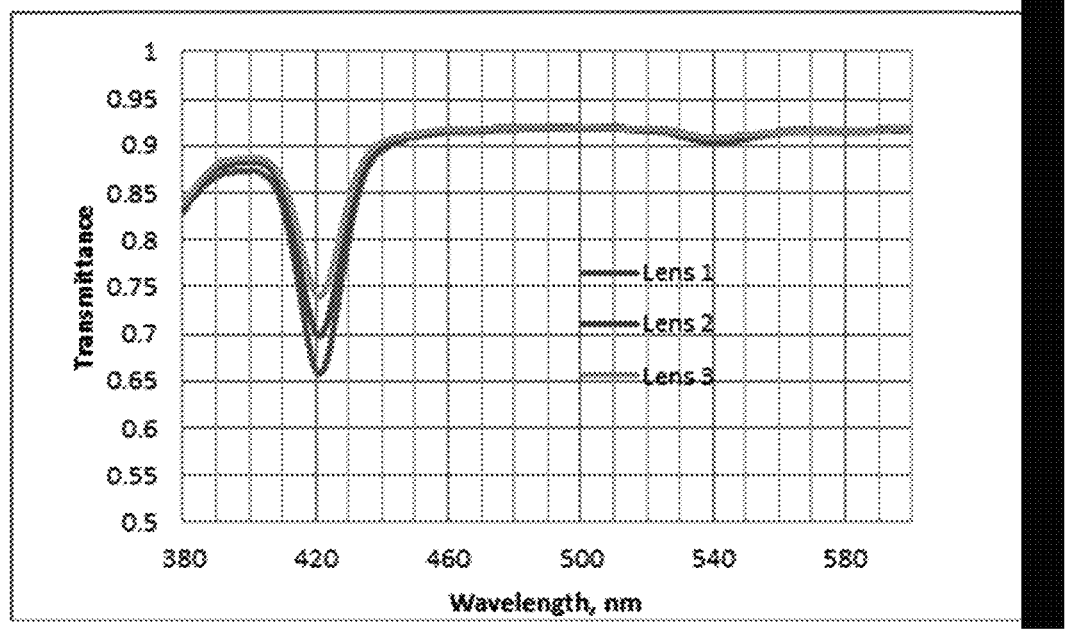

FIG. 44 shows additional exemplary transmission spectra of systems comprising an optical filter FIG. 45 shows additional exemplary transmission spectra of systems comprising an optical filter.

Figure 46:
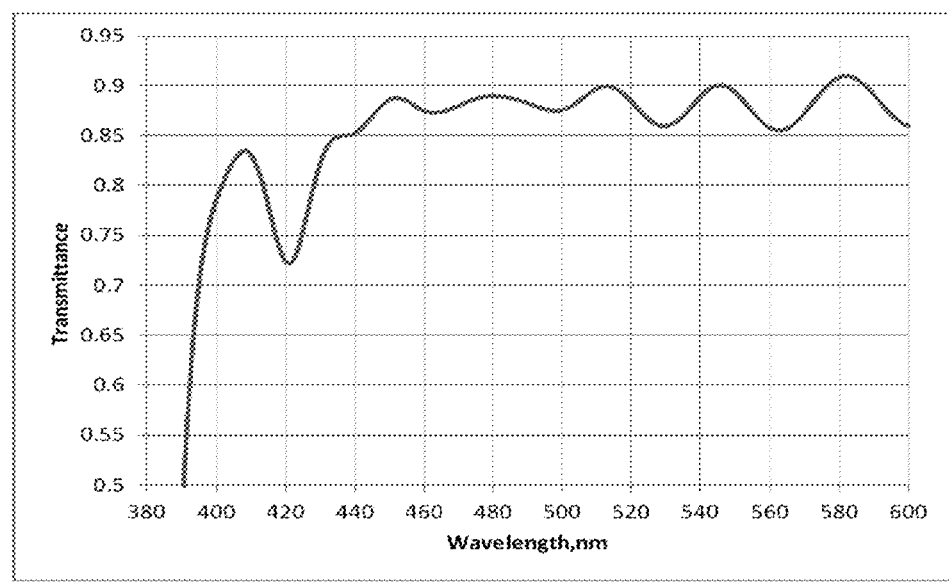

FIG. 46 shows additional exemplary transmission spectra of systems comprising an optical filter.

Figure 47:
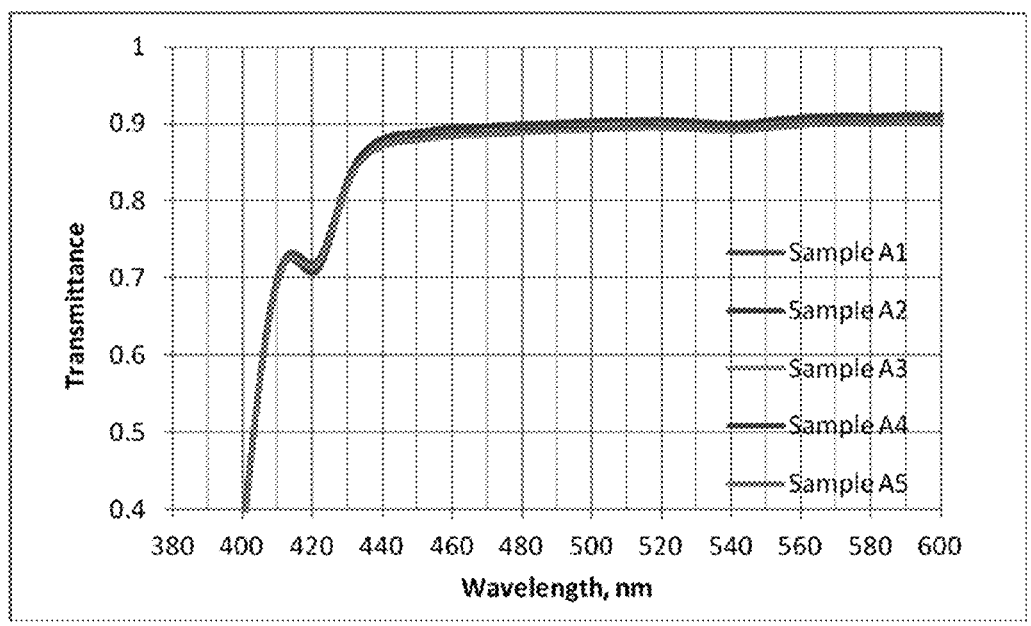

FIG. 47 shows additional exemplary transmission spectra of systems comprising an optical filter.

Figure 48:
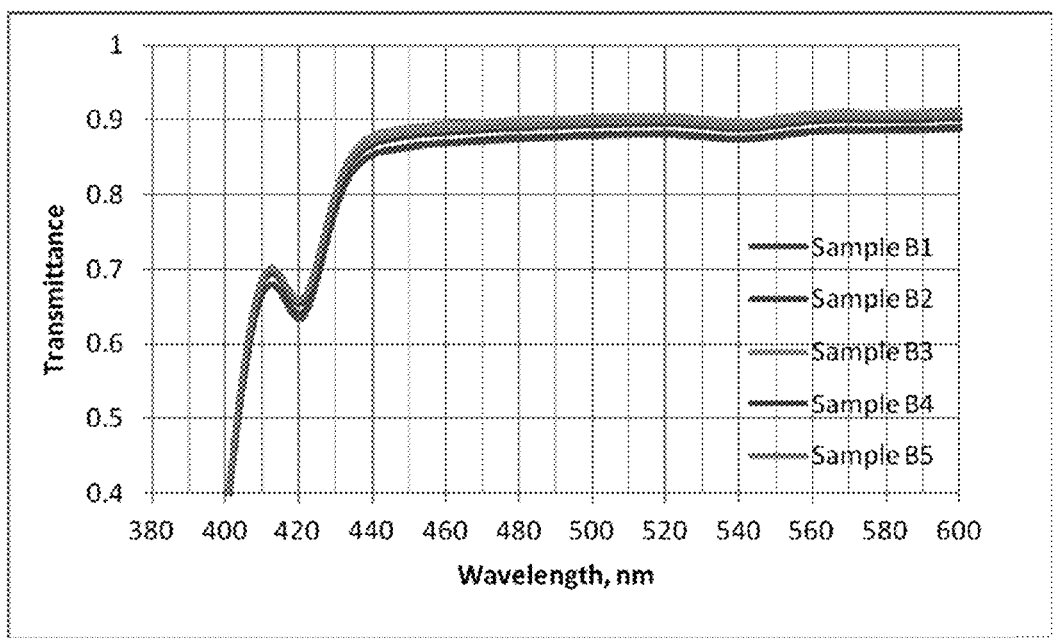

FIG. 48 shows additional exemplary transmission spectra of systems comprising an optical filter.

Figure 49:
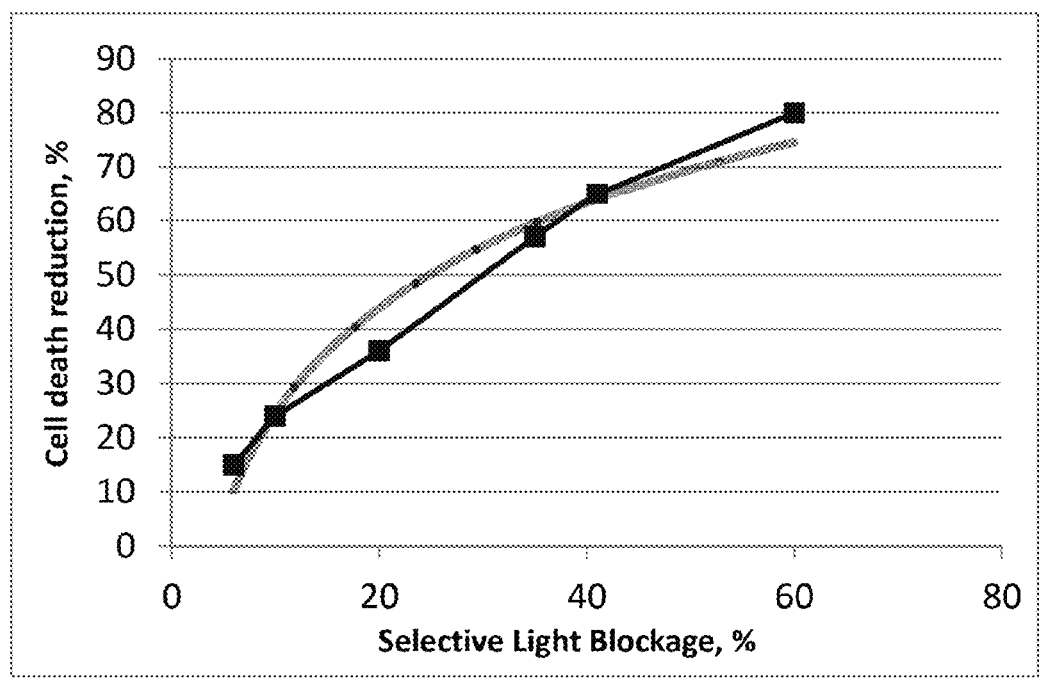

FIG. 49 shows the percentage of cell death reduction as a function of selective blue light (430+/−20 nm) blockage percentage.

Figure 50A:
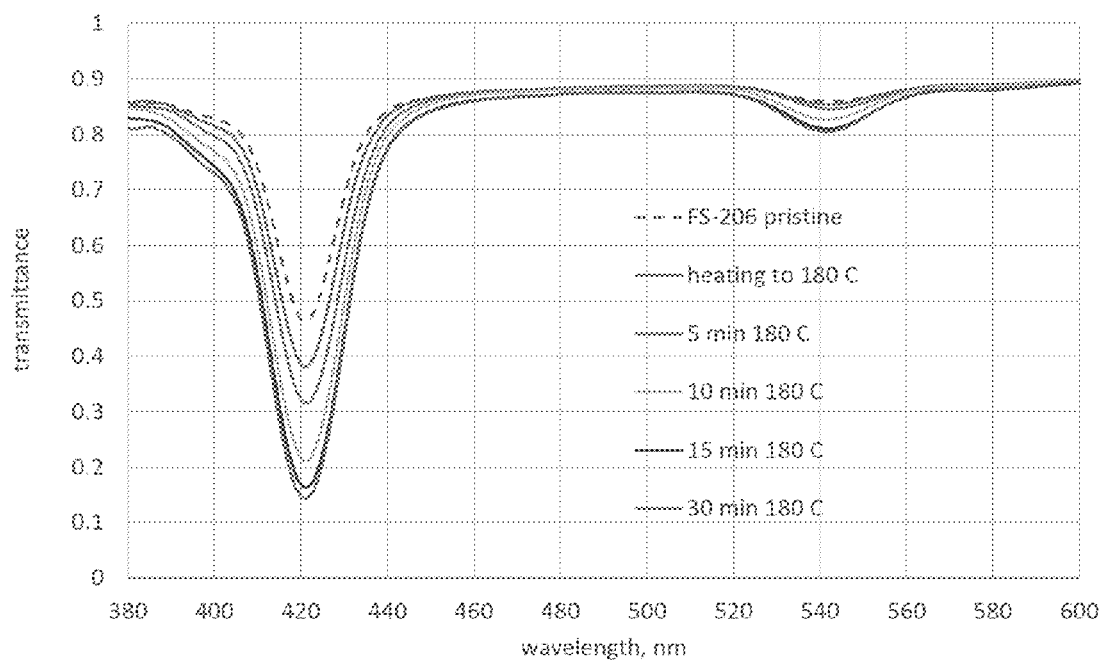

FIG. 50A shows transmission spectra of FS-206 dye before and after thermal testing.

Figure 50B:
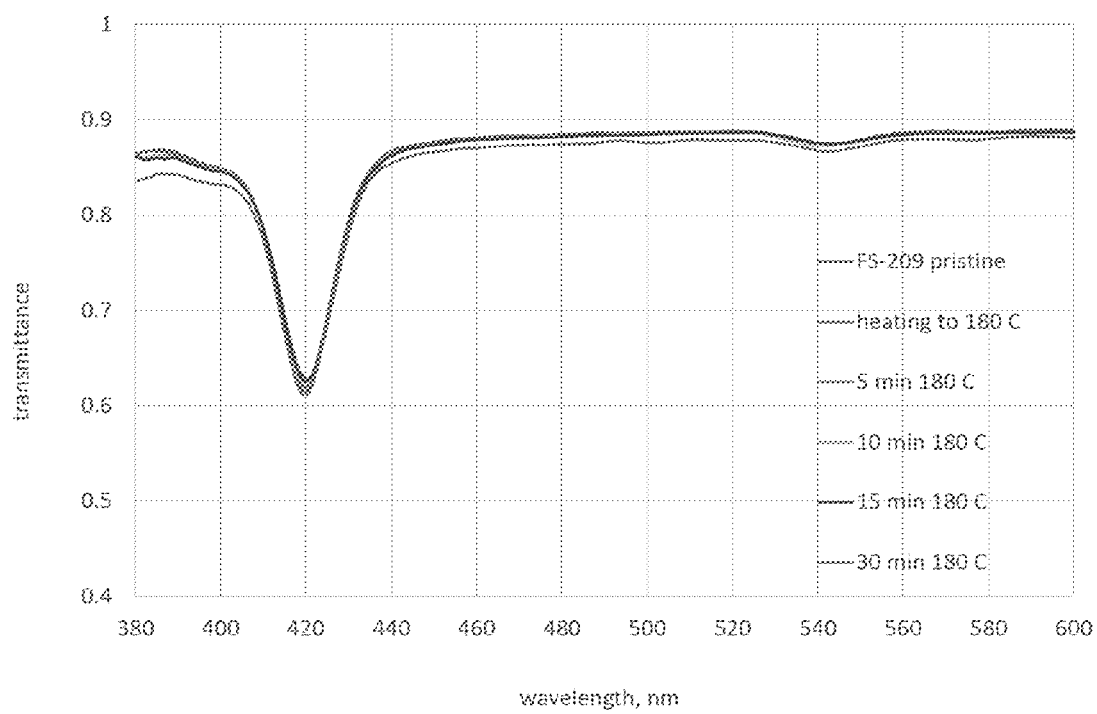

FIG. 50B shows transmission spectra of FS-209 dye before and after thermal testing.

Figure 50C:
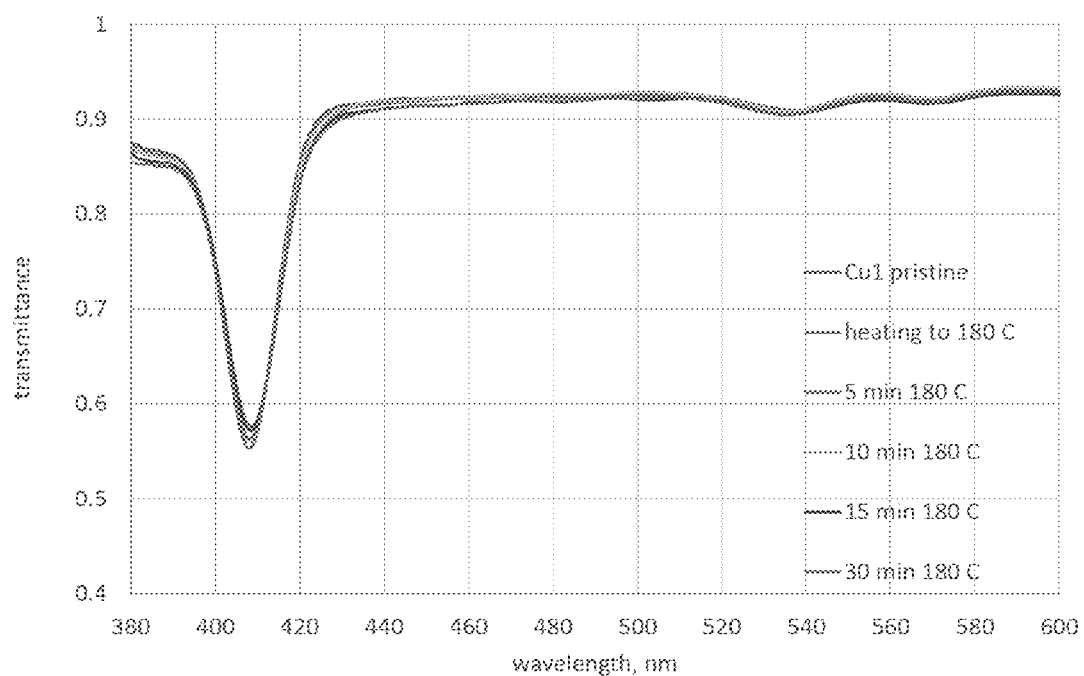

FIG. 50C shows transmission spectra of Cu1 dye before and after thermal testing.

FIG. 50D shows transmission spectra of Cu1 dye before and after thermal testing.

Figure 51:
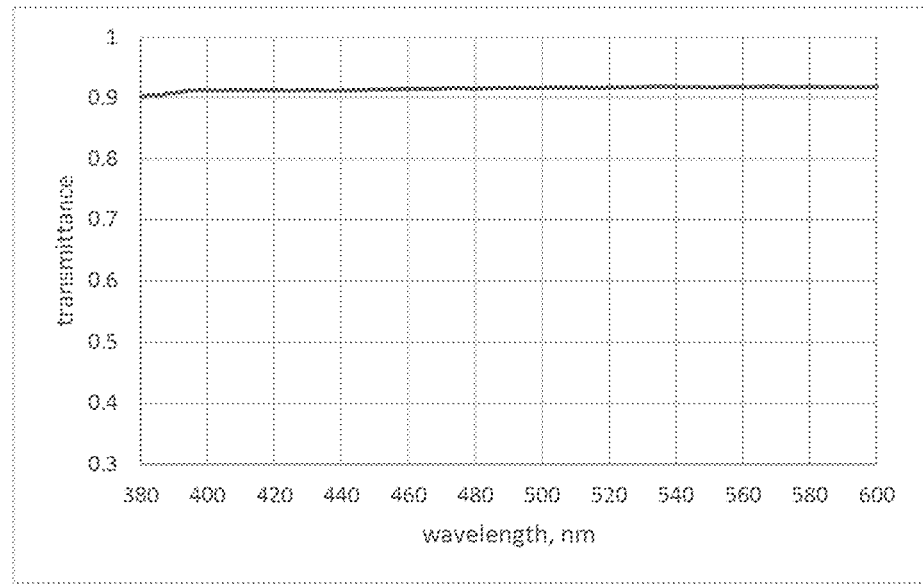

FIG. 51 shows an exemplary transmission spectrum of a glass slide.

Figure 52:
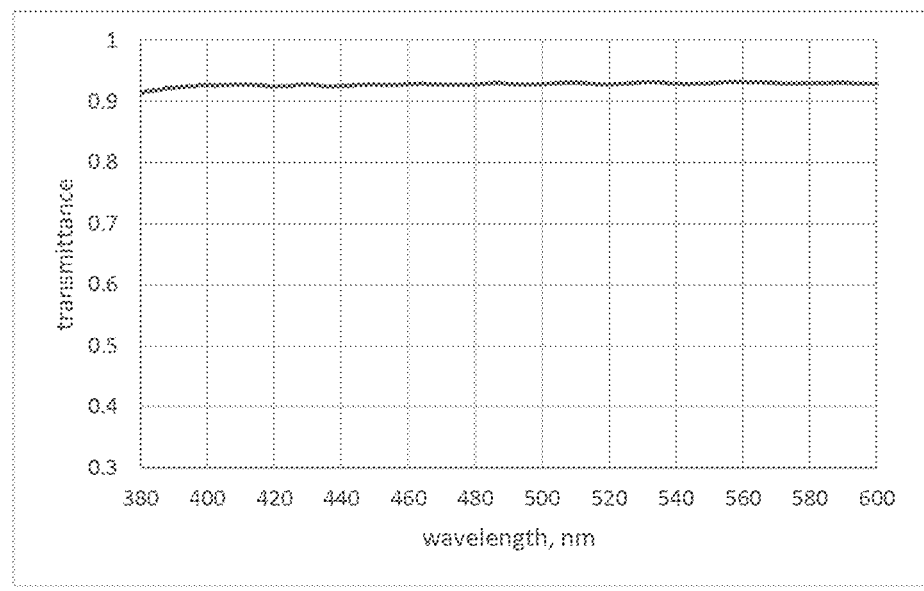

FIG. 52 shows exemplary transmission spectra of a glass slide of FIG. 51 that is coated with primer and a hardcoat.

Figure 53:
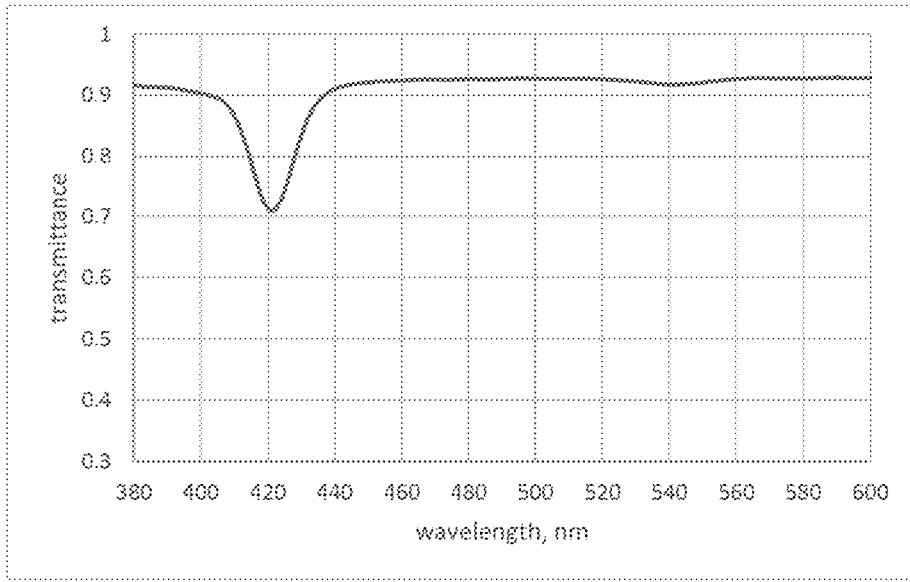

FIG. 53 shows the transmission spectra of a system comprising the glass slide of FIG. 51. The glass slide is coated with an optical filter having about 20% blue light blockage and the hardcoat used in FIG. 52. The optical filter used in FIG. 53 comprises the primer used in FIG. 52.

Figure 54:
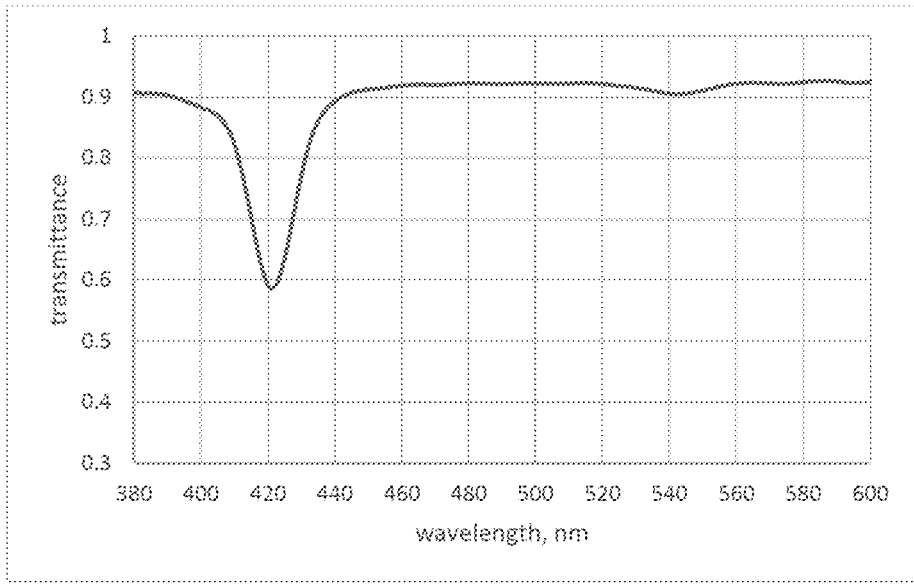

FIG. 54 shows the transmission spectra of a system comprising the glass slide of FIG. 51. The glass slide is coated with an optical filter having about 30% blue light blockage and the hardcoat used in FIG. 52. The optical filter used in FIG. 54 comprises the primer used in FIG. 52.

Figure 55:
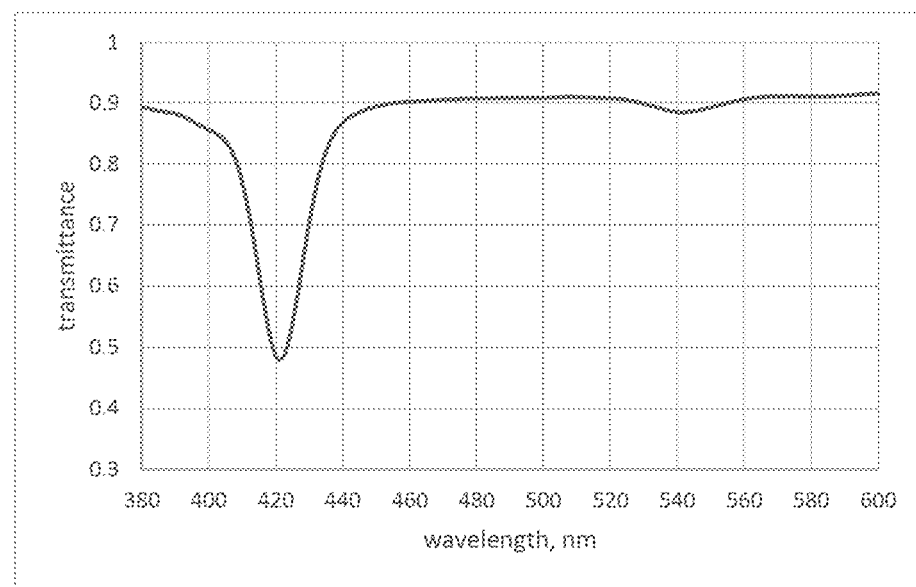

FIG. 55 shows the transmission spectra of a system comprising the glass slide of FIG. 51. The glass slide is coated with an optical filter having about 40% blue light blockage and the hardcoat used in FIG. 52. The optical filter used in FIG. 55 comprises the primer used in FIG. 52.

DETAILED DESCRIPTION

Glossary

Across the wavelength range or across the range: Includes the start point and end point of the wavelength range, and every wavelength in the range. For example, across the wavelength range of 460-700 nm includes the wavelengths 460 nm, 700 nm, and every wavelength in between 460 nm and 700 nm.

Alkoxy groups: Alkoxy groups include, but are not limited to, methoxy, ethoxy, propoxy, isopropoxy, butoxy and isobutoxy.

At least 5% less than X %: Means that 5% is subtracted from X %. Thus, for example, if X % is 80%, then "at least 5% less than X %" would be less than 75%. The percentage should not be calculated by multiplying—i.e., 5% less than 80% is not 80% (0.95)=76%, but is rather 80%−5%=75%.

Average Transmission: The "average transmission" for a wavelength range or ranges is the average value of the transmission spectra across the range(s). Mathematically, the average transmission is:

$$A/W,$$

where W is the length of the wavelength range(s) along the X-axis of the transmission spectrum, and A is the area under the transmission spectrum in the wavelength range. This is the same as saying that the "average transmission" of a spectrum across a wavelength range is calculated by integrating the spectrum to determine the area under the transmittance curve across the range, and dividing by the length of the wavelength range.

So, for example, a spectrum having a transmission of 90% at most wavelengths in a wavelength range, but a transmission of 50% at just a few wavelengths in the wavelength range, would have an "average transmission" above 80% across the wavelength range because the calculation described above would result in a number close to 90%, notwithstanding the fact that the transmission at a few points is well below 80%.

An application of "average transmission" is in the calculation of T5 and T6. The filter has an average transmission (T5) in a wavelength range that is 5 nm below a first wavelength to 5 nm above the first wavelength. If the first wavelength is 420 nm, the range (W) for T5 is 10 nm (415 nm-425 nm, inclusive). The area (A) underneath the filter transmission spectrum between 415 nm and 425 nm is determined. That area (A) is divided by the wavelength range (W).

The transmission spectrum of the filter also has an average transmission (T6) in a wavelength range from 400 nm to 460 nm. However, that range excludes a range that is 5 nm below to 5 nm above the first wavelength. Thus, if the first wavelength is 420 nm, the range (W) for T6 is 48 nm (400 nm to 414 nm, inclusive, and 426 nm to 460 nm, inclusive). The area (A) underneath the filter transmission spectrum between 400 nm to 414 nm and 426 nm to 460 nm is determined. The area (A) is then divided by the wavelength range (W) to get an average transmission. The comparison of T5 to T6 is intended to describe the magnitude of a dip in the filter transmission spectrum around the first wavelength. T5 is at least 5% less than T6.

Blue light: light in the wavelength range of 400 nm to 500 nm.

CIE LAB: a quantified color space adopted by the International Commission on Illumination, alternatively known as the Commission Internationale de l'Eclairage or CIE. This system is based on the scientific understanding that vision is based on distinctions of light vs. dark, red vs. green, and blue vs. yellow. This 3-dimensional color space has a vertical axis representing lightness (L*) from black to white, and 2 horizontal color axes representing green-red (negative a* to positive a*) and blue-yellow (negative b* to positive b*). Any perceived color can be represented as a point in the color space with the coordinates (L*, a*, b*). The (a*, b*) coordinates define the color while the L* defines the lightness of that color. In this system, color can alternatively be defined by chroma and hue. As used herein, CIE LAB refers to the 1976 CIE LAB color space.

CIE Standard Illuminant D65: a specific spectrum of light defined by an international organization and widely known to the relevant scientific community. According to the International Organization for Standardization (ISO): "[D65] is intended to represent average daylight and has a correlated colour temperature of approximately 6500 K. CIE standard illuminant D65 should be used in all colorimetric calculations requiring representative daylight, unless there are specific reasons for using a different illuminant." ISO 10526: 1999/CIE S005/E-1998. "CIE" is an abbreviation for "Commission Internationale de l'Eclairage," or International Commission on Illumination, an international authority on light, illumination, color and color spaces.

FIG. 49 illustrates the spectrum for CIE Standard Illuminant D65.

The CIE LAB color coordinates for D65 light were calculated to be (see CIE LAB Color Coordinates Calculation Method below for color calculation method):

$$L^* = 100.00$$

$$a^* = -0.013$$

$$b^* = -0.097$$

Chroma: a measure of color saturation in CIE LAB space. Chroma accounts for differences in a* and b*, but not L*. For a given set of coordinates $(a^*_1, b^*_1, L^*_1)$, the "chroma" is $$(a^*_1)^2 + (b^*_1)^2)^{1/2},$$

and is a measure of how far the point is from the color neutral axis having coordinates $(0, 0, L^*_1)$. But, the difference in chroma between two points in color space, where the two points have coordinates $(a^*_1, b^*_1, L^*_1)$ and $(a^*_2, b^*_2, L^*_2)$, is $$((a^*_2 - a^*_1)^2 + (b^*_2 - b^*_1)^2)^{1/2}$$

Copper Porphyrin Compound: a compound having the following chemical structure:

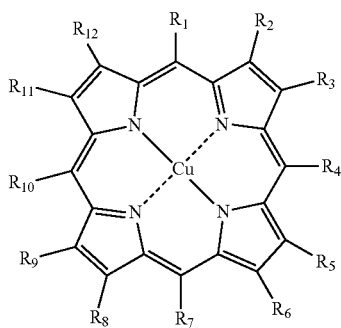

where R1 through R12 may each be, independently, H or any possible substituent.

Cu(II): copper(II); $Cu^{2+}$

Delta E or ΔE: In CIE LAB space, ΔE is the distance between two points, and is a measure of perceived color difference. Where the two points have CIE LAB coordinates $(a^*_1, b^*_1, L^*_1)$ and $(a^*_2, b^*_2, L^*_2)$, $\Delta E = ((a^*_2-a^*_1)^2 + (b^*_2-b^*_1)^2 + (L^*_2-L^*_1)^2)^{1/2}$ Disposed On: a layer is "disposed on" a surface if it is attached to the surface. The layer may be above or below the surface. There may be intervening layers.

Dispersed Through: a compound is dispersed through a substrate if molecules of the compound are located throughout the structure of the substrate.

Eyeglass Lens: An eyeglass lens includes any lens worn over the eye. Eyeglass lenses are often supported by a frame. Eyeglass lenses may be supported in other ways, for example by an adjustable band worn around the head that may also function as a safety shield or water barrier. Examples of eyeglass lenses include prescription lenses, non-prescription lenses, multifocal lenses, safety lenses, over the counter reading glasses, goggles and sunglass lenses. Eyeglass lenses may be made of glass, but may be made of other materials as well. Common eyeglass materials include polycarbonate (such as MR-10), allyl diglycol carbonate (also known as CR-39), and others known to the art.

Filter: A molecular compound or physical structure that attenuates light transmitted through an object or reflected off the object to which the filter is applied. Filters may function through reflection, absorption, or interference.

Hue: a measure of color shade in the CIE LAB system. For a given set of coordinates $(a^*_1, b^*_1, L^*_1)$, the "hue" angle is Arctangent($b^*/a^*$)

This can be visualized as the angle between the positive a* axis and the line drawn to the point $(a^*_1, b^*_1)$. The angle is measured by convention in the counter-clockwise direction; for example, red shades along the positive a* axis have a hue angle of 0°, yellow shades along the positive b* axis have a hue angle of 90°, green shades along the negative a* axis have a hue angle of 180°, and blue shades along the negative b* axis have a hue angle of 270°.

Negative side of a wavelength: The negative side of a wavelength means on the left side of where the wavelength is located in the X-axis of a transmission spectrum, when the wavelengths increase from left to right along the X-axis. For example, if the current wavelength is 420 nm, a wavelength that is on "the negative side of" of 420 nm is 410 nm.

Non-Ocular System: A system that does not pass light through to a user's eye. A non-limiting example is a skin or dermatologic lotion.

Non-Ophthalmic Ocular System: A non-ophthalmic ocular system is every system through which light passes on its way to a user's eye that is not an ophthalmic system. Together, Ophthalmic and Non-Ophthalmic Ocular systems include all systems through which light passes on its way to a user's eye. Light sources such as light bulbs or video screens can be considered non-ophthalmic systems because light passes through various layers of the light source on its way to a user's eye. Non-limiting examples of non-ophthalmic systems include a window, an automotive windshield, an automotive side window, an automotive rear window, a sunroof window, commercial glass, residential glass, skylights, a camera flash bulb and lens, an artificial lighting fixture, a magnifying glass, a fluorescent light or diffuser, a medical instrument, a surgical instrument, a rifle scope, a binocular, a computer monitor, a television screen, a lighted sign, a and a patio fixture.

Ocular: visual; seen by the eye.

Ocular System: Every system through which light passes on its way to a user's eye.

Ophthalmic: Of or pertaining to the eye. As used herein, "ophthalmic" is a subset of "ocular."

Ophthalmic System: An ophthalmic system is worn by a user, and modifies the light to which the user's eye is exposed. Ophthalmic systems are a subset of ocular systems. Common ophthalmic systems include spectacle lens, a sunglass lens, a contact lens, an intra-ocular lens, a corneal inlay, safety glasses, and a corneal onlay. These systems may be worn to correct vision, to protect the eye from physical hazards, to protect the eye from harmful radiation, and/or for cosmetic purposes. Systems through which a user looks only occasionally and that are typically not worn, such as a magnifying glass, rifle scope, camera lens, binocular, or telescope, are not considered "ophthalmic" systems.

Optical Filter: A filter having a light transmission spectrum that attenuates certain wavelengths of light as they pass through the optical filter.

Photopic Luminous Transmission: Photopic Luminous Transmission is a quantitative measure of the transmission of light through a lens. It is different from the average transmission since the transmission values at each wavelength are weighted using the spectral sensitivity of the human eye. In this sense, it is often considered more relevant for visual applications than the average transmission which weights all wavelengths equally and therefore does not account for the physics of human vision. There are different technical terms for this metric and photopic is included in this definition to explicitly indicate that color matching functions are used for photopic vision.

Photopic Luminous Transmission can be calculated using various CIE (Commission Internationale de l'Eclairage) colorimetric systems. In general, the luminous transmission is the integral of the transmission, Tλ, multiplied by the light source intensity, Sλ, multiplied by the yλ color matching function as shown in equation:

$$Y = k \int_{400\,nm}^{700\,nm} T_\lambda S_\lambda y_\lambda \, d\lambda$$

This equation can be found in [3(3.3.8)] in "Color Science: Concepts and Methods, Quantitative Data and Formulae", G. Wyszecki and W. Stiles, 1982, p. 157 ("Wyszecki").

The value is calculated over the wavelength range of 400-700 nm, using a 1 nm wavelength increment, the 1971 D65 illuminant $S\lambda$ values, and the CIE 1931 color matching functions. The illuminant $S\lambda$ values and the $y\lambda$ color matching function values were obtained from Wyszecki, pp. 156, 725-735. The constant k in this equation is given by equation:

$$k = \frac{1}{\int_{400\,nm}^{700\,nm} S_\lambda y_\lambda \, d\lambda}$$

Because the data is available in discrete values at 1 nm wavelength increments, the calculation is done by summing the data in a spreadsheet to approximate the integral as shown in equation below:

$$Y \approx \frac{\sum_{400\,nm}^{700\,nm} T_\lambda S_\lambda y_\lambda = T_{400} S_{400} y_{400} + T_{401} S_{401} y_{401} + \ldots + T_{700} S_{700} y_{700}}{\sum_{400\,nm}^{700\,nm} S_\lambda y_\lambda = S_{400} y_{400} + S_{401} y_{401} + \ldots + S_{700} y_{700}}$$

Reflected Off: In the context of an ophthalmic system, light on its way to the wearer's eye is "reflected off" the system and may be observed by those looking at the wearer.

Similarly, in the context of a non-ophthalmic system, light on its way to the user's eye is "reflected off" the system, and then potentially to an observer. For example, the measurement of light "reflected off" a car windshield should be of light starting outside the car and reflecting off the windshield.

Reflection spectrum: a spectrum showing, for each wavelength, the percentage of light reflected at that wavelength by the object having the transmission spectrum. Because it is based on percentages at each wavelength, a reflection spectrum is independent of the light source used to measure the spectrum.

Slope: In the context of a transmission spectrum or similar curve, the "slope" at a point is the slope of a line tangent to the curve at that point. Where data is discrete, for example where a transmission spectrum is defined by a value at each integer wavelength, the "slope" at a point may be calculated using data from adjacent points. For example, the slope of a transmission curve at 440 nm is the slope of the line connecting the transmission value at 439 nm to the transmission value at 441 nm.

Substrate: In a structure having multiple layers created by depositing some layers over other, the substrate is the initial layer over which the other layers are deposited. The substrate is often, but not always, the thickest layer in a structure. For example, in an eyeglass lens, the finished lens blank is the substrate. Any coatings deposited on the blank are not the substrate.

A structure may have multiple substrates if existing structures are attached to each other. For example, a shatter resistant windshield may be fabricated by attaching two layers of glass using PVB as an adhesive. Each layer of glass may be considered a substrate, because each layer of glass was at some point an initial layer with nothing deposited on it or affixed to it. Chemical compounds may be dispersed through a substrate.

Surface: Any face of a layer of material upon which another material may be placed. For example, in a semi-finished CR39 lens blank, the finished face is a surface. Additionally, the unfinished face is also a surface.

Transmission: the fraction of light that is transmitted through a system. Transmission is measured by a spectrometer which can detect the amount of light at specific wavelengths. Such measurements are generally done by measuring the amount of light from a light source at specific wavelength in air (no system) and then measuring under the same conditions with the system between the light source and the detector. The transmission is the ratio, or percentage, of light that is transmitted through the system at each wavelength. Light not transmitted through the system is either reflected, scattered, or absorbed. The transmission scale is 0-1 or 0-100%. These measurements are generally independent of the light source of the measurement system.

Transmission spectrum: a spectrum showing, for each wavelength, the percentage of light transmitted at that wavelength by the object having the transmission spectrum. Because it is based on percentages at each wavelength, a transmission spectrum is independent of the light source used to measure the spectrum.

Transmitted through: In the context of an ophthalmic system, light on its way to the wearer's eye is "transmitted through" the system, and then to the wearer's eye. Similarly, in the context of a non-ophthalmic system, light on its way to the user's eye is "transmitted through" the system, and then to the user's eye. For example, the measurement of light "transmitted through" a car windshield should be of light coming from outside the car to inside the car.

Visible light: light having a wavelength in the range 400 nm to 700 nm.

Yellowness Index: a measure of how "yellow" light appears after transmission through a system. [need additional description of standard definition]. The Yellowness Index of a system can be calculated from its transmission spectra. [describe how or provide reference/standard]

CIE LAB Color Coordinates and Yellowness Index Calculations Method: All CIE LAB color coordinates (a*, b*, L*) and Yellowness Indices (YI) described and claimed herein are calculated using standard colorimetric formulas in an excel spreadsheet based on transmission spectral data. Calculations are done using 1 nm intervals from 380-780 nm for the CIE 1931 Color Matching Functions. See G. Wyszecki and W. S. Stiles, "Color Science: Concepts and Methods, Quantitative Data and Formulae", $2^{nd}$ Edition, 1982, ("Wyszecki"), CIE 1931 Color Matching Functions: $x(\lambda)$, $y(\lambda)$, $z(\lambda)$—Table I(3.3.1), pp. 725-735. and the CIE 1971 D65 Illuminant. (Wyszecki, CIE 1971 D65 Illuminant—Table 1(3.3.4), pp. 754-758). When transmission data was not available in 1 nm wavelength increments, these data were converted to this standard using linear interpolation of the data. The tristimulus values were calculated using the following discrete sum versions of the integral equations from Wysecki and Styles:

$$X = 100 \Sigma [S_{65}(\lambda) \cdot x(\lambda) \cdot T(\lambda)] / \Sigma [S_{65}(\lambda) \cdot y(\lambda)]$$

$$Y = 100 \Sigma [S_{65}(\lambda) \cdot y(\lambda) \cdot T(\lambda)] / \Sigma [S_{65}(\lambda) \cdot y(\lambda)]$$

$$Z = 100 \Sigma [S_{65}(\lambda) \cdot z(\lambda) \cdot T(\lambda)] / \Sigma [S_{65}(\lambda) \cdot y(\lambda)].$$

Wyszecki, equation 3(3.3.8), pp. 157.

The equations and reference values used to convert the tri-stimulus values to the 1976 CIE L*a*b* color coordinates (Wyszecki, equation 5(3.3.9), pp. 167) are shown below along with the 1931 D65 Reference White values:

$$L^* = 116(Y/Y_n)^{1/3} - 16$$

$$a^* = 500[(X/X_n)^{1/3} - (Y/Y_n)^{1/3}]$$

$$b^* = 200[(Y/Y_n)^{1/3} - (Z/Z_n)^{1/3}]$$

$X_n$ 95.047
$Y_n$ 100.000
$Z_n$ 108.883

The Yellowness Index (YI) was calculated using the transmission data, the equation below and the coefficients in ASTM E313-05 table below. ASTM E313-05, Standard Practice for Calculating Yellowness and Whiteness Indices from Instrumentally Measured Color Coordinates, ASTM International.

YI was calculated assuming a CIE-D65 light source with 1931 (2° viewing angle) standard illuminant factors.

$$YI = 100(C_x X - C_z Z)/Y \qquad (1)$$

where X, Y, and Z are the CIE Tristimulus values and the coefficients depend on the illuminant and observer as indicated in the table below from the ASTM E313-05 standard.

| | CIE Standard Illuminant and Standard Observer | | | |
|---|---|---|---|---|
| Quantity | C. 1931 | $D_{65}$ 1931 | C. 1964 | $D_{66}$ 1964 |
| $X_n$ | 99.074 | 95.047 | 97.285 | 94.911 |
| $Y_n$ | 100.000 | 100.000 | 100.000 | 100.000 |
| $Z_n$ | 118.232 | 108.883 | 116.145 | 107.304 |
| $F_A$ | 0.7987 | 0.8106 | 0.7987 | 0.8103 |
| $F_B$ | 0.2013 | 0.1895 | 0.2013 | 0.1857 |
| $C_X$ | 1.2769 | 1.2985 | 1.2971 | 1.3013 |
| $C_Z$ | 1.0592 | 1.1335 | 1.0781 | 1.1498 |
| Residual error | −0.0006 | −0.0004 | −0.0004 | −0.0006 |

Coefficients of the Equations for the Yellowness Index

The numbering convention for substituents used herein places the R1 through R8 substituents on a pyrrole of the Cu porphyrin complex, and higher numbered R-groups elsewhere. This allows easy distinction between substituents permitted on the pyrroles, and substituents permitted elsewhere. The inventors believe that certain substituents may degrade molecular stability if places on the pyrrole (in one or more of the R1 through R8 positions), but may be relatively benign if placed elsewhere. The numbering convention used herein allows for easy description of a narrow group of substituents permitted on the pyrrole, and a broader group of substituents permitted elsewhere.

Cataracts and macular degeneration are believed to result from photochemical damage to the intraocular lens and retina, respectively. Blue light exposure has also been shown to accelerate proliferation of uveal melanoma cells. The most energetic photons in the visible spectrum have wavelengths between 380 and 500 nm and are perceived as violet or blue. The wavelength dependence of phototoxicity summed over all mechanisms is often represented as an action spectrum, such as is described in Mainster and Sparrow, "How Much Blue Light Should an IOL Transmit?" Br. J. Ophthalmol., 2003, v. 87, pp. 1523-29 and FIG. 6. In eyes without an intraocular lens (aphakic eyes), light with wavelengths shorter than 400 nm can cause damage. In phakic eyes, this light is absorbed by the intraocular lens and therefore does not contribute to retinal phototoxicity; however it can cause optical degradation of the lens or cataracts.

The pupil of the eye responds to the photopic retinal illuminance, in trolands (a unit of conventional retinal illuminance; a method for correcting photometric measurements of luminance values impinging on the human eye by scaling them by the effective pupil size), which is the product of the incident flux with the wavelength-dependent sensitivity of the retina and the projected area of the pupil. This sensitivity is described in Wyszecki and Stiles, Color Science: Concepts and Methods, Quantitative Data and Formulae (Wiley: N.Y.) 1982, esp. pages 102-107.

Current research strongly supports the premise that short wavelength visible light (blue light) having a wavelength of approximately 400-500 nm could be a contributing cause of AMD (age related macular degeneration). It is believed that the highest level of blue light retinal damage occurs in a region around 430 nm, such as 400-460 nm. Research further suggests that blue light worsens other causative factors in AMD, such as heredity, tobacco smoke, and excessive alcohol consumption.

The human retina includes multiple layers. These layers listed in order from the first exposed to any light entering the eye to the deepest include: 1) Nerve Fiber Layer 2) Ganglion Cells 3) Inner Plexiform Layer 4) Bipolar and Horizontal Cells 5) Outer Plexiform Layer 6) Photoreceptors (Rods and Cones) 7) Retinal Pigment Epithelium (RPE) 8) Bruch's Membrane 9) Choroid.

When light is absorbed by the eye's photoreceptor cells, (rods and cones) the cells bleach and become unreceptive until they recover. This recovery process is a metabolic process and is called the "visual cycle." Absorption of blue light has been shown to reverse this process prematurely. This premature reversal increases the risk of oxidative damage and is believed to lead to the buildup of the pigment lipofuscin in the retina. This build up occurs in the retinal pigment epithelium (RPE) layer. It is believed that aggregates of extra-cellular materials called drusen are formed due to the excessive amounts of lipofuscin.

Current research indicates that over the course of one's life, beginning with that of an infant, metabolic waste byproducts accumulate within the pigment epithelium layer of the retina, due to light interactions with the retina. This metabolic waste product is characterized by certain fluorophores, one of the most prominent being lipofuscin constituent A2E. In vitro studies by Sparrow indicate that lipofuscin chromophore A2E found within the RPE is maximally excited by 430 nm light. It is theorized that a tipping point is reached when a combination of a build-up of this metabolic waste (specifically the lipofuscin fluorophore) has achieved a certain level of accumulation, the human body's physiological ability to metabolize within the retina certain of this waste has diminished as one reaches a certain age threshold, and a blue light stimulus of the proper wavelength causes drusen to be formed in the RPE layer. It is believed that the drusen then further interfere with the normal physiology/metabolic activity which allows for the proper nutrients to get to the photoreceptors thus contributing to age-related macular degeneration (AMD). AMD is the leading cause of irreversible severe visual acuity loss in the United States and Western World. The burden of AMD is expected to increase dramatically in the next 20 years because of the projected shift in population and the overall increase in the number of ageing individuals.

Drusen hinder or block the RPE layer from providing the proper nutrients to the photoreceptors, which leads to damage or even death of these cells. To further complicate this process, it appears that when lipofuscin absorbs blue light in high quantities it becomes toxic, causing further damage and/or death of the RPE cells. It is believed that the lipofuscin constituent A2E is at least partly responsible for the short wavelength sensitivity of RPE cells. A2E has been shown to be maximally excited by blue light; the photochemical events resulting from such excitation can lead to cell death. See, for example, Janet R. Sparrow et al., "Blue light-absorbing intraocular lens and retinal pigment epithelium protection in vitro," J. Cataract Refract. Surg. 2004, vol. 30, pp. 873-78. A reduction in short-wavelength transmission in an ophthalmic system may be useful in reducing cell death due to photoelectric effects in the eye, such as excitation of A2E, a lipofuscin fluorophore.

It has been shown that reducing incident light at 430+/−30 nm by about 50% can reduce cell death by about 80%. See, for example, Janet R. Sparrow et al., "Blue light-absorbing intraocular lens and retinal pigment epithelium protection in vitro," J. Cataract Refract. Surg. 2004, vol. 30, pp. 873-78, the disclosure of which is incorporated by reference in its entirety. It is further believed that reducing the amount of blue light, such as light in the 430-460 nm range, by as little as 5% may similarly reduce cell death and/or degeneration, and therefore prevent or reduce the adverse effects of conditions such as atrophic age-related macular degeneration. FIG. 49 shows the percentage of cell death reduction as a function of selective blue light (430+/−20 nm) blockage percentage.

Further laboratory evidence by Sparrow at Columbia University for High Performance Optics has shown that concentrations of blue light filtering dyes with levels as low as 1.0 ppm and 1.9 ppm can provide retinal benefit in a mostly colorless system, "Light Filtering in Retinal Pigment Epithelial Cell Culture Model" Optometry and Vision Science 88; 6 (2011): 1-7, is referenced in its entirety. As shown in figures 51 and 52 of the Sparrow report it is possible to vary the concentration of the filter system to a level of 1.0 ppm or greater to a level of about 35 ppm as exampled with perylene dye. Any concentration level between about 1.0 ppm or greater to about 35 ppm may be used. Other dyes that exhibit similar blue light blocking function could also be used with similar variable dye concentration levels.

Table 1 below demonstrates RPE cell death reduction as light blockage percentages increase with the porphyrin dye, MTP.

TABLE 1

| cell death reduction % | Light blockage, % 410-450 nm |
|---|---|
| 15 | 6 |
| 24 | 10 |
| 36 | 20 |
| 57 | 35 |
| 65 | 41 |
| 80 | 60 |

From a theoretical perspective, the following appears to take place: 1) Waste buildup occurs within the pigment epithelial level starting from infancy throughout life. 2) Retinal metabolic activity and ability to deal with this waste typically diminish with age. 3) The macula pigment typically decreases as one ages, thus filtering out less blue light. 4) Blue light causes the lipofuscin to become toxic. The resulting toxicity damages pigment epithelial cells.

The lighting and vision care industries have standards as to human vision exposure to UVA and UVB radiation. No such standard is in place with regard to blue light. For example, in the common fluorescent tubes available today, the glass envelope mostly blocks ultra-violet light but blue light is transmitted with little attenuation. In some cases, the envelope is designed to have enhanced transmission in the blue region of the spectrum. Such artificial sources of light hazard may also cause eye damage. There is also mounting concern that exposure to LED lights may impact retinal integrity.

Figure 6:
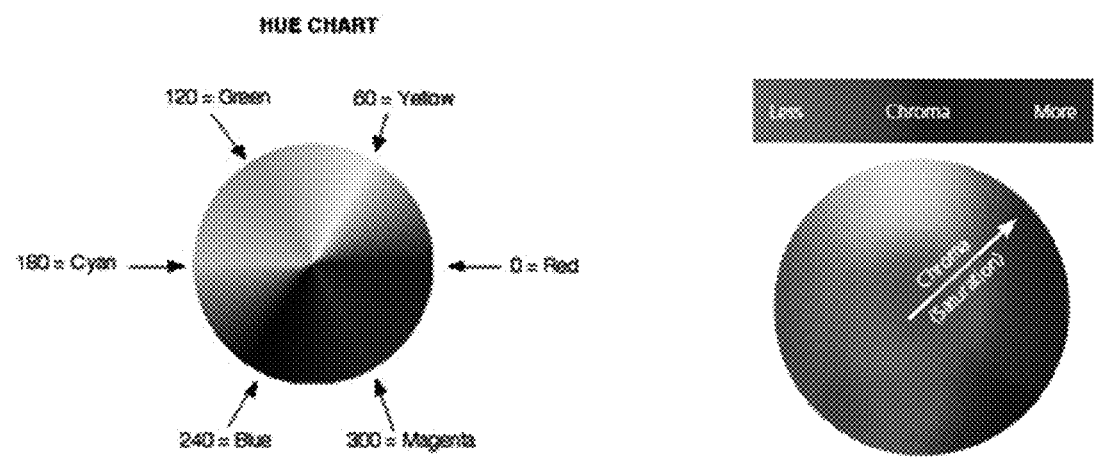
FIG. 6 shows the CIE LCH color system.

Conventional methods for reducing blue light exposure of ocular media typically completely occlude light below a threshold wavelength, while also reducing light exposure at longer wavelengths. For example, the lenses described in U.S. Pat. No. 6,955,430 to Pratt transmits less than 40% of the incident light at wavelengths as long as 650 nm, as shown in FIG. 6 of Pratt '430. The blue-light blocking lens disclosed by Johansen and Diffendaffer in U.S. Pat. No. 5,400,175 similarly attenuates light by more than 60% throughout the visible spectrum, as illustrated in FIG. 3 of the '175 patent.

Balancing the range and amount of blocked blue light may be difficult, as blocking and/or inhibiting blue light affects color balance, color vision if one looks through the optical device, and the color in which the optical device is perceived. For example, shooting glasses appear bright yellow and block blue light. The shooting glasses often cause certain colors to become more apparent when one is looking into a blue sky, allowing for the shooter to see the object being targeted sooner and more accurately. While this works well for shooting glasses, it would be unacceptable for many ophthalmic applications. In particular, such ophthalmic systems may be cosmetically unappealing because of a yellow or amber tint that is produced in lenses by blue blocking. More specifically, one common technique for blue blocking involves tinting or dyeing lenses with a blue blocking tint, such as BPI Filter Vision 450 or BPI Diamond Dye 500. The tinting may be accomplished, for example, by immersing the lens in a heated tint pot containing a blue blocking dye solution for some predetermined period of time. Typically, the solution has a yellow or amber color and thus imparts a yellow or amber tint to the lens. To many people, the appearance of this yellow or amber tint may be undesirable cosmetically. Moreover, the tint may interfere with the normal color perception of a lens user, making it difficult, for example, to correctly perceive the color of a traffic light or sign.

It has been found that conventional blue-blocking reduces visible transmission, which in turn stimulates dilation of the pupil. Dilation of the pupil increases the flux of light to the internal eye structures including the intraocular lens and retina. Since the radiant flux to these structures increases as the square of the pupil diameter, a lens that blocks half of the blue light but, with reduced visible transmission, relaxes the pupil from 2 mm to 3 mm diameter will actually increase the dose of blue photons to the retina by 12.5%. Protection of the retina from phototoxic light depends on the amount of this light that impinges on the retina, which depends on the transmission properties of the ocular media and also on the dynamic aperture of the pupil. Previous work to date has been silent on the contribution of the pupil to prophylaxis of phototoxic blue light.

Another problem with conventional blue-blocking is that it can degrade night vision. Blue light is more important for low-light level or scotopic vision than for bright light or photopic vision, a result which is expressed quantitatively in the luminous sensitivity spectra for scotopic and photopic vision. Photochemical and oxidative reactions cause the absorption of 400 to 450 nm light by intraocular lens tissue to increase naturally with age. Although the number of rod photoreceptors on the retina that are responsible for low-light vision also decreases with age, the increased absorption by the intraocular lens is important to degrading night vision. For example, scotopic visual sensitivity is reduced by 33% in a 53 year-old lens and 75% in a 75 year-old lens. The tension between retinal protection and scotopic sensitivity is further described in Mainster and Sparrow, "How Much Light Should and IOL Transmit?" Br. J. Ophthalmol., 2003, v. 87, pp. 1523-29.

Conventional approaches to blue blocking also may include cutoff or high-pass filters to reduce the transmission below a specified blue or violet wavelength to zero. For example, all light below a threshold wavelength may be blocked completely or almost completely. For example, U.S. Pub. Patent Application No. 2005/0243272 to Mainster and Mainster, "Intraocular Lenses Should Block UV Radiation and Violet but not Blue Light," Arch. Ophthal., v. 123, p. 550 (2005) describe the blocking of all light below a threshold wavelength between 400 and 450 nm. Such blocking may be undesirable, since as the edge of the long-pass filter is shifted to longer wavelengths, dilation of the pupil acts to increase the total flux. As previously described, this can degrade scotopic sensitivity and increase color distortion.

Recently there has been debate in the field of intraocular lenses (IOLs) regarding appropriate UV and blue light blocking while maintaining acceptable photopic vision, scotopic vision, color vision, and circadian rhythms.

In another embodiment that utilizes a contact lens the dye or pigment is provided that causes a yellowish tint that it is located over the central 2-9 mm diameter of the contact lens and wherein a second color tint is added peripherally to that of the central tint. In this embodiment the dye concentration which provides selective light wavelength filtering is increased to a level that provides the wearer very good contrast sensitivity and once again without compromising in any meaningful way (one or more, or all of) the wearer's photopic vision, scotopic vision, color vision, or circadian rhythms.

In still another embodiment that utilizes a contact lens the dye or pigment is provided such that it is located over the full diameter of the contact lens from approximately one edge to the other edge. In this embodiment the dye concentration which provides selective light wavelength filtering is increased to a level that provides the wearer very good contrast sensitivity and once again without compromising in any meaningful way (one or more, or all of) the wearer's photopic vision, scotopic vision, color vision, or circadian rhythms.

When various embodiments are used in or on human or animal tissue the dye is formulated in such a way to chemically bond to the inlay substrate material thus ensuring it will not leach out in the surrounding corneal tissue. Methods for providing a chemical hook that allow for this bonding are well known within the chemical and polymer industries.

In still another embodiment an intraocular lens includes a selective light wavelength filter that has a yellowish tint, and that further provides the wearer improved contrast sensitivity without compromising in any meaningful way (one or more, or all of) the wearer's photopic vision, scotopic vision, color vision, or circadian rhythms. When the selective filter is utilized on or within an intraocular lens it is possible to increase the level of the dye or pigment beyond that of a spectacle lens as the cosmetics of the intraocular lens are invisible to someone looking at the wearer. This allows for the ability to increase the concentration of the dye or pigment and provides even higher levels of improved contrast sensitivity and/or retinal protection without compromising in any meaningful way (one or more, or all of) the wearer's photopic vision, scotopic vision, color vision, or circadian rhythms.

In still another embodiment, a spectacle lens includes a selective light wave length filter comprising a dye wherein the dye's formulation provides a spectacle lens that has a mostly colorless appearance. And furthermore that provides the wearer with improved contrast sensitivity without compromising in any meaningful way (one or more, or all of) the wearer's photopic vision, scotopic vision, color vision, or circadian rhythm.

Other embodiments include a wide variation in how the selective filter can be added to any system in varying concentrations and/or zones and/or rings and/or layers. For example, in an eyeglass lens the select filter does not necessarily need to be uniform throughout the entire system or in any fixed concentration. An ophthalmic lens could have one or more zones and/or rings and/or layers of varying filter concentration or any combination or combinations thereof.

One way to cost effectively incorporate selective visible light filtering in either an ophthalmic or non-ophthalmic system is through a coating that includes the filtering system. By way of example only, the coating described can be incorporated into one or more than one: primer coatings, scratch-resistance coatings, anti-reflective coatings, hydrophobic coatings or other coatings known in the ophthalmic or non-ophthalmic industry or any combination or combinations thereof.

In view of the foregoing, there is a pressing need for an ophthalmic or non-ophthalmic system that can provide one or more of the following: 1) Blue blocking with an acceptable level of blue light protection 2) Acceptable color cosmetics, i.e., it is perceived as mostly color neutral by someone observing the ophthalmic system when worn by a wearer. 3) Acceptable color perception for a user. In particular, there is a need for an ophthalmic system that will not impair the wearer's color vision and further that reflections from the back surface of the system into the eye of the wearer be at a level of not being objectionable to the wearer. 4) Acceptable level of light transmission for wavelengths other than blue light wavelengths. In particular, there is a need for an ophthalmic system that allows for selective blockage of wavelengths of blue light while at the same time transmitting in excess of 80% of visible light. 5) Acceptable photopic vision, scotopic vision, color vision, and/or circadian rhythms. 6) Exceptional durability and UV stability characteristics so as to promote longevity of the selective blue light wavelength filter system.

A blue light wavelength filter may "selectively" filter blue light. A filter is "selective" when the amount of light it attenuates at each wavelength within a specified range of wavelengths is more than the amount of light it attenuates at most wavelengths in the visible spectrum (400-700 nm) outside the specified range. Preferably, a "selective" filter attenuates light more at each wavelength within the specified range of wavelengths than it attenuates light at all wavelengths in the visible spectrum (400-700 nm) outside the specified range.

A non-limiting example of a transmission spectrum exhibited by a selective blue light wavelength filter is that of a dye having a Soret band or a Soret peak. Another non-limiting example is a Rugate filter and similar filters based on dielectric stacks. In many cases the range of blue light filtering is designed to reduce lipofuscin accumulation within the retinas pigmented epithelium cells (RPE). A common chromophore of lipofucsin is A2E which has a peak at approximately 430 nm. Therefore, it is prudent to filter light at 430 nm, 420 nm or within a range including 430 nm to preserve retinal integrity. In other embodiments, more than one selective filter can be added to include filtering to target other chromphores or target wavelengths associated with circadian balance.

There are many dye compounds on the market that can provide some kind of blockage in the high energy visible light (HEVL) portion of the electromagnetic spectrum. However, not all of these dyes are selective, i.e. have narrow absorption peaks to block the needed part of the HEVL and not affect the other part of the spectrum that is needed for normal biological functions. Furthermore, many of these dyes do not possess a satisfactory thermal- and/or UV-stability for many applications. Therefore, there is a need of a dye or mixture of dyes that can have these properties of selective blocking in the harmful portion of the HEVL and will be stable under various environmental conditions, which include moisture, Sun (UV) exposure, heat, etc. Porphyrin dyes are good candidates to be used in coatings and/or substrates that can provide selective blockage of harmful HEVL due to their Soret band in 400-500 nm spectral range. Particularly, Copper (Cu)-porphyrins exhibit greater UV-stability than other porphyrin compounds. By molecular design, the absorption peak of the Cu-porphyrins can be tuned in the range 400-500 nm. Cu-porphyrins can be synthesized from the non-metallated porphyrins, which are readily available from commercial suppliers, such as Frontier Scientific (Logan, Utah).

The Soret band of a dye is a relatively narrow band of the visible electro-magnetic spectrum located in the blue light region of the spectrum in which the dye has intense absorption of blue light. A Soret peak is thus a local maximum in the Soret band.

In one embodiment, a first system is provided. The first system comprises an optical filter comprising a Cu-porphyrin compound. The Cu-porphyrin compound has the structure according to Formula I:

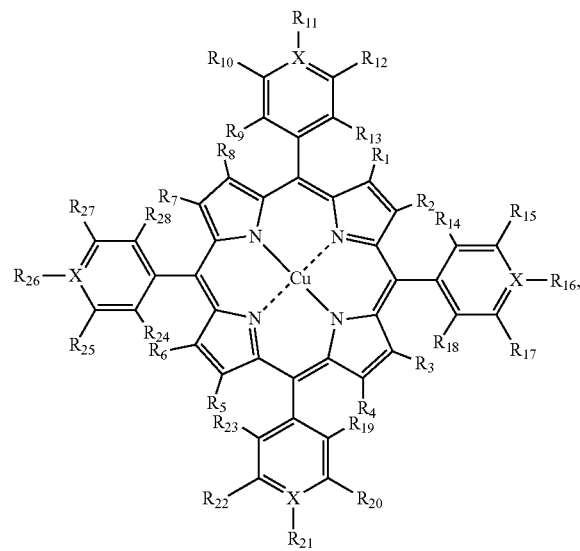

(Formula I)

or a salt, or a tautomeric form thereof, wherein X is carbon or nitrogen, each of $R_1$ through $R_8$ is independently H, Cl, Br, F, I, Me, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, or a moiety represented by -L-P each of $R_9$ through $R_{28}$ is independently H, F, Br, Cl, I, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{111}R_{111}R_{112})$, an aryl, a heteroaryl, acrylate, acryloyl, acrylamide, methacrylate, methacrylamide, thiol, amide, or a moiety represented by -L-P, or two of adjacent $R_9$ to $R_{28}$ may also form aromatic or non-aromatic ring structure;

$R_{100}$ is a bond, $—(CH_2)_n—$, or a branched alkyl having 2-20 (e.g., 2, 3, 4, 5, 6, 7, 8, 9, 10, 11, 12, 13, 14, 15, 16, 17, 18, 19, or 20) carbon atoms, where n is 1-20 (e.g., 1, 2, 3, 4, 5, 6, 7, 8, 9, 10, 11, 12, 13, 14, 15, 16, 17, 18, 19, or 20); and $R_{110}$, $R_{111}$, $R_{112}$ and $R_{200}$ are each independently H, Me, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbon atoms, or a moiety represented by -L-P;

wherein P is a polymer moiety or a polymerizable group and L is null or a linker, provided that when X is nitrogen, then $R_{11}$, $R_{16}$, $R_{21}$, and $R_{26}$ are each independently a lone pair or as defined above.

In some embodiments, X is carbon. In some embodiments, X is nitrogen, and $R_{11}$, $R_{16}$, $R_{21}$, and $R_{26}$ are each independently a lone pair. In some embodiments, X is nitrogen, and $R_{11}$, $R_{16}$, $R_{21}$, and $R_{26}$ are each independently a Me.

In some embodiments, each of $R_1$ through $R_8$ is independently H, Cl, Br, F, I, Me, a straight alkyl chain having 2-20 (e.g., 2, 3, 4, 5, 6, 7, 8, 9, 10, 11, 12, 13, 14, 15, 16, 17, 18, 19, or 20) carbon atoms, or a branched alkyl having 2-20 (e.g., 2, 3, 4, 5, 6, 7, 8, 9, 10, 11, 12, 13, 14, 15, 16, 17, 18, 19, or 20) carbons. In some embodiments, each of $R_1$ through $R_8$ is H. In some embodiments, each of $R_1$ through $R_8$ is independently H, Cl, Br, F, a straight alkyl chain having 2-20 (e.g., 2, 3, 4, 5, 6, 7, 8, 9, 10, 11, 12, 13, 14, 15, 16, 17, 18, 19, or 20) carbon atoms, or a branched alkyl having 2-20 (e.g., 2, 3, 4, 5, 6, 7, 8, 9, 10, 11, 12, 13, 14, 15, 16, 17, 18, 19, or 20) carbons.

In some embodiments, each of $R_9$ through $R_{28}$ is independently H, F, Br, Cl, I, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, or amide. In some embodiments, each of $R_9$ to $R_{28}$ is independently H, F, Br, $CH_3$, ethyl, propyl, isopropyl, butyl, isobutyl, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, or amide. In some embodiments, each of $R_{11}$, $R_{16}$, $R_{21}$, and $R_{26}$ is Cl. In some embodiments, each of $R_{11}$, $R_{16}$, $R_{21}$, and $R_{26}$ is independently a $O—R_{200}$ (e.g., OH, OMe, OEt, etc.).

In some embodiments, each of $R_{11}$, $R_{16}$, $R_{21}$, and $R_{26}$ is independently a straight chain or a branched alkyl having 2-20 carbons (e.g., tert-butyl). In some embodiments, each of $R_{11}$, $R_{16}$, $R_{21}$, and $R_{26}$ is a sulfonic acid. In some embodiments, each of $R_{11}$, $R_{16}$, $R_{21}$, and $R_{26}$ is Br. In some embodiments, each of $R_{11}$, $R_{16}$, $R_{21}$, and $R_{26}$ is COOH. In some embodiments, one of $R_{11}$ and $R_{21}$ is NH$_2$ and the other of $R_{11}$ and $R_{21}$ is COOH. In some embodiments, each of $R_9$ through $R_{28}$ is F. In some embodiments, each of $R_{10}$, $R_{12}$, $R_{15}$, $R_{17}$, $R_{20}$, $R_{22}$, $R_{25}$ and $R_{27}$ is a straight chain or a branched alkyl having 2-20 carbons (e.g., tert-butyl). In some embodiments, $R_{11}$ is —$R_{100}$—N($R_{110}R_{111}$) (e.g., N($R_{110}R_{111}$), e.g., NH$_2$). In some embodiments, $R_{11}$ and $R_{21}$ are each independently —$R_{100}$—N($R_{110}R_{111}$) (e.g., N($R_{110}R_{111}$), e.g., NH$_2$) and $R_{16}$ and $R_{26}$ are each COOH.

In some embodiments, two of adjacent $R_9$ to $R_{28}$ form a ring. For example, $R_9$ and $R_{10}$ (and/or any other two adjacent $R_9$-$R_{28}$ groups, e.g., $R_{10}$ and $R_{11}$, $R_{11}$ and $R_{12}$, $R_{12}$ and $R_{13}$, $R_{14}$ and $R_{15}$, $R_{15}$ and $R_{16}$, $R_{16}$ and $R_{17}$, $R_{17}$ and $R_{18}$, $R_{19}$ and $R_{20}$, $R_{20}$ and $R_{21}$, $R_{21}$ and $R_{22}$, $R_{22}$ and $R_{23}$, $R_{24}$ and $R_{25}$, $R_{25}$ and $R_{26}$, $R_{26}$ and $R_{27}$, $R_{27}$ and $R_{28}$ etc.) together with the phenyl ring (or pyridine ring if X is nitrogen) they are attached to can form a bicyclic aromatic ring, e.g., a naphthyl ring, a quinoline ring, or an isoquinoline ring. In some embodiments, $R_{11}$ and $R_{12}$, $R_{15}$ and $R_{16}$, $R_{20}$ and $R_{21}$, and $R_{25}$ and $R_{26}$ together with their respective phenyl ring they are attached to can form a naphthyl ring, see e.g., Formula I-7. In some embodiments, $R_9$ and $R_{10}$, $R_{14}$ and $R_{15}$, $R_{19}$ and $R_{20}$, and $R_{24}$ and $R_{25}$ together with the respective phenyl ring they are attached to can form a naphthyl ring, see e.g., Formula I-15. In some embodiments, $R_{10}$ and $R_{11}$, $R_{16}$ and $R_{17}$, $R_{20}$ and $R_{21}$, and $R_{25}$ and $R_{26}$ together with the respective phenyl ring they are attached to can form a quinoline ring, see e.g., Formula I-9. In some embodiments, the quinoline is an N-methylated quinoline salt:

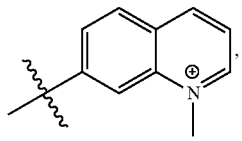 [SMILES: *c1ccc2ccc[n+](C)c2c1]

which is optionally substituted.

In one embodiment, the Cu-porphyrin compound has a structure according to Formulae I-1 to I-16:

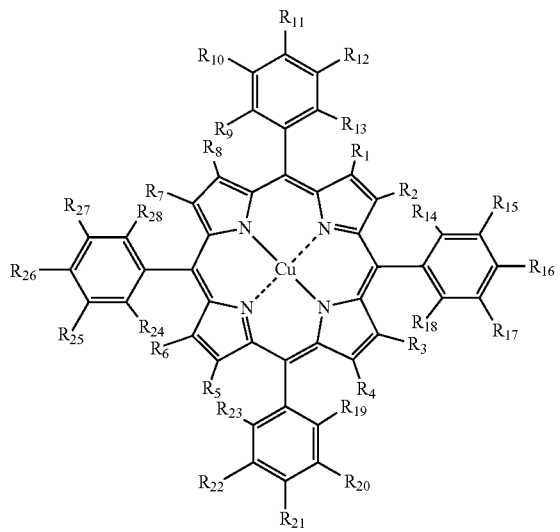

(Formula I-1)

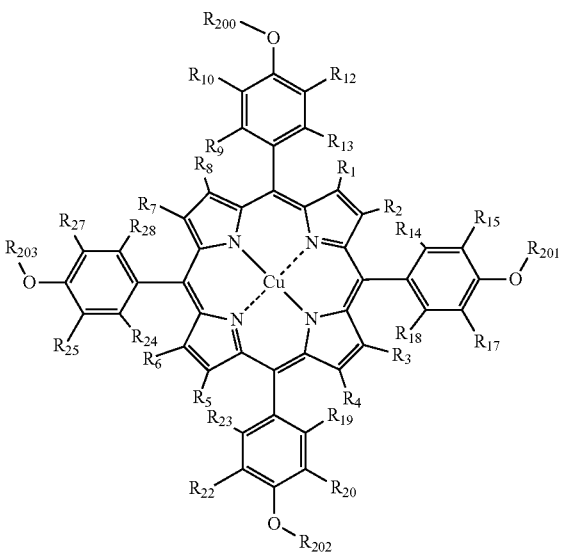

(Formula I-2)

(Formula I-3)

(Formula I-4)
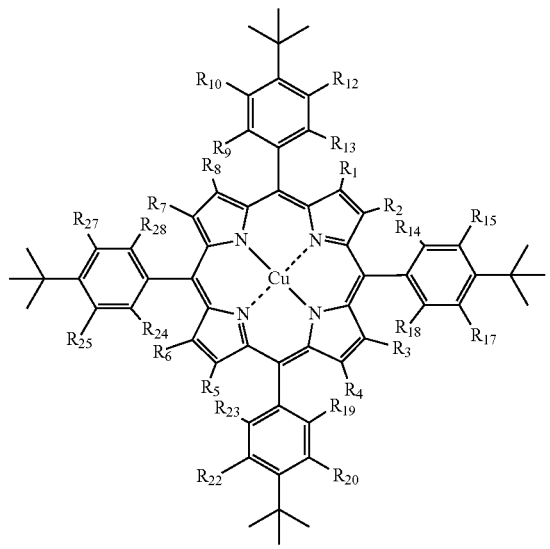
(Formula I-5)
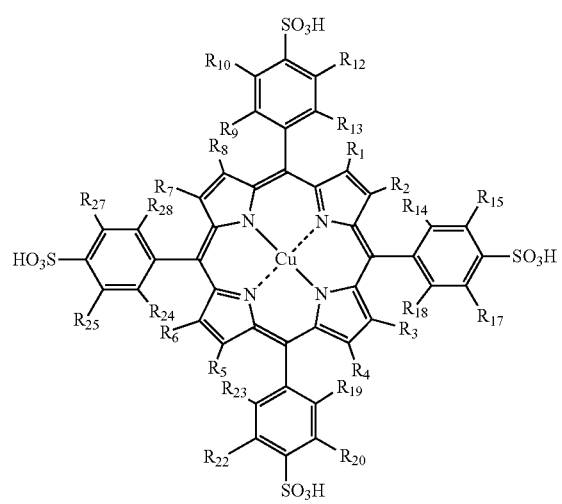
(Formula I-6)
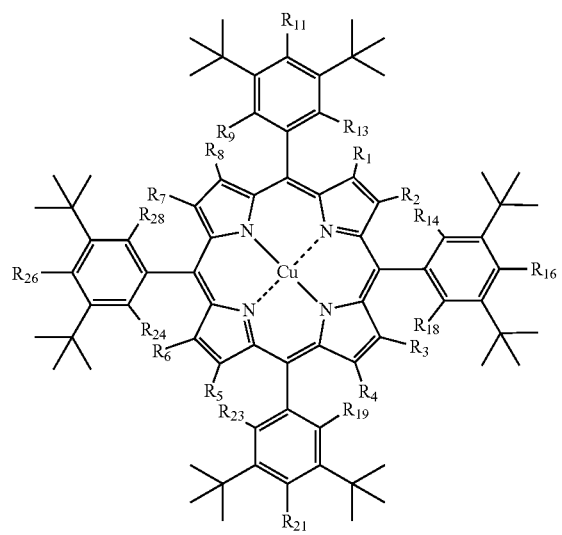
(Formula I-7)
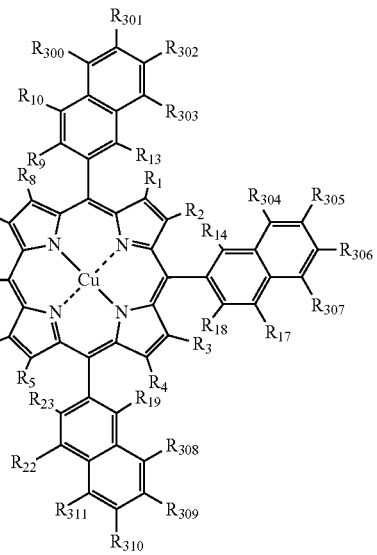
(Formula I-8)
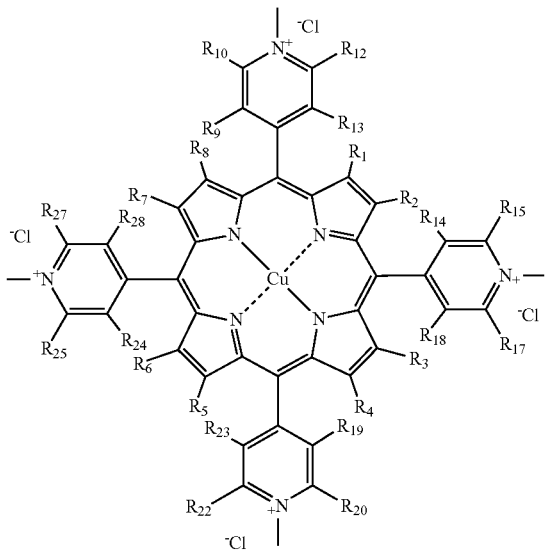
(Formula I-9)
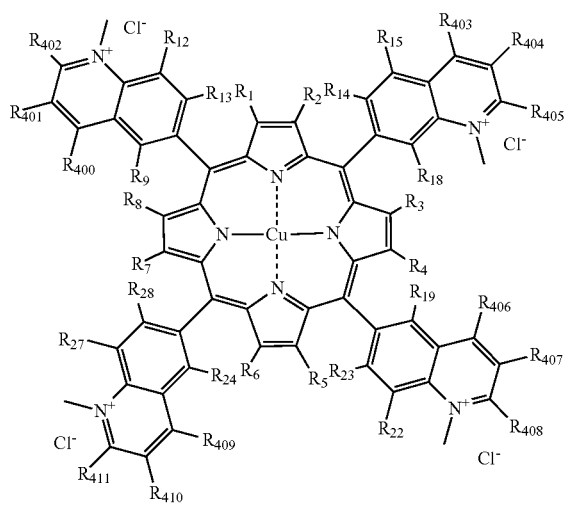

(Formula I-10)
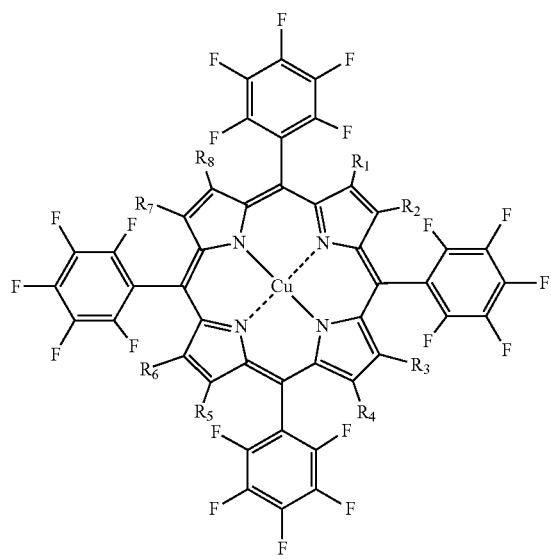
(Formula I-12)
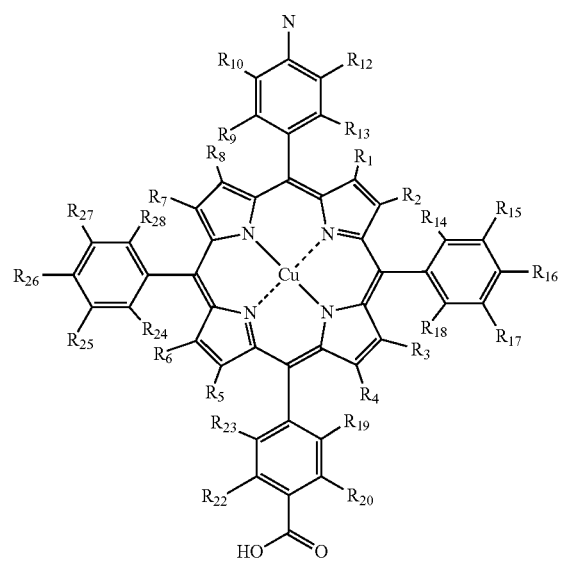
(Formula I-11)
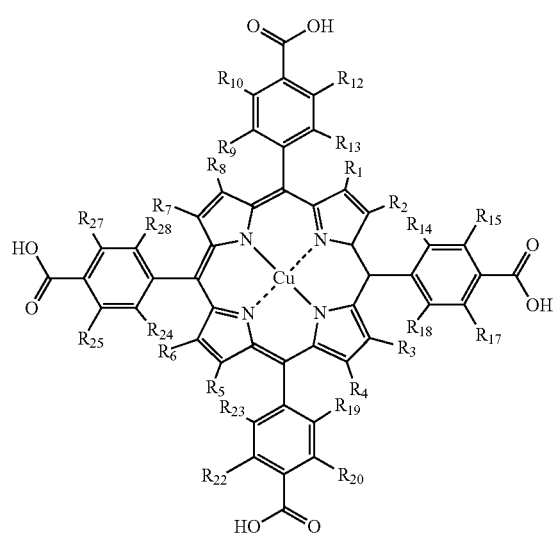
(Formula I-13)
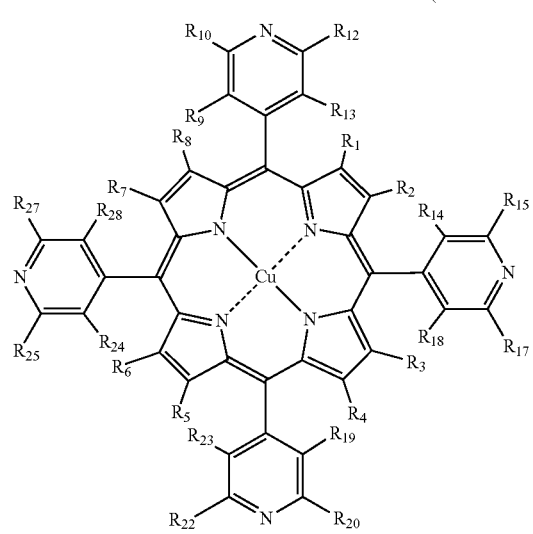

(Formula I-14)

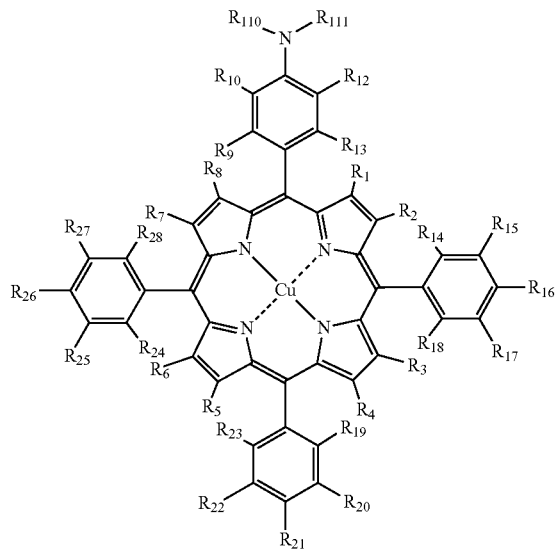

(Formula I-15)

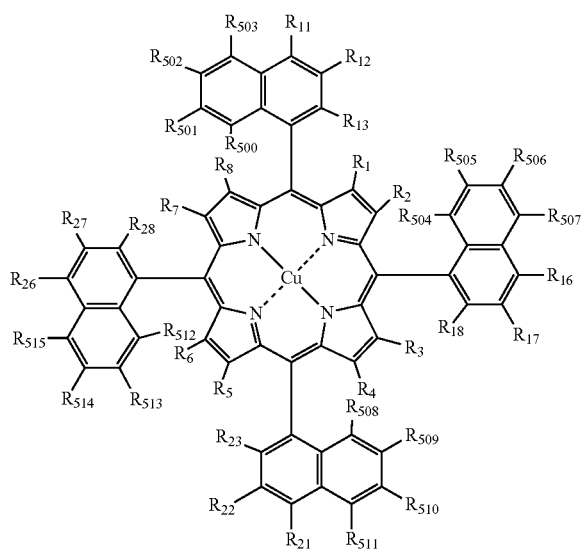

(Formula I-16)

or a salt, or a tautomeric form thereof, wherein $R_1$ through $R_{28}$, $R_{110}$, $R_{111}$, $R_{120}$, $R_{121}$, $R_{200}$-$R_{203}$, $R_{300}$-$R_{315}$, $R_{400}$-$R_{411}$, $R_{500}$-$R_{515}$ are described herein.

In some embodiments, each of $R_1$ through $R_8$ is independently H, Cl, Br, F, methyl, ethyl, propyl, isopropyl, or a moiety represented by -L-P. In some embodiments, each of $R_9$ to $R_{28}$, $R_{300}$-$R_{315}$, $R_{400}$-$R_{411}$, $R_{500}$-$R_{515}$ is independently H, F, Br, $CH_3$, ethyl, propyl, isopropyl, butyl, isobutyl, carboxylic acid, a carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein. In some embodiments, $R_{100}$ is a bond, —$(CH_2)_n$—, or a branched alkyl having 2-20 (e.g., 2, 3, 4, 5, 6, 7, 8, 9, 10, 11, 12, 13, 14, 15, 16, 17, 18, 19, or 20) carbon atoms, where n is 1-20 (e.g., 1, 2, 3, 4, 5, 6, 7, 8, 9, 10, 11, 12, 13, 14, 15, 16, 17, 18, 19, or 20). In some embodiments, $R_{110}$, $R_{111}$, $R_{120}$, $R_{121}$, $R_{200}$-$R_{203}$ are each independently H, Me, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbon atoms, or a moiety represented by -L-P.

In one embodiment, the Cu-porphyrin compound has the structure according to Formula I-1:

(Formula I-1)

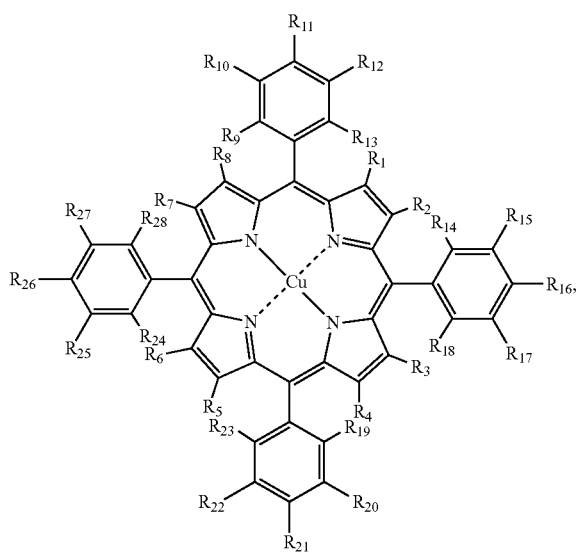

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{100}R_{111}$), —$R_{100}$—N$^+$ ($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-3:

(Formula I-3)

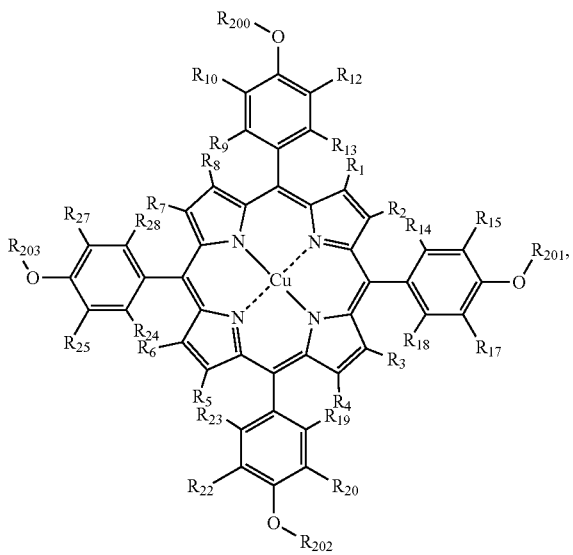

or a salt, or a tautomeric form thereof, wherein $R_1$ through $R_{28}$ and $R_{200}$-$R_{203}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$ ($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein. In some embodiments, $R_{200}$-$R_{203}$ are each independently H, Me, a straight alkyl chain having 2-20 (e.g., 2, 3, 4, 5, 6, 7, 8, 9, 10, 11, 12, 13, 14, 15, 16, 17, 18, 19, or 20) carbon atoms, or a branched alkyl having 2-20 (e.g., 2, 3, 4, 5, 6, 7, 8, 9, 10, 11, 12, 13, 14, 15, 16, 17, 18, 19, or 20) carbon atoms.

In one embodiment, the Cu-porphyrin compound has the structure according to Formula I-4:

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$ ($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-2:

(Formula I-2)

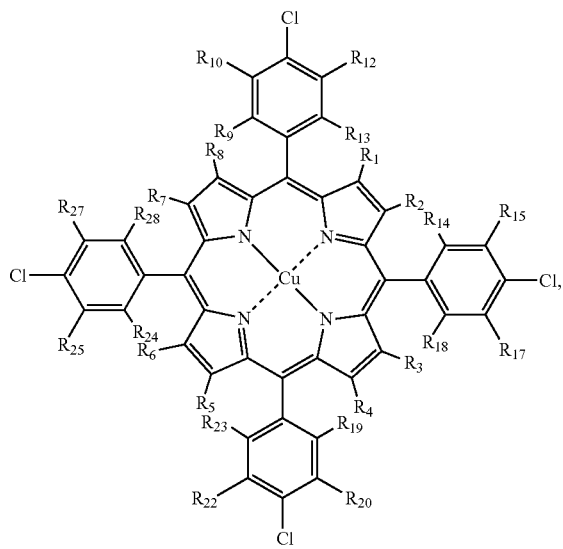

(Formula I-4)

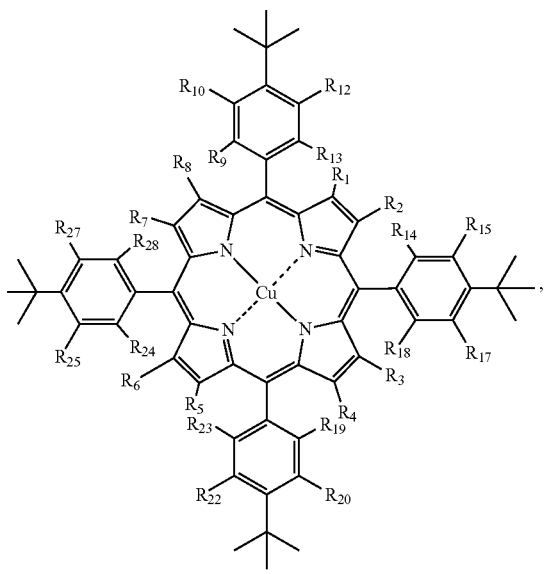

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-5:

(Formula I-5)

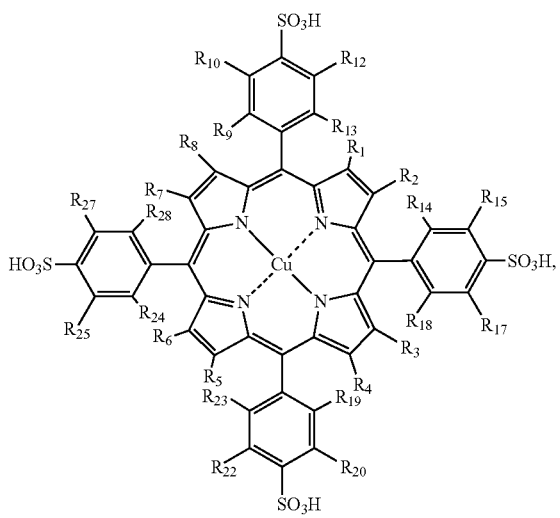

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-6:

(Formula I-6)

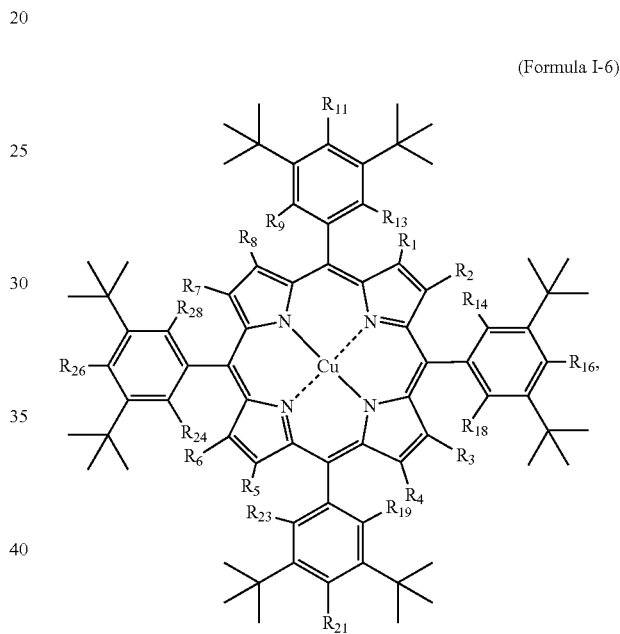

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-7:

(Formula I-7)

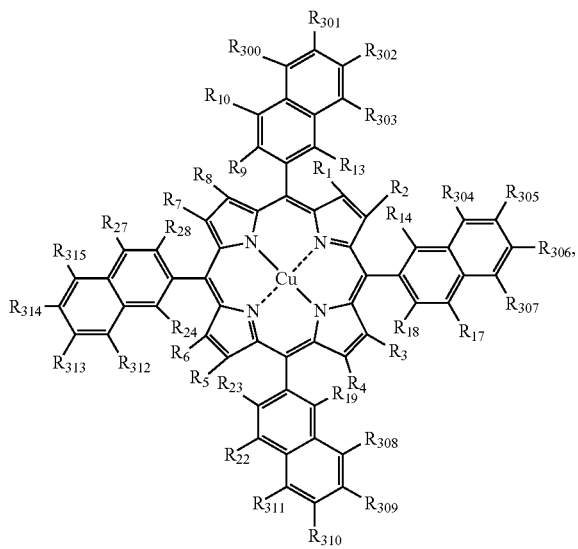

or a salt, or a tautomeric form thereof, wherein $R_1$ through $R_{28}$ and $R_{300}$-$R_{315}$ are described herein.

In some embodiments, $R_9$ through $R_{28}$ and $R_{300}$-$R_{315}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-8:

(Formula I-8)

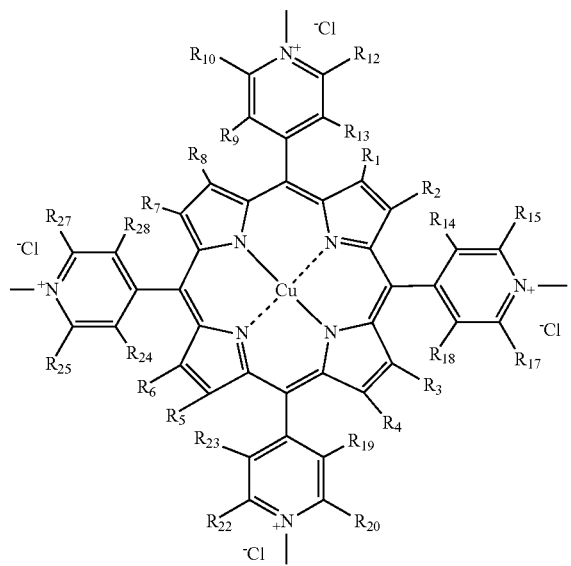

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-9:

(Formula I-9)

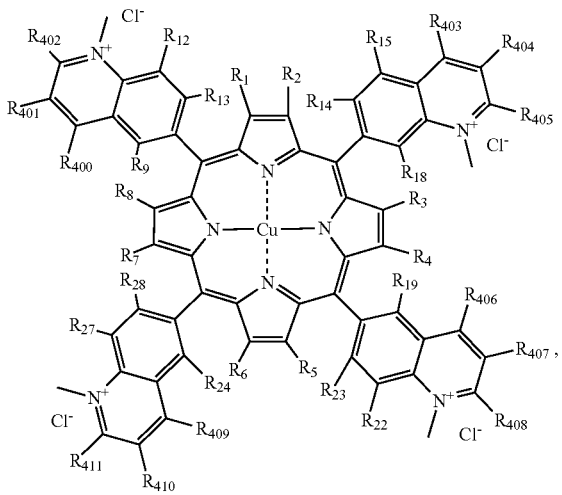

or a salt, or a tautomeric form thereof, wherein $R_1$ through $R_{28}$ and $R_{400}$-$R_{411}$ are described herein.

In some embodiments, $R_9$ through $R_{28}$ and $R_{400}$-$R_{411}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-10:

(Formula I-10)

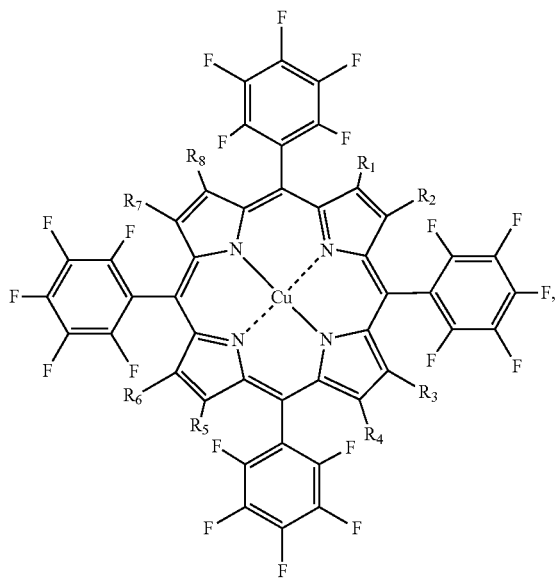

or a salt, or a tautomeric form thereof, wherein $R_1$ through $R_8$ are described herein.

In one embodiment, the Cu-porphyrin compound has the structure according to Formula I-11:

Formula I-11

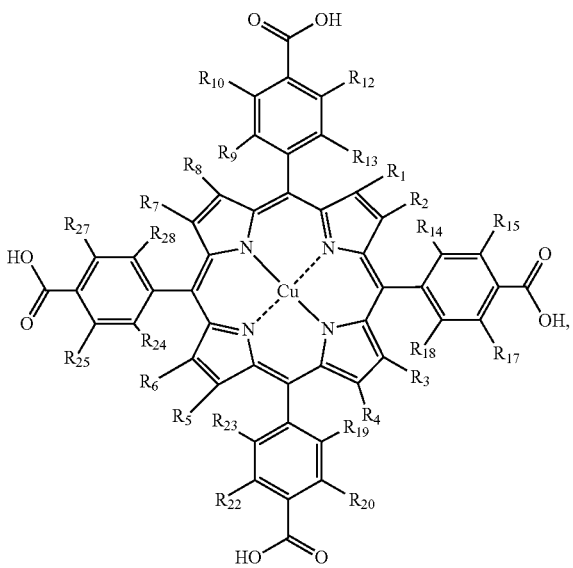

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-12:

(Formula I-12)

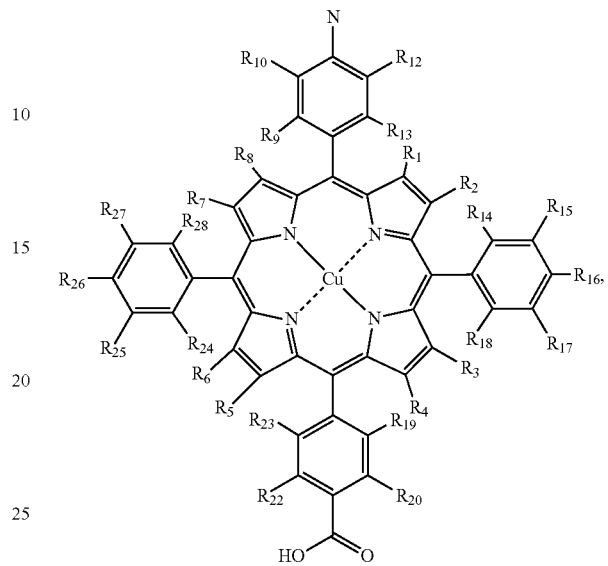

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-13:

(Formula I-13)

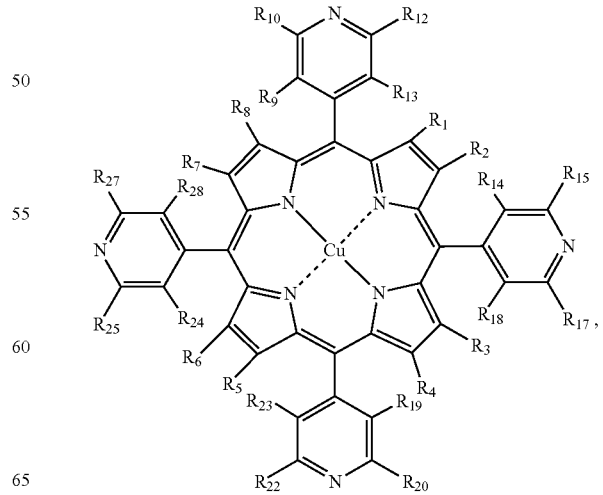

or a salt, or a tautomeric form thereof, wherein $R_1$ through $R_{28}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-14:

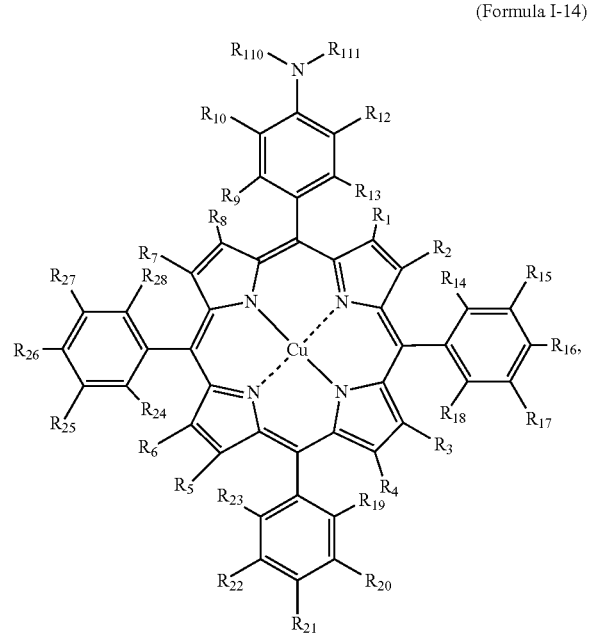

(Formula I-14)

or a salt, or a tautomeric form thereof, wherein $R_1$ through $R_{28}$, $R_{110}$ and $R_{111}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-15:

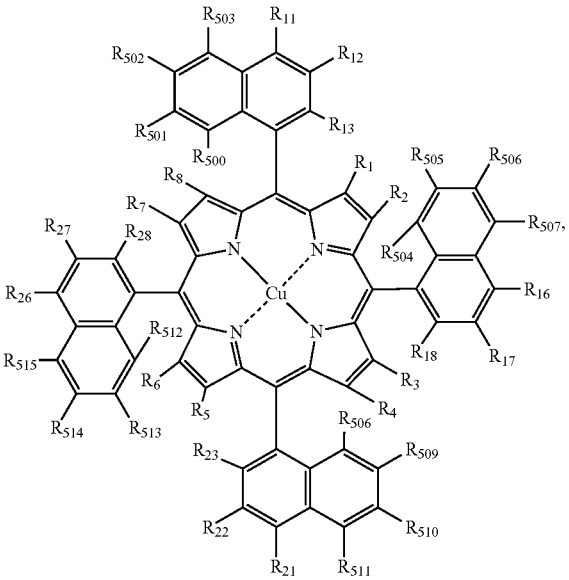

(Formula I-15)

or a salt, or a tautomeric form thereof, wherein $R_1$ through $R_{28}$ and $R_{500}$-$R_{515}$ are described herein.

In some embodiments, $R_9$ through $R_{28}$ and $R_{500}$-$R_{515}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein.

In one embodiment, the Cu-porphyrin compound has the structure according to Formula I-16:

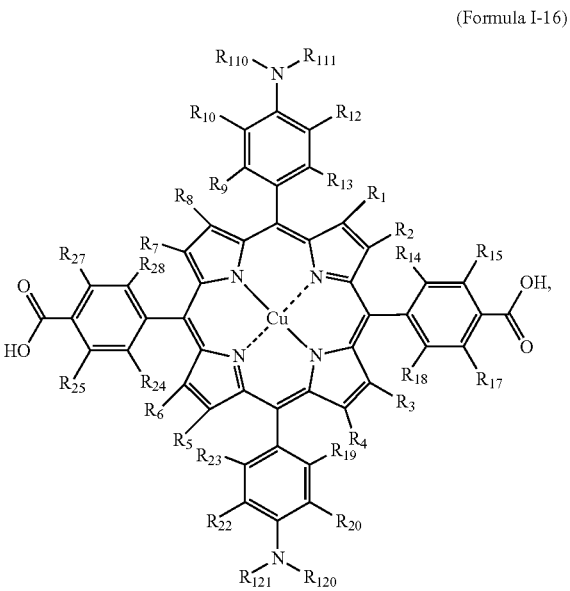

(Formula I-16)

or a salt, or a tautomeric form thereof, wherein $R_1$ through $R_{28}$, $R_{110}$, $R_{111}$, $R_{120}$, and $R_{121}$ are described herein.

In some embodiments, $R_9$ through $R_{28}$ are independently H, F, Br, $CH_3$, a straight alkyl chain having 2-20 (e.g., 2, 3, 4, 5, 6, 7, 8, 9, 10, 11, 12, 13, 14, 15, 16, 17, 18, 19, or 20) carbon atoms, a branched alkyl having 2-20 (e.g., 2, 3, 4, 5, 6, 7, 8, 9, 10, 11, 12, 13, 14, 15, 16, 17, 18, 19, or 20) carbons, carboxylic acid, carboxylic ester, —$R_{100}$—OH, —O—$R_{200}$, —$R_{100}$—N($R_{110}R_{111}$), —$R_{100}$—N$^+$($R_{110}R_{111}R_{112}$), an aryl, a heteroaryl, acrylate, acryloyl, acrylamide, methacrylate, methacrylamide, thiol, amide, or a moiety represented by -L-P. In some embodiments, two of adjacent $R_9$ to $R_{28}$ form aromatic or non-aromatic ring structure, e.g., as described herein. In some embodiments, $R_{110}$, $R_{111}$, $R_{120}$, and $R_{121}$ are each independently H, Me, a straight alkyl chain having 2-20 (e.g., 2, 3, 4, 5, 6, 7, 8, 9, 10, 11, 12, 13, 14, 15, 16, 17, 18, 19, or 20) carbon atoms, or a branched alkyl having 2-20 (e.g., 2, 3, 4, 5, 6, 7, 8, 9, 10, 11, 12, 13, 14, 15, 16, 17, 18, 19, or 20) carbon atoms.

Cu-porphyrin compounds that can be used in the optical filter of the first system include any of the previously discussed Cu-porphyrin compounds (e.g., any of the compounds according to Formula I and Formulae I-1 to I-16). In one embodiment, the Cu-porphyrin compound has a structure according to any of Formula I and Formulae I-1 to I-16, wherein each of $R_1$ through $R_{28}$, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ discussed above is H. In some embodiments, the Cu-porphyrin compound has a structure of Formula I, wherein X is nitrogen, and each of $R_1$ through $R_{28}$ is H, except that $R_{11}$, $R_{16}$, $R_{21}$, and $R_{26}$ are each a lone pair. In other words, these Cu-porphyrin compounds are not further substituted beyond what's shown in Formula I and Formulae I-1 to I-16, all respective R groups in the formulae are either H or a lone pair.

Various methods can be used to prepare the Cu-porphyrin compounds disclosed herein. By example only, several Cu-porphyrin compounds are given below along with their chemical structures, their UV-vis absorption peaks in solution, and exemplary synthetic procedures that can be used to make them:

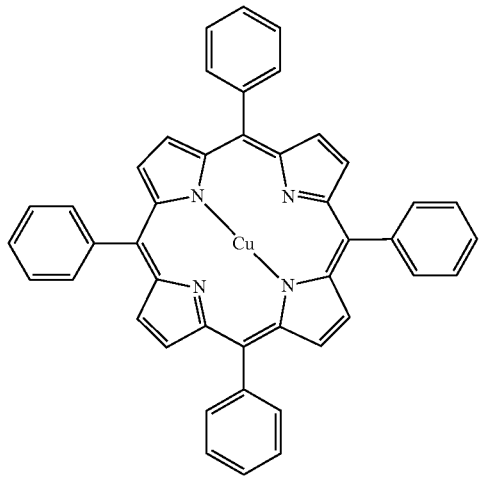

FS-201

Cu(II) meso-Tetraphenylporphine can be synthesized from meso-tetraphenylporphine using the procedure described in Inorganic Chemistry Communications, 14(9), 1311-1313; 2011. UV-vis ($CH_2Cl_2$): 572, 538, 414.

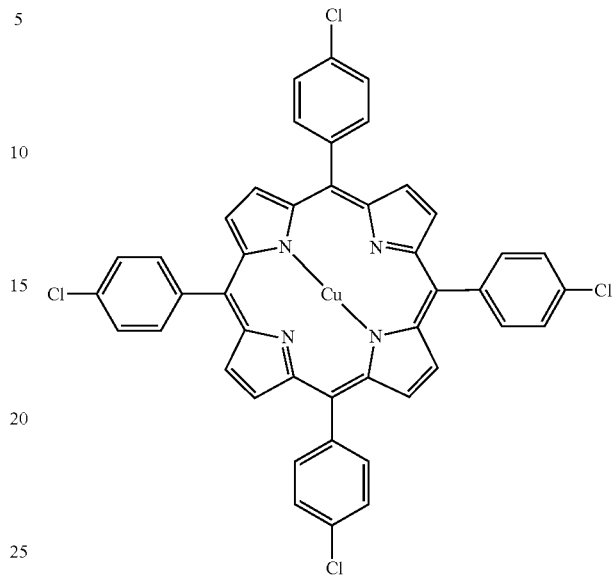

FS-202

Cu(II) meso-Tetra(4-chlorophenyl) porphine can be synthesized from meso-Tetra(4-chlorophenyl) porphine using the procedure described in Journal of Porphyrins and Phthalocyanines, 11(2), 77-84; 2007. UV-vis ($CH_2Cl_2$): 538, 415.

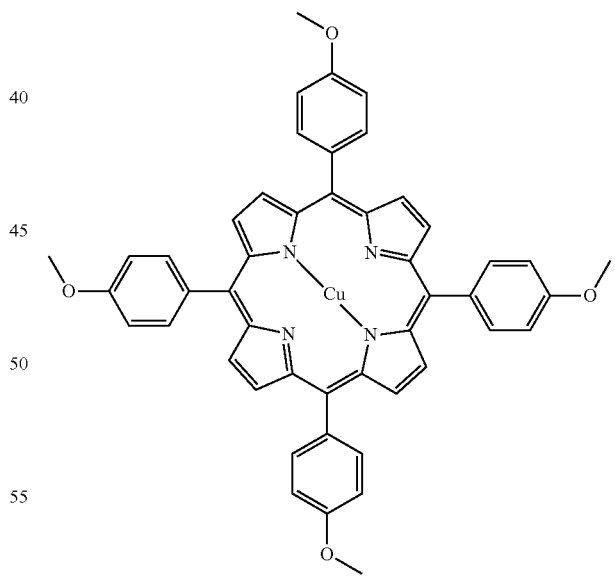

FS-203

Cu(II) meso-Tetra(4-methoxyphenyl) porphine can be synthesized from meso-Tetra(4-methoxyphenyl) porphine using the procedure described in Bioorganic & Medicinal Chemistry Letters, 16(11), 3030-3033; 2006. UV-vis ($CH_2Cl_2$): 578, 541, 419.

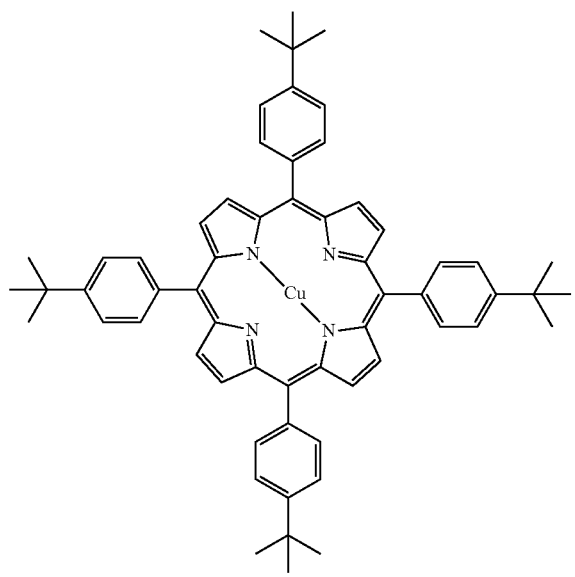

FS-204

Cu(II) meso-Tetra(4-tert-butylphenyl) porphine can be synthesized from meso-Tetra(4-tert-butylphenyl) porphine using the procedure described in Journal of Organometallic Chemistry, 689(6), 1078-1084; 2004. UV-vis ($CH_2Cl_2$): 541, 504, 418.

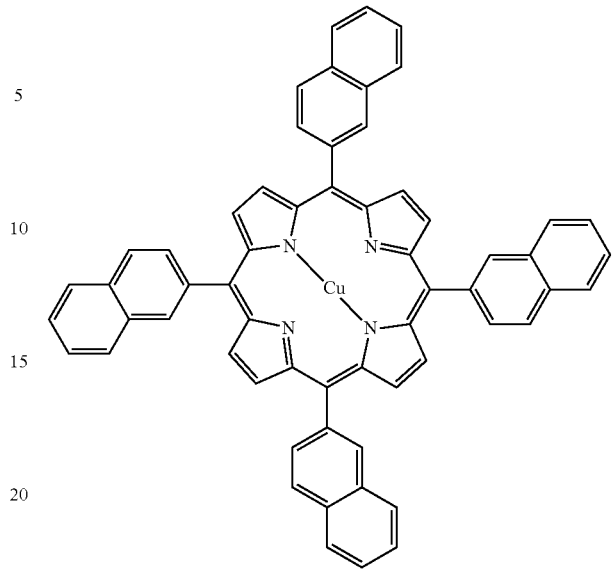

FS-206

Cu(II) meso-Tetra(2-naphthyl) porphine can be synthesized from meso-Tetra(4-chlorophenyl) porphine using the procedure described in Polyhedron, 24(5), 679-684; 2005. UV-vis ($CH_2Cl_2$): 541, 420.

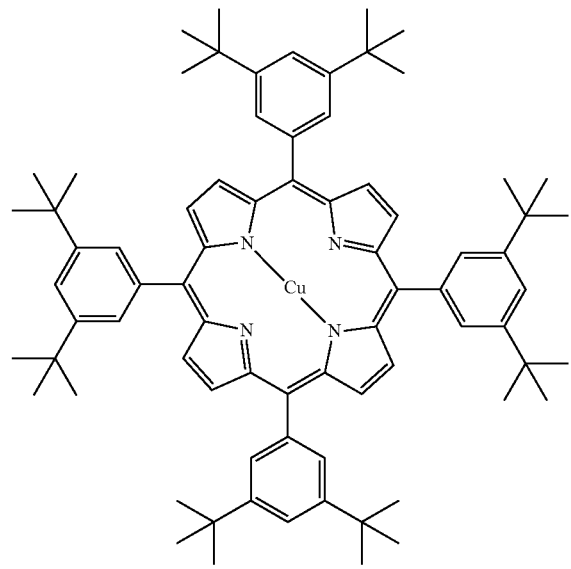

FS-205

Cu(II) meso-Tetra(3,5-di-tert-butylphenyl) porphine can be synthesized from meso-Tetra(3,5-di-tert-butylphenyl) porphine using the procedure described in Journal of Organometallic Chemistry, 689(6), 1078-1084; 2004. UV-vis ($CH_2Cl_2$): 575, 540, 501, 418.

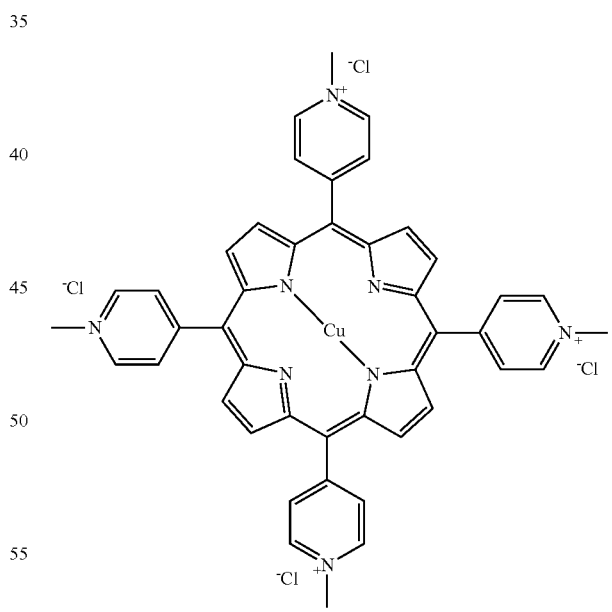

FS-207

Cu(II) meso-Tetra(N-methyl-4-pyridyl) porphine tetrachloride can be synthesized from meso-Tetra(N-methyl-4-pyridyl) porphine tetrachloride using the procedure described in Journal of Porphyrins and Phthalocyanines, 11(8), 549-555; 2007. UV-vis (1N HCl): 550, 430.

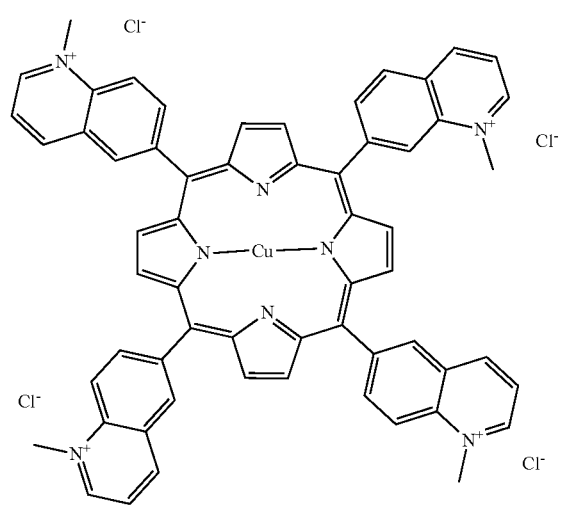
FS-208
Cu(II) meso-Tetra(N-Methyl-6-quinolinyl) porphine tetrachloride can be synthesized from meso-Tetra(N-Methyl-6-quinolinyl) porphine tetrachloride using the procedure described in Polyhedron Vol. 9, No. 20, 2527-2531; 1990. UV-vis (CH$_2$Cl$_2$): 572, 538, 414.
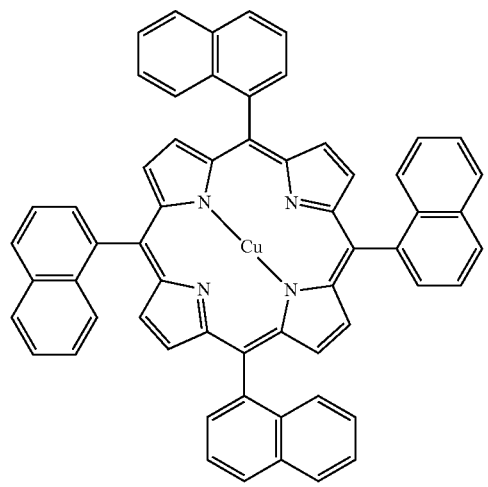
FS-209: Cu(II) meso-Tetra(1-naphthyl)porphine
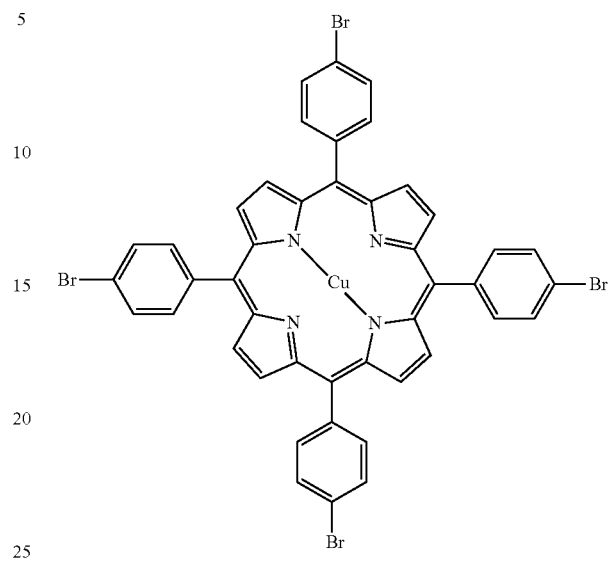
FS-210: Cu(II) meso-Tetra(4-bromophenyl)porphine
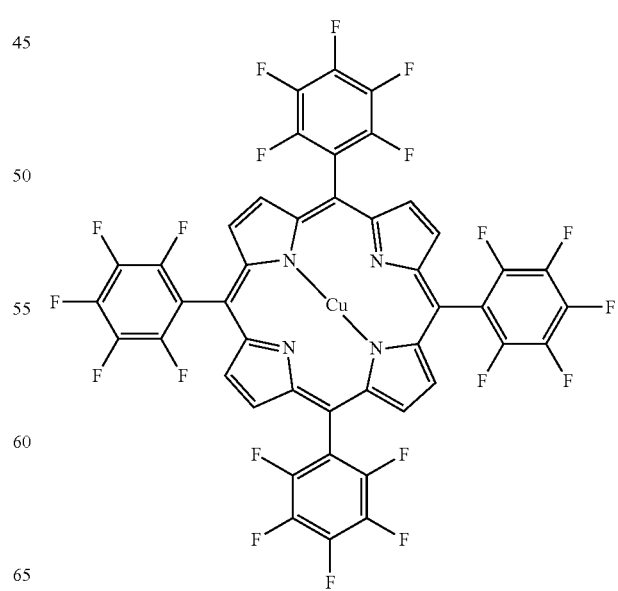

Cu1: Cu(II) meso-Tetra(pentafluorophenyl) porphine

Cu3: Cu(II) meso-Tetra(N-methyl-4-pyridyl) porphine tetra acetate

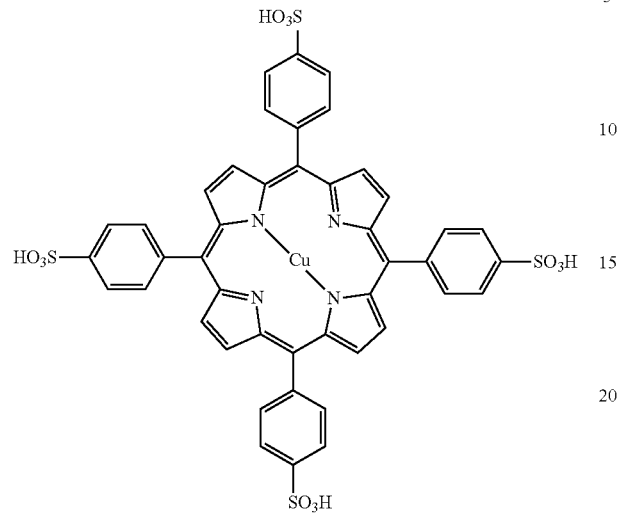

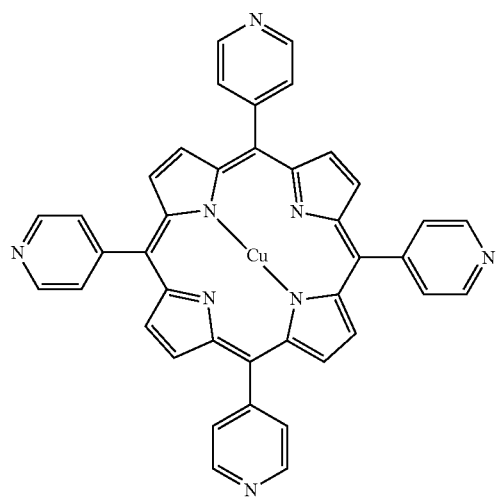

Cu4: Cu(II) meso-Tetra(4-pyridyl) porphine

Cu2: Cu(II) meso-Tetra(4-sulfonatophenyl) porphine (acid form)

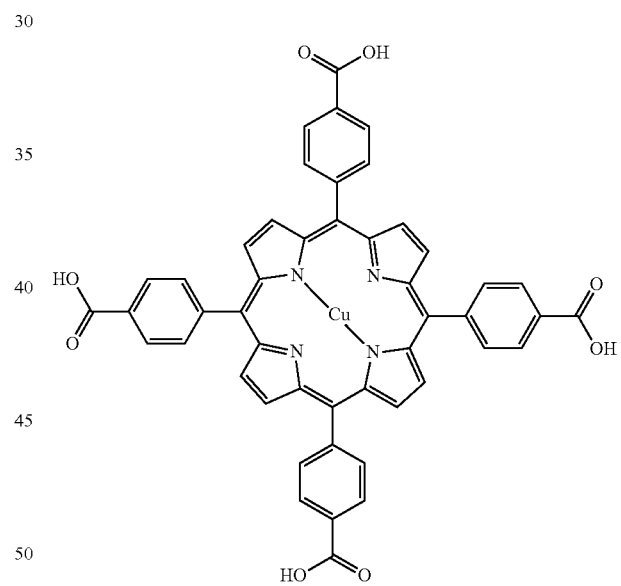

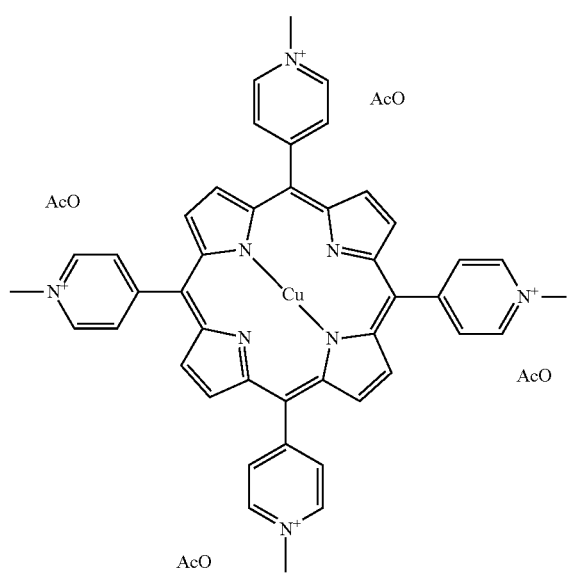

Cu5: Cu(II) meso-Tetra(4-carboxyphenyl)porphine

As described herein, useful Cu-porphyrin compounds also include compounds of Formula I and Formulae I-1 to I-16, where not all the respective R groups in the formulae are H or a lone pair. In other words, these Cu-porphyrin compounds are further substituted with one or more various groups (e.g., various R groups described herein). In some embodiments, these further substituted Cu-porphyrin compounds have a desired filtering ability. One way determine whether or not a compound has a desired filtering ability, one can measure the transmission spectrum of the compound or of a system that incorporates that specific compound.

Additionally, other values, such as delta E, delta chroma, and similar values, as discussed elsewhere herein, may also be used.

In one embodiment, the Cu-porphyrin compounds of Formula I and Formulae I-1 to I-16 are not a polymer or otherwise attached to a polymer. In some embodiments, each of $R_1$ through $R_8$ is independently H, Cl, Br, F, I, $CH_3$, a straight alkyl chain having 2-20 carbon atoms, or a branched alkyl having 2-20 carbons. In some embodiments, each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $-R_{100}-OH$, $-O-R_{200}$, $-R_{100}-N(R_{110}R_{111})$, $-R_{100}-N^+(R_{110}R_{111}R_{112})$, an aryl, a heteroaryl, acrylate, acryloyl, acrylamide, methacrylate, methacrylamide, thiol, or amide. In some embodiments, $R_{100}$ is a bond, $-(CH_2)_n-$, or a branched alkyl having 2-20 carbon atoms, wherein n is 1-20; and $R_{110}$, $R_{111}$, $R_{112}$ and $R_{200}$ are each independently H, Me, a straight alkyl chain having 2-20 carbon atoms, or a branched alkyl having 2-20 carbon atoms. In some embodiments, two of adjacent $R_9$ to $R_{28}$ form aromatic or non-aromatic ring structure, e.g., as described herein.

In one embodiment, the Cu-porphyrin compounds of Formula I and Formulae I-1 to I-16 contain one or more polymerizable groups. The addition of these polymerizable groups (including, but not limited to a polymerizable group, such as acrylate, methacrylate, acrylamide, methacrylamide, amines, amides, thiols, carboxylic acids, etc.) can be used to functionalize the optical filter and make it polymerizable by, e.g., free-radical polymerization. These polymerizable groups can be attached to already existing pendants to the porphyrin ring, or directly to the porphyrin ring. Reactive porphyrin will enable chemical bonding to a polymer matrix, where they are dispersed, by means of UV light, e-beam, heat and/or their combination.

In one embodiment, at least one of $R_1$ to $R_{28}$, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ in Formula I and Formulae I-1 to I-16 is an -L-P. When there are more than one -L-P, each -L-P can be the same or different. In one embodiment, 1-8 (e.g., 1, 2, 3, 4, 5, 6, 7, or 8) of $R_1$ to $R_{28}$, $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ are -L-P. Each -L-P can be the same or different. In some embodiments, there is only one -L-P in a structure according to Formula I and Formulae I-1 to I-16. In some embodiments, there are two -L-P in a structure according to Formula I and Formulae I-1 to I-16. In some embodiments, one of $R_1$ to $R_8$ is an -L-P group. In some embodiments, one of $R_9$ to $R_{28}$ is an -L-P group. In some embodiments, one of $R_{110}$-$R_{112}$, $R_{120}$, $R_{121}$, $R_{200}$-$R_{203}$, $R_{300}$-$R_{315}$, $R_{400}$-$R_{411}$, $R_{500}$-$R_{515}$ is an -L-P group.

In one embodiment, P is a polymerizable group. Useful polymerizable groups include any of those known in the art. For example, the polymerizable group can be selected from the group consisting of acrylates, acryloyls, acrylamides, methacrylates, methacrylamides, carboxylic acids, thiols, amides, terminal or internal alkynyl groups, terminal or internal alkenyl groups, iodides, bromides, chlorides, azides, carboxylic esters, amines, alcohols, epoxides, isocyanates, aldehydes, acid chlorides, siloxanes, boronic acids, stannanes, and benzylic halides. Some of these groups are shown in FIG. 28A. In any of the embodiments described herein, the polymerizable group can have a total number of carbons less than 20 (e.g., less than 16, less than 12, less than 8, less than 4, less than 2, or have no carbon atoms). In some embodiments, the polymerizable group is COOH. In some embodiments, the polymerizable group is one of the following:

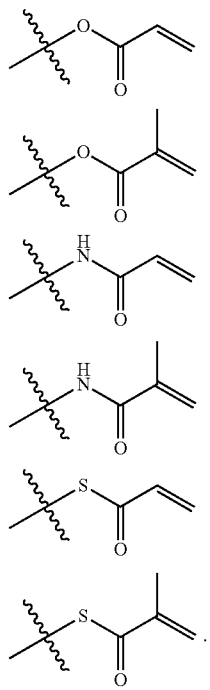

In some embodiments, the Cu-porphyrin compound has a structure, or is a homo- or co-polymer characterized by having a monomeric structure, according to Formula I-1,

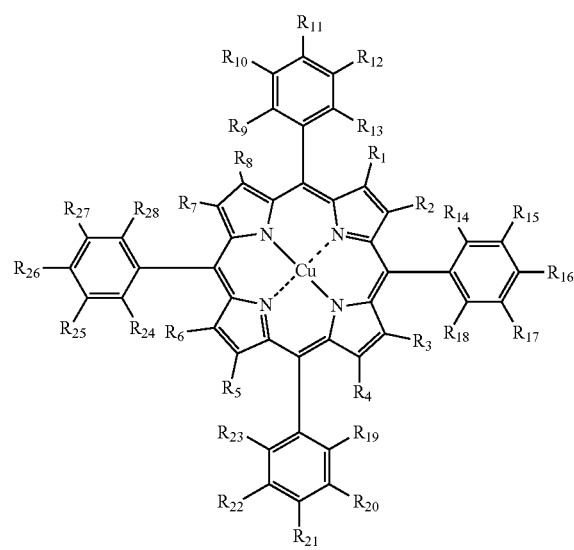

or a salt, or a tautomeric form thereof, wherein each of $R_1$ to $R_8$ is H, and each of $R_9$, $R_{10}$, $R_{12}$-$R_{15}$, $R_{17}$-$R_{20}$, $R_{22}$-$R_{25}$, $R_{27}$, and $R_{28}$ is F, and each of $R_{11}$, $R_{16}$, $R_{21}$, and $R_{26}$ is selected from the following:

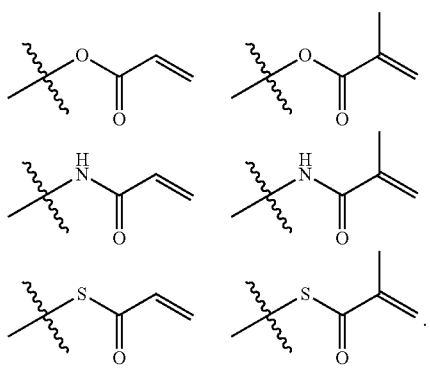

See also FIG. 28B. In some embodiments, $R_{11}$, $R_{16}$, $R_{21}$, and $R_{26}$ are the same.

In some embodiments, the Cu-porphyrin compound has a structure, or is a homo- or co-polymer characterized by having a monomeric structure, according to Formula I-15,

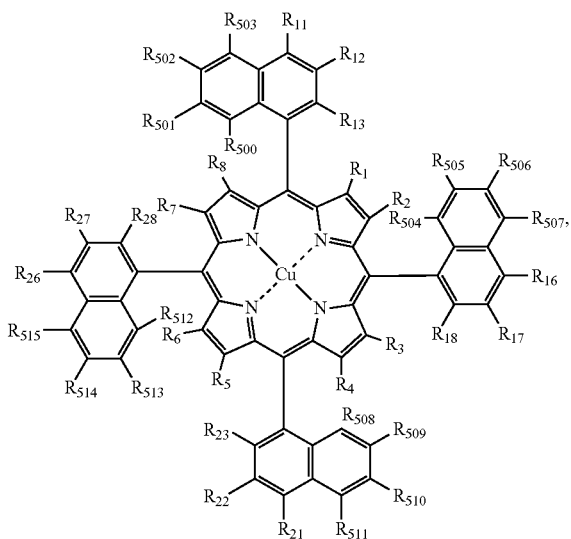

or a salt, or a tautomeric form thereof, wherein each of $R_1$ to $R_8$ is H, wherein each of $R_{11}$-$R_{13}$ and $R_{500}$-$R_{503}$, each of $R_{16}$-$R_{18}$ and $R_{504}$-$R_{507}$, each of $R_{21}$-$R_{23}$ and $R_{508}$-$R_{511}$, and each of $R_{26}$-$R_{28}$ and $R_{512}$-$R_{515}$ is independently H or selected from the following:

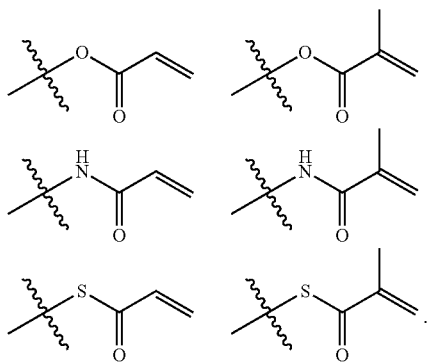

In some embodiments, the substitution pattern for the four naphthyl ring is the same, i.e., the corresponding R groups on the naphthyl rings are the same. In some embodiments, at least one of $R_{11}$-$R_{13}$ and $R_{500}$-$R_{503}$, at least one of $R_{16}$-$R_{18}$ and $R_{504}$-$R_{507}$, at least one of $R_{21}$-$R_{23}$ and $R_{508}$-$R_{511}$, and at least one of $R_{26}$-$R_{28}$ and $R_{512}$-$R_{515}$ is selected from the following:

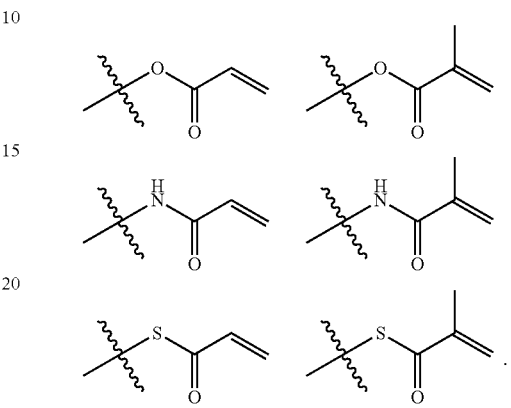

See FIG. 28C.

In some embodiments, the Cu-porphyrin compound has a structure according to Formula I-7,

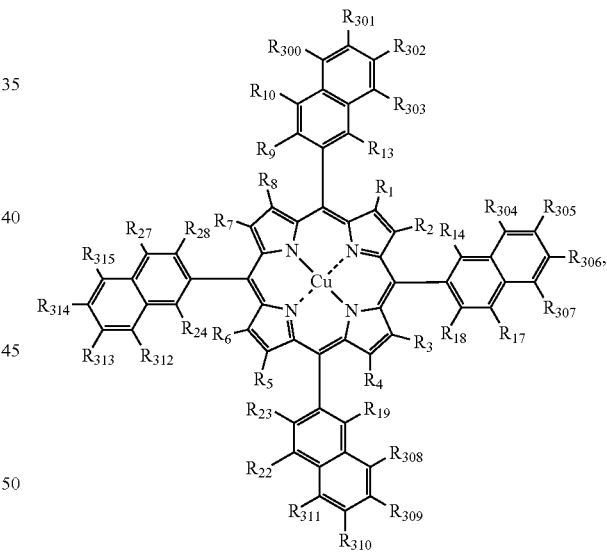

or a salt, or a tautomeric form thereof, wherein each of $R_1$ to $R_8$ is H, wherein each of $R_9$, $R_{10}$, $R_{13}$ and $R_{300}$-$R_{303}$, each of $R_{14}$, $R_{17}$, $R_{18}$ and $R_{304}$-$R_{307}$, each of $R_{19}$, $R_{22}$, $R_{23}$ and $R_{308}$-$R_{311}$, and each of $R_{24}$, $R_{27}$, $R_{28}$ and $R_{312}$-$R_{315}$ is independently H or selected from the following:

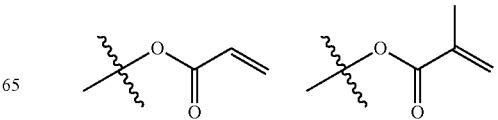

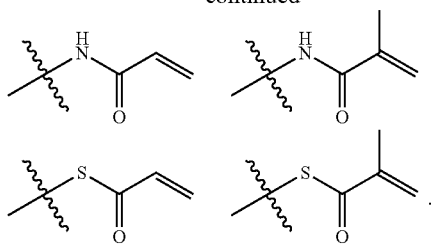

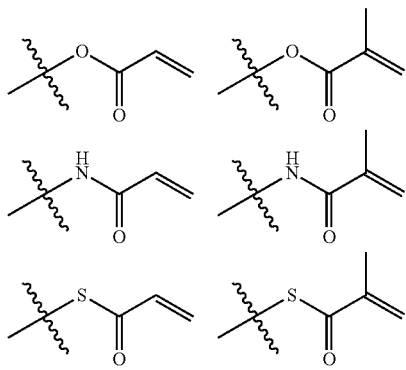

See FIG. 28D.

Polymeric forms of the Cu-porphyrin compounds described herein can be advantageous compared to the non-polymer Cu-porphyrin compounds. For example, the polymerizable optical filters will disperse (on a molecular level) and mix better into a polymer matrix than their non-polymerizable counterparts. These compounds are especially useful in applications where the filter is applied within the product and not as a coating. For instance, polymerizable absorptive dyes with acrylate functional groups are expected to be well-dispersed in acrylate-based matrix used for making contact lenses or intraocular lens (IOLs), due to the similar chemical structures between the dyes and the matrix. Polymerizable dyes added to the raw materials used for making Polyvinyl butyral (PVB), Polyurethane (PU), poly(Ethylene-vinyl acetate) (EVA) interlayer materials are expected to disperse better than their non-polymerizable parts. Another possibility is adding the polymerizable dye to the PVB, PU or EVA material before their extrusion into sheets/layers, where thermal polymerization of the dyes is expected to occur during the extrusion.

In one embodiment, P is a polymer moiety. The polymer moiety can be selected from biopolymers, polyvinyl alcohol, polyacrylates, polyamides, polyamines, polyepoxides, polyolefins, polyanhydrides, polyesters, and polyethyleneglycols. In some embodiments, P can be PVB, PU, or EVA.

In any of the embodiments described herein, L can be null or a linker. In some embodiments, L is null. In some embodiments, L is a linker. Useful linkers include any of those known in the art. For example, the linker can be —C(O)—, —O—, —O—C(O)O—, —C(O)CH$_2$CH$_2$C (O)—, —S—S—, —NR$^{130}$, —NR$^{130}$C(O)O—, —OC(O) NR$^{130}$, —NR$^{130}$C(O)—, —C(O)NR$^{130}$, —NR$^{130}$C(O) NR$^{130}$—, -alkylene-NR$^{130}$C(O)O—, -alkylene-NR$^{130}$C(O) NR$^{130}$—, -alkylene-OC(O)NR$^{130}$—, -alkylene-NR$^{130}$—, -alkylene-O—, -alkylene-NR$^{130}$C(O)—, -alkylene-C(O) NR$^{130}$—, —NR$^{130}$C(O)O-alkylene-, —NR$^{130}$C(O) NR$^{130}$alkylene-, —OC(O)NR$^{130}$-alkylene, —NR$^{130}$-alkylene-, —O-alkylene-, —NR$^{130}$C(O)-alkylene-, —C(O) NR$^{130}$-alkylene-, -alkylene-NR$^{130}$C(O)O-alkylene-, -alkylene-NR$^{130}$C(O)NR$^{130}$-alkylene-, -alkylene-OC(O) NR$^{130}$-alkylene-, -alkylene-NR$^{130}$-alkylene-, -alkylene-O-alkylene-, -alkylene-NR$^{130}$C(O)-alkylene-, —C(O)NR$^{130}$-alkylene-, where R$^{130}$ is hydrogen, or optionally substituted alkyl.

In some embodiments, the Cu-porphyrin compounds can be a homopolymer or a copolymer characterized by having a monomeric structure of Formula I(m):

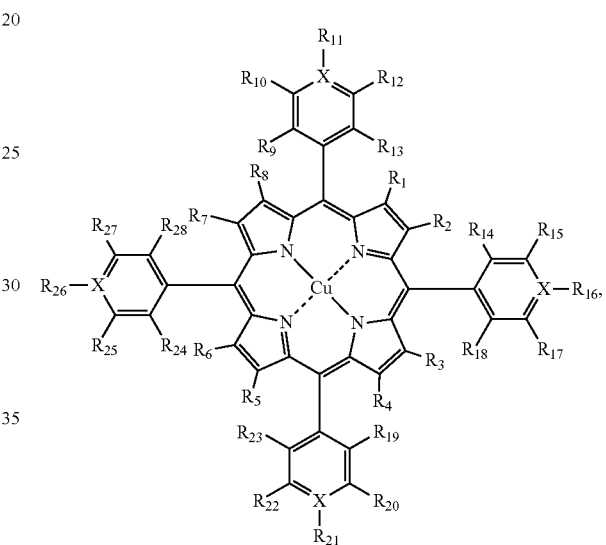

or a salt, or a tautomeric form thereof, wherein X and R$_1$ through R$_{28}$ are described herein, provided that there is 1-8 (e.g., 1, 2, 3, 4, 5, 6, 7, or 8) -Lm-Pm in Formula I(m) and each -Lm-Pm can be the same or different, wherein Pm is a polymerizable group and Lm is null or a linker. In some embodiments, one of R$_1$ to R$_8$ is an -Lm-Pm group. In some embodiments, one of R$_9$ to R$_{28}$ is an -Lm-Pm group. In some embodiments, one of R$_1$ to R$_{28}$ includes an -Lm-Pm group. In some embodiments, each of R$_1$ through R$_8$ is independently H, Cl, Br, F, I, CH$_3$, a straight alkyl chain having 2-20 carbon atoms, a branched alkyl having 2-20 carbons, or a moiety represented by -Lm-Pm. In some embodiments, each of R$_9$ through R$_{28}$ is independently H, F, Br, Cl, I, CH$_3$, a straight alkyl chain having 2-20 carbon atoms, a branched alkyl having 2-20 carbon atoms, nitro, sulfonic acid, carboxylic acid, a carboxylic ester, —R$_{100}$—OH, —O—R$_{200}$, —R$_{100}$—N(R$_{110}$R$_{111}$), —R$_{100}$—N$^+$(R$_{110}$R$_{111}$R$_{112}$), an aryl, a heteroaryl, acrylate, acryloyl, acrylamide, methacrylate, methacrylamide, thiol, or amide, or a moiety represented by -Lm-Pm. In some embodiments, two of adjacent R$_9$ to R$_{28}$ form aromatic or non-aromatic ring structure, e.g., as described herein. In some embodiments, R$_{100}$ is a bond, —(CH$_2$)$_n$—, or a branched alkyl having 2-20 carbon atoms, wherein n is 1-20; R$_{110}$, R$_{111}$, R$_{112}$ and R$_{200}$ are each independently H, Me, a straight alkyl chain having 2-20 carbon atoms, a branched alkyl having 2-20 carbon atoms, or a moiety represented by -Lm-Pm. In some embodiments, X is carbon or nitrogen, provided that when X is nitrogen, then $R_{11}$, $R_{16}$, $R_{21}$, and $R_{26}$ are each independently a lone pair or as defined above. Suitable linkers and polymerizable groups are described herein.

In one embodiment, the Cu-porphyrin compound of the first system is a homopolymer or a copolymer characterized by having a monomeric structure of Formula I(m)

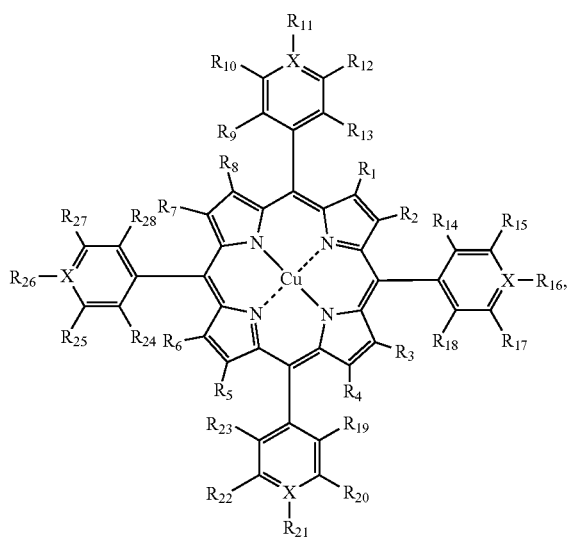

or a salt, or a tautomeric form thereof, wherein X and $R_1$ through $R_{28}$ are described herein.

In some embodiments, each of $R_1$ through $R_8$ is independently H, Cl, Br, F, I, $CH_3$, a straight alkyl chain having 2-20 carbon atoms, or a branched alkyl having 2-20 carbons; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, or amide; or two of adjacent $R_9$ to $R_{28}$ form aromatic or non-aromatic ring structure. In some embodiments, $R_{100}$ is a bond, $—(CH_2)_n—$, or a branched alkyl having 2-20 carbon atoms, wherein n is 1-20; $R_{110}$, $R_{111}$, $R_{112}$ and $R_{200}$ are each independently H, Me, a straight alkyl chain having 2-20 carbon atoms, or a branched alkyl having 2-20 carbon atoms. In some embodiments, X is carbon or nitrogen, provided that when X is nitrogen, then $R_{11}$, $R_{16}$, $R_{21}$, and $R_{26}$ are each independently a lone pair or as defined above.

In one embodiment, the Cu-porphyrin compound of the first system is a homopolymer or a copolymer characterized by having a monomeric structure of Formula I(m)

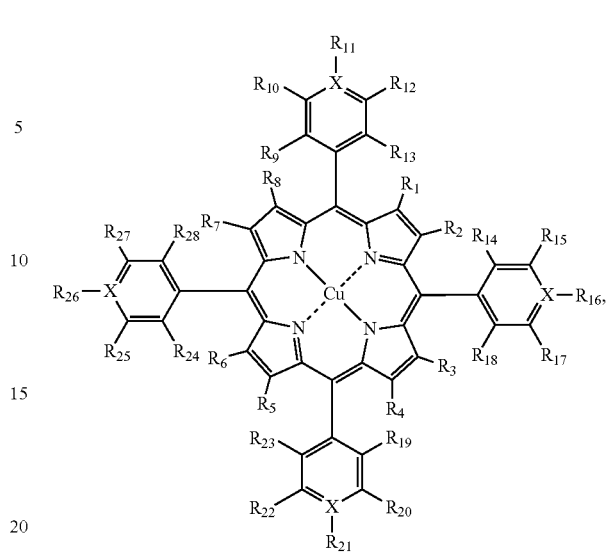

or a salt, or a tautomeric form thereof, wherein X and $R_1$ through $R_{28}$ are described herein, provided that there is 1-4 (e.g., 1, 2, 3, or 4) -Lm-Pm in Formula I(m) and each -Lm-Pm can be the same or different, wherein Lm is null, and each Pm is the same or different polymerizable group, wherein the polymerizable group is selected from the group consisting of acrylates, acryloyls, acrylamides, methacrylates, methacrylamides, carboxylic acids, thiols, amides, terminal or internal alkynyl groups having 2 to 20 carbons, terminal or internal alkenyl groups having 2 to 20 carbons, iodides, bromides, chlorides, azides, carboxylic esters, amines, alcohols, epoxides, isocyanates, aldehydes, acid chlorides, siloxanes, boronic acids, stannanes, and benzylic halides. In some embodiments, one of $R_1$ to $R_8$ is an -Lm-Pm group. In some embodiments, one of $R_9$ to $R_{28}$ is an -Lm-Pm group. In some embodiments, one of $R_1$ to $R_{28}$ includes an -Lm-Pm group.

In some embodiments, each of $R_1$ through $R_8$ is independently H, Cl, Br, F, I, $CH_3$, a straight alkyl chain having 2-20 carbon atoms, a branched alkyl having 2-20 carbons, or a moiety represented by -Lm-Pm; and each of $R_9$ through $R_{28}$ is independently H, F, Br, Cl, I, $CH_3$, a straight alkyl chain having 2-20 carbon atoms, a branched alkyl having 2-20 carbon atoms, nitro, sulfonic acid, carboxylic acid, a carboxylic ester, $—R_{100}—OH$, $—O—R_{200}$, $—R_{100}—N(R_{110}R_{111})$, $—R_{100}—N^+(R_{110}R_{111}R_{112})$, an aryl, a heteroaryl, acrylate, acryloyl, acrylamide, methacrylate, methacrylamide, thiol, amide, or a moiety represented by -Lm-Pm. In some embodiments, two of adjacent $R_9$ to $R_{28}$ form aromatic or non-aromatic ring structure, e.g., as described herein. In some embodiments, $R_{100}$ is a bond, $—(CH_2)_n—$, or a branched alkyl having 2-20 carbon atoms, wherein n is 1-20. In some embodiments, $R_{110}$, $R_{111}$, $R_{112}$ and $R_{200}$ are each independently H, Me, a straight alkyl chain having 2-20 carbon atoms, a branched alkyl having 2-20 carbon atoms, or a moiety represented by -Lm-Pm. In some embodiments, X is carbon or nitrogen, provided that when X is nitrogen, then $R_{11}$, $R_{16}$, $R_{21}$, and $R_{26}$ are each independently a lone pair or as defined above.

As used herein and a person of ordinary skill in the art can readily appreciate, a polymer or polymer moiety characterized by having a monomeric structure as shown means that the polymer can be synthesized or prepared using the indicated monomer, or using the indicated monomer in combination with one or more other monomers in the case of a copolymer. Depending on the monomer used, the structure of the final polymer can be readily ascertained by those ordinary skill in the art. As used herein, the term polymer broadly refers to a compound or a mixture of compounds having two or more repeating structural units.

Various methods are known for the preparation of polymeric Cu-porphyrin compounds. For example, a synthesis of one type of polyphophyrins is described in U.S. Pat. No. 6,429,310. Other exemplary methods are known for preparing homo- or co-polymers from a monomer having a Formula I(m), which contains one or more, either same or different, polymerizable groups. For example, such methods can include various radical polymerization, photo-induced polymerization, heat-induced polymerization, cationic polymerization, anionic polymerization, metal-catalyzed polymerization, etc. See generally, Odian, George G. 2004. *Principles of Polymerization*. fourth ed. Hoboken, N.J.: Wiley and Hiemenz, Paul C., and Timothy Lodge. 2007. *Polymer Chemistry*. second ed. Boca Raton: CRC Press.

Figure 1A:
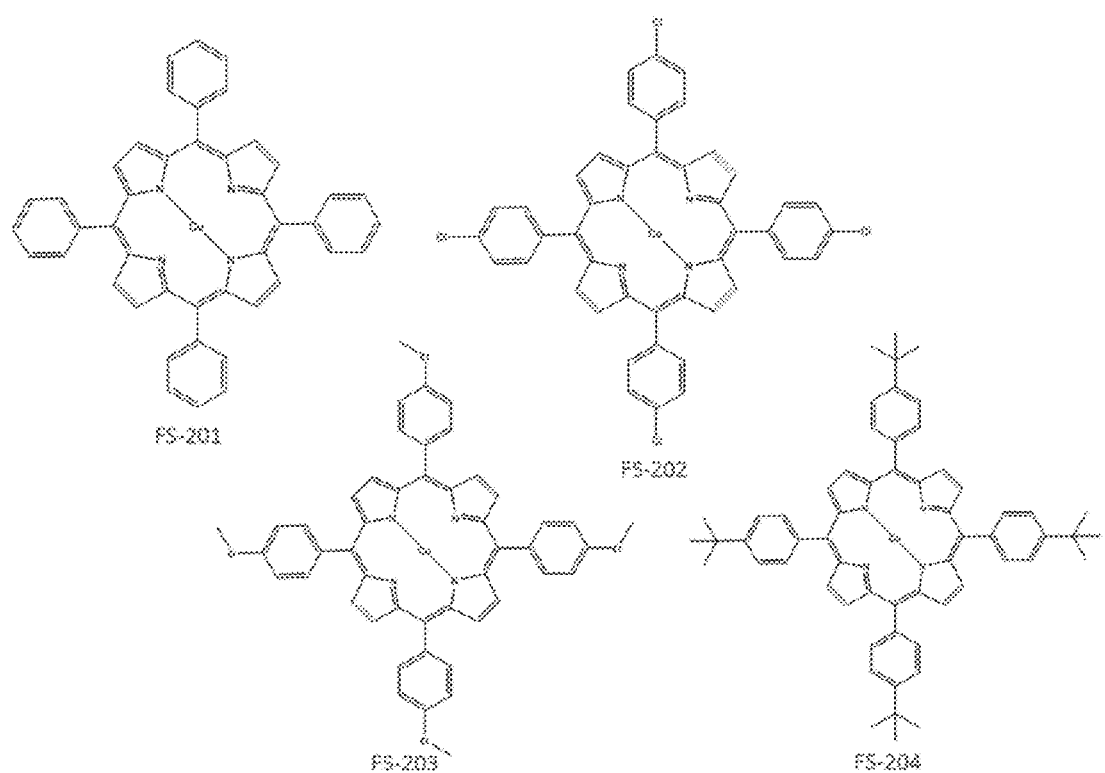
FIG. 1A shows chemical structures of Cu-porphyrin dyes in FS-dye series.
Figure 1B:
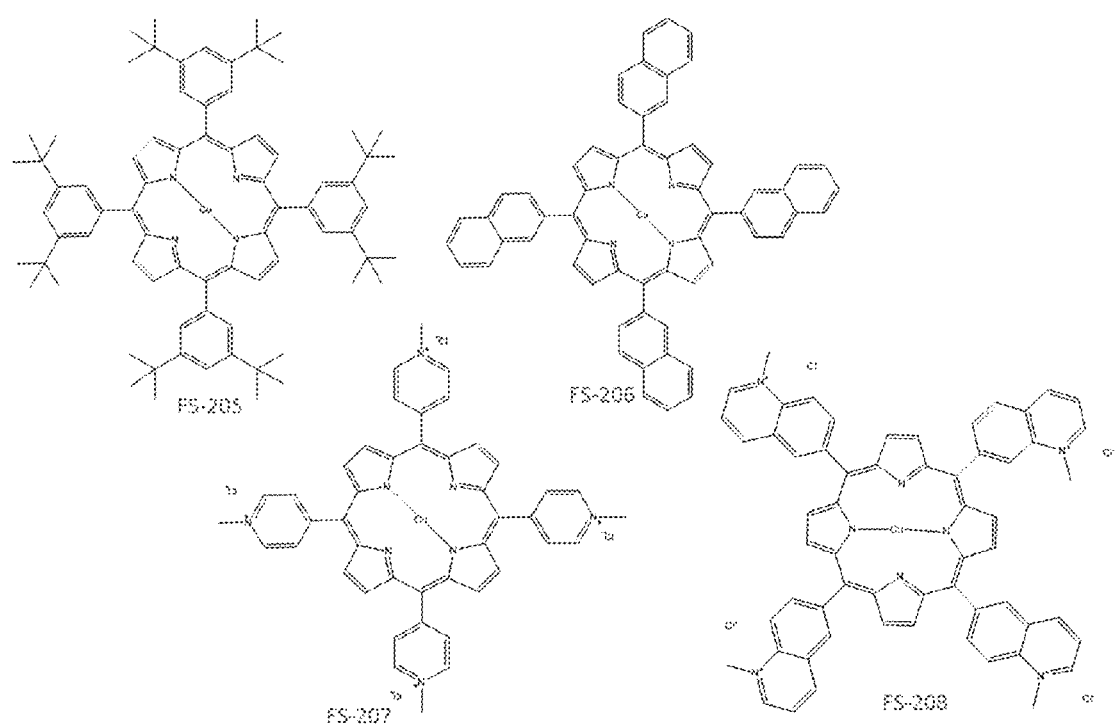
FIG. 1B shows more chemical structures of Cu-porphyrin dyes in FS-dye series.
Figure 1C:
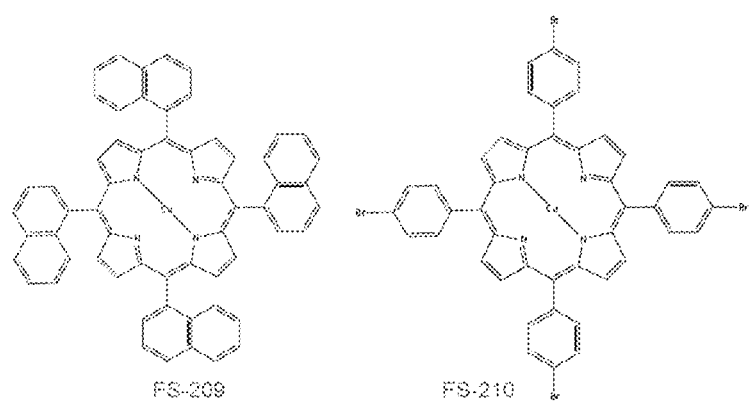
FIG. 1C shows more chemical structures of Cu-porphyrin dyes in FS-dye series.
Figure 1D:
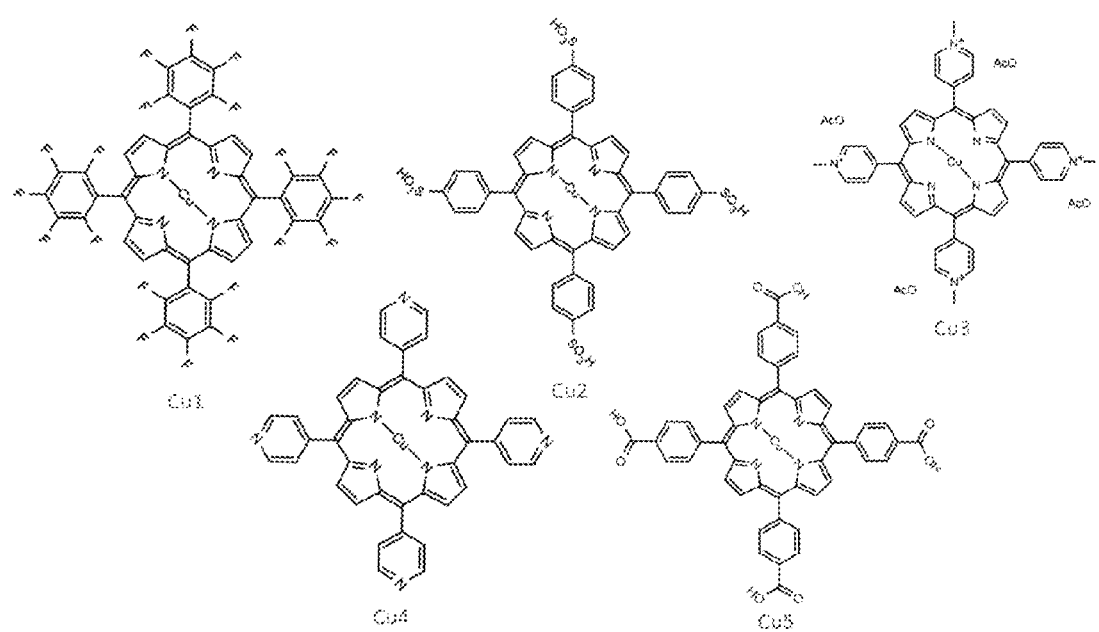
FIG. 1D shows more chemical structures of Cu-porphyrin dyes in Cu-dye series

One example of a Cu-porphyrin compound that is polymerizable is Cu5, shown in FIG. 1D. This Cu5 compound has a carboxylic group.

Other examples are given in FIGS. 28B-28D. It is noted that R numbering on those chemical structures do not correspond to the R numbering used elsewhere in this application. FIG. 28A shows tetrafluoro acrylate. FIG. 28B shows 1-napthyl acrylate. And FIG. 28C shows 2-naphthyl acrylate.

FIGS. 1A-3B present non-limiting chemical structures of porphyrin dye compounds which may be used in the optical filters disclosed herein.

FIGS. 1A, 1B, 1C, and 1D show examples of FS-dye compound series and Cu-dye compound series. All of these belong to the category of porphyrins with copper as a core metal inside the porphyrin ring, or Cu-porphyrins.

Figure 2A:
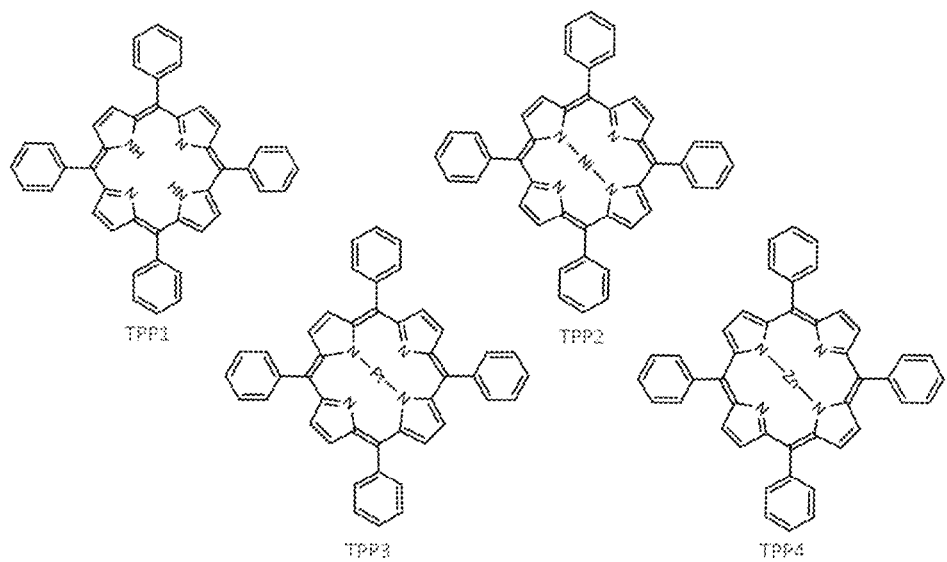
FIG. 2A shows chemical structures of porphyrin dyes in TPP-dye series.
Figure 2B:
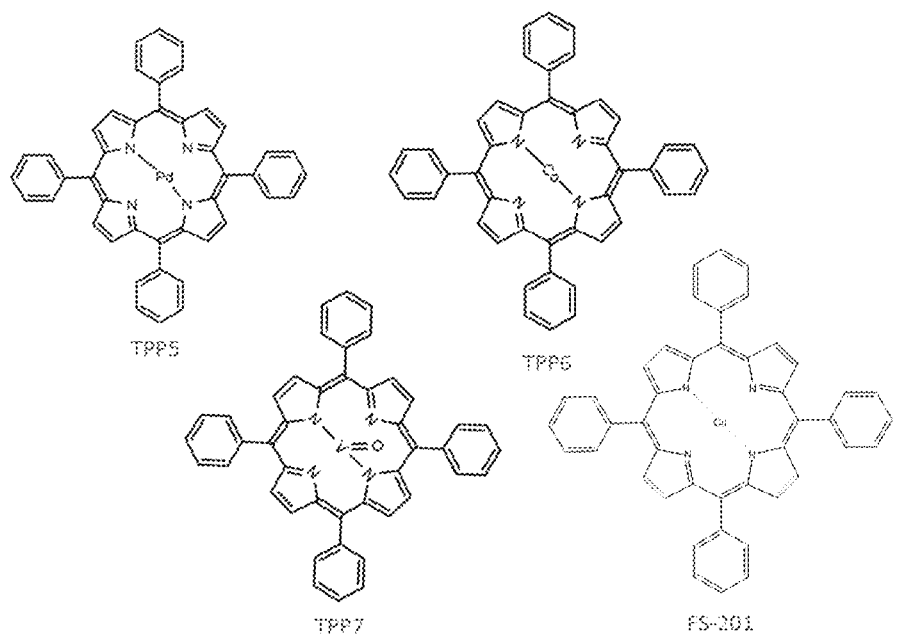
FIG. 2B shows more chemical structures of porphyrin dyes in TPP-dye series and FS-201.

FIGS. 2A-2B show examples of TPP-decompound series, where porphyrin dyes with different core metals and only phenyl pendants are presented. FS-201 dye is provided in FIG. 2 for comparison, due to its similar structure to TPP-dye compound series.

Figure 3A:
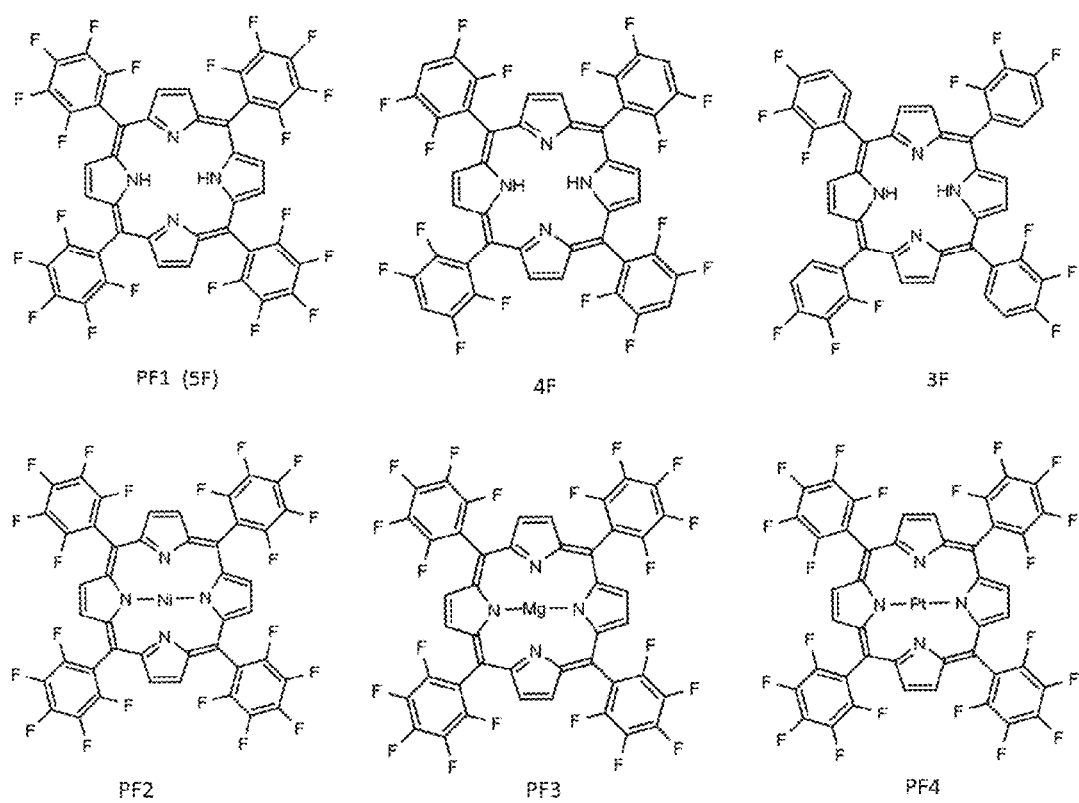
FIG. 3A shows chemical structures of Cu-porphyrin dyes in PF-dye series.
Figure 3B:
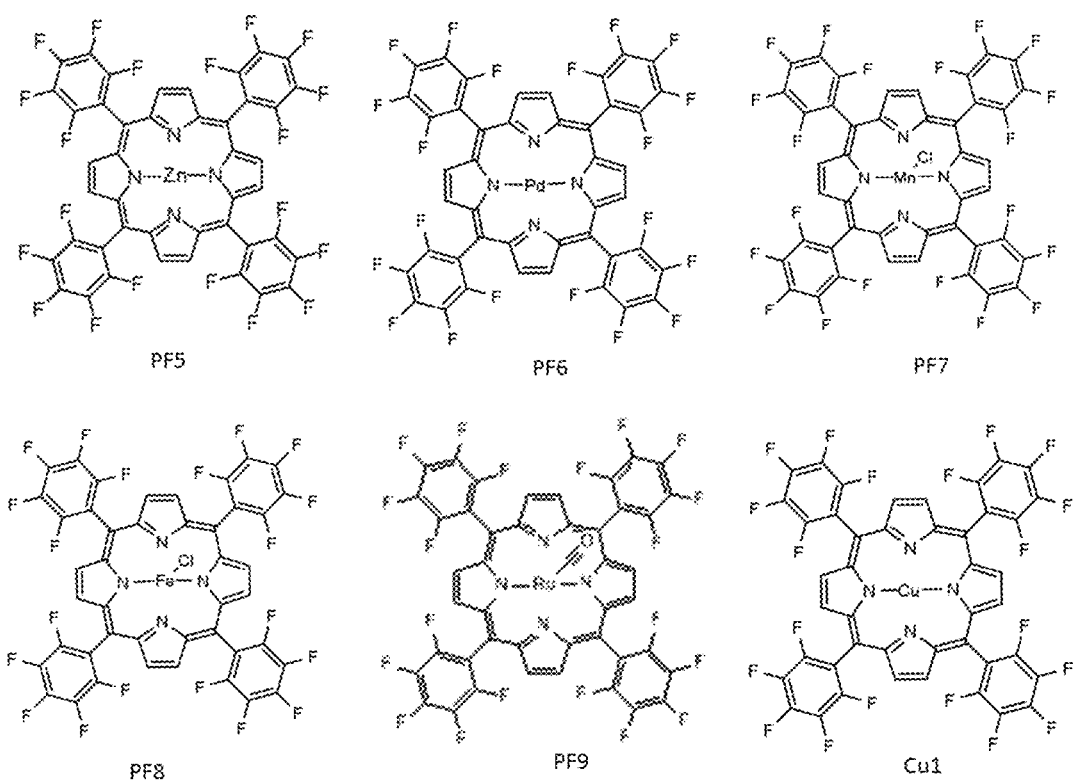
FIG. 3B shows more chemical structures of Cu-porphyrin dyes in PF-dye series and Cu1 dye.

FIGS. 3A-3B show examples of PF-decompound series, related to porphyrins with penta-fluoro-phenyl pendants and different core metals. For comparative purposes, and due to the similar structure as the PF-decompound category, Cu1-dye compound is also given in FIG. 3.

The Cu-porphyrin compounds discussed above may be used as a dye in the optical filter in a system. In one embodiment, the optical filter comprises a coating that is disposed on a surface of the system. As a non-limiting example, a surfaces in a CR39 semi-finished lens blank include both the unfinished face and the finished face. Other examples of surfaces include a face of a lens blank, a reflective face of a mirror, and a screen in an electronic device.

In such an arrangement, a coating that includes the Cu-porphyrin compound is disposed on a surface of the system.

In another embodiment, the optical filter comprising the Cu-porphyrin dye, is dispersed through a substrate of the first system.

The compounds disclosed herein are applicable to many applications. Some of these applications include, but are not limited to, ophthalmic systems, non-ophthalmic ocular systems, and non-ocular systems.

In one embodiment, the system is an ophthalmic system. Common ophthalmic systems may include an eyeglass lens, a contact lens, an intra-ocular lens, a corneal inlay, and a corneal onlay.

In order to further protect the human eye from exposure to both harmful high energy visible light wavelengths and UV light and optionally IR light, non-ophthalmic applications are also envisioned.

Thus, in one embodiment, the system is a non-ophthalmic ocular system. This includes a system through which light passes on its way to a user's eye that is not an ophthalmic system. Common and non-limiting examples include a window (including aircraft windows); an automotive (including cars, trucks, and buses) windshield; an automotive side window; an automotive rear window; a sunroof window; a mirror in an automobile, truck, bus, train, plane, helicopter, boat, motorcycle, recreational vehicle, farm tractor, construction vehicle or equipment, spacecraft, military craft; commercial glass; residential glass; skylights; a camera flash bulb and lens; an artificial lighting fixture; a magnifying glass (including over the counter); a fluorescent light or diffuser; a medical instrument (including equipment used by ophthalmologists and other eye care professionals to examine the eyes of patients); a telescope; a surgical instrument; a hunting scope for rifles, shotguns and pistols; a binocular; a computer monitor; a television screen; a lighted sign; any electronic devices that emit or transmit visible light; and a patio fixture. In other embodiment the optical filter can be incorporated into any electronic device that emits visible light either hand held or not hand held. By way of example only, an electronic device could include: a computer monitor (mentioned above), a laptop, an iPad, any phone or other telecommunication device, tablet, visual gaming systems, surfaces, or GPS or other navigational devices.

In one embodiment, the system is a non-ophthalmic ocular system, and the optical filter may be disposed between a first surface 251A and a second surface 251B of a first system 2500, shown in FIG. 25. In one embodiment, the first and second surfaces may be glass. The optical filter may be incorporated in an interlayer 252. In some embodiments, the interlayer 252 may be polyvinyl butyral (PVB), polyvinyl alcohol (PVA), ethylene vinyl acetate (EVA), or polyurethane (PU), or copolymers where one of the co-polymer is PVB, PVA, EVA, or PU. Other suitable polymers with characteristics similar to the polymers listed are also envisioned. FIG. 26 shows the chemical structures for the chemicals that may be used to form these interlayers. This embodiment may be particularly useful as an automotive windshield. Automotive windshields often have the structure illustrated in FIG. 25. An optical filter, such as a copper porphyrin dye, may be incorporated into the interlayer of such as structure.

In another embodiment, the first system is a non-ocular system. As defined in the Glossary, a non-ocular system includes systems that do not pass light through to a user's eye. By way of example only, non-ocular systems may include any type of skin or hair product such as shampoo, suntan and sunscreen products, anti-aging skin products, oils, lip stick, lip balm, lip gloss, eye shadow, eye liner, eye primer or acne products, or products used to treat skin cancer, skin beauty products such as primers, foundation, moisturizers, powders, bronzers, blush, skin color enhancers, lotions (skin or dermatological), or any type of dermatological product. Thus, embodiments include any type of skin or hair product for either a health or beauty benefit. The addition of the Cu-porphyrin compounds listed above or in combination with other porphyrins or derivatives of other porphyrin to these types of non-ocular systems may be used for the detection or treatment of cancer in the human body. For example, the addition of these compounds to a skin lotion, skin cream, or sunscreen may add a selective blue light filter to inhibit harmful wavelengths that are known to cause cancer.

Furthermore, the systems disclosed herein also include military and space applications because acute and/or chronic exposure to high energy visible light, UV, and also IR can potentially have a deleterious effect on soldiers and astronauts.

The systems disclosed herein have transmission spectrums such that the systems are able to block harmful and undesirable blue wavelengths while having a relatively high transmission across wavelengths outside of the blocked blue wavelengths. As used herein, inhibit, block and filter (when used as verbs) mean the same.

Across the wavelength range of 460 nm-700 nm, the transmission spectrum of the first system has an average transmission ($TS_{RG}$) that is greater than or equal to 51%, 54%, 57%, 60%, 63%, 66%, 69%, 72%, 75%, 78%, 80%, 85%, 90% or 95%. The average transmission of the system across this wavelength range depends on the application of the system. For example, in ophthalmic systems it may be desirable to have an average transmission of at least 95% in some applications. However, in some non-ophthalmic systems, it may be desirable to have a lower average transmission across the wavelength range of 460 nm-700 nm, such as in car windshields. In one preferred embodiment, $TS_{RG}$ is equal to or greater than 80%.

Across the wavelength range of 400 nm-460 nm, the first system has an average transmission defined as $TS_{Blue}$. $TS_{Blue}$ is less than $TS_{RG}$-5%. Thus, for example, if $TS_{RG}$ is 85%, then $TS_{Blue}$ is less than 80%. The average transmission of a spectrum across a wavelength range may be calculated as defined in the Glossary.

FIGS. 41-48 show exemplary transmission spectra of different systems comprising an optical filter. FIG. 41 shows transmission spectra of five ophthalmic systems. Each system comprises a CR39 lens blank coated with an optical filter containing the Cu-porphyrin dye FS-206 with 40% blue light blockage.

FIG. 42 shows transmission spectra of five ophthalmic systems. Each system comprises a CR39 lens blank coated with an optical filter containing the Cu-porphyrin compound FS-206 with 30% blue light blockage.

FIG. 43 shows transmission spectra for five ophthalmic systems. Each system comprises a mid-index 1.55 blank coated with an optical filter containing the Cu-porphyrin compound FS-206 with 40% blue light blockage.

FIG. 44 shows transmission spectra for five ophthalmic systems, where each system comprises a mid-index 1.55 blank coated with an optical filter containing the Cu-porphyrin compound FS-206 with 30% blue light blockage.

FIG. 45 shows transmission spectra of three ophthalmic systems. System 1 comprises a CR39 surfaced lens coated with an optical filter comprising FS-206 with 15% blue light blockage. System 2 comprises a CR39 surfaced lens coated with an optical filter comprising FS-206 with 20% blue light blockage. System 3 comprises a CR39 surfaced lens coated with an optical filter comprising FS-206 with 25% blue light blockage.

FIG. 46 shows the transmission spectrum of a system comprising a polycarbonate lens coated with an optical filter comprising FS-206 with 15% blue blockage.

FIG. 47 shows the transmission spectra of five systems. Each system comprises a PVB interlayer impregnated with an optical filter comprising FS-206 with 20% blue light blockage. FIG. 48 shows the transmission spectra of five systems. Each system comprises a PVB interlayer impregnated with an optical filter comprising FS-206 with 25% blue light blockage.

In one embodiment, in addition to having an average across the specified wavelength range, the transmission spectrum of the system has a specific value at every wavelength within the specified wavelength range. In one embodiment, the first system transmits at least 51%, 54%, 57%, 60%, 63%, 66%, 69%, 72%, 75%, 78%, 80%, 85%, 90% or 95% of light at every wavelength across the range of 460 nm-700 nm. In a preferred embodiment, the system transmits at least 80% of light at every wavelength range of 460 nm-700 nm The optical filter of the system also has its own transmission spectrum. The transmission spectrum of the optical filter and the transmission spectrum of the system may be different or similar to each other. In a preferred embodiment, the two spectra are different from each other.

Across the wavelength range of 460 nm-700 nm, the transmission spectrum of the optical filter has an average transmission ($TF_{RG}$) that is equal to or greater than 60%, 65%, 70%, 75%, 80%, 85%, 90%, or 95%. As discussed above with respect to the system, the average transmission of the filter across this range may also depend on the application of the system. In a preferred embodiment, $TF_{RG}$ is equal to or greater than 80%.

Across the wavelength range of 400 nm-460 nm, the optical filter also has an average transmission defined as $TF_{Blue}$. $TF_{Blue}$ is less than $TF_{RG}$-5%. The average transmission of a spectrum across a wavelength range is calculated as defined in the Glossary.

The transmission spectrum of the optical filter also has a first local minimum in transmission at a first wavelength within the wavelength range of 400-500 nm, preferably within the wavelength range of 400-460 nm, and more preferably within the wavelength range of 405-440 nm.

The first wavelength may be at any wavelength that is between the ranges discussed above, including but not limited to: within 2 nm of 420 nm, within 2 nm of 409 nm, within 10 nm of 425 nm, within 5 nm of 425 nm, and within 30 nm of 430 nm. Preferably the first wavelength is within 10 nm of 420 nm. The location of the first wavelength is determined based on the specific application of the system. It is affected by the Cu-porphyrin dye that is used in the filter. For example, as seen in FIG. 19, FS-206 has a local minimum in transmission at the first wavelength around 420 nm while Cu1 has a local transmission in transmission at the first wavelength that is below 420 nm. A person of ordinary skill in the art would be able to determine, based on this disclosure, which Cu-porphyrin compound to use to obtain the desired transmission spectrum.

In one embodiment, the filter transmits no more than 70%, no more than 65%, no more than 55%, no more than 50%, no more than 45%, no more than 40% of light, and preferably no more than 60% of light at the first wavelength. The amount of light that the filter transmits, (or the amount of light that the filter inhibits) at the first wavelength may be adjusted by changing the specific Cu-porphyrin compound that is used in the optical filter and the concentration of that compound. For example, FIG. 15 shows the transmission spectrum of 12 different optical filters. Each of the optical filters contain different concentrations of the FS-206 Cu-porphyrin dye compound. As another example, FIG. 16 shows the transmission spectra of 5 different optical filters.

Each optical filter (or coating) contains a different concentration of FS-207 Cu-porphyrin dye compound.

It should be noted that the amount of light that is ultimately transmitted at the first wavelength in the first system depends on other variables, such as, but not limited to, where the optical filter is applied, how it is applied, and to what it is applied. As an example only, if both sides of a lens in an ophthalmic system are coated with a coating containing the optical filter with the Cu-porphyrin compound, then the coating formulation can contain less compound because the % blue light blockage is additive of the blockage of both lens sides. If a lens blank is coated on both sides, then more a concentrated coating formulation is prepared, because the back side of the lens blank will be subsequently removed by a surfacing step and only the front coating will remain on the final lens product. Also, more concentrated formulation is needed if the final lens is coated on one side by spin-coating, spraying or other method.

It should also be noted that the transmission spectrum of the system, while affected by the transmission spectrum of the optical filter, does not have to be the same as the transmission spectrum of the system. For example, the transmission spectrum of the system may not have a local minimum at the same wavelength as the transmission spectrum of the optical filter. In one embodiment, for at least one wavelength within 10 nm of the first wavelength on the negative side, the slope of the transmission spectrum of the first system has an absolute value that is less than the absolute value of the slope of the transmission spectrum at a third wavelength. The third wavelength is more than 10 nm from the first wavelength on the negative side. Thus, for example, the first system may have a "shoulder" at the first wavelength, rather than a local minimum.

Thus, the compound concentration in the coating, the thickness of the coating containing the dye package, or coating parameters may be adjusted to achieve the desired % blue light blockage. Using these parameters and others like it, one would be able to achieve the desired transmission spectrum with the benefit of this disclosure.

Another way to characterize the transmission spectrum of the optical filter at the first wavelength is to compare the transmission value at the first wavelength to the transmission values at wavelengths around the first wavelength. In one embodiment, the filter has an average transmission in a wavelength range that is 5 nm below the first wavelength to 5 nm above the first wavelength. This average transmission value is labeled as T5. For example, if the first wavelength is at 420 nn, the range for T5 would be from 415 nm-425 nm, inclusive. The transmission spectrum of the optical filter also has an average transmission in a wavelength range from 400 nm to 460 nm, excluding a range that is 5 nm below to 5 nm above the first wavelength. This average transmission value is defined by T6. In the example, discussed above with the first wavelength range at 420 nm, T6 would be calculated for the wavelength range of 400 nm to 414 nm and 426 nm to 460 mm. T5 is at least 5% less than T6.

It is noted that the same calculation may be done for narrower and wider ranges, including 2 nm above and below the first wavelength, 7 nm above and below the first wavelength, 10 nm above and below the first wavelength, and 15 nm above and below the first wavelength. Thus, as another non-limiting example, the average transmission of the filter in a wavelength range from 10 nm below the first wavelength to 10 nm above the first wavelength is defined by T7. The average transmission of the filter in a wavelength range from 400 nm to 460 nm that excludes the range from 10 nm below the first wavelength to 10 nm above the first wavelength is T8. In this embodiment, if the first wavelength is 420 nm, T7 would be calculated for the wavelength range 410 nm-430 nm, and T8 would be calculated for the wavelength ranges 400 nm-409 nm and 431 nm-460 nm. T7 is at least 5% less than T8.

In one embodiment, the optical filter may have a second local minimum at a second wavelength that is different from the first wavelength. This second wavelength may be between 400 nm-460 nm, 460-500 nm, or 500 nm-700 nm. Whether or not the optical filter has a second local minimum depends on what Cu-porphyrin compound or compounds are used in the optical filter. Optical filters with a first local minimum and a second local minimum may be obtained by using one Cu-porphyrin compound that independently has two local minima in its transmission spectrum or a mixture of 2, 3, 4 or more Cu-porphyrin compounds that together exhibit two local minimums.

Systems that incorporate optical filters are generally subjected to constant UV exposure. The UV radiation from this exposure may cause the compound to degrade over time. Thus, over time, the compound's ability and, therefore the filter's ability, to inhibit light transmission is decreased. These systems may also be subjected to weather conditions with rapidly fluctuating temperatures. These rapidly fluctuating temperatures will also degrade the compound and lessen the optical filter's ability to inhibit the desired amount of light.

The Cu-porphyrin compounds discussed herein are superior over other compounds used in optical filters due, in part, to their stability over long periods of UV and weather exposure. Thus, these Cu-porphyrin dye compounds and the optical filters comprising these dye compounds are photo-stable and thermal-stable.

To assess the stability, particularly photo-stability, of the optical filters containing the Cu-porphyrin compounds, several UV exposure and accelerated weatherability tests were performed on optical filters containing the Cu-porphyrin dye compounds. As a comparison, UV exposure and accelerated weatherability tests were also performed on optical filters containing other porphyrin dye compounds that are not Cu-porphyrin compounds. These non-Cu-porphyrin compounds also have local minimum in transmission in the 400 nm-460 nm wavelength range and are available from Frontier Scientific. Some of these non-Cu-porphyrin compounds include:

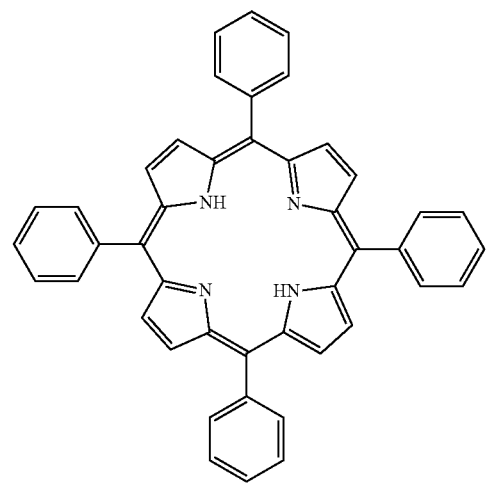 [SMILES: C1=Cc2nc1c(-c1ccccc1)c1ccc([nH]1)c(-c1ccccc1)c1nc(c(-c3ccccc3)c3ccc([nH]3)c2-c2ccccc2)C=C1]

TPP1: meso-Tetraphenylporphine (1-3% chlorin) [Frontier ID: NT614]
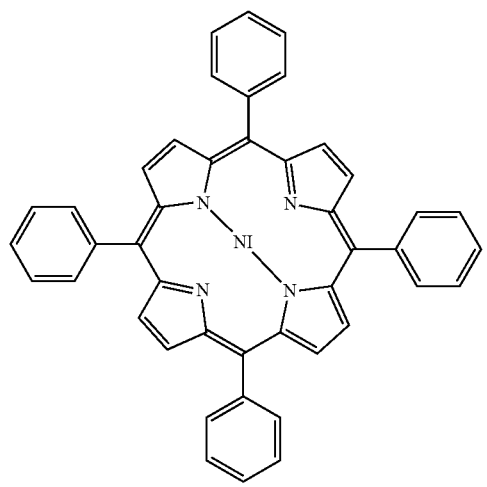
TPP2: Ni(II) meso-Tetraphenylporphine (1-3% chlorin) [Frontier ID: NiT614]
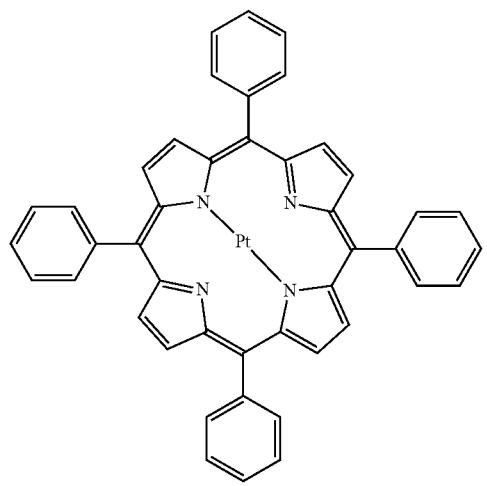
TPP3: Pt(II) meso-Tetraphenylporphine [Frontier ID: T40548]
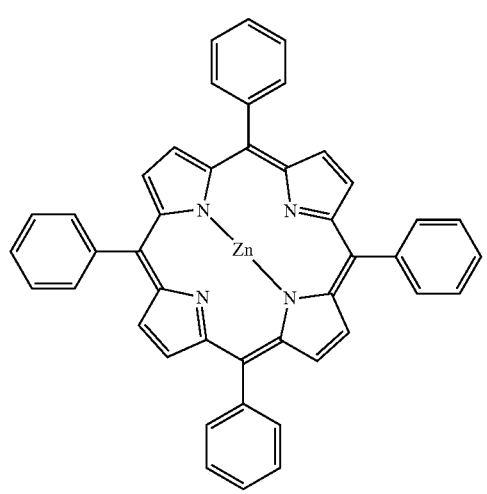
TPP4: Zn(II) meso-Tetraphenylporphine (1-3% chlorin) [Frontier ID: T40942]
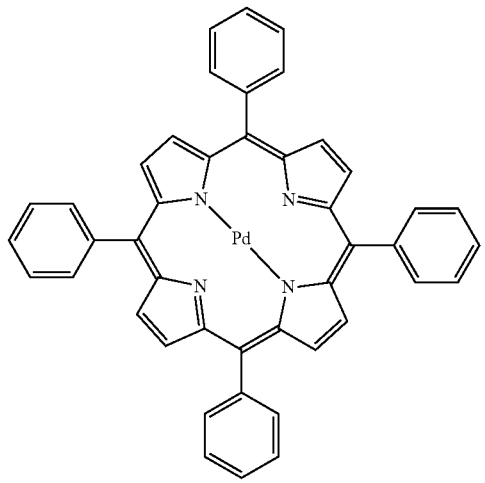
TPP5: Pd(II) meso-Tetraphenylporphine [Frontier ID: T40372]
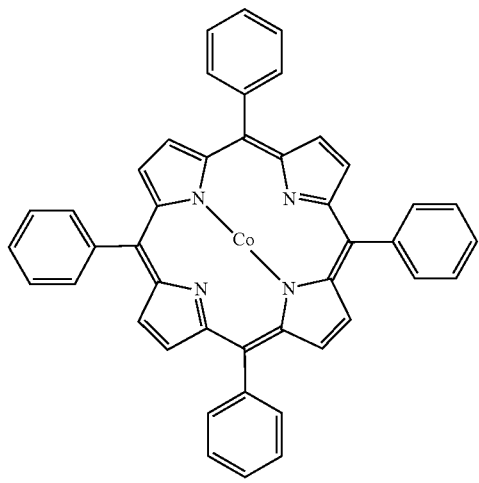
TPP6: Co(II) meso-Tetraphenylporphine (contains 1-3% chlorin) [Frontier ID: T40823]
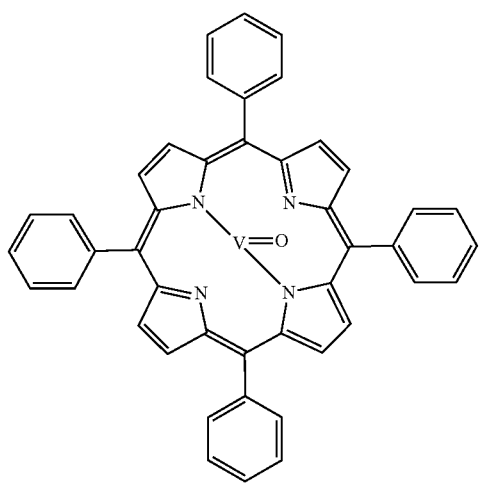

TPP7: Vanadyl meso-tetraphenylporphine (1-3% chlorin) [Frontier ID: VOT614]

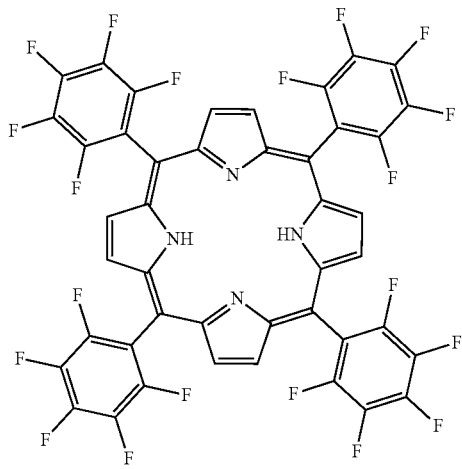 [SMILES: Fc1c(F)c(F)c(-c2c3nc(c(-c4c(F)c(F)c(F)c(F)c4F)c4ccc([nH]4)c(-c4c(F)c(F)c(F)c(F)c4F)c4nc(c(-c5c(F)c(F)c(F)c(F)c5F)c5ccc2[nH]5)C=C4)C=C3)c(F)c1F]

PF1 (or 5F): meso-Tetra(pentafluorophenyl)porphine (cholirine free) [Frontier ID: T975]

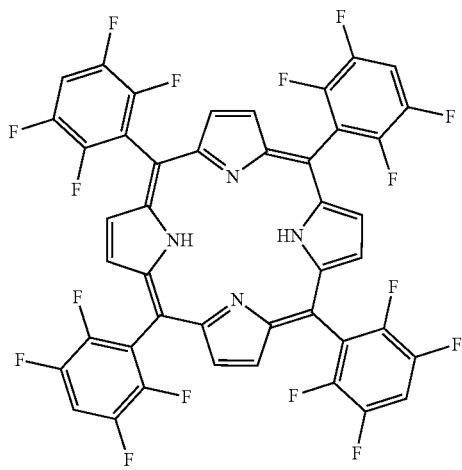 [SMILES: Fc1cc(F)c(F)c(-c2c3nc(c(-c4c(F)c(F)cc(F)c4F)c4ccc([nH]4)c(-c4c(F)c(F)cc(F)c4F)c4nc(c(-c5c(F)c(F)cc(F)c5F)c5ccc2[nH]5)C=C4)C=C3)c1F]

4F: meso-Tetra(2,3,5,6-tetrafluoropheny)porphine [Frontier ID: T14199]

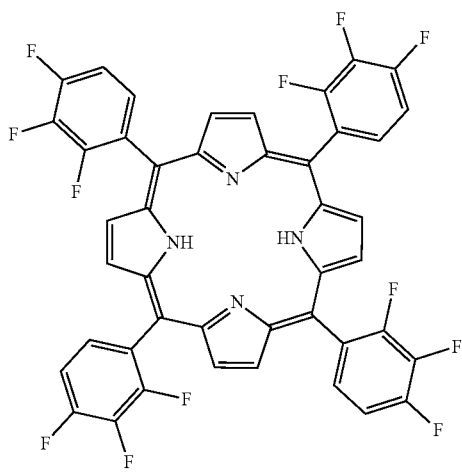 [SMILES: Fc1ccc(-c2c3nc(c(-c4ccc(F)c(F)c4F)c4ccc([nH]4)c(-c4ccc(F)c(F)c4F)c4nc(c(-c5ccc(F)c(F)c5F)c5ccc2[nH]5)C=C4)C=C3)c(F)c1F]

3F: meso-Tetra(2,3,4-trifluorophenyl)porphine [Frontier ID: T14198]

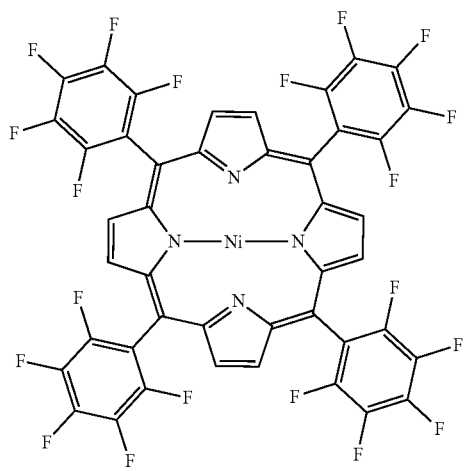

PF2: Ni(II)-meso-Tetra(pentafluorophenyl)porphine [Frontier ID: T40274]

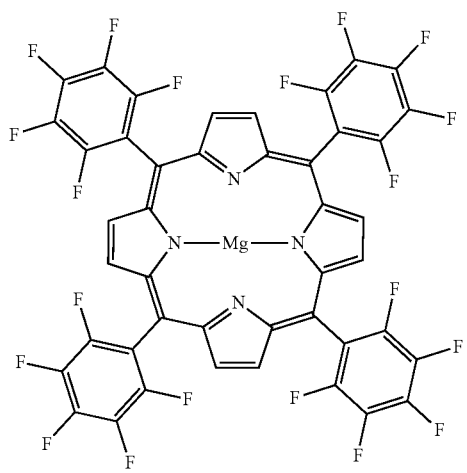

PF3: Mg(II)-meso-Tetra(pentafluorophenyl)porphine [Frontier ID: T40900]

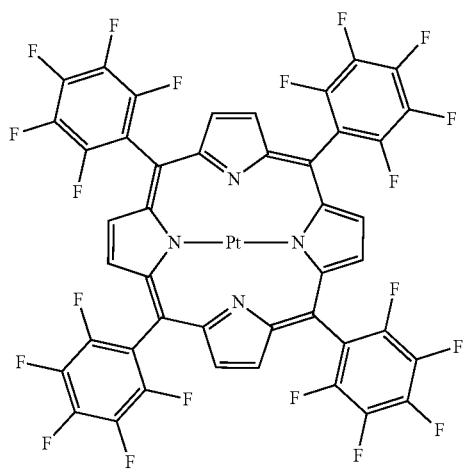

PF4: Pt(II)-meso-Tetra(pentafluorophenyl)porphine [Frontier ID: PtT975]

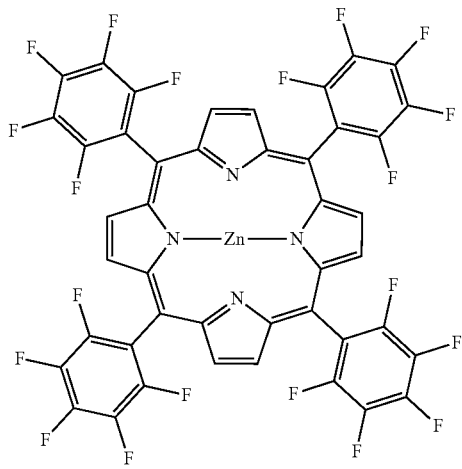

PF5: Zn(II)-meso-Tetra(pentafluorophenyl)porphine [Frontier ID: T40728]

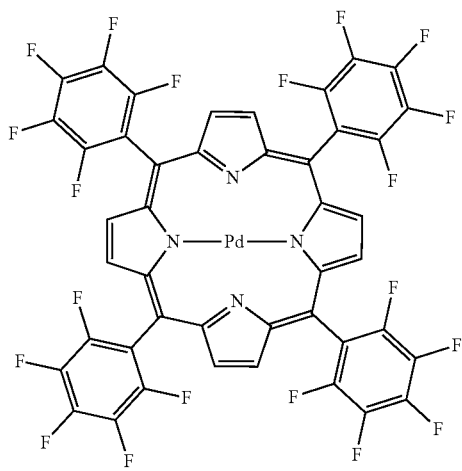

PF6: Pd(II)-meso-Tetra(pentafluorophenyl)porphine [Frontier ID: PdT975]

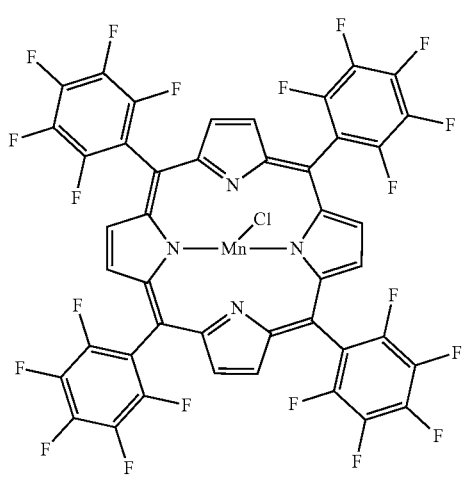

PF7: Mn(III)-meso-Tetra(pentafluorophenyl)porphine chloride [Frontier ID: T40169]

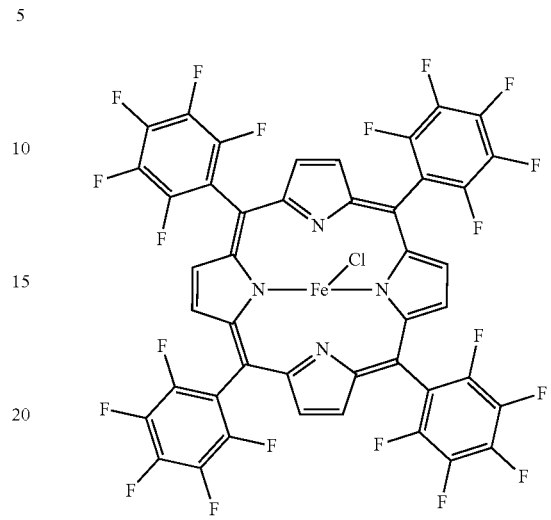

PF8: Fe(III)-meso-Tetra(pentafluorophenyl)porphine chloride [Frontier ID: T41158]

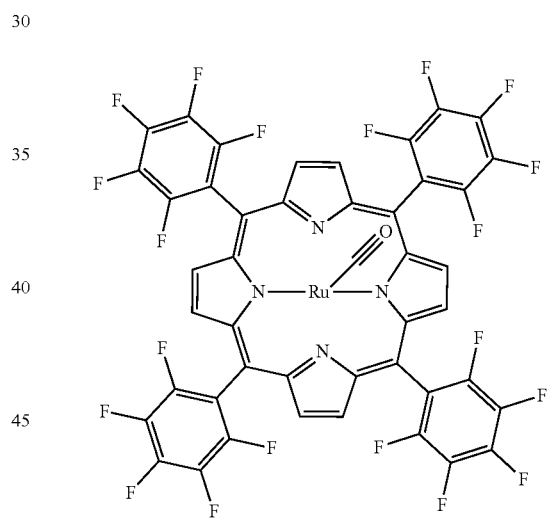

PF9: Ru(II)-carbonyl meso-Tetra(pentafluorophenyl)porphine [Frontier ID: T14557]

The UV exposure and accelerated weatherability tests performed on the optical filters are as follows:
(A) Laboratory UV-visible exposure test was performed with BlueWave 200 lamp (Dymax), which light output looks like:
Total Light in 280-450 nm Spectral Range:
  Visible (400-450 nm)—41.5%
  UVA (320-395 nm)—41.5% and
  UVB (280-320 nm)—17%
Samples of selective blue-blocking coatings coated on UV-transparent pre-cleaned glass microscope slides (available from Corning) were subjected to UV-visible exposure for 30 min, 60 min, 90 min, and 120 min, which correspond to total fluence of 7 J/cm$^2$, 14 J/cm$^2$, 21 J/cm$^2$, and 28 J/cm$^2$, respectively. The tested blue-blocking coatings comprised a primer matrix (available from SDC Technologies) and Cu-porphyrin dye compound to be tested is added to the primer via the appropriate solvent (e.g. chlorinated solvent). The slides were coated with the previously prepared dyed primer formulations by a dip-coating method. After drying the primer coating for 15 min at ambient temperature, a scratch-resistant hard coating (SDC Technologies) was applied via dip-coating and baked for 2 hours at 110° C. in air. The samples were monitored during the duration of the test and their transmission spectra and CIE coordinates were assessed. The results of this test are given in FIGS. 19A-19D for the FS- and Cu-compound series. As discussed above, the FS- and Cu-compound series are all Cu-porphyrins. As comparative examples, this UV test was also performed on the TPP-porphyrin series, a non-Cu-porphyrin compound. FIGS. 18A-18B shows the results of this test. FIG. 18B also shows the UV test result of FS-201 as a comparison. Generally, the filtering ability of the TPP-porphyrin series degraded significantly after being exposed to the UV wavelengths used in the testing methods while filtering ability of FS- and Cu-dye series showed significant stability.

(B) Outdoor weathering test was done by exposure to a weather conditions in Virginia (location 37°5'28"N 80°24'28"W) in the period October-December, when temperature changes during day and night are large, ranging from around 70 F to below freezing temperatures, coupled with Sun light exposure, rain and snow exposure. The samples were prepared in the same way as the samples for Laboratory UV-visible exposure test: glass microscope slides were coated with a primer containing the dye compound to be tested, and then with scratch-resistant hard coating. The samples were monitored during the duration of the test and their transmission and CIE coordinates were assessed. The results of this test are given in FIGS. 22A-22D for Cu-series and FS-series dyes. For comparative purposes, this weathering test was also performed for compounds in the TPP series, PF series, and F series porphyrin dyes. The results for these series are shown in FIGS. 20A-20B and 21A-21D. As an easy comparison, the test results for FS-201 is given in FIG. 20B as well. Generally, the filtering ability of the TPP-, PF-, and F-series dyes degraded significantly after the weathering tests while filtering ability of FS- and Cu-dye series showed significant stability.

Both tests, laboratory UV-visible light exposure test and outdoor weathering test, yielded the most stable selective blue-blocking coatings. When the coatings containing porphyrin dyes with phenyl pendants and different core metal elements were tested (TPP-dye compound series, structures are given in FIG. 2), the dye compounds showed different stability and were classified according to their photo-stability. The tests of PF-dye compound series (where structures are given in FIG. 3) yielded similar results. The listing below gives the porphyrin dye compounds with different core metals and phenyl pendants, starting with the most stable metal (position #1):

Metal-Porphyrin Listing:
1) Copper
2) Nickel; vanadium
3) No metal
4) Cobalt
5) Platinum; Palladium; Ruthenium
6) Iron; Manganese; Magnesium
7) Zinc
  Cu>Ni; V>No metal>Co>Pt; Pd; Ru>Fe; Mn; Mg>Zn
  These results are also schematically presented in FIG. 23.
  Once the most stable porphyrin core metal was determined to be copper (Cu), dye compounds with Cu as a core metal in the porphyrin ring and various pendants (i.e. FS-dye series and Cu-dye series presented in FIG. 1) were subjected to both tests, laboratory UV-visible light exposure test and outdoor weathering test. The results of the test yielded the most stable pendants for Cu-porphyrins and they are given in the listing below starting with the most stable pendant (position #1).

Cu-Porphyrins with Different Pendant Listing:
1) Penta-fluoro-phenyl
2) Carboxy-phenyl
3) Phenyl; Sulfonato-phenyl; Chloro-phenyl; Di-butyl-phenyl
4) 1-naphtyl; 2-naphtyl; Methoxy-phenyl; Bromo-phenyl
5) Pyridyl; N-methyl-pyridyl; N-methyl-quinolinyl
  These results are schematically presented in FIG. 24.
  Both tests mentioned above resulted in the following observation: the core metal has a primary effect on dye compound photo-stability, while the pendants have a secondary effect. Through a comparison of the testing done with TPP-dyes, it was determined that Cu-porphyrin is the most stable, while the pendants were kept the same for all dyes (phenyl pendants). Once the most stable metal was determined, an assessment for the pendant photo-stability was made. This assessment yielded penta-fluoro-phenyl to be the most stable pendant, when Cu-porphyrins (FS-dye and Cu-compound series) were tested. This initiated testing of PF-compound series, where compounds with penta-fluoro-phenyl pendants were used and different core metals. Again, this series resulted in the above observation that the metal, and not the pendant, contributes the most to the compound photo-stability. The Cu1-compound was absolute "winner" (most stable dye) in all of the tests performed.

As seen from FIGS. 22A-22D, Cu1, Cu2, Cu5, FS-201, FS-202, and FS-205 dye compounds showed the most stability in the outdoor weathering test. Thus, further tests were performed on optical filters containing these compounds. FIG. 22E-22G shows the transmission spectra for optical filters comprising these Cu-porphyrin compounds before and during outdoor weathering test performed for 60 days. These sets of compounds were selected for testing in this category in order to determine the most stable pendant attached to a porphyrin with copper (Cu) as a core metal.

(C) Thermal Stability Test

Because the incorporation of the optical filter into some systems are done at elevated temperatures, compounds (dyes) that are used in these systems should also be able to withstand elevated temperatures. For example, the incorporation of the Cu-porphyrin dye compound into a PVB interlayer may include a processing step (extrusion) that is performed at 180° C. for ten minutes. Thus, a thermal stability test was also performed on certain Cu-porphyrin dye compounds including FS-206, FS-209, Cu1, and Cu5. The optical filters were made with glass slides coated with dyed primer (a primer with the Cu-porphyrin compound) and hardcoat (baked for 3 hrs at 110 C). The slides were exposed to a heating step at 180° C. (which took about 40 min). The slides were then heated at 180° C. for different time periods (5 min, 10 min, 15 min and 30 min). The results are shown in FIGS. 50A-50D. As shown in the Figures, the ability of the tested optical filters did not degrade. Thus, the tested dye compounds showed excellent thermal stability at 180° C. for the tested time periods. In fact, it should be noted that FIG. 50A shows an increase in filtering at the first wavelength for FS-205. This may due to the fact that the dye is not completely dissolved in the solvent when the coating is done. Thus, when it was heated to 180° C., the clusters of un-dissolved material disassociated and became more monomeric in nature.

Additionally, an industrial glass accelerated weathering test was performed. This test may be applicable to all of the different types of systems, but is specifically applicable for a non-ophthalmic ocular systems.

(A) Industrial class accelerated weathering test was performed in a chamber at 45° C. with, UV-light exposure centered at 340 nm and intensity of 0.73 W/m$^2$ for up-to 2000 hours. The samples were laminated glass with PVB interlayer comprising the optical filter.

Laminated glass is commonly used in the automotive and architectural applications, mostly as safety glass for automobile windshields, safety windows, hurricane-proof buildings, and the like. It comprises a protective interlayer, usually tough and ductile polymer bonded between two panels of glass 251A and 251B, as shown in FIG. 25. The bonding process takes place under heat and pressure. When laminated under these conditions, the interlayer binds the two panes of glass together. The most used polymer for laminated glass applications has been polyvinyl butyral (or PVB) due to its strong binding capability, optical clarity, adhesion to many surfaces, toughness and flexibility. The major applications for laminated glass are automobile windshields, safety windows, hurricane-proof buildings, etc. Trade names for PVB-films include but are not limited to: Saflex (Eastman, USA), Butacite (DuPont, USA), WinLite (Chang Chung Petrochemicals Co. Ltd, Taiwan), S-Lec (Sekisui, Japan) and Trosifol (Kuraray Europe GmbH, Germany). There are other types of interlayer materials in use, including polvurethanes, such as Duraflex thermoplastic polyurethane (Baver MaterialScience, Germany), Ethylene vinyl acetate (EVA), polyvinyl alcohol (PVA), etc. The chemical structures of several interlayer materials are shown in FIG. 26.

For the purpose of the accelerated weathering test, first of all, impregnation of PVB-sheets took place in previously prepared primer formulations containing certain amount of FS-206 dye compound, yielding blue-light-filtering PVB sheets with 20%, 25% and 33% blue light blockage. Then, the PVB sheets were dried and laminated between two glass panels under elevated temperature (for example, 135° C.) and pressure. The laminated samples were characterized before the test and checked after 500 hrs, 1000 hrs and 2000 hrs exposure to the above conditions for their transmission and CIE La*b* coordinates' changes. All tested samples satisfied the criteria for passing the test, which are: delta a* and delta b* of less than 1, delta E*<2.0, transmittance>70% and changes in transmittance of less than 1.5% after exposure of 2000 hrs.

The luminance and other parameters for the tested construction was measured according to ISO 13837: Road vehicles—Safety glazing materials—Method for the determination of solar transmittance, which specifies test methods to determine the direct and total solar transmittance of safety glazing materials for road vehicles. Two computational conventions (denoted convention "A" and convention "B") are included, both of which are consistent with current international needs and practices. While either convention may be used, the results described herein used Method "A". This ISO standard applies to monolithic or laminated, clear or tinted samples of safety glazing materials.

All the parameters monitored and measured before, during, and after the test are given in Tables 2 and 3.

Table 2 gives the values for the transmittance of all tested constructions of laminated glass, glass/PVB-A/glass (20% blue blocking), glass/PVB-B/glass (25% blue blocking), glass/PVB-C/glass (33% blue blocking), and glass/PVB/ glass as control sample (non-blue-filtering sample), which is in the range of about 86-89% before the test, and remained in this range after 2000 hrs test. L*, a* and b* coordinates, also given in Table 2, are similar for all tested samples (blue-blocking samples and the control sample)_and do not change significantly during 2000 hrs of exposure to test conditions.

TABLE 2

Light transmission and CIE La*b* color coordinates of tested blue-blocking laminated glass samples before and after 500 hrs, 1000 hrs and 2000 hrs accelerated weathering test.

| Construction | Control - before exposure | | | | 500 hrs | | | |
|---|---|---|---|---|---|---|---|---|
| | Light Transmission [Ill. A/2°] | L* [D65/10°] | a* [D65/10°] | b* [D65/10°] | Light Transmission [Ill. A/2°] | L* [D65/10°] | a* [D65/10°] | b* [D65/10°] |
| glass/PVB-A/glass | 88.46 | 34.20 | −0.89 | −0.07 | 88.23 | 34.03 | −0.83 | 0.03 |
| glass/PVB-B/glass | 87.76 | 35.31 | −1.08 | 0.12 | 87.48 | 35.15 | −1.03 | 0.33 |
| glass/PVB-C/glass | 87.15 | 35.26 | −1.27 | 0.66 | 87.04 | 35.21 | −1.16 | 0.71 |
| glass/PVB/glass | 88.92 | 34.26 | −0.81 | −0.30 | 89.02 | 34.29 | −0.68 | −0.43 |

| Construction | 1000 hrs | | | | 2000 hrs | | | |
|---|---|---|---|---|---|---|---|---|
| | Light Transmission [Ill. A/2°] | L* [D65/10°] | a* [D65/10°] | b* [D65/10°] | Light Transmission [Ill. A/2°] | L* [D65/10°] | a* [D65/10°] | b* [D65/10°] |
| glass/PVB-A/glass | 88.10 | 34.28 | −0.81 | 0.00 | 87.90 | 34.28 | −0.86 | 0.07 |
| glass/PVB-B/glass | 87.46 | 35.29 | −1.03 | 0.33 | 87.40 | 35.27 | −0.99 | 0.27 |
| glass/PVB-C/glass | 86.90 | 35.22 | −1.16 | 0.74 | 86.80 | 35.23 | −1.13 | 0.78 |
| glass/PVB/glass | 88.99 | 34.43 | −0.65 | −0.52 | 88.90 | 34.47 | −0.64 | −0.49 |

TABLE 3

Changes in light transmission and changes in CIE La*b* color coordinates of tested blue-blocking laminated glass samples after 500 hrs, 1000 hrs and 2000 hrs accelerated weathering test. Delta E* parameter was also calculated from the changes in CIE La*b* coordinates.

| Construction | ΔLT % | ΔL* | Δa* | Δb* | ΔE |
|---|---|---|---|---|---|
| 500 hrs | | | | | |
| glass/PVB-A/glass | 0.23 | 0.17 | −0.06 | −0.10 | 0.21 |
| glass/PVB-B/glass | 0.28 | 0.16 | −0.05 | −0.21 | 0.27 |
| glass/PVB-C/glass | 0.11 | 0.05 | −0.11 | −0.05 | 0.13 |
| glass/PVB/glass | −0.10 | −0.03 | −0.13 | 0.13 | 0.19 |
| 1000 hrs | | | | | |
| glass/PVB-A/glass | 0.36 | −0.08 | −0.08 | −0.07 | 0.13 |
| glass/PVB-B/glass | 0.30 | 0.02 | −0.05 | −0.21 | 0.22 |
| glass/PVB-C/glass | 0.25 | 0.04 | −0.11 | −0.08 | 0.14 |
| glass/PVB/glass | −0.07 | −0.17 | −0.16 | 0.22 | 0.32 |
| 2000 hrs | | | | | |
| glass/PVB-A/glass | 0.56 | −0.08 | −0.03 | −0.14 | 0.16 |
| glass/PVB-B/glass | 0.36 | 0.04 | −0.09 | −0.15 | 0.18 |
| glass/PVB-C/glass | 0.35 | 0.03 | −0.14 | −0.12 | 0.19 |
| glass/PVB/glass | 0.02 | −0.21 | −0.17 | 0.19 | 0.33 |

Note:
The tested construction was laminated PVB sheet between two glass panels. PVB-A is PVB sheet impregnated with FS-206 dye compound with 20% blue light blockage. PVB-B is PVB sheet impregnated with FS-206 with 25% blue light blockage. PVB-C is PVB sheet impregnated with FS = 206 with 33% blue light blockage.

In Table 3, it can be also seen that all tested constructions, glass/PVB-A/glass (20% blue blocking), glass/PVB-B/glass (25% blue blocking), glass/PVB-C/glass (33% blue blocking), and glass/PVB/glass as control sample (non-blue-filtering sample) have shown similar values for total color difference parameter, delta E* calculated for the samples after 500 hrs, 1000 hrs and 2000 hrs with respect to the initial sample's state (used as a "standard" in the calculation). The similar values for delta E* for blue-blocking samples and non-blue-blocking sample implies that the PVB layers containing porphyrin dye compound do not change (degrade) during prolonged and intense UV light exposure at elevated temperature.

In another embodiment PVB, PVA, PU or EVA interlayers used for making laminated glass, which structures are given in FIG. 26, can be coated with selective blue-light filtering coating.

In another embodiment the blue-light blocking dye package can be added during the synthesis step of the interlayer (PVB, PVA, EVA, PU).

Light- or heat-induced degradation (mainly oxidation) of organic dye materials is a complex radical process, when free radicals (R.) are generated. Therefore, UV absorbers and/or radical scavengers ((antioxidants, light stabilizers) can be added to the coating to improve its stability. Such additives can be purchased from BASF, under the trade names Tinuvin® and Chimassorb® UV absorber series, hindered amine light stabilizer HALS and others.

In one embodiment, UV stabilizer/UV blocker can be added to the selective blue-light coating to further improve its UV and heat stability. Schematically the addition of UV stabilizer and/or UV blocker is given in FIG. 27. The simplest way, is to add the UV blocking layer on top of blue-blocking filtering coating (FIG. 27a). Thus, in this embodiment, the UV blocking element is disposed on the filter. Another way is the blue-blocking coating to be immersed in a UV-blocking tint bath, where UV blocker diffusion into the selective blue light filtering coating happens (FIG. 27b). Another way is the UV blocker and/or stabilizer to be added in the primer or hard coat formulation together with the blue-blocking dyes (FIG. 27c). Yet another option is they to be chemically-bonded to the dye, as schematically shown in FIG. 27d.

All Cu-porphyrins disclosed herein are thermally-stable for many hours at elevated temperatures. Tests conducted in air at 110 degrees C. showed no any signs of thermal degradation of Cu-porphyrin (oxidation, dye bleaching and so on).

An intense UV exposure tests conducted in air with an intense UV and visible light (supplied by Dymax Blue-Wave200 light source) have shown satisfactory photo-stability of all Cu-porphyrins.

Figure 4:
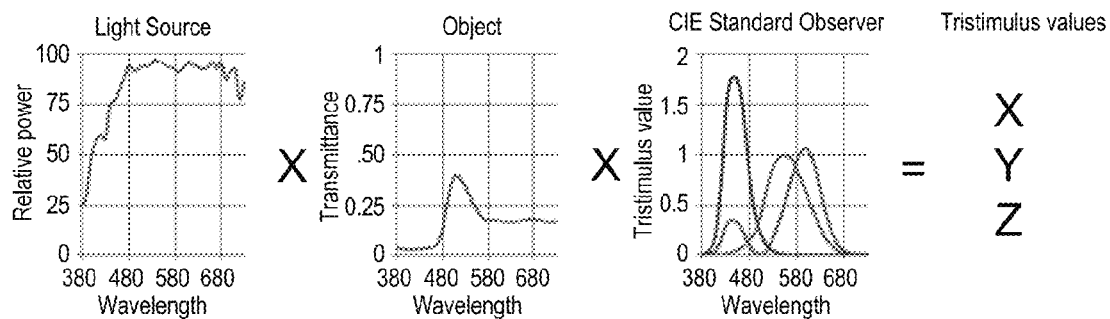
FIG. 4 shows a schematic of the calculation of X, Y and Z tristimulus values.

The coatings comprising porphyrin dyes in the present disclosure may be characterized with the Yellowness index (YI parameter, which is actually a number computed from colorimetric or spectrophotometric data indicating the degree of departure of a sample's color from colorless (or from a preferred white) towards yellow). Negative values of YI are possible, as well, and denote sample's color departure toward blue. Yellowness Index per ASTM Method E313 was calculated as follows:

$$YIE313 = \frac{100(C_x X - C_z Z)}{Y}$$

where C-coefficients depend on the illuminant (light source type) and the observer, and X, Y and Z are tristimulus values, which calculation is schematically given in FIG. 4. The tristimulus values X, Y, and Z for a given object, which is illuminated by a certain light source, can be calculated for the CIE Standard Observer by summing the products of all these distributions (light source spectrum, object spectrum and CIE color-matching functions for the Standard Observer) over the wavelengths range typically from 380 nm to 780 nm.

The first systems discussed herein have a low yellowness index, indicating a low color shift. In one embodiment, the first system has a YI of no more than 30, no more than 27.5, no more than 25, no more than 22.5, no more than 20, no more than 17.5, no more than 15, no more than 12.5, no more than 10, no more than 9, no more than 8, no more than 7, no more than 6, no more than 5, no more than 4, no more than 3, no more than 2, and no more than 1. Preferably, in ophthalmic systems, where applications may have more sensitivity to appearance of the system, the system has a YI of no more than 15. Preferably, in non-ophthalmic systems, where appearance of the system may not be as a factor, the system has a YI of no more than 35.

The optical filters discussed herein also have a low yellowness index. In one embodiment, the filter has a YI of no more than 30, no more than 27.5, no more than 25, no more than 22.5, no more than 20, no more than 17.5, no more than 15, no more than 12.5, no more than 10, no more than 9, no more than 8, no more than 7, no more than 6, no more than 5, no more than 4, no more than 3, no more than 2, and no more than 1. Preferably, in ophthalmic systems, where applications may have more sensitivity to appearance of the system, the filter has a YI of no more than 15. Preferably, in non-ophthalmic systems, where appearance of the system may not be as a factor, the filter has a YI of no more than 35. The yellowness index of the optical filter may be the same or different from the yellowness index of the system.

Figure 5A:
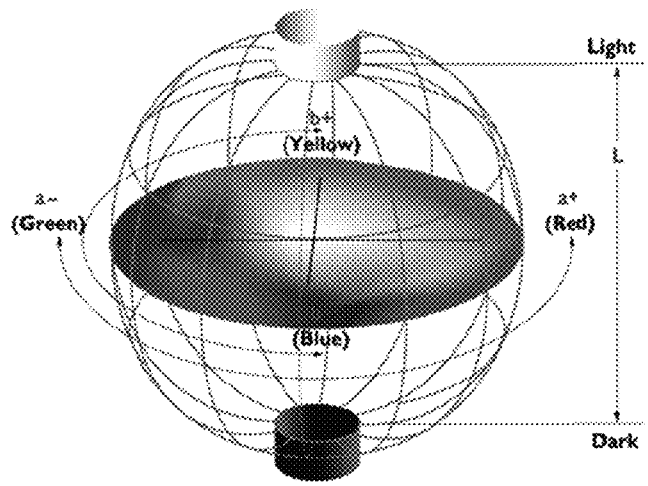
FIG. 5A shows the CIE LAB color system.
Figure 5B:
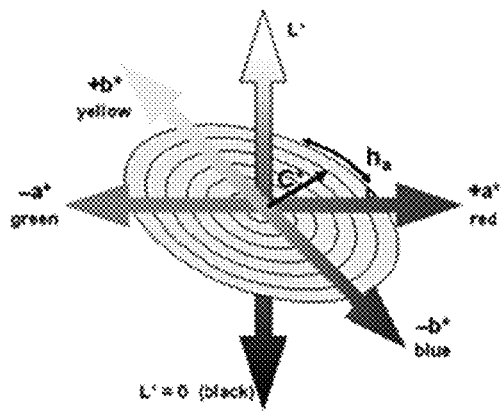
FIG. 5B shows another representation of the CIE LAB color system.

Besides YI-values, other color parameters and color space systems may be used for to characterize the systems and optical filters (such as selective blue-blocking coatings or other types of selective blue-blocking filters) disclosed herein. They are given below:

(B) CIE LAB Color Space (FIGS. 5A and 5B):

Three parameters L, a* and b* represent samples (e.g. coatings) in CIE LAB color space as follows:

L*—Represents a sample's position on the lightness axis in CIE LAB color space;

a*—Represents a sample's position on the green/red axis in CIE LAB color space, green being in the negative direction and red being in the positive direction; and b*—Represents a sample's position on the blue/yellow axis in CIE LAB color space, blue being in the negative direction and yellow being in the positive direction.

Further information regarding the CIE LAB color space may be found in the Glossary. CIE LAB coordinates of a sample may be calculated by the method discussed in the Glossary using the transmission spectrum of the sample. The light source that is used to measure the transmission spectrum of the sample generally does not matter, as long as the light source is a broad-spectrum light source.

Once this transmission spectrum determined, it is used to calculate CIE LAB coordinates of the sample. Although discussed in the Glossary in more detail, as a general matter, CIE LAB coordinates are calculated using the transmission spectrum of the sample and the spectrum of a reference light source. This second reference light source may be the same or different from the light source used to determine the transmission spectrum of the sample. In a preferred embodiment the reference light source is D65.

(C) CIE LCH Color Space (FIG. 6):

Three parameters L, C* and h* represent samples (coatings) in CIE LCH color space as follows:

L* axis represents Lightness.

C* axis represents Chroma or "saturation". This ranges from 0 at the center of the circle, which is completely unsaturated (i.e. a neutral grey, black or white) to 100 or more at the edge of the circle for very high Chroma (saturation) or "color purity".

h* describes the hue angle. It ranges from 0 to 360.

One can easily transform CIE LAB color coordinates into CIE LCH coordinates and vice versa. For instance, C* and h* coordinates can be calculated from a* and b* using following equations:

CIE 1976 a,b (CIELAB) chroma:

$$C^*_{ab} = (a^{*2} + b^{*2})^{1/2}$$

CIE 1976 a,b (CIELAB) hue angle:

$$h_{ab} = \arctan(b^*/a^*)$$

Figure 7:
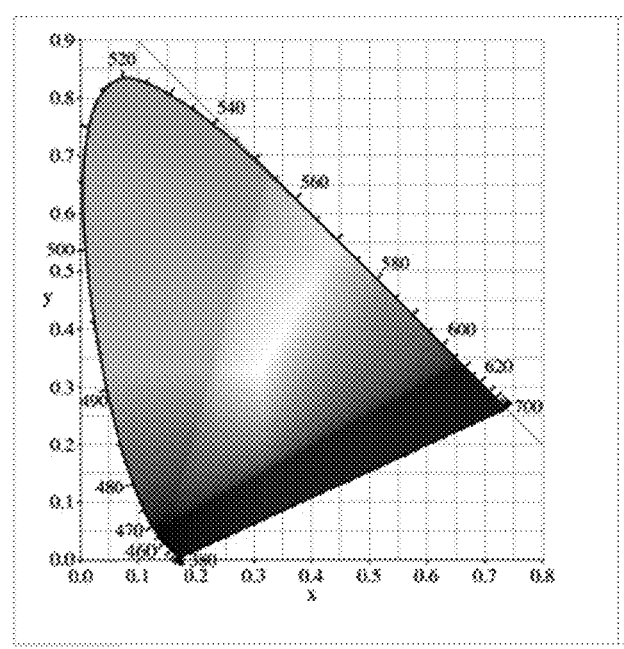
FIG. 7 shows the CIE 1931 color space.

(C) CIE 1931 Chromaticity Diagram (or CIE xy Color Space, FIG. 7):

CIE chromaticity diagram or CIE color space has several modifications over the years with 1931 and 1976 are most used ones. CIE chromaticity coordinates (x, y, z) be derived from the tristimulus values (X, Y, Z):

$$x = \frac{X}{X+Y+Z}$$

$$y = \frac{Y}{X+Y+Z}$$

$$z = \frac{Z}{X+Y+Z}$$

$$x+y+z = 1$$

(D) CIE 1976 Color Space (or L'u'v' Color Space or CIE LUV Color Space, FIG. 8):

The CIE 1976 chromaticity diagram is a more uniform color space than CIE 1931 diagram. It is produced by plotting u' as abscissa and v' as ordinate, where u' and v' are calculated according to:

$$u' = \frac{4X}{X+15Y+3Z} = \frac{4x}{-2x+12y+3}$$

$$v' = \frac{9Y}{X+15Y+3Z} = \frac{9y}{-2x+12y+3}$$

where X, Y, and Z are the tristimulus values. The third chromaticity coordinate w' is equal to (1−u'−v'), because:

$$u'+v'+w'=1$$

(E) Color Parameters' Differences and Total Color Difference (Delta E*):

(i) Color Parameters' Differences in CIE LAB space: The position of a given sample (coating) in CIE LAB can be also expressed via difference of LAB-coordinates with respect to a standard.

If delta L* is positive; the sample is lighter than the standard. If negative; it would be darker than the standard.

If delta a* is positive; the sample is more red (or less green) than the standard. If negative; it would be more green (or less red).

If delta b* is positive; the sample is more yellow (or less blue) than the standard. If negative; it would be more blue (or less yellow).

(ii) Total Color difference, ΔE* or DE or delta E* between two color stimuli is calculated as the Euclidean distance between the points representing them in the CIE LAB or CIE LCH space.

CIE LAB total color difference delta E* is a function of delta L*, delta a* and delta b* is given in FIG. a), while CIE LCH total color difference delta E* is a function of delta L*, delta C* and delta h* is given in FIG. 9.

The formulas for calculation of delta E in CIE LAB and CIE LCH space are given below:

$$\Delta E^*_{ab} = [(\Delta L^*)^2 + (\Delta a^*)^2 + (\Delta b^*)^2]^{1/2}$$

and $$\Delta E^*_{ab} = [(\Delta L^*)^2 + (\Delta C^*)^2 + (\Delta H^*)^2]^{1/2}$$

The meaning of all these color differences (color coordinates' differences and total color difference delta E*) is given below:

ΔL*=difference in lightness/darkness value +=light −=darker

Δa*=difference on red/green axis +=redder −=greener

Δb*=difference on yellow/blue axis +=yellower −=bluer

ΔC*=difference in chroma +=brighter −=duller

ΔH*=difference in hue

| Delta E value | Meaning |
| --- | --- |
| 0-1 | A normally invisible difference |
| 1-2 | Very small difference, only obvious to a trained eye |
| 2-3.5 | Medium difference, also obvious to an untrained eye |
| 3.5-5 | An obvious difference |
| >6 | A very obvious difference |

Delta E may be one of the parameters relied upon to determine a sample's color shift. A detailed description of the meaning of delta E*-values is given below:

Color difference equations are set such that their units correspond to just noticeable difference JND, hence, it is commonly stated that any color difference below 1 unit is predicted as not being perceptible for samples viewed side by side.

One study found a JND to be equal to $\Delta E^*=2.3$ (M. Mahy, L. Van Eycken, and A. Oosterlinck, "Evaluation of uniform color spaces developed after the adoption of CIELAB and CIELUV," *Color Research and Application*, vol. 19, 2, pp. 105-121, 1994).

Schlapfer suggests for two color samples viewed side by side the following classification:
$\Delta E^*<0.2$ as "Not visible",
$\Delta E^*$ between 0.2 and 1.0 as "Very small",
$\Delta E^*$ between 1.0 and 3.0 as "Small",
$\Delta E^*$ between 3.0 and 6.0 as "Medium" and
$\Delta E^*>6.0$ as "Large"
(K. Schlapfer, Farbmetrik in der Reproduktionstechnik und im Mehrfarbendruck, 2 ed.: UGRA, 1993).

Hardeberg proposes a good rule of thumb for practical interpretation of a $\Delta E^*$, where:
$\Delta E^*<3$ are classified as "Hardly perceptible",
$\Delta E^*<6$ is defined as "perceptual, but acceptable" and
$\Delta E^*>6$ as "Not acceptable"
(J. Y. Hardeberg, Acquisition and Reproduction of Color Images, Colorimetric and Multispectral Approaches Dissertation.com, 2001).

Another study states that $\Delta E^*$ between 4 and 8 is generally deemed acceptable in e.g. press and color imaging (A. Sharma, *Understanding Color Management*. Thompson Delmar Learning: New York, 2004). In the study by Stokes et al. values of approximately $\Delta E^*=6$ was found acceptable for their experimental images and observers (M. Stokes, M. Fairchild, and R. Berns, "Colorimetrically quantified visual tolerances for pictorial images," in *Proc. TAGA—Technical Association of the Graphic Arts, Proceedings of the 44th Annual Meeting*, Williamsburg, Va., USA, 1992, pp. 757-777).

The discrepancies in the meaning of delta E* throughout these different studies is mostly because the evaluation of color acceptability is highly subjective and depends greatly on the experiences and expectations of observers, as well as the application for which the samples are intended. However, they should be taken into consideration when talking about JND or delta E*, because the human eye is more sensitive to certain colors than the others. A good metric should take this into account in order for a color parameter, such as delta E* or JND to have meaning. For example, a certain $\Delta E^*$ value may be insignificant between two colors where the eye is insensitive, but can be very significant in another part of the spectrum, where the human eye is more sensitive.

Figure 10:
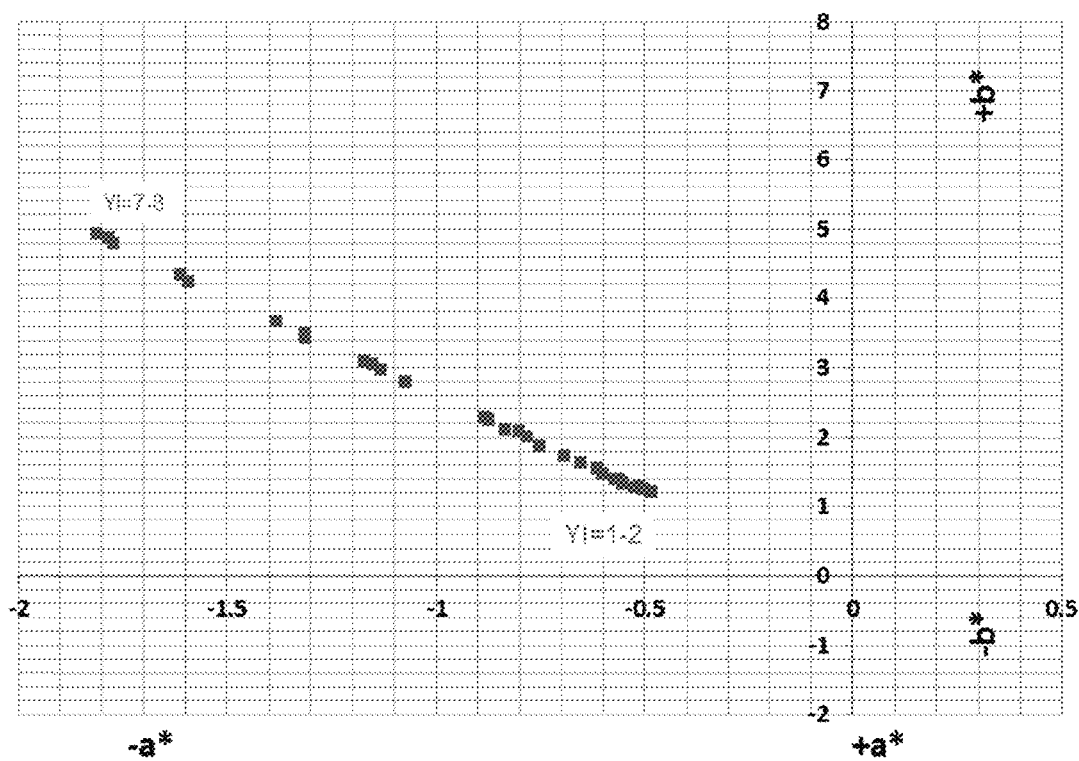
FIG. 10 shows a* and b* coordinates (CIE LAB color system) for selective blue-blocking coatings comprising FS-206 dye with blue light blockage ranging from 10% to 40%.
Figure 11:
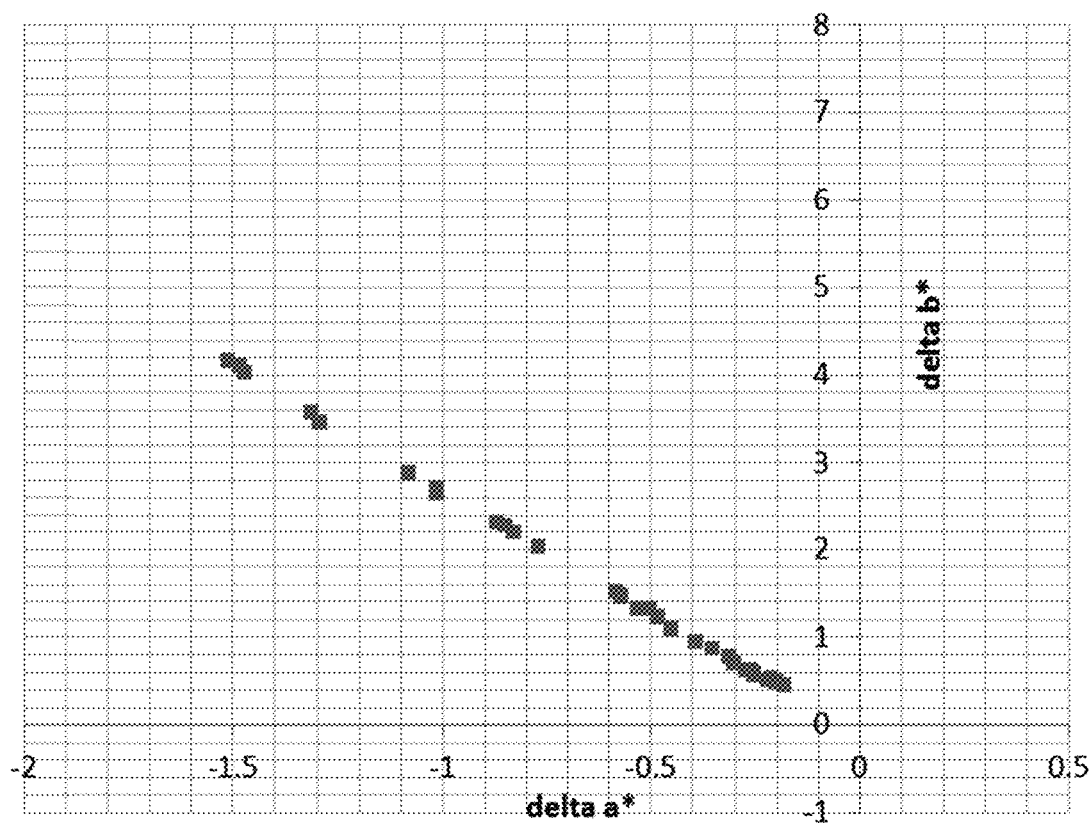
FIG. 11 shows delta a* and delta b* coordinates (CIE LAB color system) for selective blue-blocking coatings comprising FS-206 dye with blue light blockage ranging from 10% to 40%.

FIGS. 10-14 present several color parameters, measured and calculated for the selective blue-blocking coatings consistent with embodiments disclosed herein. FIG. 10 shows the a* and b* coordinates (in the CIE LAB color system) for selective blue-blocking coatings comprising FS-206 dye with blue light blockage ranging from 10% to 40%. FIG. 11 shows Delta a* and delta b* coordinates (CIE LAB color system) for selective blue-blocking coatings comprising FS-206 dye with blue light blockage ranging from 10% to 40%. FIG. 12 shows YI vs. Delta E for selective blue-blocking coatings comprising FS-206 dye. Each symbol designates the measured coating; all presented coatings provide blue light blocking in the range 10-40% and showed YI between 2 and 8. In FIG. 12, the color difference (Delta E) was calculated as: La*b* (SAMPLE)–La*b* (STANDARD) with Polycarbonate surfaced lens used as a STANDARD. This is an example of how the effect of the filter may be isolated.

FIG. 13 shows Yellowness index vs. Chroma for blue-blocking coatings. The symbols present in the Figure designate coatings with about 20% blue light blockage, while the broken ellipsoid gives the range for coatings with 10-40% blue light blockage. FIG. 14 shows Hue vs. Chroma for optical filter coatings. The symbols designate coatings with about 20% blue light blockage, while the broken ellipsoid gives the range for coatings with 10-40% blue light blockage.

FIGS. 15 and 16 shows the tunability of % blue light blockage as a function of dye concentration for FS-206 and FS-207 dyes coated on glass substrates, respectively. Increased dye concentration at given coating thickness yields increased light blockage and higher YI-values. Precise tunability of % blue light blockage and YI can be achieved by adjusting the dye concentration in the coating. It is noted that while the filters here have been coated on a glass substrate, the glass substrate does not contribute to transmission spectrum or the YI. FIG. 15 shows the transmission spectra of selective filtering coatings on glass substrates comprising Cu(II) meso-Tetra(2-naphthyl) porphine dye (FS-206) at different concentrations. Generally, FIG. 15 shows that as the dye concentration is increased, the amount of light transmitted is decreased. For example, the transmission spectrum for dye concentration of 0.1 is represented by the line in FIG. 15 that has the lowest transmittance at wavelength 420 nm and the transmission spectrum for dye concentration of 0.091 is represented by the line that has the second-to-lowest transmittance at the wavelength 420 nm. Table 7 below further discusses the dependencies of dye concentration, YI and % blue light blockage for coatings containing FS-206 dye. FIG. 16 shows the transmission spectra of selective filtering coating on glass substrates comprising FS-207 dye at different concentrations. The graph lines in FIG. 16 represent, in order from top to bottom of the graph, YI as follows: YI=10.61, YI=14.03, YI=15.51, YI=17.58, and YI=19.57. Generally, FIG. 16 shows that as YI is increased, transmittance is decreased. Table 8 below further discusses the relationships between the dye concentration, YI, and % blue blockage for coatings containing FS-207 dye.

FIGS. 17A-17F are related to % blue light block as a function of YI, but also slight variations in % blockage is observed depending on the spectral range where the calculation is done. FIGS. 17A-17F show Yellowness Index (YI) vs. % blue light blockage, calculated for different spectral ranges for coatings on glass substrates comprising FS-206 dye at different concentrations. Note: the glass substrate does not contribute to the final/reported YI (YI of glass is 0). FIG. 17A is for the wavelength ranges 420 nm-425 nm. FIG. 17B is for the wavelength ranges 420 nm-425 nm. FIG. 17B is for the wavelength ranges 420 nm-430 nm. FIG. 17C is for the wavelength ranges 415 nm-435 nm. FIG. 17D is for the wavelength ranges 420 nm-440 nm. FIG. 17E is for the wavelength ranges 410 nm-430 nm. FIG. 17F is for the wavelength ranges 410 nm-450 nm.

Thus, the systems disclosed herein have a very low color shift in both transmittance and reflectance. Using the some of the parameters discussed above, this low color shift may be characterized by how the system transmits or reflects a certain reference light source. CIE Standard Illuminant D65 light source has CIE LAB coordinates represented by $(a^*_1$, $b^*_1$, $L^*_1$). In one embodiment, when this CIE D65 light source is transmitted through or reflected off the first system, the light that results has CIE LAB coordinates represented by ($a^*_2$, $b^*_2$, $L^*_2$). A total color difference $\Delta E$ between ($a^*_1$, $b^*_1$, $L^*_1$) and ($a^*_2$, $b^*_2$, $L^*_2$) is less than 6.0, preferably less than 5.0, and even more preferably less than 4.0 or 3.0. A total chroma difference between ($a^*_1$, $b^*_1$, $L^*_1$) and ($a^*_2$, $b^*_2$, $L^*_2$) is less than 6.0, preferably less than 5.0, and even more preferably, less than 4.0 or 3.0.

The low color shift in both transmittance and reflectance of the systems disclosed herein may also be characterized in how the optical filter transmits and reflects a certain reference light source.

One way to characterize the effect of an optical filter on a system is to measure how a first system comprising the optical filter transmits and reflects a reference light source. Then, the same reference light source should be transmitted through and/or reflected off a second system. The second system is identical to the first system in every way except that it does not include the optical filter. Using the numbers obtained for the first system and the second system, the color shift of the optical filter may be determined. For example, in one embodiment, CIE Standard Illuminant D65 light source had CIE LAB coordinates represented by ($a^*_1$, $b^*_1$, $L^*_1$). When this CIE D65 light source is transmitted through or reflected off the first system, the light that results has CIE LAB coordinates represented by ($a^*_2$, $b^*_2$, $L^*_2$). This CIE D65 light source is then transmitted through or reflected off a second system. The second system is identical to the first system in every way except that it does not contain an optical filter. When the CIE D65 light source is transmitted through or reflected off the second system, the light that results has CIE LAB coordinates represented by ($a^*_3$, $b^*_3$, $L^*_3$). A total color difference $\Delta E$ between ($a^*_2$, $b^*_2$, $L^*_2$) and ($a^*_3$, $b^*_3$, $L^*_3$) is less than 6.0, preferably less than 5.0, and even more preferably less than 4.0 or 3.0. A total chroma difference between ($a^*_2$, $b^*_2$, $L^*_2$) and ($a^*_3$, $b^*_3$, $L^*_3$) is less than 6.0, preferably less than 5.0, and even more preferably less than 4.0 or 3.0.

Thus, the optical filters disclosed herein are superior to others at least in part due to the low color shift. In Tables 4-6 are given examples of measured and calculated color parameters and color coordinates for an optical filter coating comprising FS-206 dye compound and providing 20% blue light blockage. What is noticeable is the low "color" values of the coating compared to broad-band filtering coatings. For instance, among other color parameters, its chroma C was measured to be 1.98, YI was calculated to be 3.5, total color difference delta E* to be only 3.91, which corresponds to JND around 1.7, while the average and luminous transmittances were above 90%. Also, all other coatings comprising other porphyrin dyes were characterized with "low color" values. This can be seen from FIG. 10-14, for blue-light-filtering coatings, which can provide up-to 40% blue light blockage:

TABLE 4

Color parameters C, YI, hue, a*, b*, delta E and JND, for selective blue-blocking coating containing FS-206 dye with 20% blue light blockage.

| Sample | L | a* | b* | Hue | Chroma | ΔE | YI | JND = 2.3DE |
|---|---|---|---|---|---|---|---|---|
| Coating comprising Cu-porphyrin dye compound FS-206 | 96.68 | −0.75 | 1.83 | 112.30 | 1.98 | 3.91 | 3.5 | 1.7 |
| D65 (reference light source) | 100.00 | −0.01 | =0.10 | 262.08 | 0.10 | N/A | N/A | N/A |

TABLE 5

Average transmittance Tavg, luminous transmittance Tv, and CIE LAB lightness L* for selective blue-blocking coating containing FS-206 dye with 20% blue light blockage.

| Optical filter | Tavg | Tv | L |
|---|---|---|---|
| Coating comprising Cu-porphyrin dye compound FS-206 | 91.00 | 91.80 | 96.72 |

TABLE 6

CIE 1931 x and y color coordinates and CIE 1976 u and v color coordinates for selective blue-blocking coating containing FS-206 dye with 20% blue light blockage.

| Optical filter | CIE 1931 | | CIE 1976 | |
|---|---|---|---|---|
| | x | y | u | v |
| Coating comprising Cu-porphyrin dye compound FS-206 | 0.32 | 0.34 | 0.2 | 0.47 |

Thus, in one embodiment, the first system has:

Chroma C is below 5.0,

|a*| and |b*| are below 2 and 4, respectively,

YI is below 8.0, delta E* is below 5.0 and

JND is below 2 units, while the lightness L and transmission values (Tavg, Tv) are above 90%.

In Table 7 are given values for % blue light blockage, calculated in different spectral ranges (all within the previously mentioned "dangerous for the retina" blue wavelength region) for coatings comprising Cu(II) meso-Tetra(2-naphthyl) porphine (FS-206 dye) on glass substrates. The dye concentration in the coating is given as % by weight dye/primer. % blue light blockage values and YI's are given for glass substrates, where both surfaces were coated with the coating comprising the dye. The glass substrate does not contribute to the final reported YI-value (i.e. YI for the used glass substrate is 0). It is clear that the % blue light blockage and YI of the coating comprising FS-206 dye can be precisely tuned by the dye concentration in the coating and the thickness coating. In Table 7, the thickness of the coatings was kept constant, i.e. all coatings were done by dip-coating method at same conditions (immersion rate, withdrawing rate, ambient temperature, formulation viscosity), and thus, the reported % blue blockage and YI were controlled solely by the dye concentration in the coating.

TABLE 7

Dye concentration, Yellowness Index (YI) and % blue light blockage for glass substrates coated with selective blue light coating comprising Cu(II) meso-Tetra(2-naphthyl) porphine dye (FS-206).

| | FS-206 wt % (dye/primer) | | | | | | | | | | | |
|---|---|---|---|---|---|---|---|---|---|---|---|---|
| | 0.100 | 0.091 | 0.080 | 0.057 | 0.045 | 0.036 | 0.025 | 0.020 | 0.014 | 0.012 | 0.010 | 0.008 |
| | YI* | | | | | | | | | | | |
| range | 7.60 | 6.71 | 5.80 | 4.87 | 3.54 | 3.28 | 2.91 | 2.40 | 2.28 | 2.02 | 1.96 | 1.88 |
| | blue light blockage, % | | | | | | | | | | | |
| 420 +/− 5 nm | 38 | 34 | 29 | 25 | 19 | 17 | 16 | 13 | 13 | 11 | 10 | 10 |
| 420 +/− 3 nm | 40 | 36 | 31 | 27 | 20 | 19 | 17 | 14 | 14 | 12 | 11 | 11 |
| 425 +/− 10 nm | 30 | 26 | 23 | 19 | 14 | 13 | 12 | 10 | 10 | 9 | 8 | 8 |
| 425 +/− 5 nm | 35 | 31 | 27 | 23 | 17 | 16 | 15 | 12 | 12 | 10 | 9 | 9 |
| 425 +/− 3 nm | 36 | 32 | 28 | 24 | 18 | 16 | 15 | 12 | 12 | 11 | 10 | 10 |
| 420-425 nm | 41 | 36 | 32 | 27 | 20 | 19 | 18 | 14 | 14 | 12 | 11 | 11 |
| 420-440 nm | 23 | 20 | 18 | 15 | 11 | 10 | 9 | 7 | 7 | 6 | 6 | 6 |
| 410-450 nm | 20 | 17 | 15 | 12 | 9 | 8 | 8 | 6 | 6 | 5 | 5 | 5 |

*The reported YI-values are measured for coatings on dip-coated glass substrates, where the substrate does not contribute to the final (reported) YI-value [YI of glass = 0].

Table 8 shows similar data for coatings comprising FS-207 dye coated on glass substrates. The glass substrate does not contribute to the final reported YI-value (i.e. YI for the used glass substrate is 0). Note that due to the red-shift of the absorption peak of FS-207 compared to that of FS-206, the YI's of the coatings comprising FS-207 are higher than those for coatings with FS-206 dye at the same % blockage level. In Table 8, the thickness of the coatings was kept constant, i.e. all coatings were done by dip-coating method at same conditions (immersion rate, withdrawing rate, ambient temperature, formulation viscosity), and thus, the reported % blue blockage and YI were controlled solely by the dye concentration in the coating.

TABLE 8

Dye concentration, Yellowness Index (YI) and % blue light blockage for glass substrates coated with selective blue light coating comprising FS-207 dye.

| | FS-207 wt % (dye/primer) | | | | | |
|---|---|---|---|---|---|---|
| | 0.128 | 0.115 | 0.1 | 0.092 | 0.077 | 0.066 |
| | YI* | | | | | |
| range | 19.57 | 17.58 | 15.51 | 14.03 | 11.5 | 10.61 |
| | % blue light blockage | | | | | |
| 410-450 nm | 33 | 30 | 26 | 23 | 20 | 17 |
| 420-440 nm | 43 | 38 | 32 | 29 | 26 | 22 |

*The reported YI-values are measured for coatings on dip-coated glass substrates, where the substrate does not contribute to the final (reported) YI-value [YI of glass = 0].

FS-208 dye has a broader peak and red-shifter compared to that of FS-206 dye, and therefore, showed much higher YI values for the coatings that provide same % blockage than FS-206.

In Table 9, YI measured for surfaced plano lens blanks are given. These values are given as an example only; the values for surfaced lens blanks can greatly vary depending on the manufacturer of the actual lens material, final lens blank thickness, lens optical power etc.

TABLE 9

YI measured for surfaced plano lens banks.

| Lens material | CR-39 | MR-8 | PC | MR-7 | MR-10 |
|---|---|---|---|---|---|
| YI of surfaced lens | 0.5 | 0.5 | 1.1 | 0.8 | 1.8 |

By example only, Table 10 gives the approximate YI values for surfaced plano lens blanks coated with blue light selective coating comprising FS-206 dye. The final reported values for YI of the coated surfaced lens blanks are sum of the YI (coating) and YI (substrate).

TABLE 10

Approximate YI values for surfaced plano lenses coated with blue light selective coating comprising FS-206 dye.

| | % blue blockage (420 +/− 5 nm) | | | | | | | | | | |
|---|---|---|---|---|---|---|---|---|---|---|---|
| | 38 | 34 | 29 | 25 | 19 | 17 | 16 | 13 | 13 | 11 | 10 |
| Lens material | Yellowness Index (YI) | | | | | | | | | | |
| glass (YI = 0) | 7.60 | 6.71 | 5.80 | 4.87 | 3.54 | 3.28 | 2.91 | 2.40 | 2.28 | 2.02 | 1.96 |
| CR-39 (YI = 0.5) | 8.10 | 7.21 | 6.30 | 5.37 | 4.04 | 3.78 | 3.41 | 2.90 | 2.78 | 2.52 | 2.46 |
| MR-8 (YI = 0.5) | 8.10 | 7.21 | 6.30 | 5.37 | 4.04 | 3.78 | 3.41 | 2.90 | 2.78 | 2.52 | 2.46 |
| PC (YI = 1.1) | 8.70 | 7.81 | 6.90 | 5.97 | 4.64 | 4.38 | 4.01 | 3.50 | 3.38 | 3.12 | 3.06 |
| glass (YI = 0) | 7.60 | 6.71 | 5.80 | 4.87 | 3.54 | 3.28 | 2.91 | 2.40 | 2.28 | 2.02 | 1.96 |
| CR-39 (YI = 0.5) | 8.10 | 7.21 | 6.30 | 5.37 | 4.04 | 3.78 | 3.41 | 2.90 | 2.78 | 2.52 | 2.46 |
| MR-8 (YI = 0.5) | 8.10 | 7.21 | 6.30 | 5.37 | 4.04 | 3.78 | 3.41 | 2.90 | 2.78 | 2.52 | 2.46 |
| PC (YI = 1.1) | 8.70 | 7.81 | 6.90 | 5.97 | 4.64 | 4.38 | 4.01 | 3.50 | 3.38 | 3.12 | 3.06 |
| glass (YI = 0) | 7.60 | 6.71 | 5.80 | 4.87 | 3.54 | 3.28 | 2.91 | 2.40 | 2.28 | 2.02 | 1.96 |

TABLE 10-continued

Approximate YI values for surfaced plano lenses coated with blue light selective coating comprising FS-206 dye.

| | % blue blockage (420 +/− 5 nm) | | | | | | | | | |
|---|---|---|---|---|---|---|---|---|---|---|
| | 38 | 34 | 29 | 25 | 19 | 17 | 16 | 13 | 13 | 11 | 10 |
| Lens material | | | | | Yellowness Index (YI) | | | | | |
| CR-39 (YI = 0.5) | 8.10 | 7.21 | 6.30 | 5.37 | 4.04 | 3.78 | 3.41 | 2.90 | 2.78 | 2.52 | 2.46 |
| MR-8 (YI = 0.5) | 8.10 | 7.21 | 6.30 | 5.37 | 4.04 | 3.78 | 3.41 | 2.90 | 2.78 | 2.52 | 2.46 |
| PC (YI = 1.1) | 8.70 | 7.81 | 6.90 | 5.97 | 4.64 | 4.38 | 4.01 | 3.50 | 3.38 | 3.12 | 3.06 |

From Table 7 and FIGS. 15 and 17A-17F, it can be noted that the coating's YI and selective blue light filtering performance can be precisely tuned by adjusting the FS-206 dye concentration in the coating. Additionally, this dye has a good solubility, especially in chlorinated solvents.

Lastly, it is noted that solvent may play a particular role in the methods disclosed herein. This is discussed below. Particular examples of the role of solvent are described below in the context of additional embodiments.

a) FS-206 dye is dissolved in methylene chloride and added to the primer at a concentration of 1 wt % dye/primer. Then, the solution is further diluted with a fresh primer down to the needed concentration for a given application. After filtration, the solution is applied to form an optical filter. For example, it may be used for dip-coating of the lenses. Then a clear hardcoat may be coated on the lens. The final lenses show about 30-35% blue light blockage in the spectral range around 420 nm and YI=5.0-6.0 depending on the lens material.

b) FS-206 dye is dissolved in chloroform and added to the primer at a concentration of 1 wt % dye/primer. The solution is ultrasonicated for 1 hours at 50 C. Then, the solution is further diluted with a fresh primer down to the needed final concentration for a given application. After filtration, the solution is used for dip-coating of the lenses followed by the clear hardcoat. The final lenses show about 30-35% blue light blockage in the spectral range around 420 nm and YI=5.0-6.0 depending on the lens material. The chloroform seems better solvent for FS-206 dye compared to the example (a) above. The same level of light blockage in the spectral range around 420 nm is achieved with lower dye concentration in chloroform.

In another embodiment, the selective blue-blocking filter contains a color-neutralizing component, e.g. Pigment Blue 15 (Sigma Aldrich), given below:

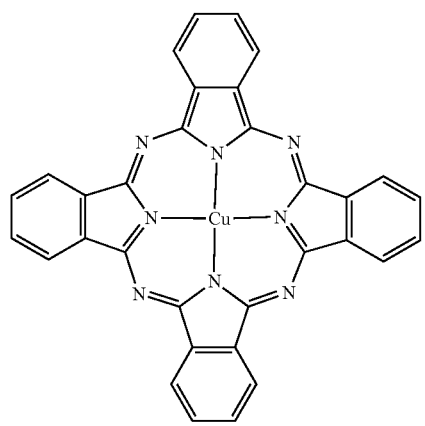

Copper(II) Phthalocyanine [546682 Aldrich]; Synonym: CuPc, Phthalocyanine Blue, Pigment Blue 15.

The coating might contain other optical brighteners (e.g. BASFrighteners Tinopal®) to brighten or enhance the appearance of coatings, masking yellowing.

In an ophthalmic system the selective blue blocking filtering can be incorporated into the lens system in various ways. By way of example only, the filter could be located: in one or more primer coats, one or more hard coats, one or more hydrophobic coats, one or more anti-reflective coats, within a photochromic lens, within the lens substrate, within the visibility tint of a contact lens, rugate, interference, band pass, band block, notch, dichroic, in varying concentrations and in one or more peaks of filtering or in any combination thereof.

In one embodiment the selective filter is incorporated into a sunglass (prescription or non-prescription) that passes traffic light recognition standards or in other embodiments does not pass traffic light recognition standards. In addition UV blocking and/or IR blocking is incorporated into the sunglass.

In one embodiment the selective blue-blocking filter contains carotenoids, e.g. lutein, zeaxanthin and others, melanin, or their combination. In another embodiment the selective blue blocking filter may contain: lutein, zeaxanthin, or melanin in either a natural, synthetic, or derivative form or in any combination thereof. Further, in other embodiments, the lutein, zeaxanthin, and melanin or any combination thereof may be designed to leach out of a system as to be absorbed by human tissue. For example, a contact lens could be designed such that lutein is purposely released into the eye to provide a health benefit.

In another embodiment the selective blue blocking filter can be incorporated in: PVA, PVB, sol-gel, or any type of film or laminate or any combination thereof.

In other embodiments UV and/or IR light is blocked or inhibited.

In another embodiment the filter can be incorporated throughout the entire product or incorporated in less than the entire product or in rings, layers, or zones or in any combination thereof. For example, in a contact lens that is 14.2 mm in diameter. The selective blue blocking filter can lie within the total 14.2 mm, or in less than the 14.2 mm or in rings, layers, or zones or in any combination thereof. This same is true of any product that incorporates said filter.

Embodiments could include by way of example only: any type of windows, or sheet of glass, or any transparent material, automotive windshields, aircraft windows, camera flash bulbs and lenses, any type of artificial lighting fixture (either the fixture or the filament or both), fluorescent lighting, LED lighting or any type of diffuser, medical instruments, surgical instruments, rifle scopes, binoculars, computer monitors, televisions screens, lighted signs or any other item or system whereby light is emitted or is transmitted or passes through filtered or unfiltered.

Embodiments may enable non-ophthalmic systems. Any non-ophthalmic system whereby, light transmits through or from the non-ophthalmic system are also envisioned. By way of example only, a non-ophthalmic system could include: automobile windows and windshields, aircraft windows and windshields, any type of window, computer monitors, televisions, medical instruments, diagnostic instruments, lighting products, fluorescent lighting, or any type of lighting product or light diffuser.

Any amount of light that reaches the retina can be filtered and can be included in any type of system: ophthalmic, non-ophthalmic, dermatological, or industrial.

In another embodiment, the dye package can be added to the lens material during making the lens blank or during the fabrication of contact lens or intra-ocular lens. Besides, the dyes given above, polymerizable and other types of reactive dyes can be used to enable chemical connection of the dye system to the surrounding lens material.

In one embodiment, there is provided a fabrication process that combines the synergistic balance of Yellowness index, light transmission of the system, selective filtering of light to protect the retina and/or improve contrast, dye formation, dye stability, thickness of the coating, compatibility with substrates to which it is applied, solubility into the resin, refractive index of the dye, protection from UV light, and protection from normal wear and tear.

The selective filter is located within the primer that is applied to the back surface of the lens (ocular surface-closest to the eye) with a scratch resistant coating applied to the front surface of the lens (contra-ocular-furthest from the eye) with a UV inhibitor applied in front or optionally on both the front and rear surface of the lens. The UV inhibitor functions to protect the dye from UV degradation along with reducing UV dose to the eye.

Fabricating the selective high energy visible light coating utilizing FS-206 or FS-209 or Cu1 or Cu2 or Cu5 dye are outlined as follows:

In the fabrication of the coating, the UV coating may be on the front surface of the lens, within the polymer and/or selective filter, or on the back surface of the lens, or any possible combination thereof. However, in one embodiment the UV blocking is in the front of the lens-furthest from the eye. This allows for protection of the primer and/or dye and also the eye. In another embodiment, applying UV blocking on the rear of the lens—closest to the eye, allows for further reduction of UV light entering the eye by reflection of light from the back surface of the lens.

In other embodiments the dye is dried on the lens surface during the fabrication process by air drying and/or oven drying. UV light should be avoided during this step.

In other embodiments, the dye may be filtered before being applied to the lens.

In other embodiments, during a dip coating process, the front and back surface of a lens is coated with the primer and the dye. In this case the dye on the front surface will fade over time due to UV light exposure to the front primer coating which is unprotected from UV light. This fading will allow for approximately 20% of the dye to fade over a two year period. Therefore, the back surface may be coated so that it has +20% more blockage than the front primer. This embodiment initially artificially elevates the Yellowness Index, which increases eye protection, but as fading occurs over time, the Yellowness Index will decrease.

Embodiments disclosed herein provide for the YI being variable depending on the intended application. By way of example only, an ophthalmic application such as an eyeglass lens may provide optimal retinal protection and cosmesis with a YI of 5.0 whereby, a non-ophthalmic application such as a window of a home or commercial building may have a much higher YI of 15.0 so as to reduce overall light transmission with an even higher retinal protection level wherein cosmesis is less important than an ophthalmic eyeglass lens.

Embodiments include one or more dyes designed to filter high energy blue light wavelengths. These dyes may include porphyrins or derivatives with or without Soret bands. The dyes may include one or more peaks based on the intended target wavelengths. The dyes may also vary in slope. Further rings, layers, or zones of filtering can be incorporated into the systems disclosed herein. By way of example only, in the non-ophthalmic use of an automotive windshield it may be prudent to incorporate a layer of filtering in the upper horizontal aspect of the front windshield to both reduce glare from the sun and provide higher retinal protection than other parts of the windshield.

In one embodiment, the first system includes UV and/or IR (infrared) blocking. Thus, the first system may further include an IR blocking element or a UV blocking element, as discussed above. Embodiments disclosed herein can be applied to a static focus lens comprising a non-changeable color, a static focus lens comprising a changeable color such as, by way of example only, photochromic lens such as Transitions, a dynamic focusing lens comprising a non-changeable color, a dynamic focusing lens comprising a changeable color such as, by way of example only, photochromic lens such as Transitions.

FIGS. 29-37 present examples of various versions of the fabrications steps of selective blue-blocking ophthalmic lenses starting with non-UV-blocking and UV-blocking ophthalmic lens material substrates. Flexibility of the application of selective blue filtering coating is presented: it can be applied in different stages of the fabrication of surfaced lens (with or without prescription) depending on the UV-blocking character of the lens material used as a lens substrate. Generally, a Cu-porphyrin compound is first dissolved in a solvent to make a solution. The solution is then diluted with a primer and filtered to remove dust, contaminants, and un-dissolved aggregates of the dye. The solution is then applied to form an optical filter.

In FIG. 29A, fabrication steps for CR39 lenses are shown. In step 1, the UV blocking element is added to the CR39 semi-finished lens. In step 2, the optical filter comprising the Cu-porphyrin compound is applied by dip-coating, spin-coating, or spray coating. In step 3, the CR39-semi finished lens is surfaced, grinded, and/or polished. In step 4, a hardcoat is added.

In FIG. 29B, another way of fabricating CR39 lenses is shown. In step 1, the optical filter comprising the Cu-porphyrin compound is coated on the CR39 lens by dip-coating, spin-coating, or spray coating, In step 2, the CR39-semi finished lens is surfaced, grinded, and/or polished. In step 3, a hardcoat is added. In step 4, the UV blocking element is added to the CR39 semi-finished lens.

In FIG. 29C, another way of fabricating CR39 lenses is shown. In step 1, the optical filter comprising the Cu-porphyrin compound is coated on the CR39 lens by dip-coating, spin-coating, or spray coating In step 2, the CR39-semi finished lens is surfaced, grinded, and/or polished. In step 3, a hardcoat is added. In step 4, a UV blocking AR coating is added to the CR39 semi-finished lens.

In FIG. 30, one way of fabricating PC lenses is shown. In step 1, the optical filter comprising the Cu-porphyrin compound is coated on the PC lens by dip-coating, spin-coating, or spray coating In step 2, the PC lens is surfaced, grinded, and/or polished. In step 3, a hardcoat is added.

In FIG. 31, one way of fabricating MR8 lenses is shown. In step 1, the optical filter comprising the Cu-porphyrin compound is coated on the MR8 lens by dip-coating, spin-coating, or spray coating. In step 2, the MR8 lens is surfaced, grinded, and/or polished. In step 3, a hardcoat is added.

In FIG. 32A, one way of fabricating MR8 lenses with an additional UV blocker is shown. This method of similar to the one shown in FIG. 31 except that it has an additional step 4 of adding the UV blocking element. FIG. 32B shows another way of fabricating MR8 lenses with an additional UV blocker. It is similar to the method shown in FIG. 31, except that a prior step is added before step 1, where the prior step includes adding the UV blocking element. FIG. 32C shows one way of fabricating MR-8 lenses with additional UV blocking AR coating. It is similar to the method shown in FIG. 31, except that step 3 comprises using a UV AR coating.

In FIG. 33, one embodiment of fabrication steps for MR-7 lenses are shown. These steps are similar to the steps shown in FIG. 31. In FIG. 34, one embodiment of fabrication steps for MR-10 lenses are shown. These steps are similar to the steps shown in FIG. 31.

FIG. 35 shows an embodiment of fabrication where a protective removable layer is used. In step 1, the lens blank is surfaced, grinded, and/or polished. In step 2, one surface of the lens blank is protected with the use of a removable layer. In step 3, the optical filter comprising the Cu-porphyrin compound is coated by dip-coating, spin-coating, spray-coating, or similar processes. In step 4, the protective layer is removed by peeling-off, washing out, and other similar processes. In step 5, the hardcoat is added.

FIG. 36 shows an example of both surfaces coated with the optical filter on inherently non-UV-blocking lens substrates. In step 1, lens blank is surfaced, grinded, and/or polished. In step 2, the optical filter comprising the Cu-porphyrin compound is coated on the lens by dip-coating, spin-coating, or spray coating. In step 3, a hardcoat is added. In step 4, a UV blocking element is added.

FIG. 37 shows an example of both surfaces coated with the optical filter on inherently UV-blocking lens substrates. In step 1, lens blank is surfaced, grinded, and/or polished. In step 2, the optical filter comprising the Cu-porphyrin compound is coated on the lens by dip-coating, spin-coating, or spray coating. In step 3, a hardcoat is added.

FIG. 38 presents transmission spectra of lens, which both sides are coated with selective blue-blocking coating (HPO coating), and transmission spectra of the lens upon removal of the back coated surface, by e.g. by so-called surfacing step. Note that the % blue light blockage upon surfacing (removal of the lens back surface) is approximately. half of the initial % blockage.

FIG. 39 presents schematics of cross-sections of various blanks (semi-finished, thick, thin) and lenses used in ophthalmic industry.

FIG. 40 presents the Yellowness Index (YI) vs. % blue light blockage, calculated for different spectral ranges for coatings on glass substrates comprising FS-206 dye at different concentrations. Note: the glass substrate does not contribute to the final/reported YI (YI of glass is 0), as well as the % blue light blockage can slightly vary depending on the spectral range where it is calculated.

FIG. 51 shows an exemplary transmission spectrum of a glass slide.

FIG. 52 shows an exemplary transmission spectra of the glass slide in FIG. 51 coated with primer and a hardcoat.

FIG. 53 shows the transmission spectra of a glass slide used in FIG. 51 coated (1) with HPO selective filter with about 20% blue light blockage and (2) the hardcoat used in FIG. 52. The HPO selective filter used in FIG. 53 comprises FS-206 dye compound and the primer used in FIG. 52.

FIG. 54 shows the transmission spectra of a glass slide used in FIG. 51 coated with HPO selective filter with about 30% blue light blockage the hardcoat used in FIG. 52. The optical HPO selective filter used in FIG. 54 comprises FS-206 dye compound and the primer used in FIG. 52.

FIG. 55 shows the transmission spectra of a glass slide used in FIG. 51 coated with HPO selective filter with about 40% blue light blockage and the hardcoat used in FIG. 52. The HPO selective filter used in FIG. 55 comprises FS-206 dye compound and the primer used in FIG. 52. The systems used in FIGS. 53, 54, and FIG. 55 are identical to the system used in FIG. 52, except for the addition of the FS-206 dye compound. Thus, in the system of FIGS. 53, 54, and 55, the transmission spectrum of the dye alone could be determined by comparing those spectrum to the spectrum in FIG. 52.

In one embodiment, the system may contain one or more anti-reflective (AR) coatings. Besides its main purpose, the AR coating may significantly block (reflect) blue light in 400-460 nm spectral range.

In one embodiment, the system may contain the selective blue blocking coating and one or more AR coatings. The total % blue light blocking by the system can be as a result solely by the selective blue light absorptive coating, or can be a sum of the blockage provided by the selective blue blocking coating (by absorption) and the blockage (reflection) provided by the AR coating.

While this disclosure describes many embodiments, some of which show specific layers and layer arrangements, these specific layers and layer arrangements are non-limiting. One of skill in the art will readily understand that providing selective-blue blocking layers and/or components in devices that transmit light may be achieved using the teachings disclosed herein, without specifically using the aforementioned specific layers and layer arrangements disclosed.

Further, references herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. The breadth and scope of the invention should not be limited by any of the above-described exemplary embodiments, but should be defined only in accordance with the following claims and their equivalents.

What is claimed:

1. A first system, comprising:
an optical filter comprising a Cu-porphyrin compound, wherein the Cu-porphyrin compound has a structure of:

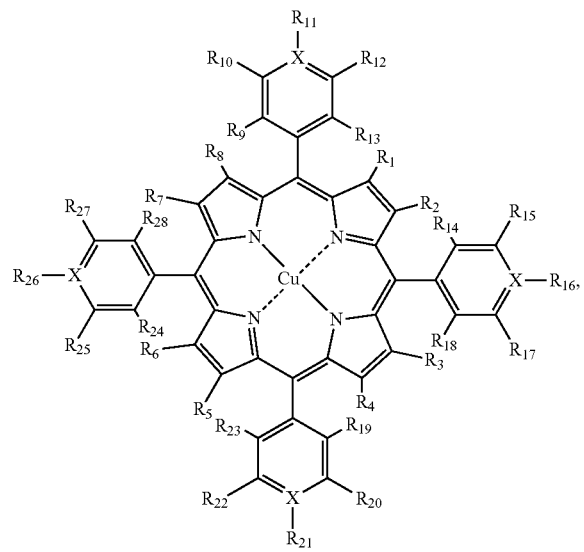

(Formula I)

or a salt, or a tautomeric form thereof, wherein:

X is carbon, each of $R_1$ through $R_8$ is H; and each of $R_9$ through $R_{28}$ is independently H, F, Br, Cl, carboxylic acid, a carboxylic ester, or forms a 6-membered aromatic ring structure with an adjacent member of $R_9$ through $R_{28}$;

wherein at least one of $R_9$-$R_{13}$, at least one of $R_{14}$-$R_{18}$, at least one of $R_{19}$-$R_{23}$, and at least one of $R_{24}$-$R_{28}$ are not H and wherein at least two of $R_9$-$R_{13}$, at least two of $R_{14}$-$R_{18}$, at least two of $R_{19}$-$R_{23}$, and at least two of $R_{24}$-$R_{28}$ are H; and wherein the first system comprises a first substrate having a first surface and optionally a second substrate, and wherein the Cu-porphyrin compound is incorporated into the first system by one or more of:

(1) dispersing the Cu-porphyrin compound in a coating disposed on the first surface, (2) dispersing the Cu-porphyrin compound through the first substrate, and (3) dispersing the Cu-porphyrin compound in a polymer interlayer disposed between the first substrate and the second substrate, and wherein $TS_{RG}$ is the average transmission of the first system across the wavelength range of 460-700 nm;

$TS_{Blue}$ is the average transmission of the first system across the wavelength range of 400-460 nm;

$TS_{RG} >= 80\%$;

$TS_{Blue} < TS_{RG}-5\%$.

2. The first system of claim 1, wherein the Cu-porphyrin compound is Cu(II) meso-Tetra(1-naphthyl)porphine or Cu(II) meso-Tetra(4-carboxyphenyl) porphine.

3. The first system of claim 1, wherein each of $R_9$ through $R_{28}$ is independently H, carboxylic acid, or a carboxylic ester.

4. The first system of claim 3, wherein each of $R_9$ through $R_{28}$ is independently H or carboxylic acid.

5. The first system of claim 3, wherein each of $R_9$ through $R_{28}$ is independently H or a carboxylic ester.

6. The first system claim 1, wherein on each phenyl ring to which $R_9$ through $R_{28}$ are attached, two adjacent members of $R_9$ through $R_{28}$ form a 6-membered aromatic ring structure.

7. The first system of claim 1, wherein the first system is an ophthalmic system.

8. The first system of claim 7, wherein the first system is a contact lens.

9. The first system of claim 7, wherein the first system is an intra-ocular lens.

10. The first system of claim 1, wherein the first system is a non-ophthalmic ocular system.

11. The first system of claim 10, wherein the first system is an automotive windshield.

12. The first system of claim 10, wherein the first system is an automotive side window.

13. The first system of claim 10, wherein the first system is an automotive sunroof window.

14. The first system of claim 10, wherein the first system is commercial glass.

15. The first system of claim 10, wherein the first system is residential glass.

16. The first system of claim 1, wherein:

the optical filter has a transmission spectrum;

$TF_{RG}$ is the average transmission of the optical filter across the wavelength range of 460-700 nm;

$TF_{Blue}$ is the average transmission of the optical filter across the wavelength range of 400-460 nm;

$TF_{RG} >= 80\%$;

$TF_{Blue} < TF_{RG}-5\%$; and the optical filter has a first local minimum in transmission at a first wavelength within the wavelength range of 400-460 nm.

17. The first system of claim 1, wherein:

CIE Standard Illuminant D65 light having CIE LAB coordinates ($a*_1$, $b*_1$, $L*_1$), when transmitted through the first system, results in transmitted light having CIE LAB coordinates ($a*_2$, $b*_2$, $L*_2$), and a total color difference $\Delta E$ between ($a*_1$, $b*_1$, $L*_1$) and ($a*_2$, $b*_2$, $L*_2$) is less than 5.0.

18. The first system of claim 1, wherein:

CIE Standard Illuminant D65 light having CIE LAB coordinates ($a*_1$, $b*_1$, $L*_1$), when transmitted through the first system, results in transmitted light having CIE LAB coordinates ($a*_2$, $b*_2$, $L*_2$), and a total chroma difference between ($a*_1$, $b*_1$, $L*_1$) and ($a*_2$, $b*_2$, $L*_2$) is less than 5.0.

19. The first system of claim 1, wherein the first system has a yellowness index (YI) of no more than 35.

20. The first system of claim 1, wherein the optical filter has a yellowness index (VI) of no more than 35.

21. The first system of claim 1, wherein:

for at least one wavelength within 10 nm of the first wavelength on the negative side, the slope of the transmission spectrum of the first system has an absolute value that is less than the absolute value of the slope of the transmission spectrum at a third wavelength, wherein the third wavelength is more than 10 nm from the first wavelength on the negative side.

22. The first system of claim 1, wherein the Cu-porphyrin compound is Cu(II) meso-Tetra(1-naphthyl)porphine.

23. The first system of claim 1, wherein the Cu-porphyrin compound is Cu(II) meso-Tetra(4-carboxyphenyl)porphine.

24. The first system of claim 1, wherein the optical filter is incorporated in a layer of polyvinyl butyral (PVB).

25. The first system of claim 1, wherein the first system is a spectacle lens, a contact lens, an intra-ocular lens, an automotive windshield, an automotive side window, an automotive sunroof window, commercial glass, or residential glass.

26. The first system of claim 1, wherein the Cu-porphyrin compound is incorporated into the first system by dispersing the Cu-porphyrin compound in a coating disposed on the first surface.

27. The first system of claim 1, wherein the Cu-porphyrin compound is incorporated into the first system by dispersing the Cu-porphyrin compound through the first substrate.

28. The first system of claim 1, wherein the Cu-porphyrin compound is incorporated into the first system by dispersing the Cu-porphyrin compound in a polymer interlayer disposed between the first substrate and the second substrate.

29. A method, comprising:

dissolving a Cu-porphyrin compound in a solvent to make a solution;

diluting the solution with a primer to obtain a diluted solution;

filtering the diluted solution to obtain a filtrate; and applying the filtrate to form an optical filter, wherein the Cu-porphyrin compound has a structure of:

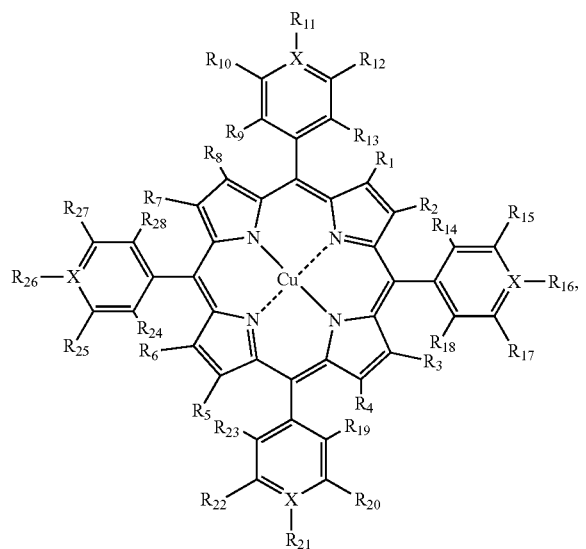

(Formula I)

or a salt, or a tautomeric form thereof, wherein:
X is carbon,
each of $R_1$ through $R_8$ is H; and
each of $R_9$ through $R_{28}$ is independently H, F, Br, Cl, carboxylic acid, a carboxylic ester, or forms a 6-membered aromatic ring structure with an adjacent member of $R_9$ through;
where at least one of $R_9$-$R_{13}$, at least one of $R_{14}$-$R_{18}$, at least one of $R_{19}$-$R_{23}$, and at least one of $R_{24}$-$R_{28}$ is not H and wherein at least two of $R_9$-$R_{13}$, at least two of $R_{14}$-$R_{18}$, at least two of $R_{19}$-$R_{23}$, and at least two of $R_{24}$-$R_{28}$ are H;
wherein a first system comprises a first substrate having a first surface and optionally a second substrate, and wherein the Cu-porphyrin compound is incorporated into the first system by one or more of:
(1) dispersing the Cu-porphyrin compound in a coating disposed on the first surface,
(2) dispersing the Cu-porphyrin compound through the first substrate, and
(3) dispersing the Cu-porphyrin compound in a polymer interlayer disposed between the first substrate and the second substrate, and
wherein
$TS_{RG}$ is the average transmission of the first system across the wavelength range of 460-700 nm;
$TS_{Blue}$ is the average transmission of the first system across the wavelength range of 400-460 nm;
$TS_{RG} >= 80\%$;
$TS_{Blue} < TS_{RG} - 5\%$.

* * * * *